(12) United States Patent
Son et al.

(10) Patent No.: US 12,523,205 B2
(45) Date of Patent: Jan. 13, 2026

(54) FLUID ROUTING PLUG

(71) Applicant: Kerr Machine Co., Sulphur, OK (US)

(72) Inventors: Nicholas Son, Davis, OK (US); Micheal Cole Thomas, Azle, TX (US); Christopher Todd Barnett, Stratford, OK (US); Kelcy Jake Foster, Sulphur, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 19/213,760

(22) Filed: May 20, 2025

(65) Prior Publication Data

US 2025/0283454 A1    Sep. 11, 2025

Related U.S. Application Data

(63) Continuation-in-part of application No. 19/036,483, filed on Jan. 24, 2025, which is a continuation-in-part
(Continued)

(51) Int. Cl.
| | |
|---|---|
| F04B 15/02 | (2006.01) |
| F04B 7/00 | (2006.01) |
| F04B 7/02 | (2006.01) |
| F04B 53/10 | (2006.01) |
| F04B 53/16 | (2006.01) |

(Continued)

(52) U.S. Cl.
CPC ............ *F04B 15/02* (2013.01); *F04B 7/0003* (2013.01); *F04B 7/0088* (2013.01); *F04B 7/0208* (2013.01); *F04B 53/1022* (2013.01); *F04B 53/1032* (2013.01); *F04B 53/162* (2013.01);
(Continued)

(58) Field of Classification Search
CPC ........ F04B 53/22; F04B 53/16; F04B 53/162; F04B 39/14; F04B 39/12; F04B 39/121; F04B 39/122; F04B 39/127; F04B 35/002; F04B 7/0084; F04B 7/0003; F04B 11/0091; F04B 53/1087; F04B 1/0452; F04B 53/007; F04B 53/109; F04B 15/02; F04B 1/0538; F04B 53/1022; F04B 53/1032; F04B 7/0266; F04B 7/0088; F04B 7/0208; F16L 55/11; F16L 39/00; F16K 15/066; F16K 11/105
See application file for complete search history.

(56) References Cited

U.S. PATENT DOCUMENTS

| | | |
|---|---|---|
| 677,137 A | 6/1901 | Leavitt |
| 2,771,846 A | 11/1956 | Horton et al. |

(Continued)

FOREIGN PATENT DOCUMENTS

| | | |
|---|---|---|
| CN | 105756880 A | 7/2016 |
| CN | 108843531 A | 11/2018 |

(Continued)

*Primary Examiner* — Bryan M Lettman
(74) *Attorney, Agent, or Firm* — Tomlinson McKinstry, P.C.

(57) ABSTRACT

A fluid routing plug for use with a fluid end section. The fluid end section being one of a plurality of fluid end sections making up a fluid end side of a high pressure pump. The fluid routing plug is installed within a horizontal bore formed in a fluid end section and is configured to route fluid throughout the fluid end section.

21 Claims, 105 Drawing Sheets

Related U.S. Application Data of application No. 18/779,480, filed on Jul. 22, 2024, now Pat. No. 12,215,679, which is a continuation of application No. 18/396,991, filed on Dec. 27, 2023, now Pat. No. 12,049,880, which is a continuation of application No. 18/341,070, filed on Jun. 26, 2023, now Pat. No. 11,859,601, which is a continuation of application No. 17/884,736, filed on Aug. 10, 2022, now Pat. No. 11,686,296, which is a continuation-in-part of application No. 17/668,529, filed on Feb. 10, 2022, now Pat. No. 11,578,711, which is a continuation-in-part of application No. 16/951,605, filed on Nov. 18, 2020, now Pat. No. 11,300,111, said application No. 17/668,529 is a continuation-in-part of application No. 17/550,552, filed on Dec. 14, 2021, now Pat. No. 11,644,018, which is a continuation-in-part of application No. 17/515,707, filed on Nov. 1, 2021, now Pat. No. 11,359,615, which is a continuation of application No. 16/951,741, filed on Nov. 18, 2020, now Pat. No. 11,162,479.

(60) Provisional application No. 62/936,789, filed on Nov. 18, 2019, provisional application No. 62/940,513, filed on Nov. 26, 2019, provisional application No. 62/953,763, filed on Dec. 26, 2019, provisional application No. 62/957,489, filed on Jan. 6, 2020, provisional application No. 62/959,570, filed on Jan. 10, 2020, provisional application No. 62/960,194, filed on Jan. 13, 2020, provisional application No. 62/960,366, filed on Jan. 13, 2020, provisional application No. 62/968,634, filed on Jan. 31, 2020, provisional application No. 62/990,817, filed on Mar. 17, 2020, provisional application No. 63/008,036, filed on Apr. 10, 2020, provisional application No. 63/018,021, filed on Apr. 30, 2020, provisional application No. 63/019,789, filed on May 4, 2020, provisional application No. 63/027,584, filed on May 20, 2020, provisional application No. 63/033,244, filed on Jun. 2, 2020, provisional application No. 63/040,086, filed on Jun. 17, 2020, provisional application No. 63/046,826, filed on Jul. 1, 2020, provisional application No. 63/053,797, filed on Jul. 20, 2020, provisional application No. 63/076,587, filed on Sep. 10, 2020, provisional application No. 63/089,882, filed on Oct. 9, 2020, provisional application No. 63/125,459, filed on Dec. 15, 2020, provisional application No. 63/148,065, filed on Feb. 10, 2021, provisional application No. 63/150,340, filed on Feb. 17, 2021, provisional application No. 63/155,835, filed on Mar. 3, 2021, provisional application No. 63/168,364, filed on Mar. 31, 2021, provisional application No. 63/283,487, filed on Nov. 28, 2021, provisional application No. 63/233,241, filed on Aug. 14, 2021, provisional application No. 63/240,889, filed on Sep. 4, 2021, provisional application No. 63/246,099, filed on Sep. 20, 2021, provisional application No. 63/301,524, filed on Jan. 21, 2022, provisional application No. 63/304,070, filed on Jan. 28, 2022, provisional application No. 63/310,269, filed on Feb. 15, 2022, provisional application No. 63/312,541, filed on Feb. 22, 2022, provisional application No. 63/309,168, filed on Feb. 11, 2022, provisional application No. 63/235,251, filed on Aug. 20, 2021.

(51) Int. Cl.
  *F04B 53/22* (2006.01)
  *F16K 11/10* (2006.01)
  *F16L 55/11* (2006.01)

(52) U.S. Cl.
  CPC ............ *F04B 53/22* (2013.01); *F16K 11/105* (2013.01); *F16L 55/11* (2013.01); *F04B 7/0266* (2013.01)

(56) References Cited

U.S. PATENT DOCUMENTS

| | | |
|---|---|---|
| 2,828,696 A | 4/1958 | Wright |
| 3,062,198 A | 11/1962 | Richardson |
| 3,181,473 A | 5/1965 | Duron |
| 3,309,013 A | 3/1967 | Bauer |
| 3,370,545 A | 2/1968 | Waibel |
| 3,508,849 A | 4/1970 | Weber |
| 3,528,613 A | 9/1970 | Berlyn |
| 3,531,052 A | 9/1970 | Berlyn |
| 3,652,098 A | 3/1972 | Kawazu |
| 3,702,624 A * | 11/1972 | Fries .................... F16K 15/066 137/516.23 |
| 3,746,483 A | 7/1973 | Hindel |
| 3,777,779 A | 12/1973 | Scwaller |
| 4,078,574 A | 3/1978 | Kosarzecki |
| 4,174,194 A | 11/1979 | Hammelmann |
| 4,412,792 A | 11/1983 | LaBorde |
| 4,551,077 A | 11/1985 | Pacht |
| 4,616,983 A | 10/1986 | Hanafi |
| 4,878,815 A | 11/1989 | Stachowiak |
| 4,960,039 A | 10/1990 | Robertson |
| 5,037,276 A | 8/1991 | Tremoulet |
| 5,059,101 A | 10/1991 | Valvaara |
| 5,064,354 A | 11/1991 | Robertson |
| 5,127,807 A | 7/1992 | Eslinger |
| 5,230,363 A | 7/1993 | Winn, Jr. et al. |
| 5,253,987 A | 10/1993 | Harrison |
| 5,302,087 A | 4/1994 | Pacht |
| 5,331,736 A | 7/1994 | Suggs |
| 5,382,057 A | 1/1995 | Richter |
| 5,605,449 A | 2/1997 | Reed |
| 5,636,975 A | 6/1997 | Tiffany et al. |
| 5,709,514 A | 1/1998 | Suggs |
| 5,924,853 A | 7/1999 | Pacht |
| 6,231,323 B1 | 5/2001 | Jezek |
| 6,234,490 B1 | 5/2001 | Champlin |
| 6,341,950 B1 | 1/2002 | Schuller et al. |
| 7,354,046 B2 | 4/2008 | Ramsay |
| 8,047,820 B2 | 11/2011 | Merrick |
| 8,240,634 B2 | 8/2012 | Jarchau et al. |
| 9,188,122 B1 | 11/2015 | Reed |
| 9,328,745 B2 | 5/2016 | Bartlok et al. |
| 9,371,919 B2 | 6/2016 | Forrest et al. |
| 9,670,922 B2 | 6/2017 | Pacht |
| 10,184,470 B2 | 1/2019 | Barnett |
| D916,240 S | 4/2021 | Nowell et al. |
| 2008/0093361 A1 | 4/2008 | Kennedy |
| 2009/0194717 A1 | 8/2009 | Jarchau et al. |
| 2012/0272764 A1 | 11/2012 | Pendleton |
| 2013/0045123 A1 | 2/2013 | Roman et al. |
| 2013/0263932 A1 | 10/2013 | Baxter |
| 2014/0127062 A1 | 5/2014 | Buckley et al. |
| 2014/0348677 A1 | 11/2014 | Moeller |
| 2015/0071803 A1* | 3/2015 | Huang ................ F04B 39/1046 417/560 |
| 2015/0144826 A1 | 5/2015 | Bayyouk et al. |
| 2015/0147194 A1 | 5/2015 | Foote |
| 2015/0211641 A1* | 7/2015 | Pacht .................... F04B 1/145 251/359 |
| 2016/0090980 A1 | 3/2016 | Howard et al. |
| 2017/0204852 A1 | 7/2017 | Barnett, Jr. |
| 2018/0306150 A1 | 10/2018 | Stecklein et al. |
| 2019/0017503 A1 | 1/2019 | Foster et al. |
| 2019/0032685 A1 | 1/2019 | Foster et al. |
| 2019/0040966 A1 | 2/2019 | Myers et al. |

(56) References Cited

U.S. PATENT DOCUMENTS

| | | |
|---|---|---|
| 2019/0063427 A1 | 2/2019 | Nowell et al. |
| 2019/0128104 A1 | 5/2019 | Graham |
| 2019/0242373 A1 | 8/2019 | Wernig |
| 2019/0360482 A1 | 11/2019 | Nowell et al. |
| 2020/0182240 A1 | 6/2020 | Nowell et al. |
| 2022/0243724 A1 | 8/2022 | Li |
| 2022/0260161 A1 | 8/2022 | Nowell et al. |
| 2022/0412346 A1 | 12/2022 | Nowell et al. |

FOREIGN PATENT DOCUMENTS

| | | |
|---|---|---|
| CN | 109989912 A | 7/2019 |
| CN | 111255677 A | 6/2020 |

\* cited by examiner

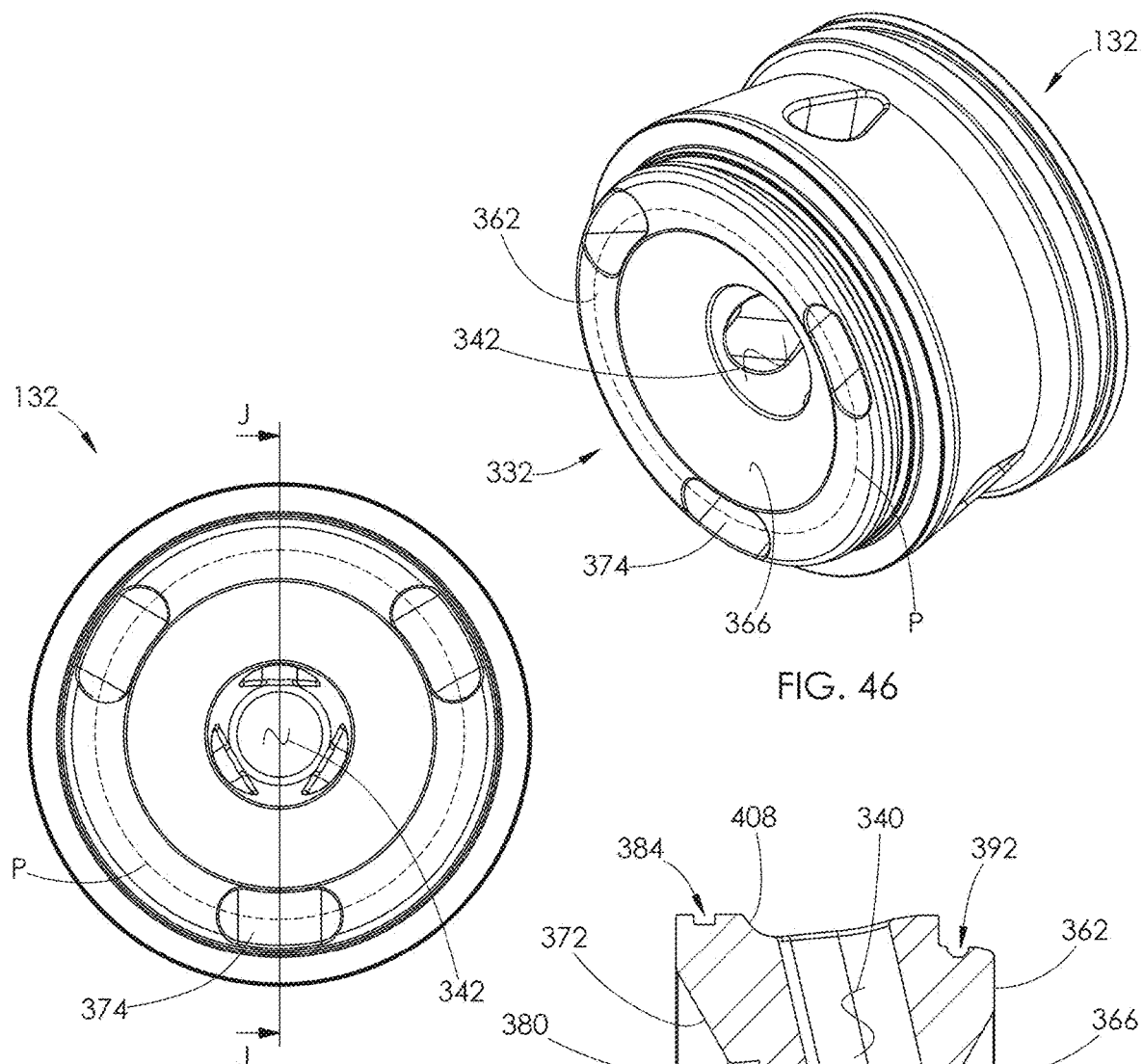
FIG. 46
FIG. 47
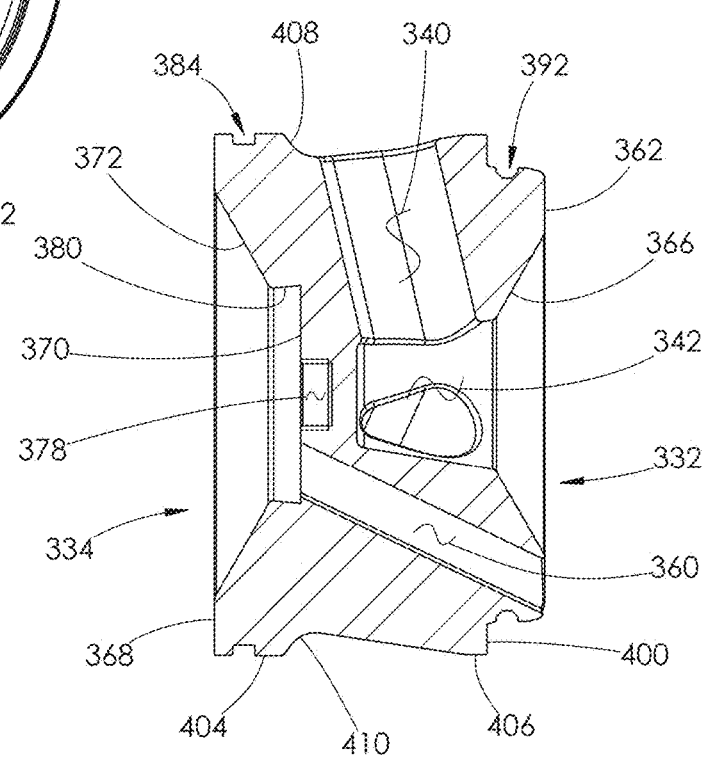
FIG. 48

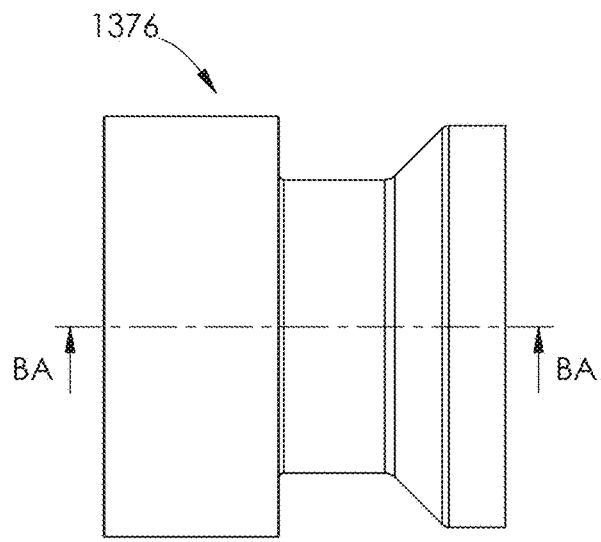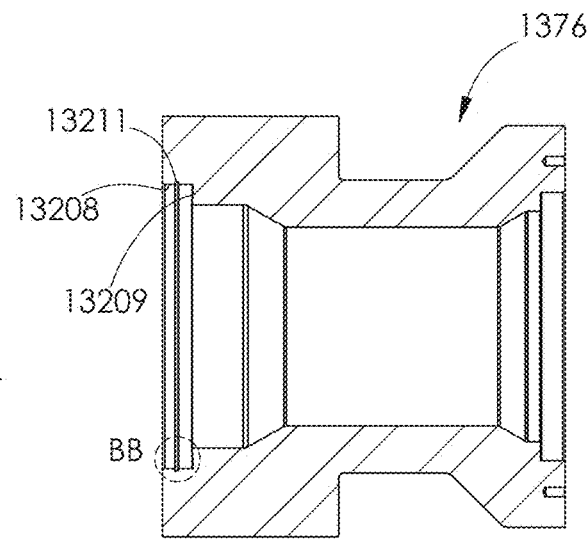
FIG. 145                              FIG. 146
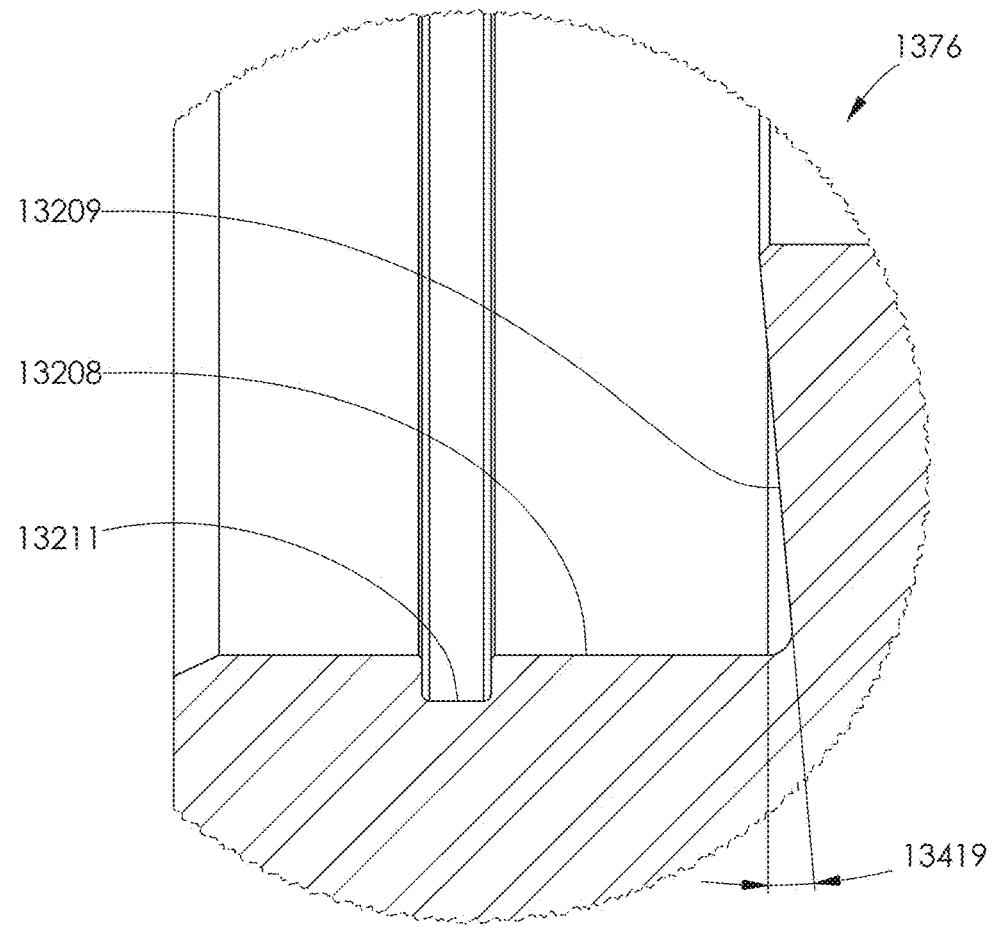
FIG. 147

FLUID ROUTING PLUG

BACKGROUND

Various industrial applications may require the delivery of high volumes of highly pressurized fluids. For example, hydraulic fracturing (commonly referred to as "fracking") is a well stimulation technique used in oil and gas production, in which highly pressurized fluid is injected into a cased wellbore. As shown for example in FIG. 1, the pressured fluid flows through perforations 10 in a casing 12 and creates fractures 14 in deep rock formations 16. Pressurized fluid is delivered to the casing 12 through a wellhead 18 supported on the ground surface 20. Sand or other small particles (commonly referred to as "proppants") are normally delivered with the fluid into the rock formations 16. The proppants help hold the fractures 14 open after the fluid is withdrawn. The resulting fractures 14 facilitate the extraction of oil, gas, brine, or other fluid trapped within the rock formations 16.

Fluid ends are devices used in conjunction with a power source to pressurize the fluid used during hydraulic fracturing operations. A single fracking operation may require the use of two or more fluid ends at one time. For example, six fluid ends 22 are shown operating at a wellsite 24 in FIG. 2. Each of the fluid ends 22 is attached to a power end 26 in a one-to-one relationship. The power end 26 serves as an engine or motor for the fluid end 22. Together, the fluid end 22 and power end 26 function as a high pressure pump.

Continuing with FIG. 2, a single fluid end 22 and its corresponding power end 26 are typically positioned on a truck bed 28 at the wellsite 24 so that they may be easily moved, as needed. The fluid and proppant mixture to be pressurized is normally held in large tanks 30 at the wellsite 24. An intake piping system 32 delivers the fluid and proppant mixture from the tanks 30 to each fluid end 22. A discharge piping system 33 transfers the pressurized fluid from each fluid end 22 to the wellhead 18, where it is delivered into the casing 12 shown in FIG. 1.

Fluid ends operate under notoriously extreme conditions, enduring the same pressures, vibrations, and abrasives that are needed to fracture the deep rock formations 16, shown in FIG. 1. Fluid ends may operate at pressures of 5,000-15,000 pounds per square inch (psi) or greater. Fluid used in hydraulic fracturing operations is typically pumped through the fluid end at a pressure of at least 8,000 psi, and more typically between 10,000 and 15,000 psi. However, the pressure may reach up to 22,500 psi. The power end used with the fluid end typically has a power output of at least 2,250 horsepower during hydraulic fracturing operations. A single fluid end typically produces a fluid volume of about 400 gallons, or 10 barrels, per minute during a fracking operation. A single fluid end may operate in flow ranges from 170 to 630 gallons per minute, or approximately 4 to 15 barrels per minute. When a plurality of fluid ends are used together, the fluid ends collectively may deliver as much as 4,200 gallons per minute or 100 barrels per minute to the wellbore.

In contrast, mud pumps known in the art typically operate at a pressure of less than 8,000 psi. Mud pumps are used to deliver drilling mud to a rotating drill bit within the wellbore during drilling operations. Thus, the drilling mud does not need to have as high of fluid pressure as fracking fluid. A fluid end does not pump drilling mud. A power end used with mud pumps typically has a power output of less than 2,250 horsepower. Mud pumps generally produce a fluid volume of about 150-600 gallons per minute, depending on the size of pump used.

In further contrast, a fluid jetting pump known in the art typically operates at pressures of 30,000-90,000 psi. Jet pumps are used to deliver a highly concentrated stream of fluid to a desired area. Jet pumps typically deliver fluid through a wand. Fluid ends do not deliver fluid through a wand. Unlike fluid ends, jet pumps are not used in concert with a plurality of other jet pumps. Rather, only a single jet pump is used to pressurize fluid. A power end used with a jet pump typically has a power output of about 1,000 horsepower. Jet pumps generally produce a fluid volume of about 10 gallons per minute.

High operational pressures may cause a fluid end to expand or crack. Such a structural failure may lead to fluid leakage, which leaves the fluid end unable to produce and maintain adequate fluid pressures. Moreover, if proppants are included in the pressurized fluid, those proppants may cause erosion at weak points within the fluid end, resulting in additional failures.

It is not uncommon for conventional fluid ends to experience failure after only several hundred operating hours. Yet, a single fracking operation may require as many as fifty (50) hours of fluid end operation. Thus, a traditional fluid end may require replacement after use on as few as two fracking jobs. There is a need in the industry for a fluid end configured to avoid or significantly delay the structures or conditions that cause wear or failures within a fluid end.

BRIEF DESCRIPTION OF THE DRAWINGS

First Embodiment

FIG. 46 is a rear perspective view of the fluid routing plug shown in FIG. 43.

FIG. 47 is a rear elevational view of the fluid routing plug shown in FIG. 43.

FIG. 48 is a cross-sectional view of the fluid routing plug shown in FIG. 47, taken along line J-J.

Alternative Embodiments

Figure 81:
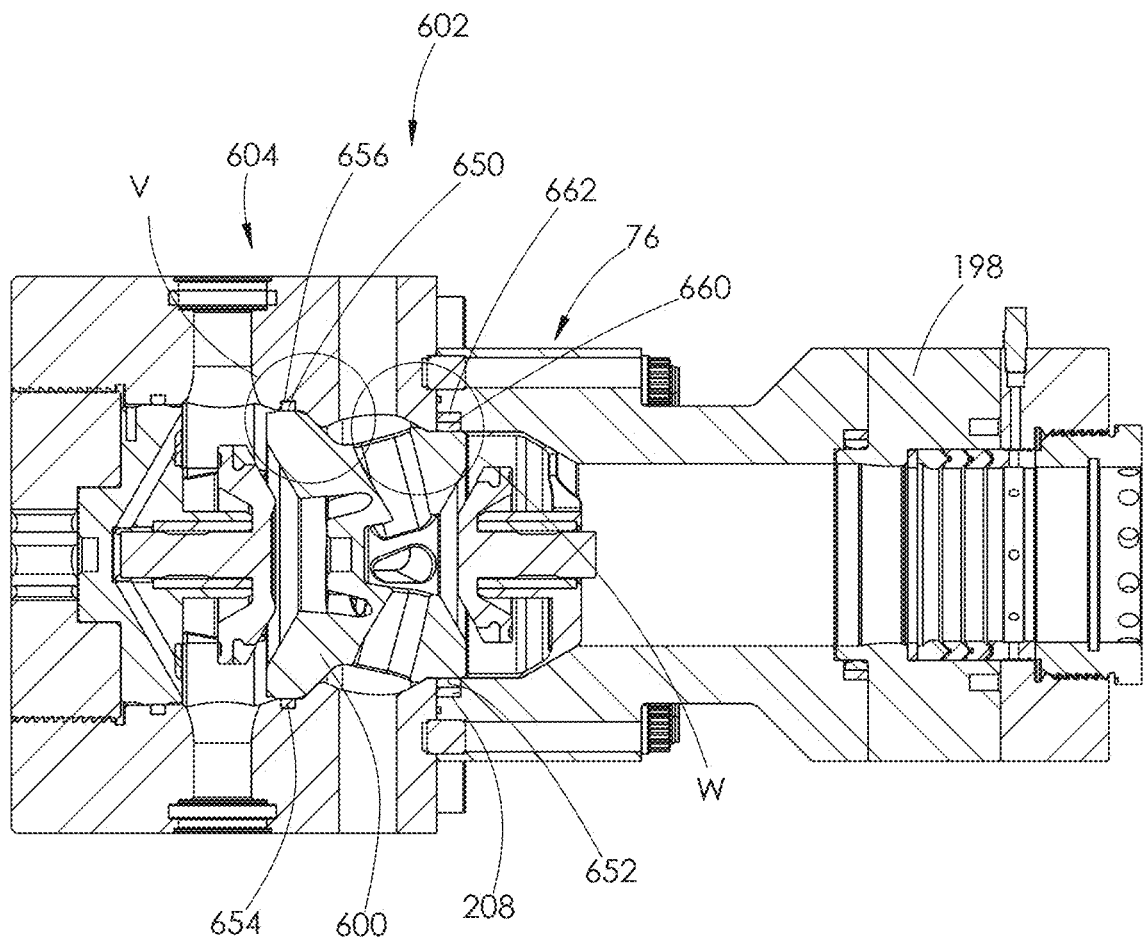

FIG. 81 is a cross-sectional view of an alternative embodiment of a fluid end section having an alternative embodiment of a fluid routing plug installed therein.

Figure 82:
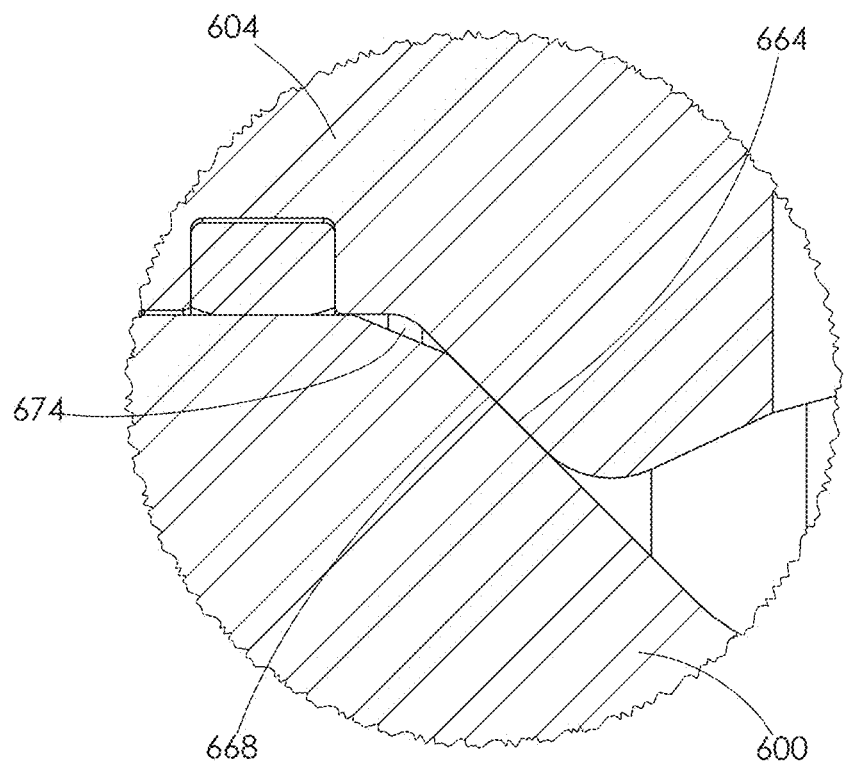

FIG. 82 is an enlarged view of area V shown in FIG. 81.

Figure 83:
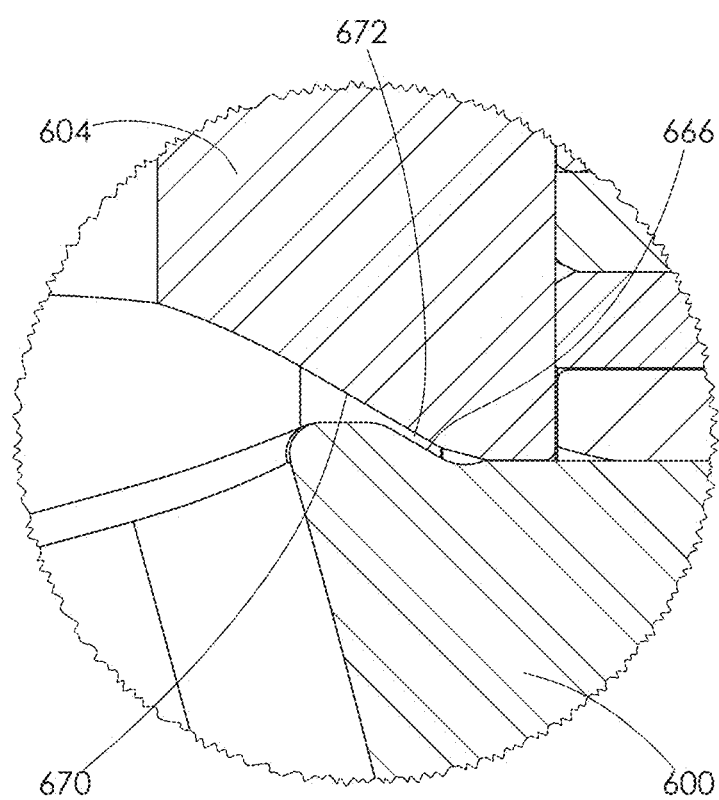

FIG. 83 is an enlarged view of area W shown in FIG. 81.

Figure 84:
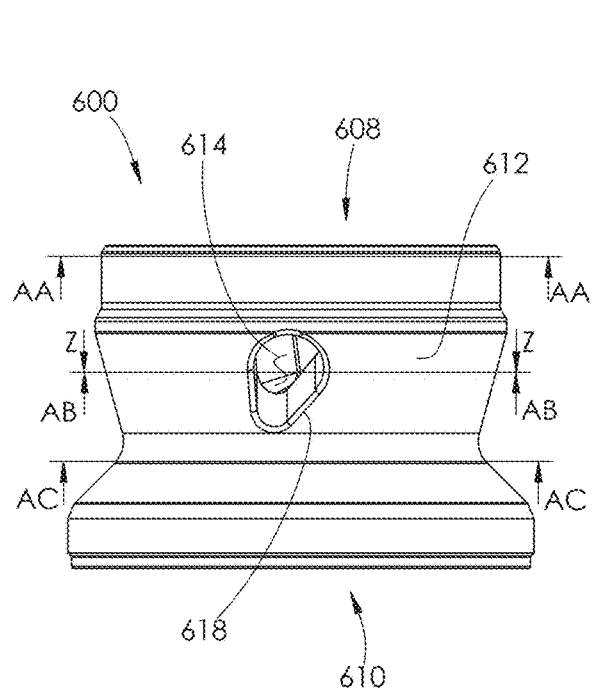

FIG. 84 is a top plan view of the fluid routing plug shown in FIG. 81.

Figure 85:
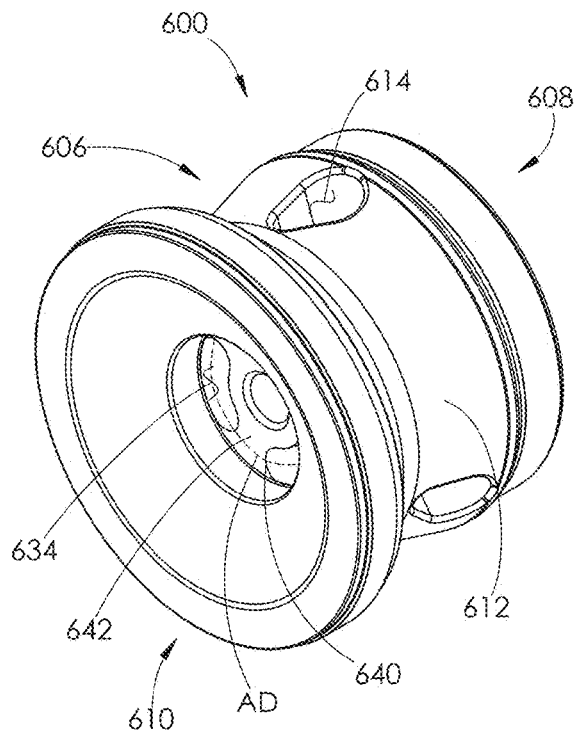

FIG. 85 is a front perspective view of the fluid routing plug shown in FIG. 84.

Figure 86:
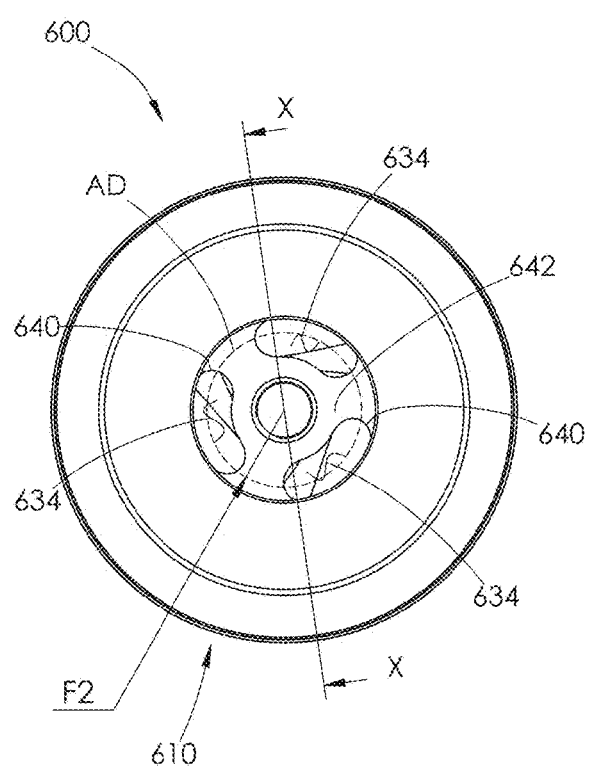

FIG. 86 is a front elevational view of the fluid routing plug shown in FIG. 84.

Figure 87:
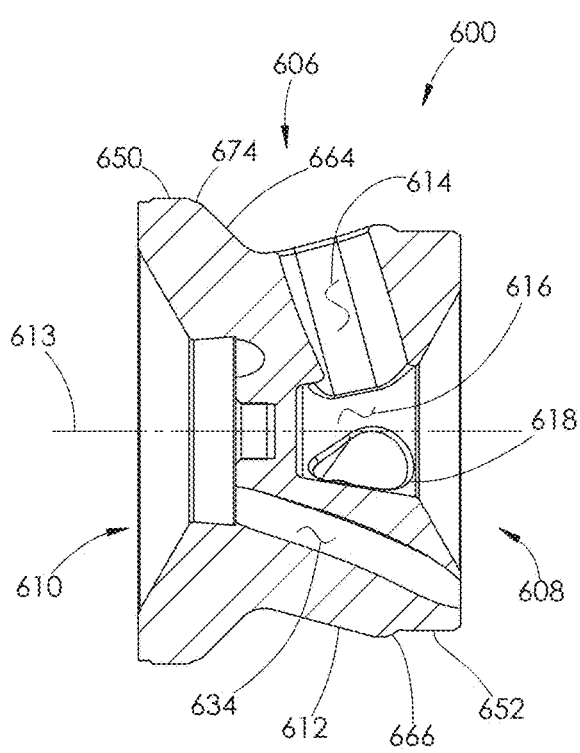

FIG. 87 is a cross-sectional view of the fluid routing plug shown in FIG. 86, taken along line X-X.

Figure 88:
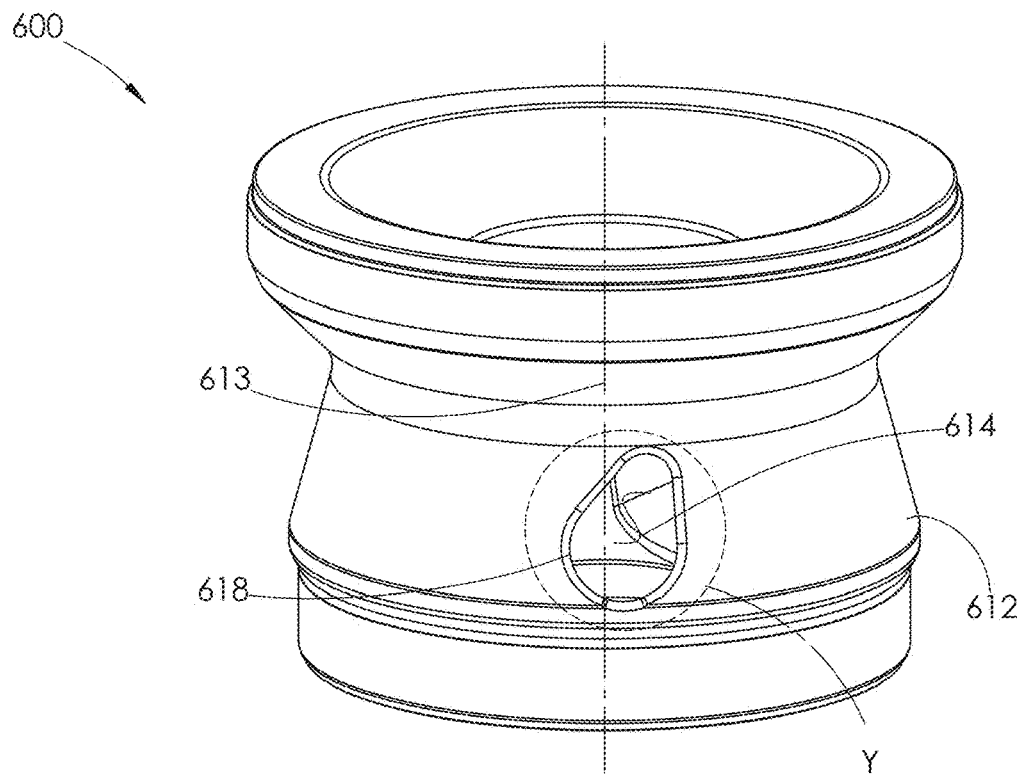

FIG. 88 is a top perspective view of the fluid routing plug shown in FIG. 84.

Figure 89:
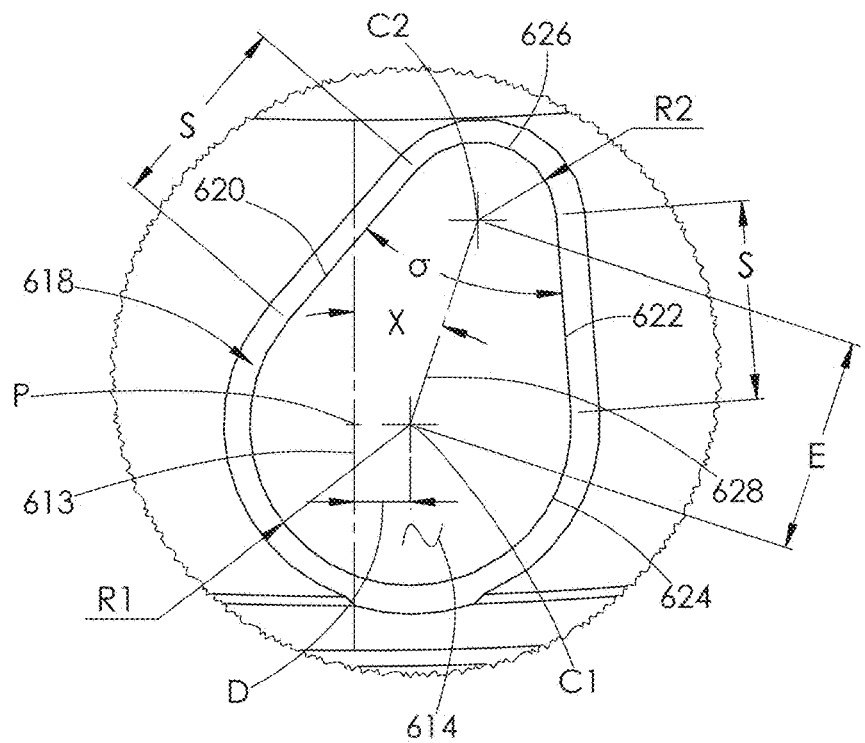

FIG. 89 is an enlarged view of area Y shown in FIG. 88.

Figure 90:
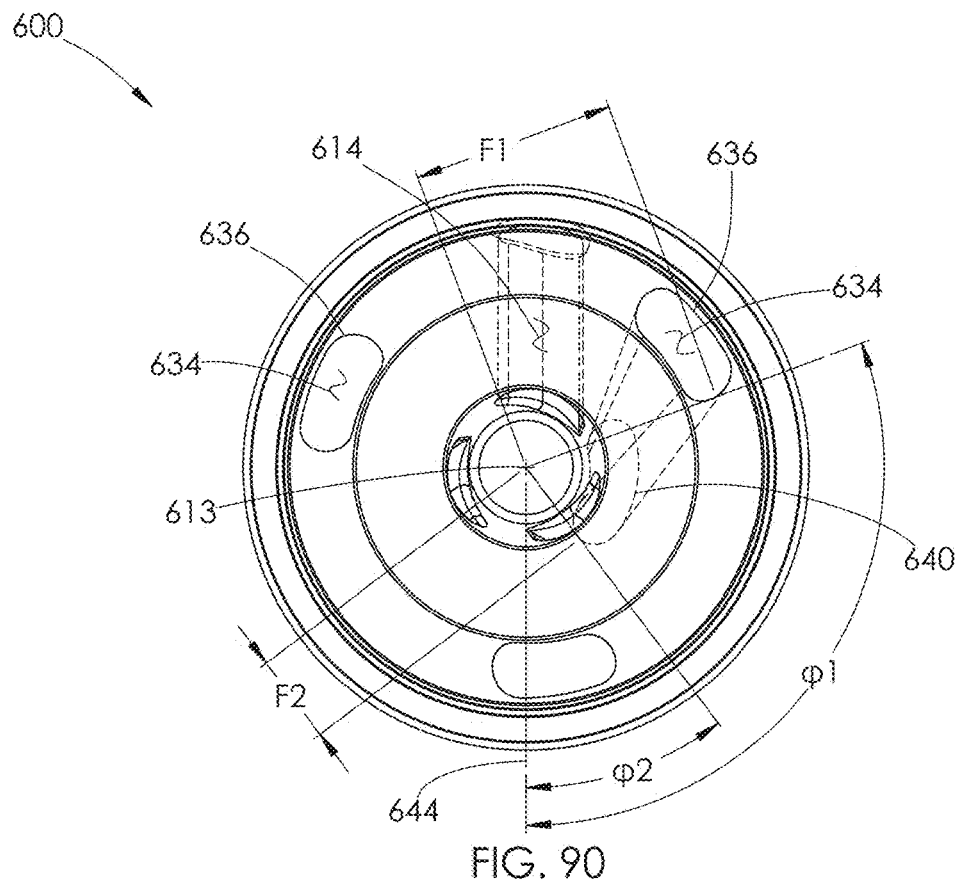

FIG. 90 is a rear elevational view of the fluid routing plug shown in FIG. 84, but one of the suction passages and one of the discharge passages are shown in phantom.

Figure 91:
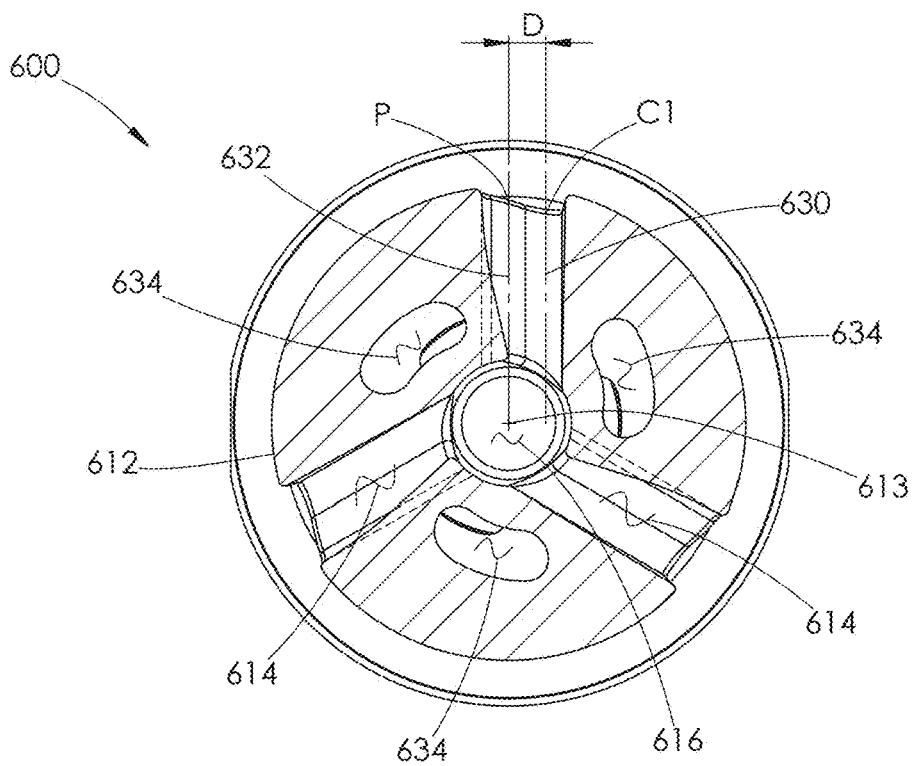

FIG. 91 is a cross-sectional view of the fluid routing plug shown in FIG. 84, taken along line Z-Z.

Figure 92:
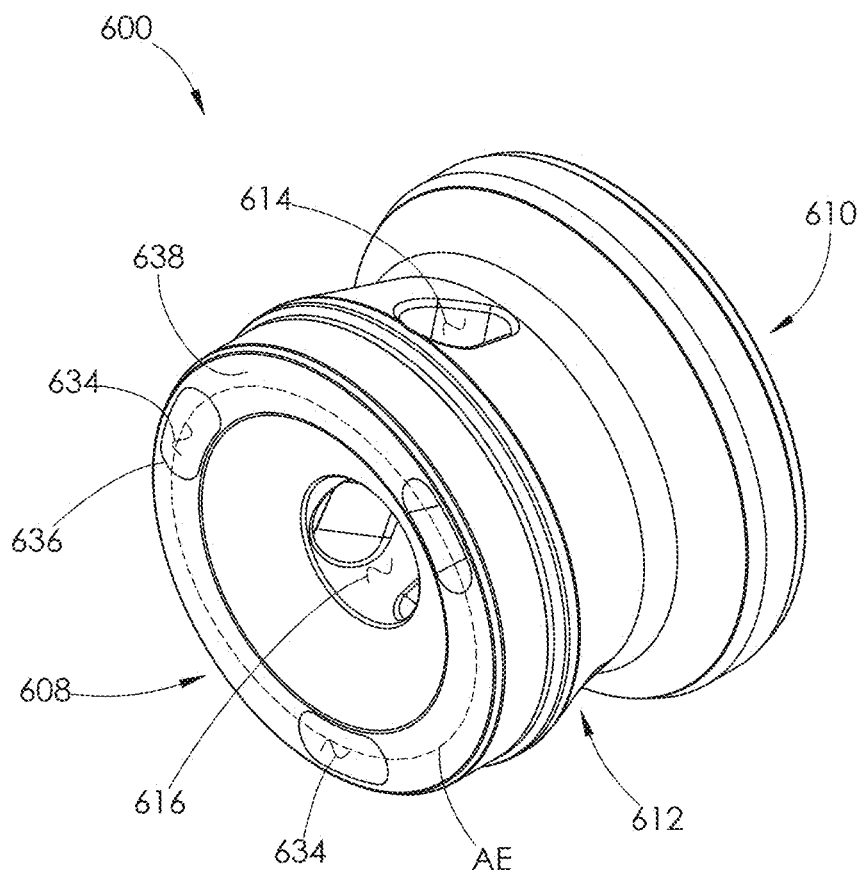

FIG. 92 is a rear perspective view of the fluid routing plug shown in FIG. 84.

Figure 93:
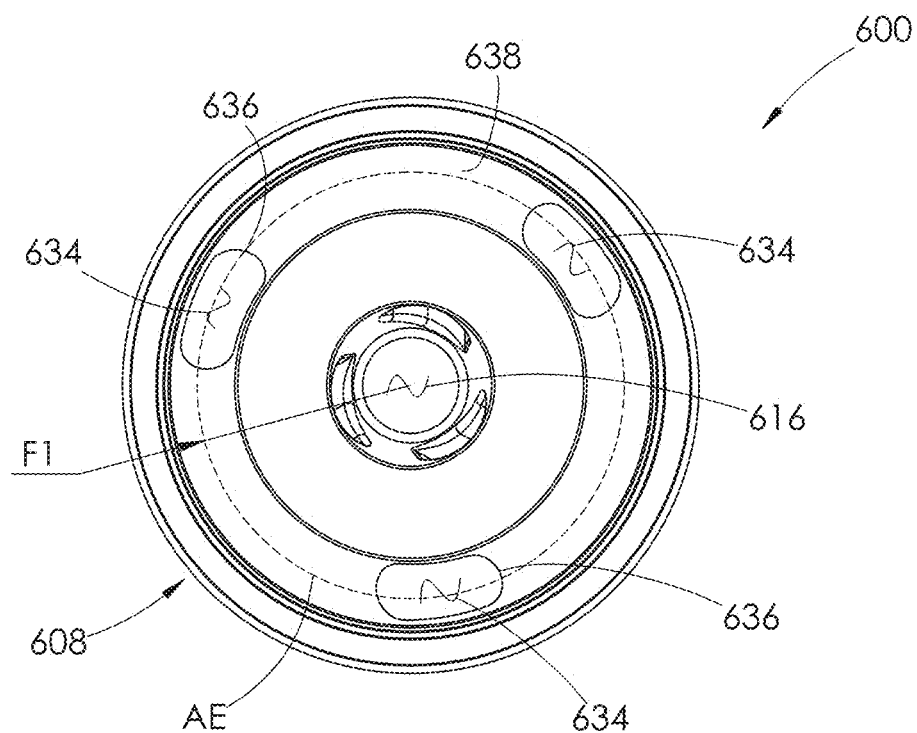

FIG. 93 is a rear elevational view of the fluid routing plug shown in FIG. 84.

Figure 94:
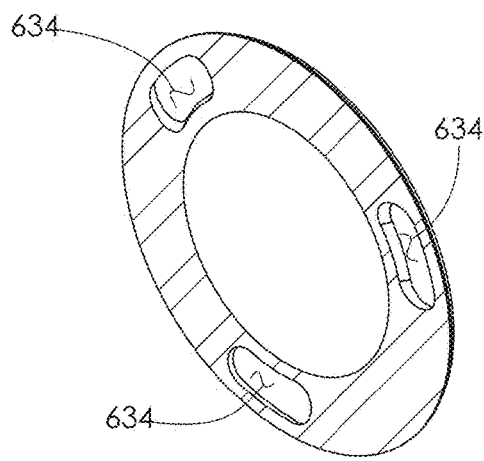

FIG. 94 is a perspective cross-sectional view of the fluid routing plug shown in FIG. 84, taken along line AA-AA.

Figure 95:
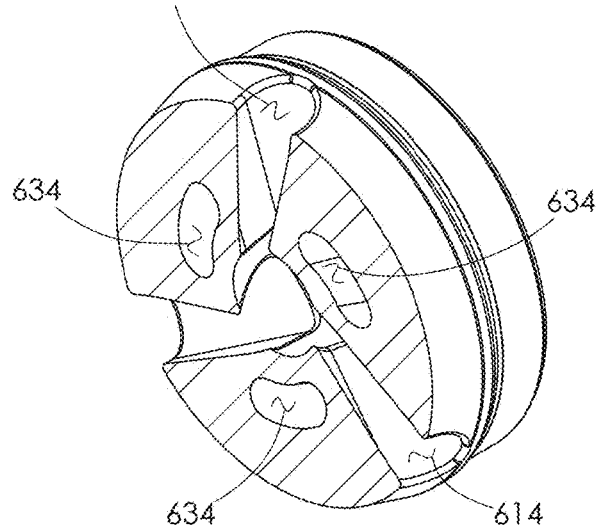

FIG. 95 is a perspective cross-sectional view of the fluid routing plug shown in FIG. 84, taken along line AB-AB.

Figure 96:
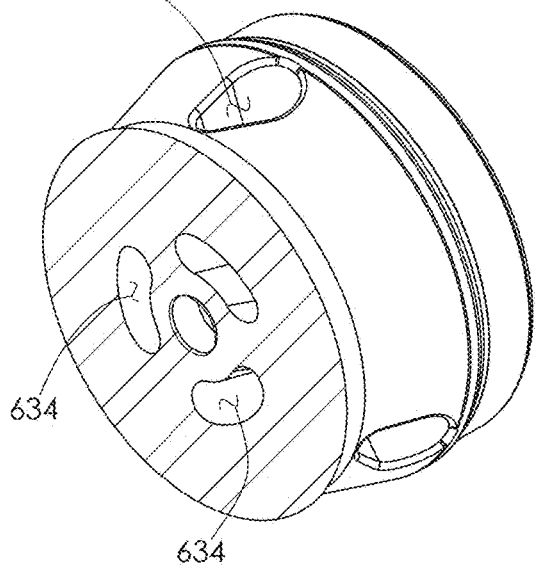

FIG. 96 is a perspective cross-sectional view of the fluid routing plug shown in FIG. 84, taken along line AC-AC.

Figure 97:
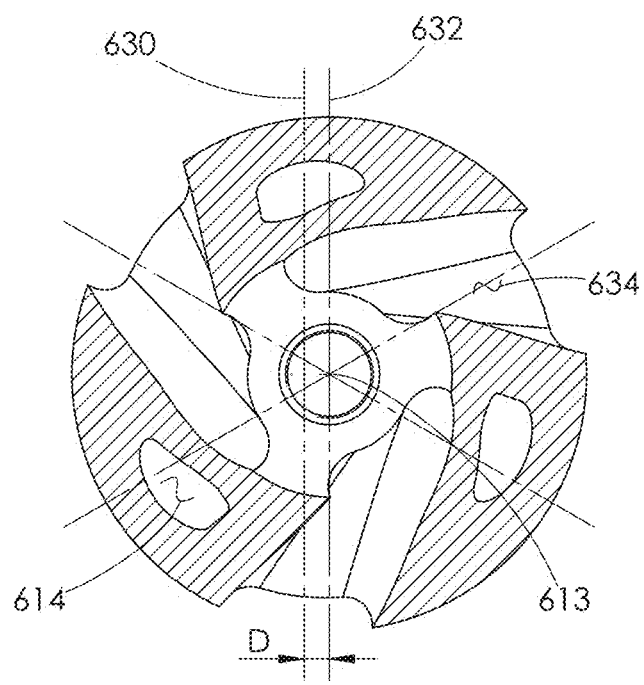

FIG. 97 is a front elevational and conical-sectional view of the fluid routing plug shown in FIG. 84. The conical-section is taken from line AD in FIGS. 85 and 86 to line AE in FIGS. 92 and 93.

Figure 98:
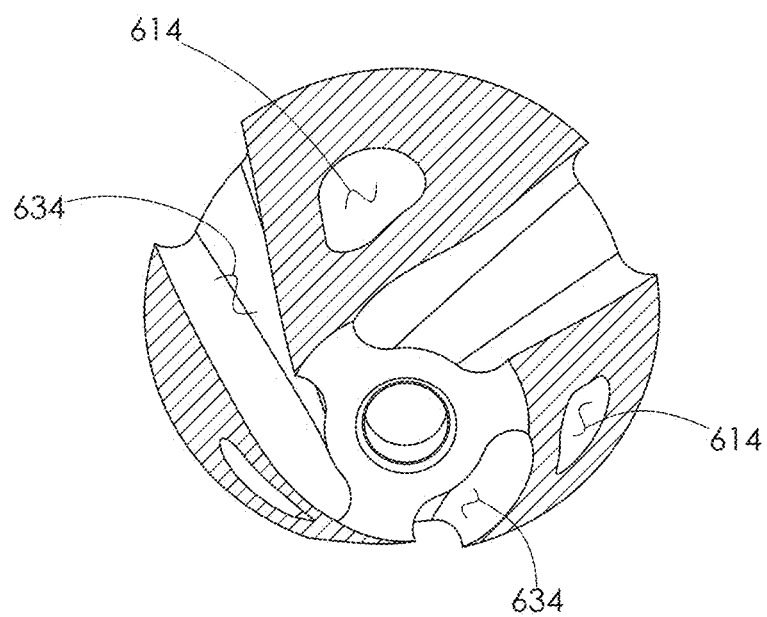

FIG. 98 is a front perspective and conical-sectional view of the fluid routing plug shown in FIG. 97.

Figure 99:
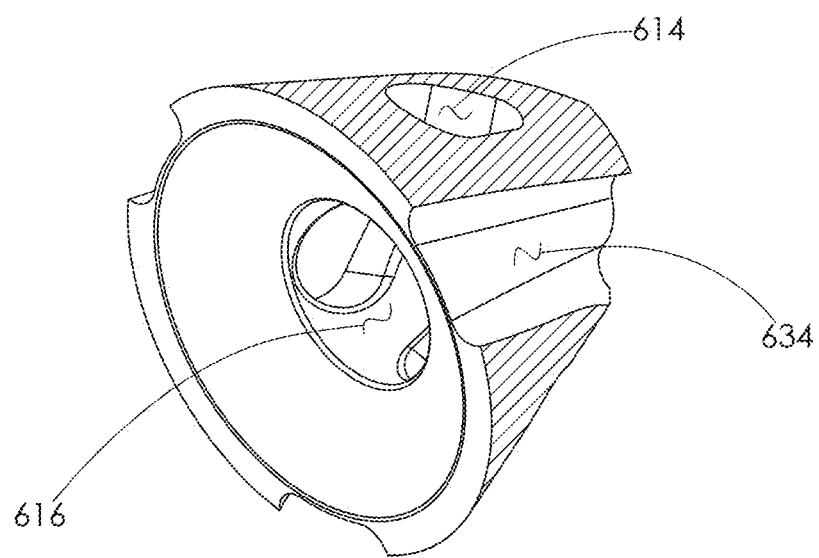

FIG. 99 is a rear perspective and conical-sectional view of the fluid routing plug shown in FIG. 97.

Figure 100:
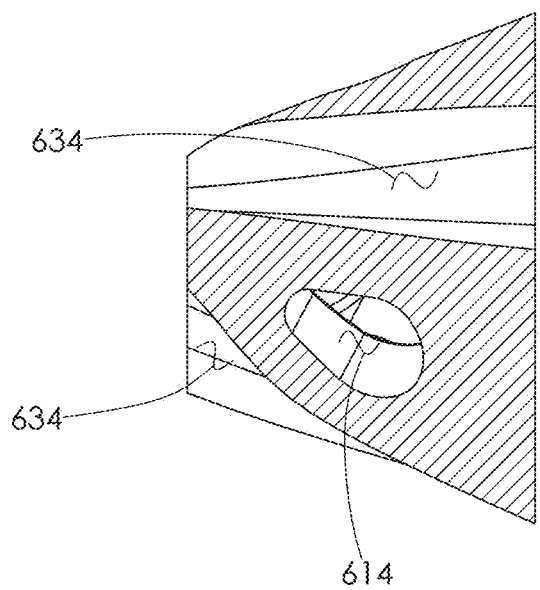

FIG. 100 is a side elevational and conical-sectional view of the fluid routing plug shown in FIG. 97.

Figure 101:
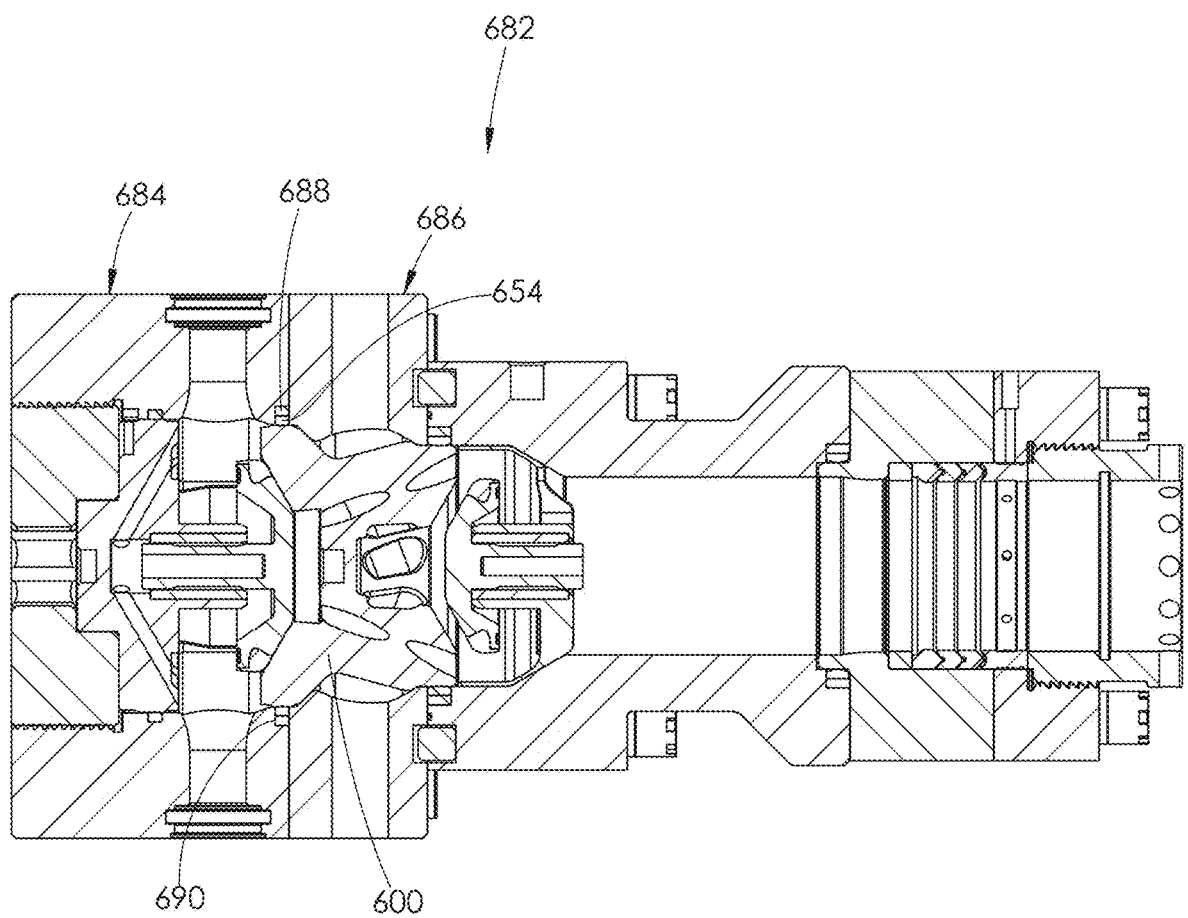

FIG. 101 is a cross-sectional view of another embodiment of a fluid end section having the fluid routing plug shown in FIG. 84 installed therein.

Figure 102:
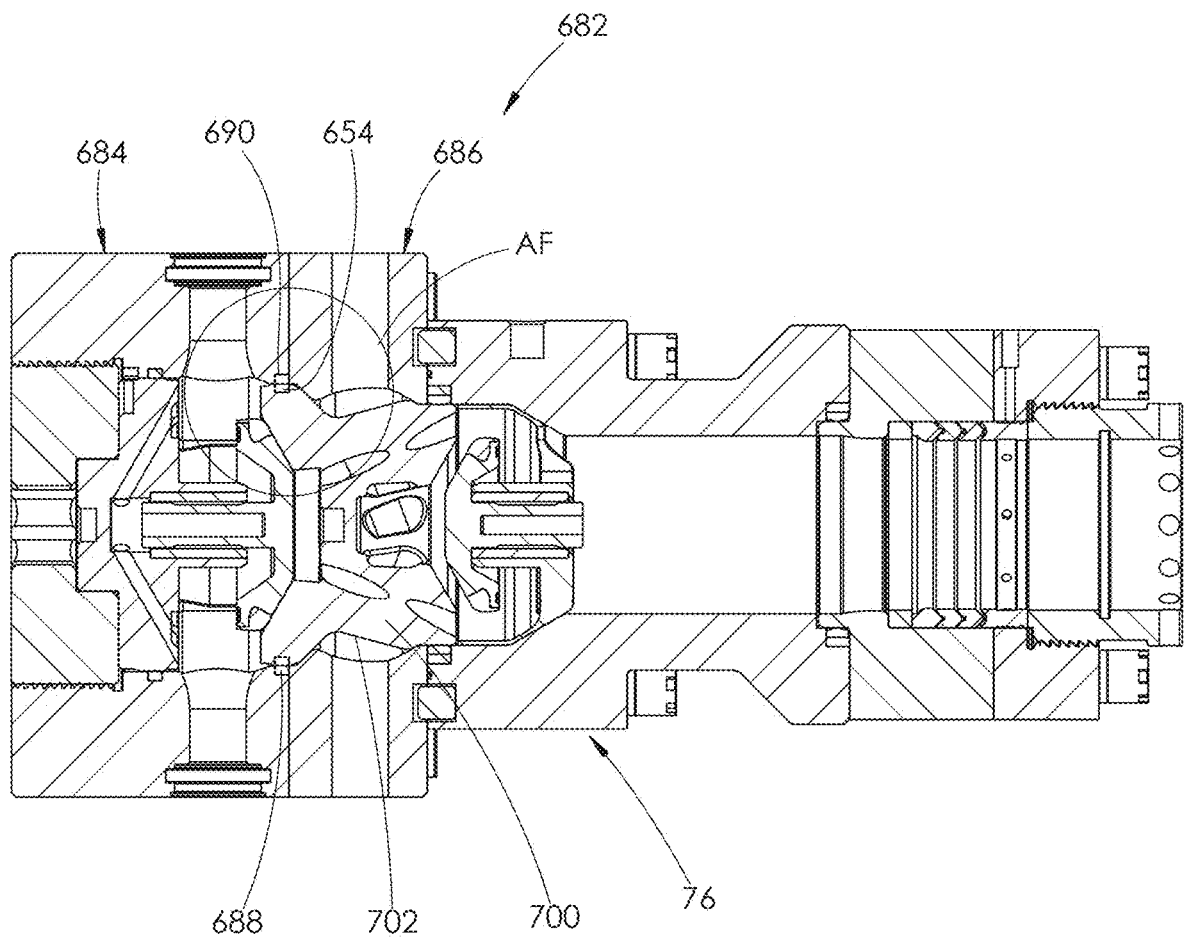

FIG. 102 is the cross-sectional view of the fluid end section shown in FIG. 101 having another embodiment of a fluid routing plug installed therein.

Figure 103:
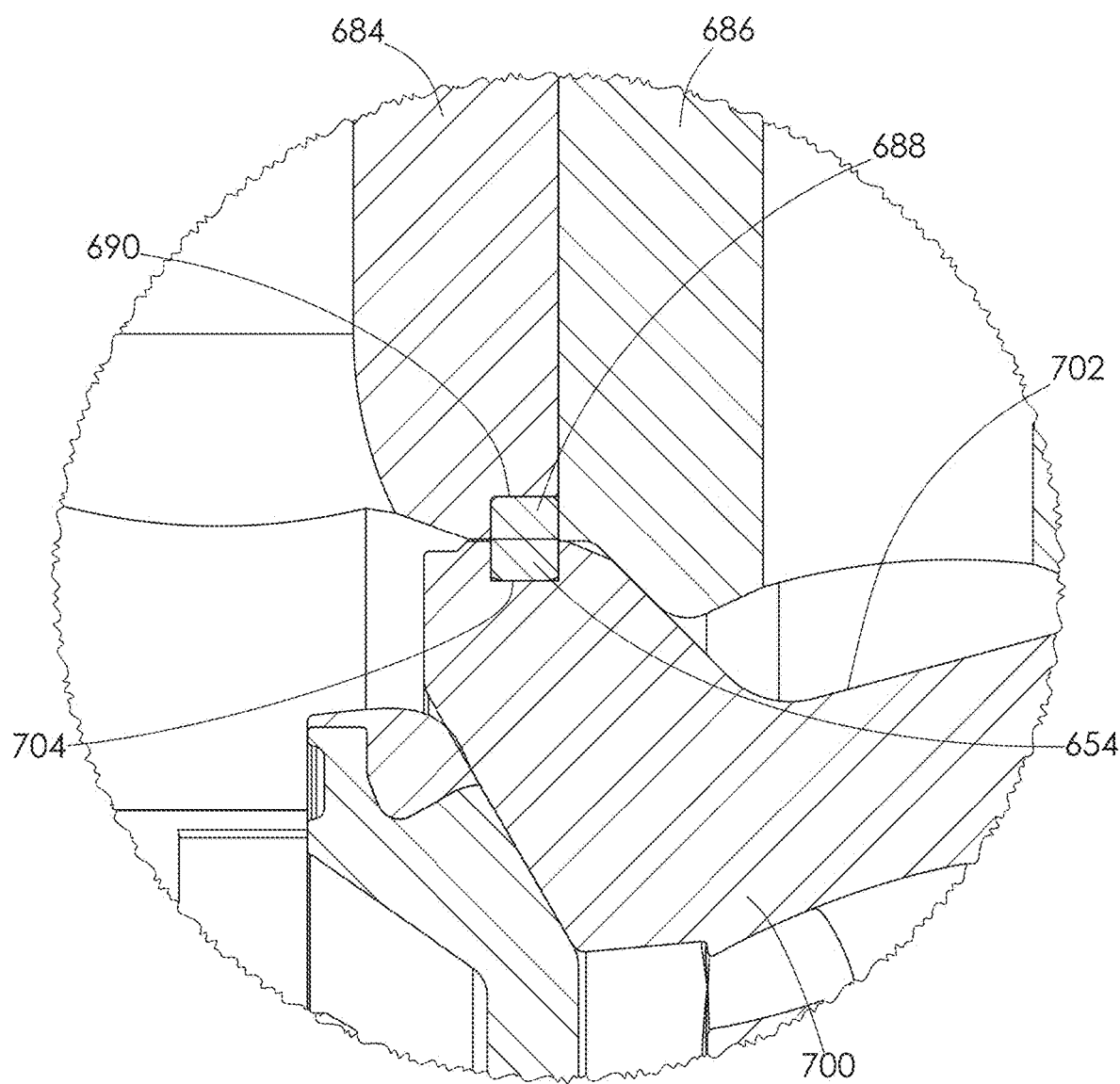

FIG. 103 is an enlarged view of area AF shown in FIG. 102.

Figure 104:
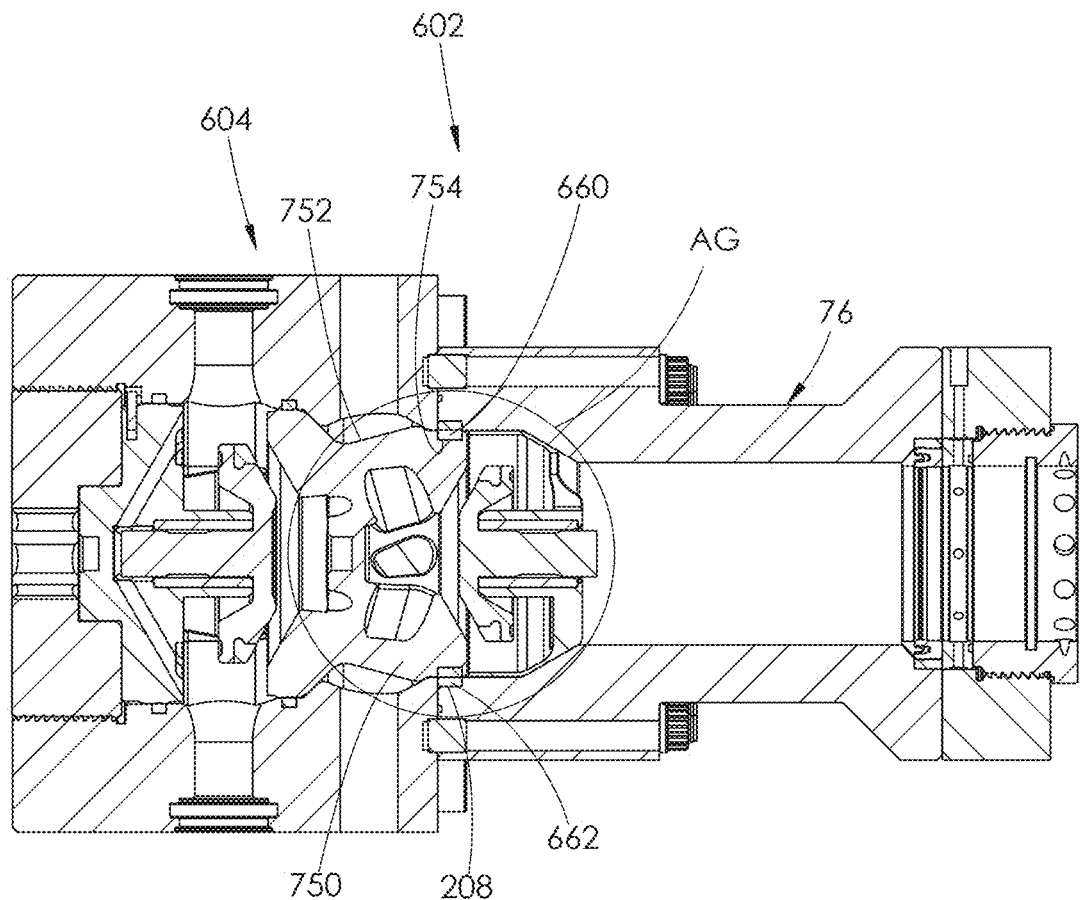

FIG. 104 is the cross-sectional view of the fluid end section shown in FIG. 81 having another embodiment of a fluid routing plug installed therein.

Figure 105:
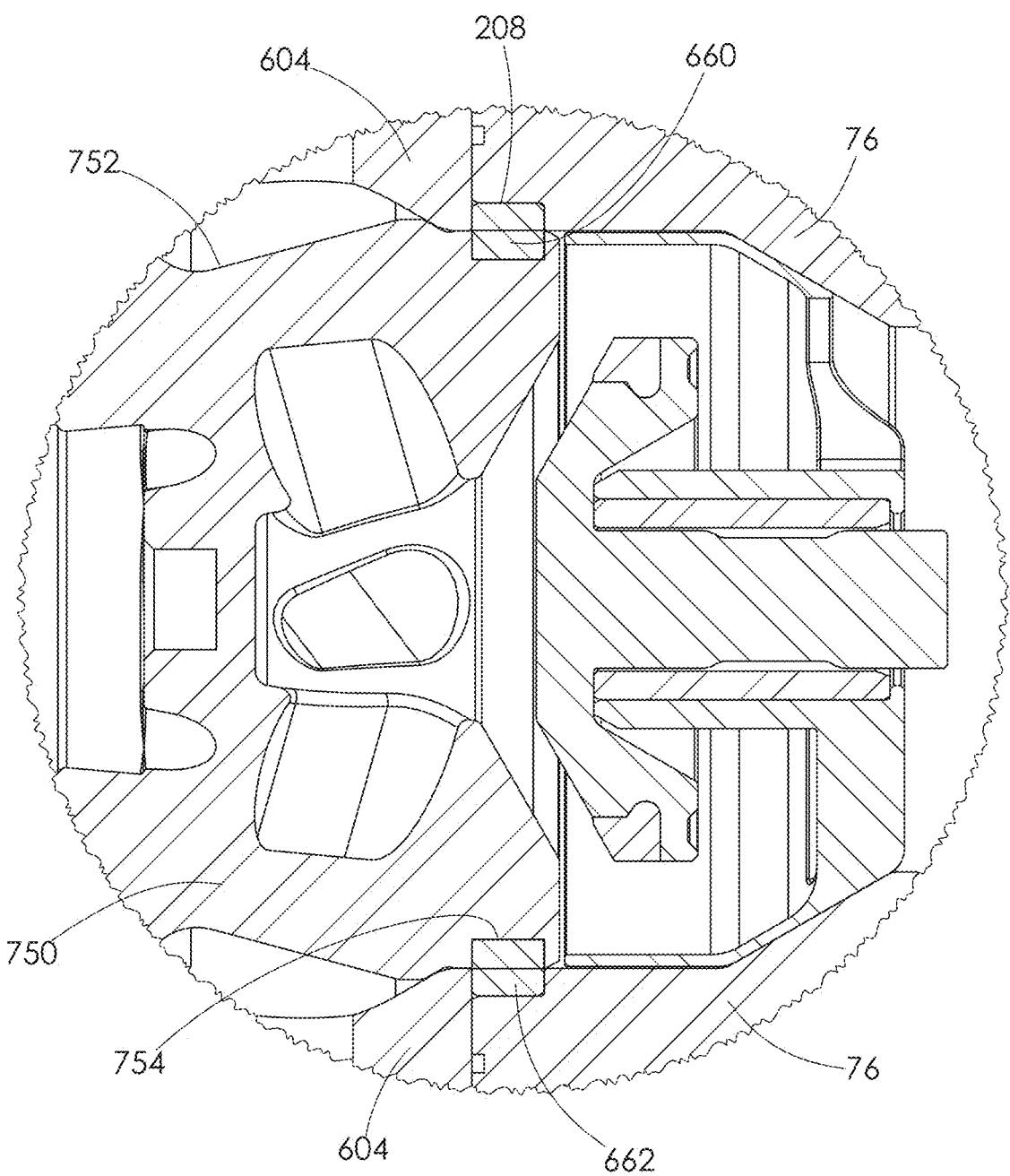

FIG. 105 is an enlarged view of area AG shown in FIG. 104.

Figure 106:
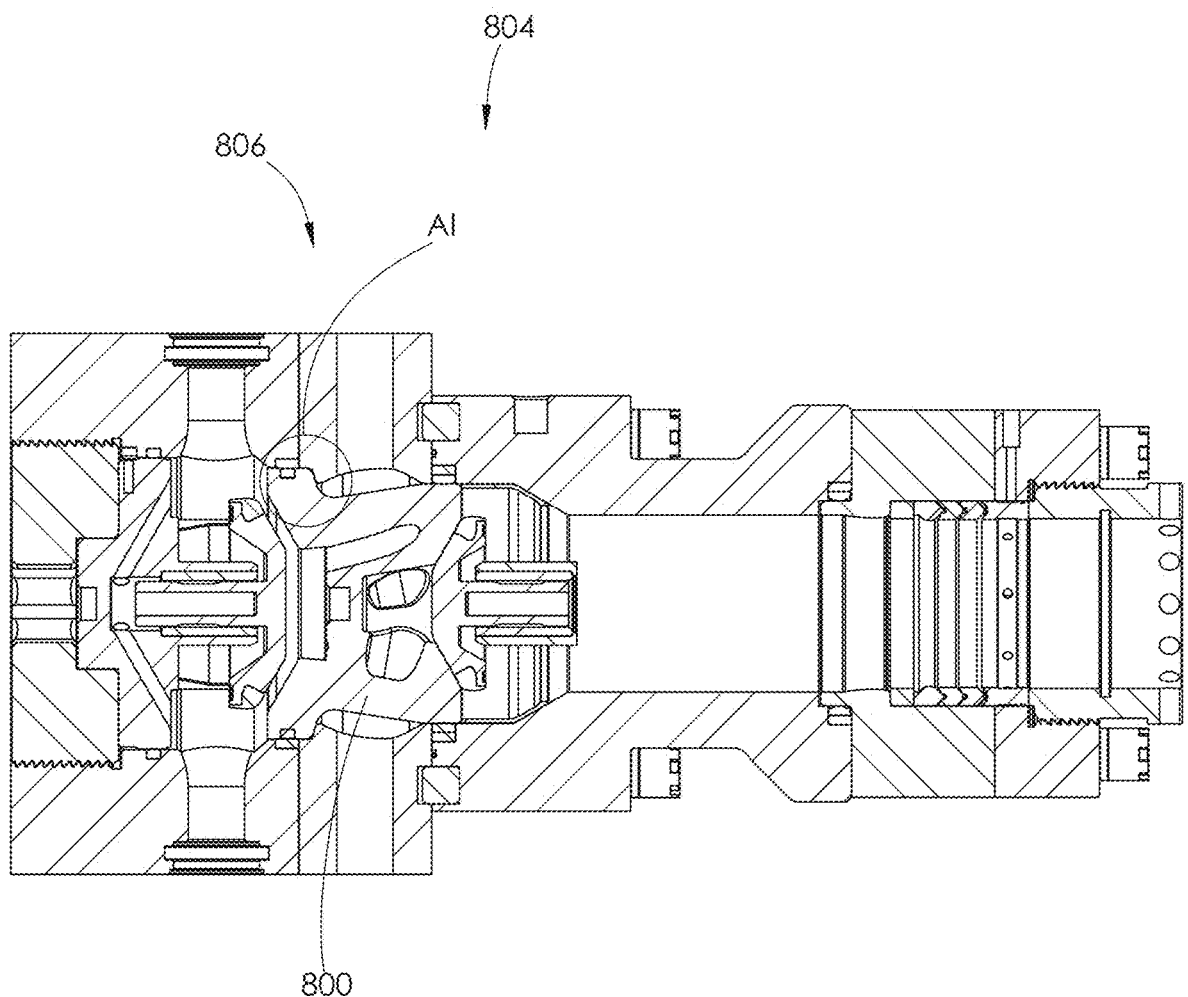

FIG. 106 is a cross-sectional view of another embodiment of a fluid end section having another embodiment of a fluid routing plug installed therein.

Figures 107, 108:
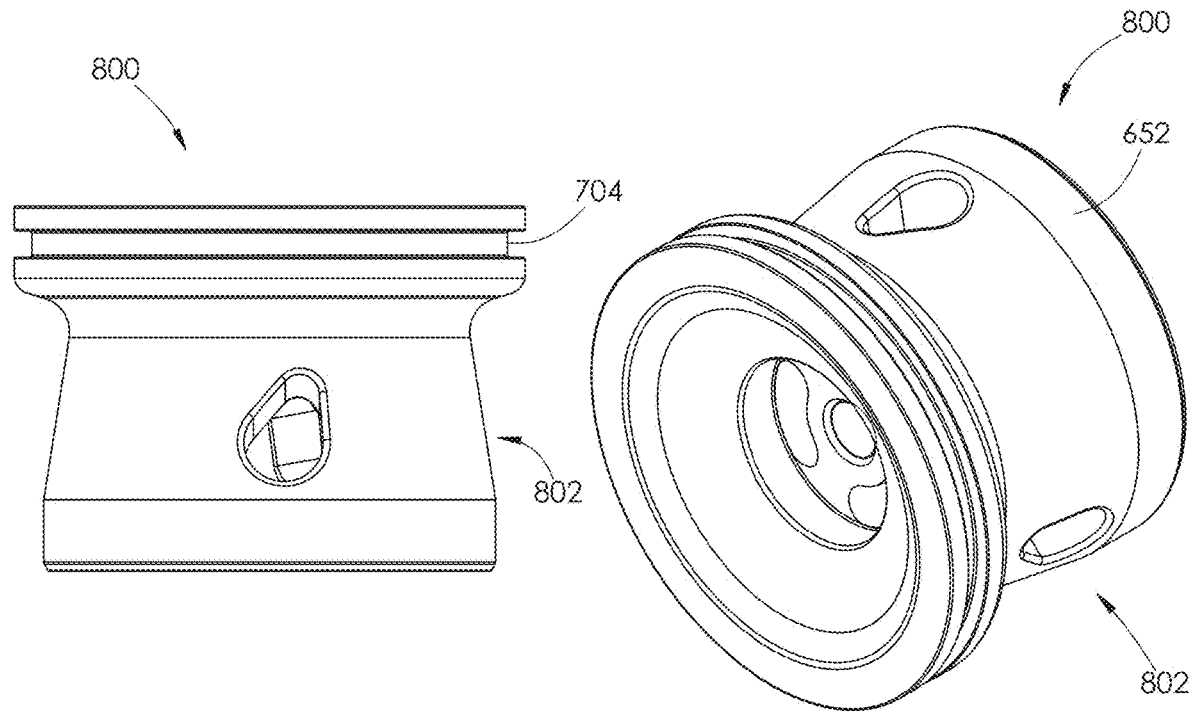

FIG. 107 is a top plan view of the fluid routing plug shown in FIG. 106.

FIG. 108 is a front perspective view of the fluid routing plug shown in FIG. 107.

Figures 109, 110:
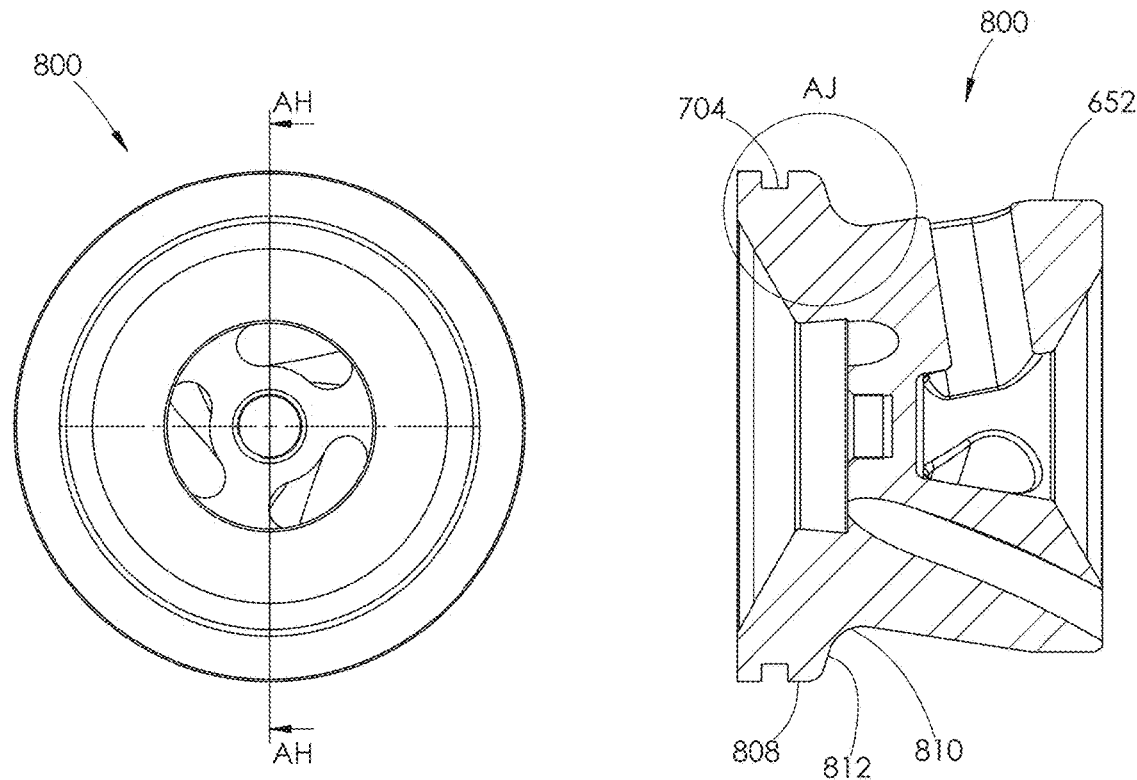

FIG. 109 is a front elevational view of the fluid routing plug shown in FIG. 107.

FIG. 110 is a cross-sectional view of the fluid routing plug shown in FIG. 109, taken along line AH-AH.

Figure 111:
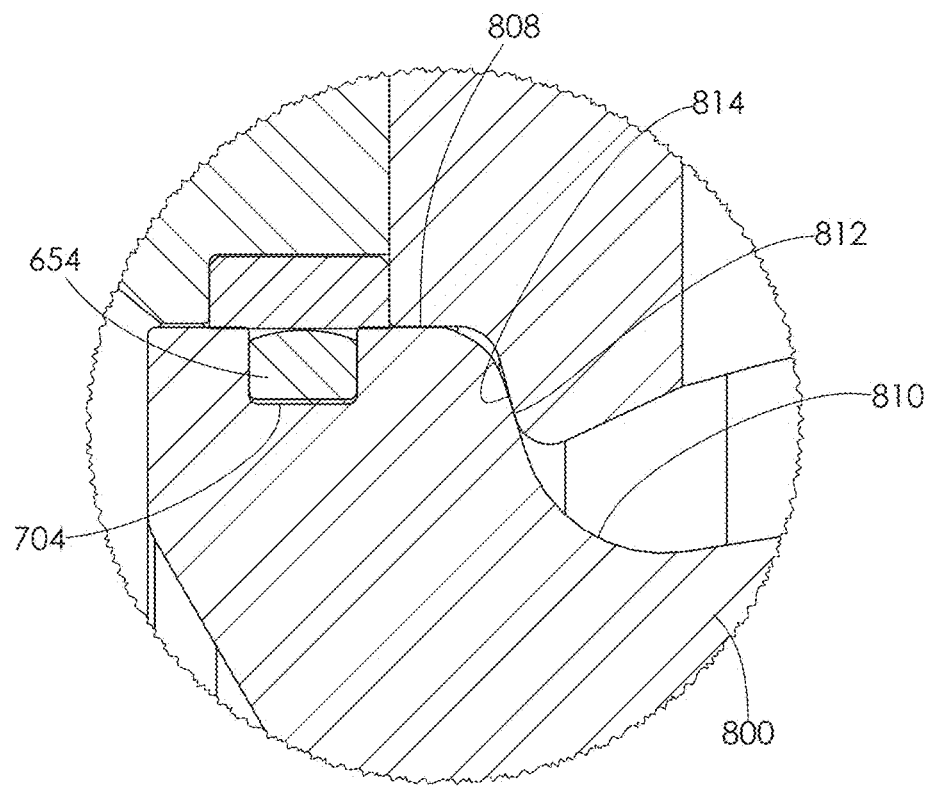

FIG. 111 is an enlarged view of area AI shown in FIG. 106.

Figure 112:
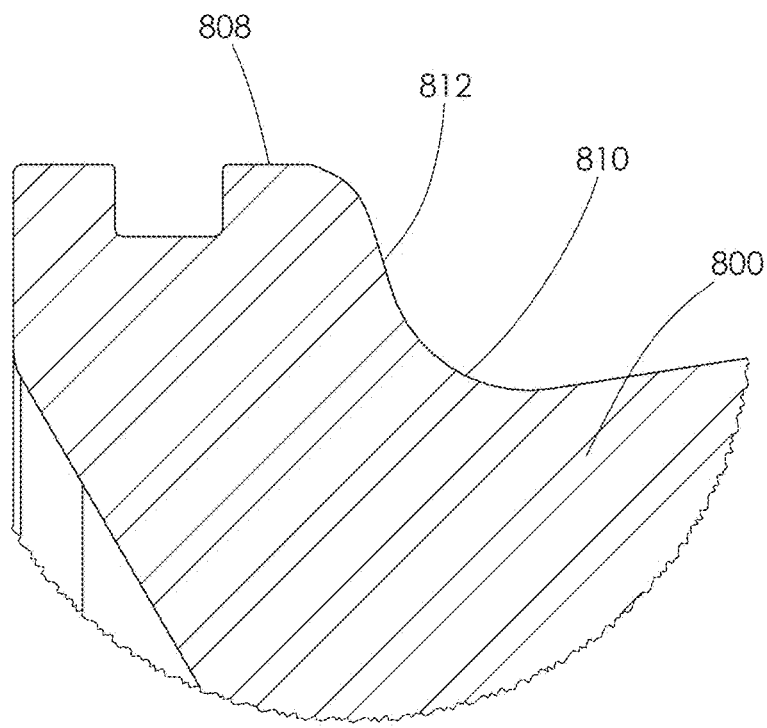

FIG. 112 is an enlarged view of area AJ shown in FIG. 110.

Figure 113:
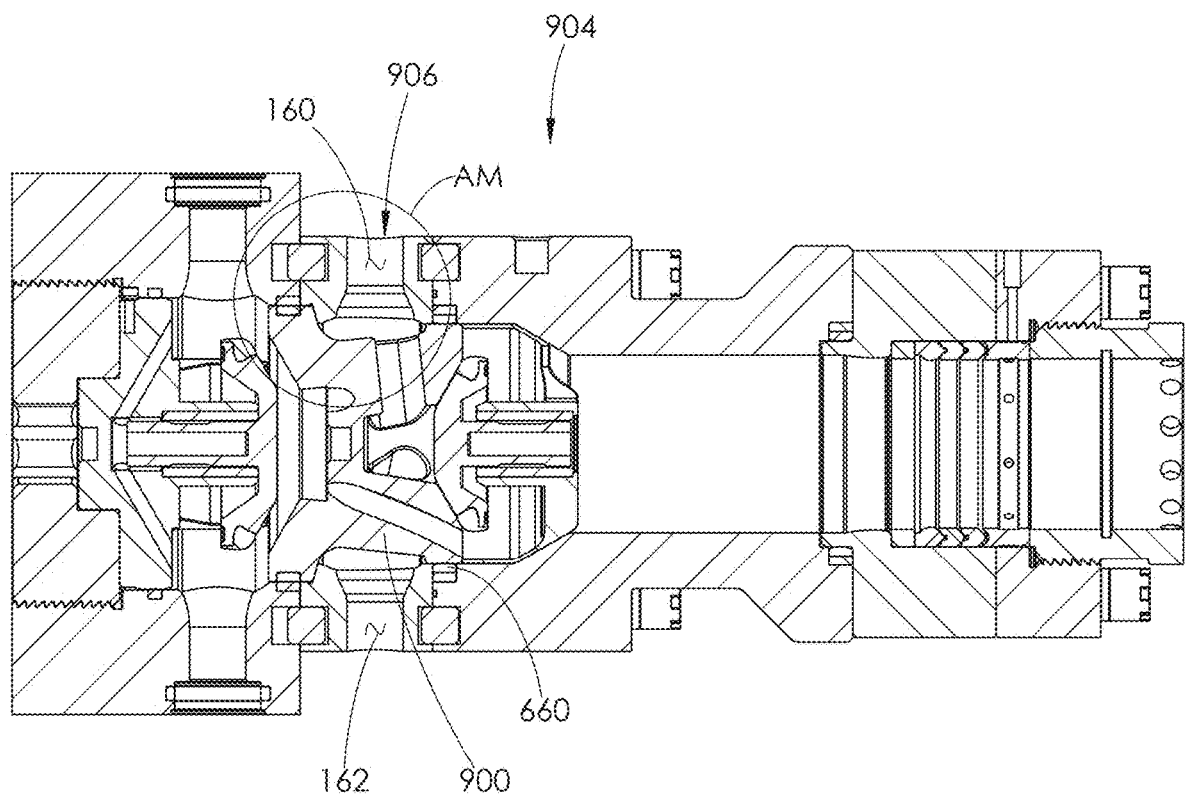

FIG. 113 is a cross-sectional view of another embodiment of a fluid end section having another embodiment of a fluid routing plug installed therein.

Figure 114:
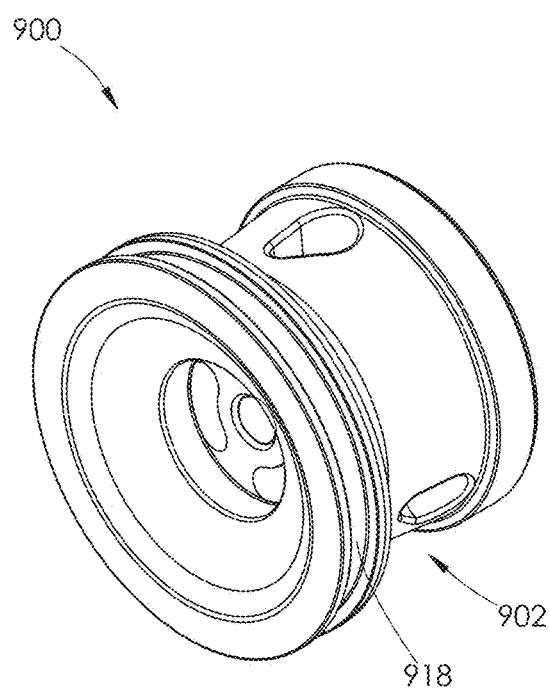

FIG. 114 is a front perspective view of the fluid routing plug shown in FIG. 113.

Figure 115:
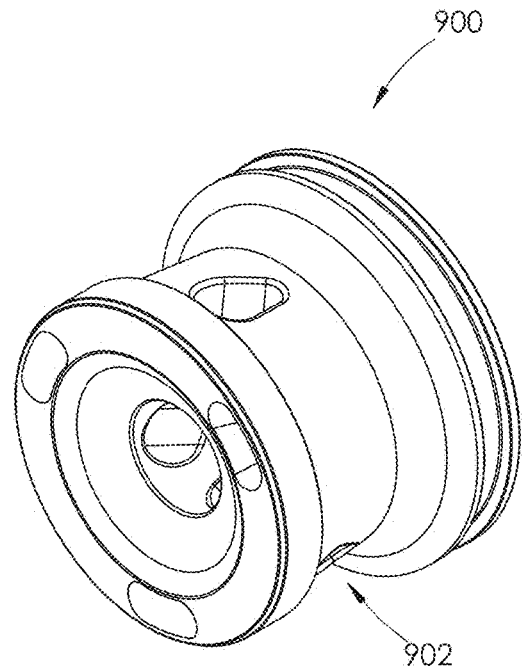

FIG. 115 is a rear perspective view of the fluid routing plug shown in FIG. 114.

Figure 116:
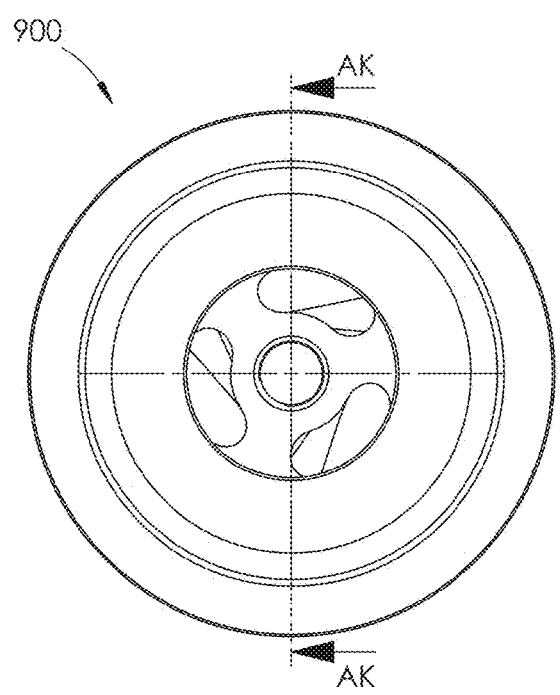

FIG. 116 is a front elevational view of the fluid routing plug shown in FIG. 114.

Figure 117:
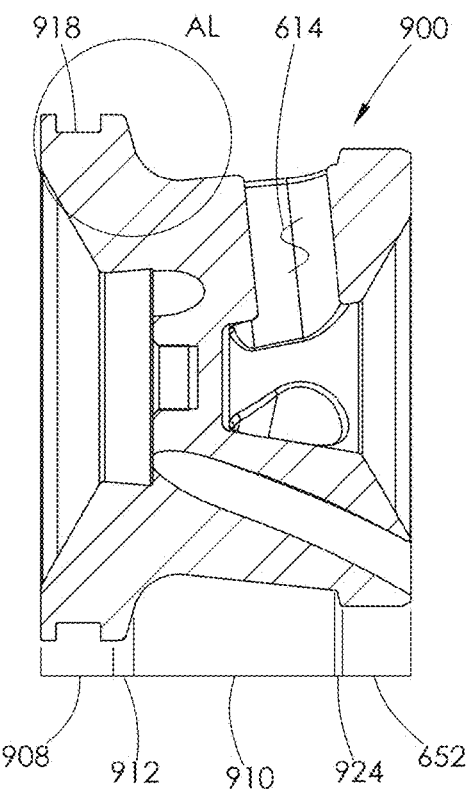

FIG. 117 is a cross-sectional view of the fluid routing plug shown in FIG. 116, taken along line AK-AK.

Figure 118:
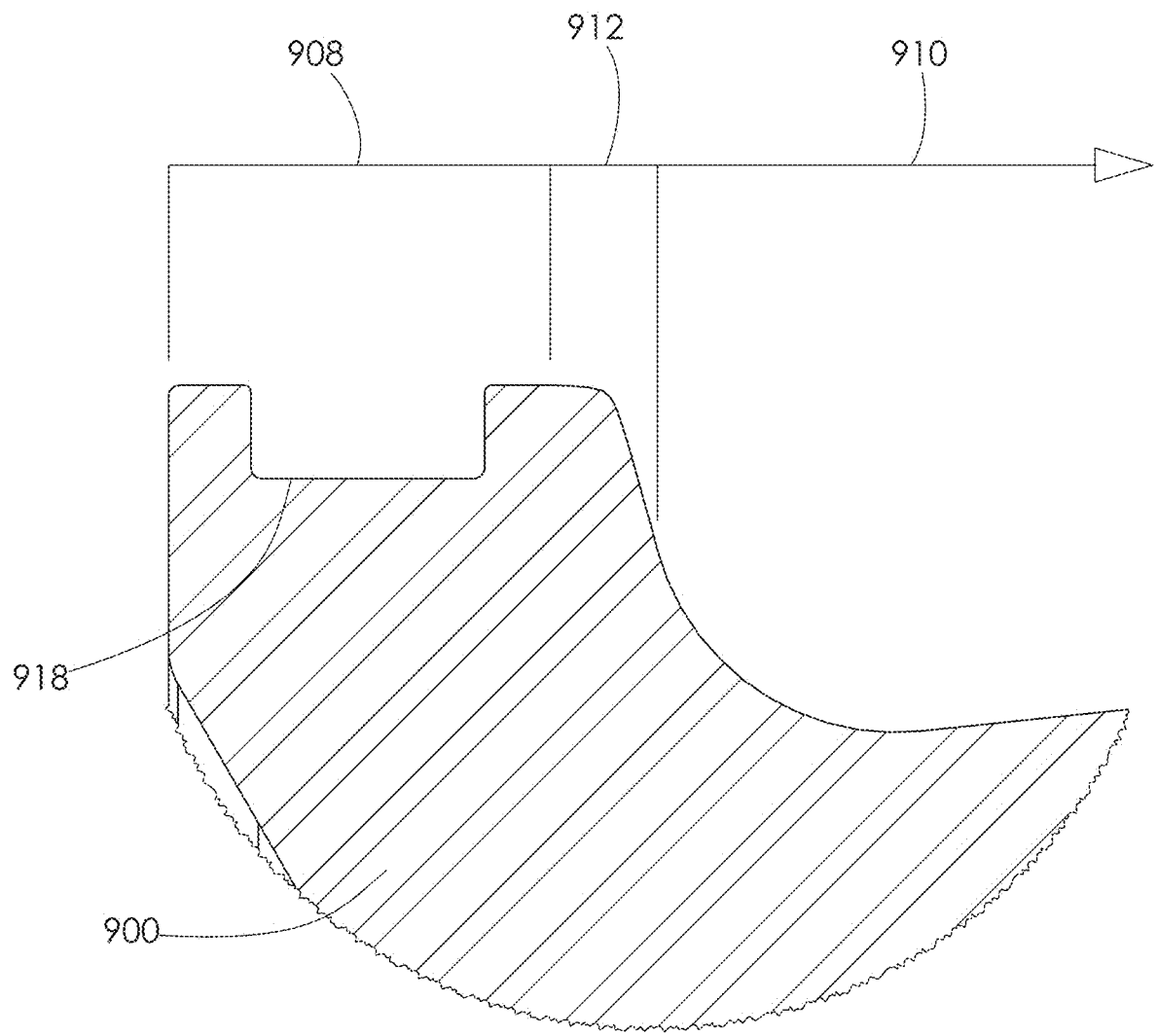

FIG. 118 is an enlarged view of area AL shown in FIG. 117.

Figure 119:
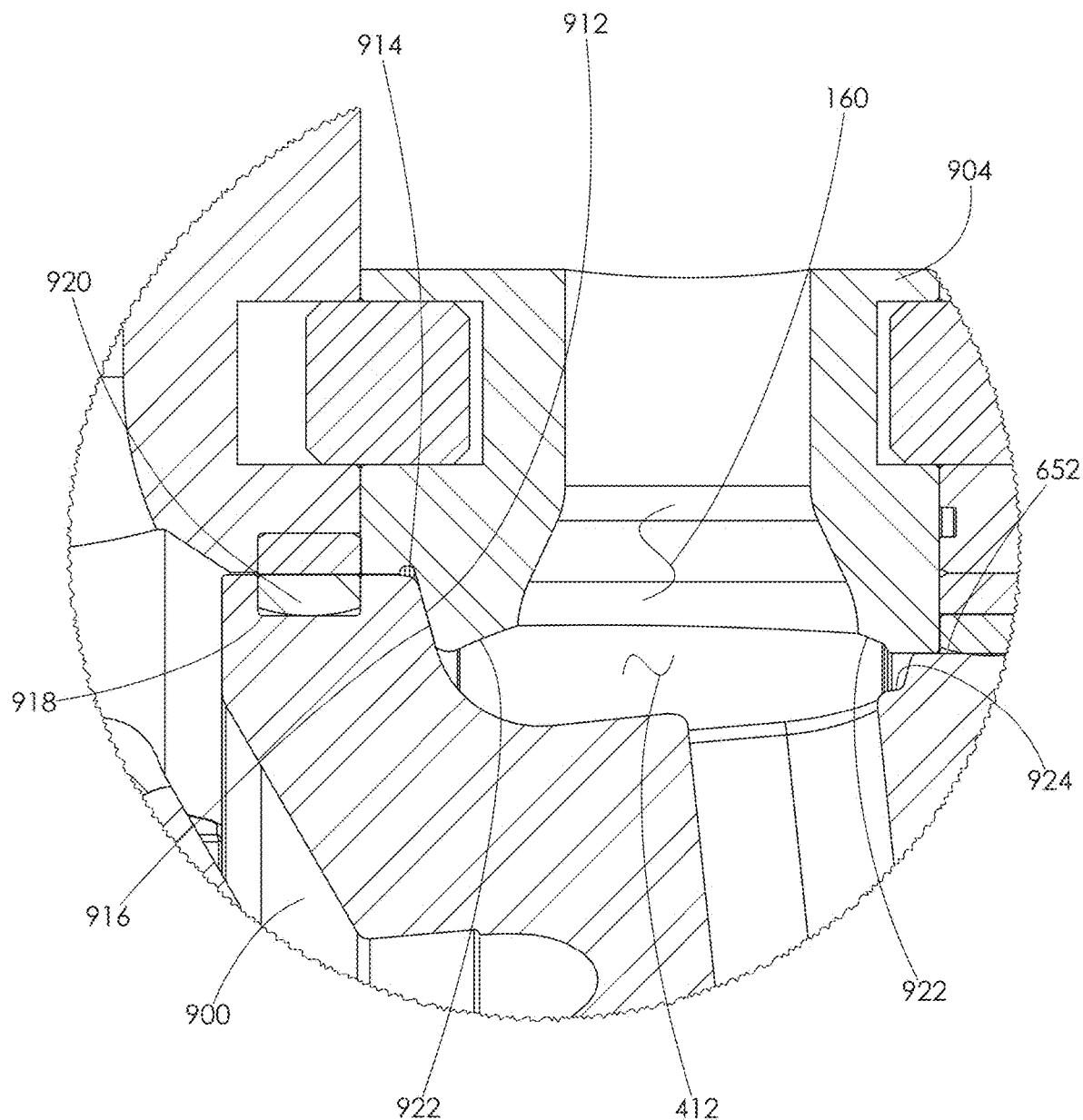

FIG. 119 is an enlarged view of area AM shown in FIG. 113.

Figure 6:
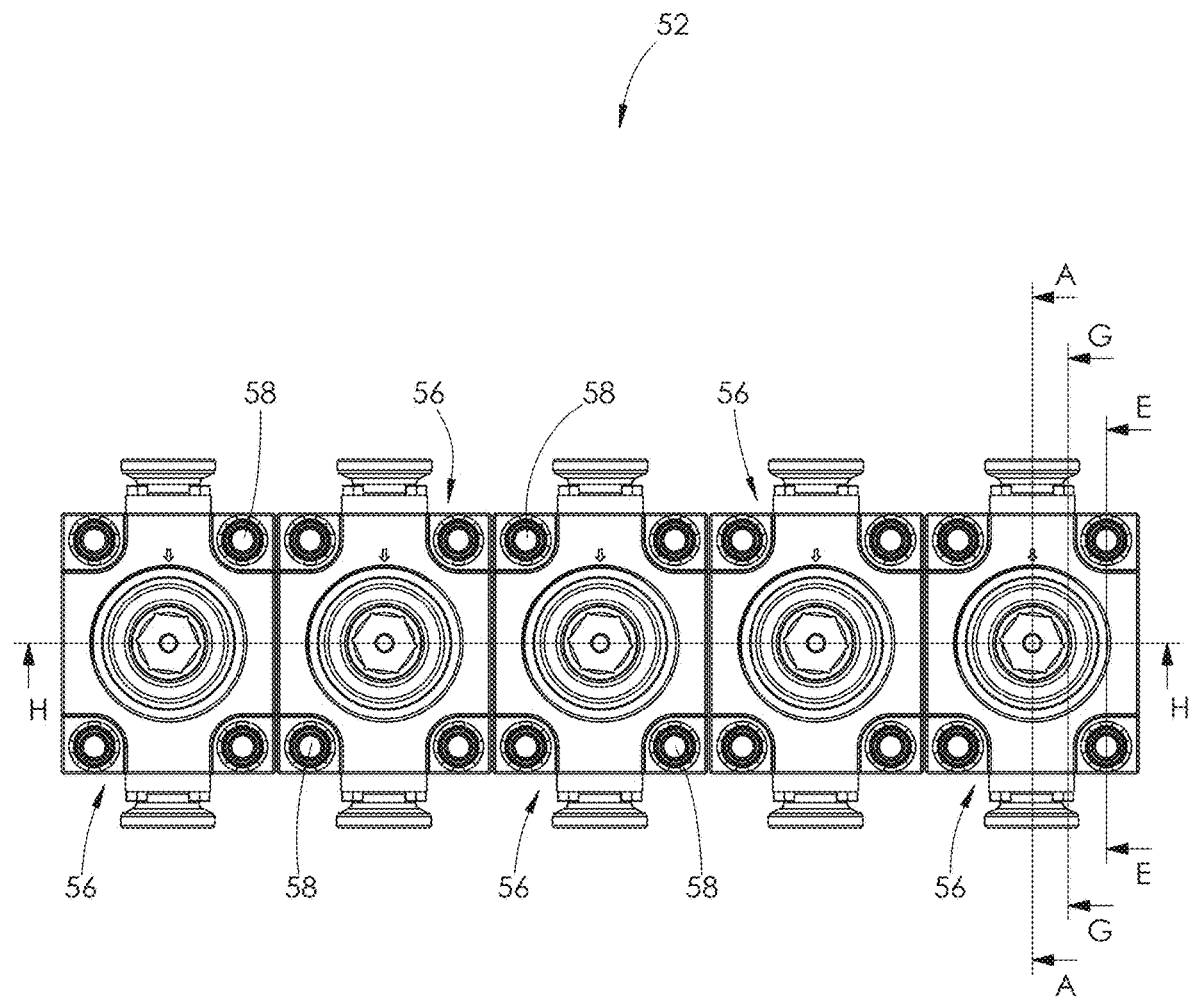
FIG. 6 is a front elevational view of the fluid end assembly and stay rods shown in FIG. 4.
Figure 120:
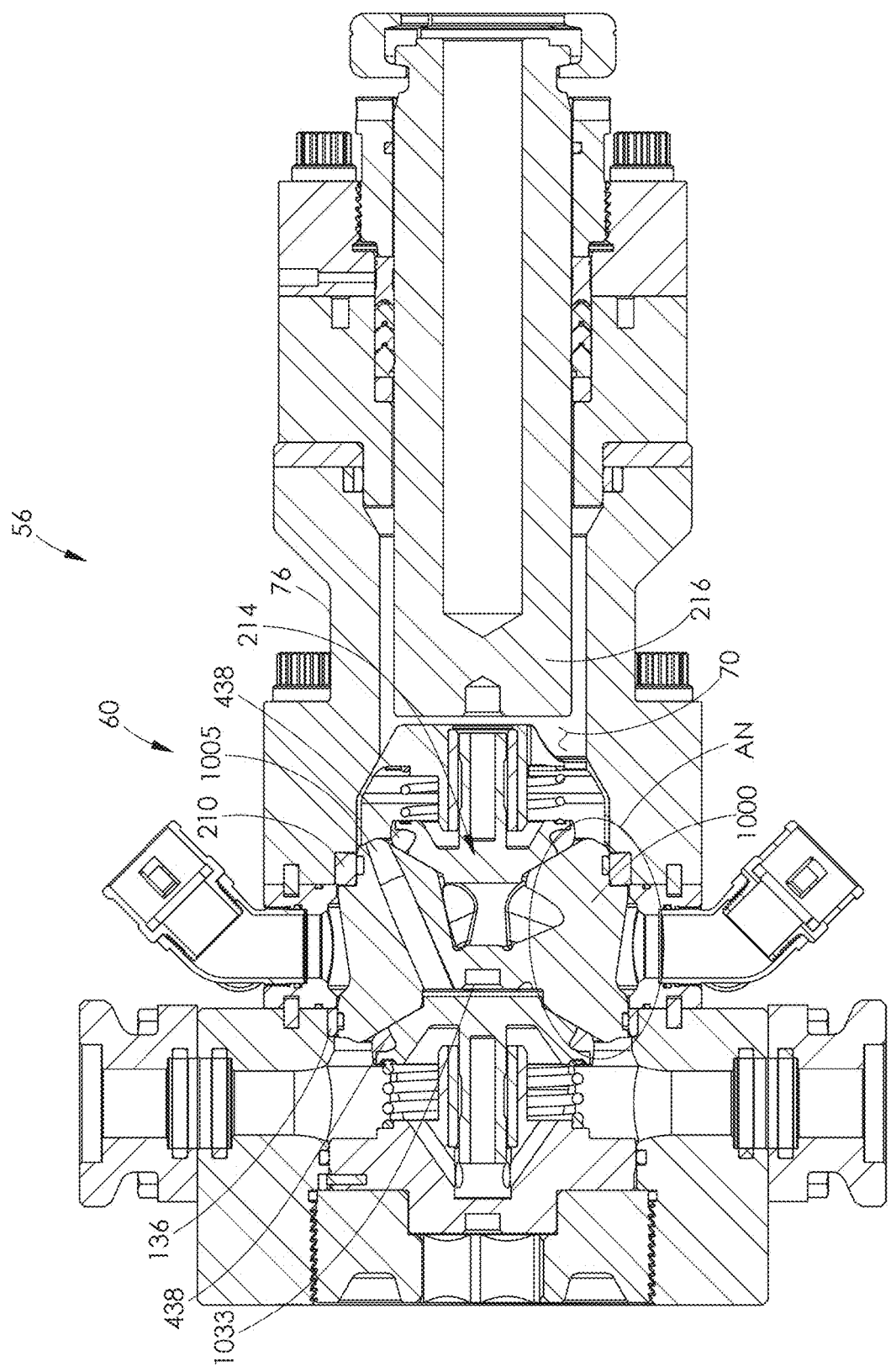

FIG. 120 is a cross-sectional view of the fluid end section shown in FIG. 6 taken along line A-A. The fluid end section has another embodiment of a fluid routing plug installed, the plunger is fully extended and both valves are shown in the closed position.

Figure 121:
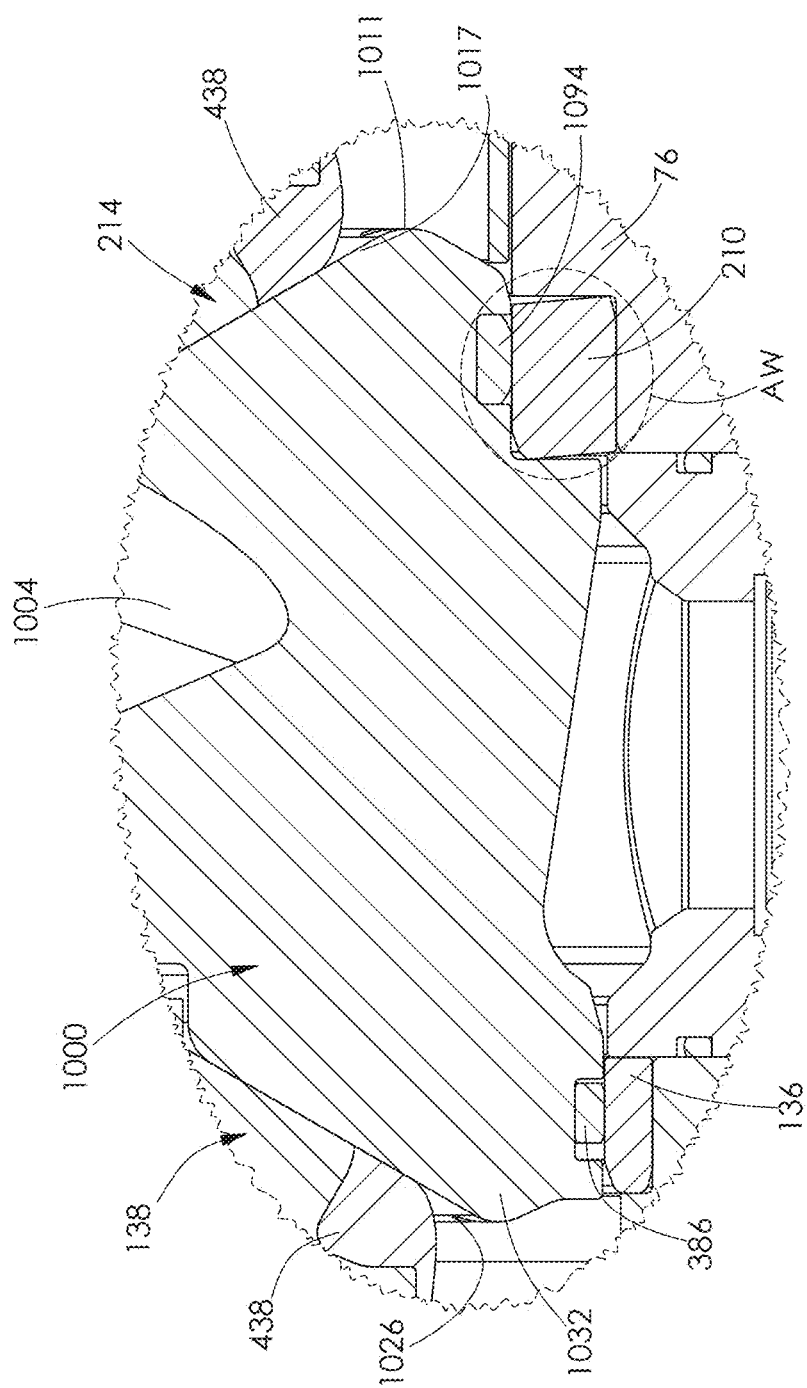

FIG. 121 is an enlarged view of area AN shown in FIG. 120.

Figure 122:
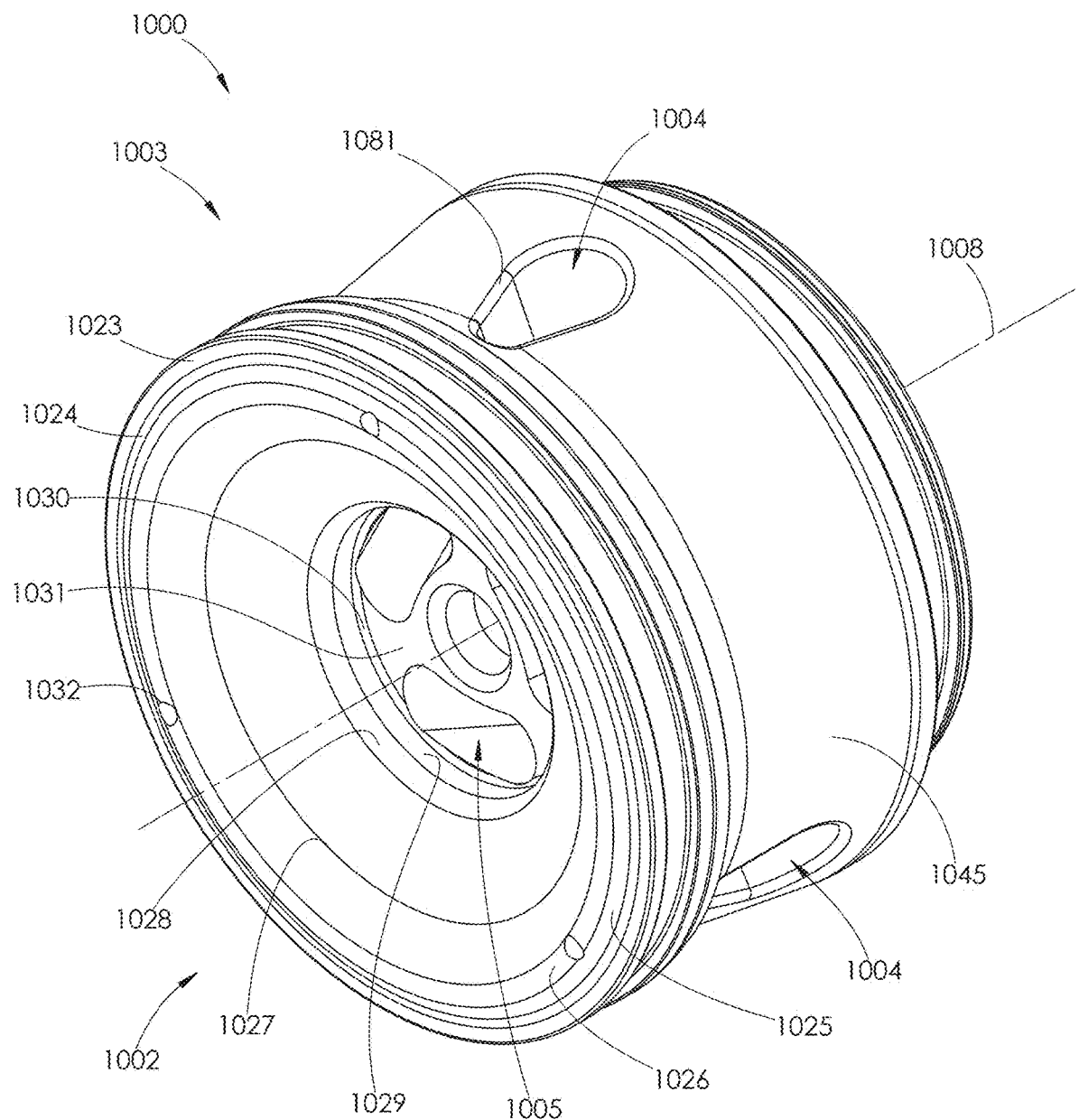

FIG. 122 is a front perspective view of the fluid routing plug shown in FIG. 120.

Figure 123:
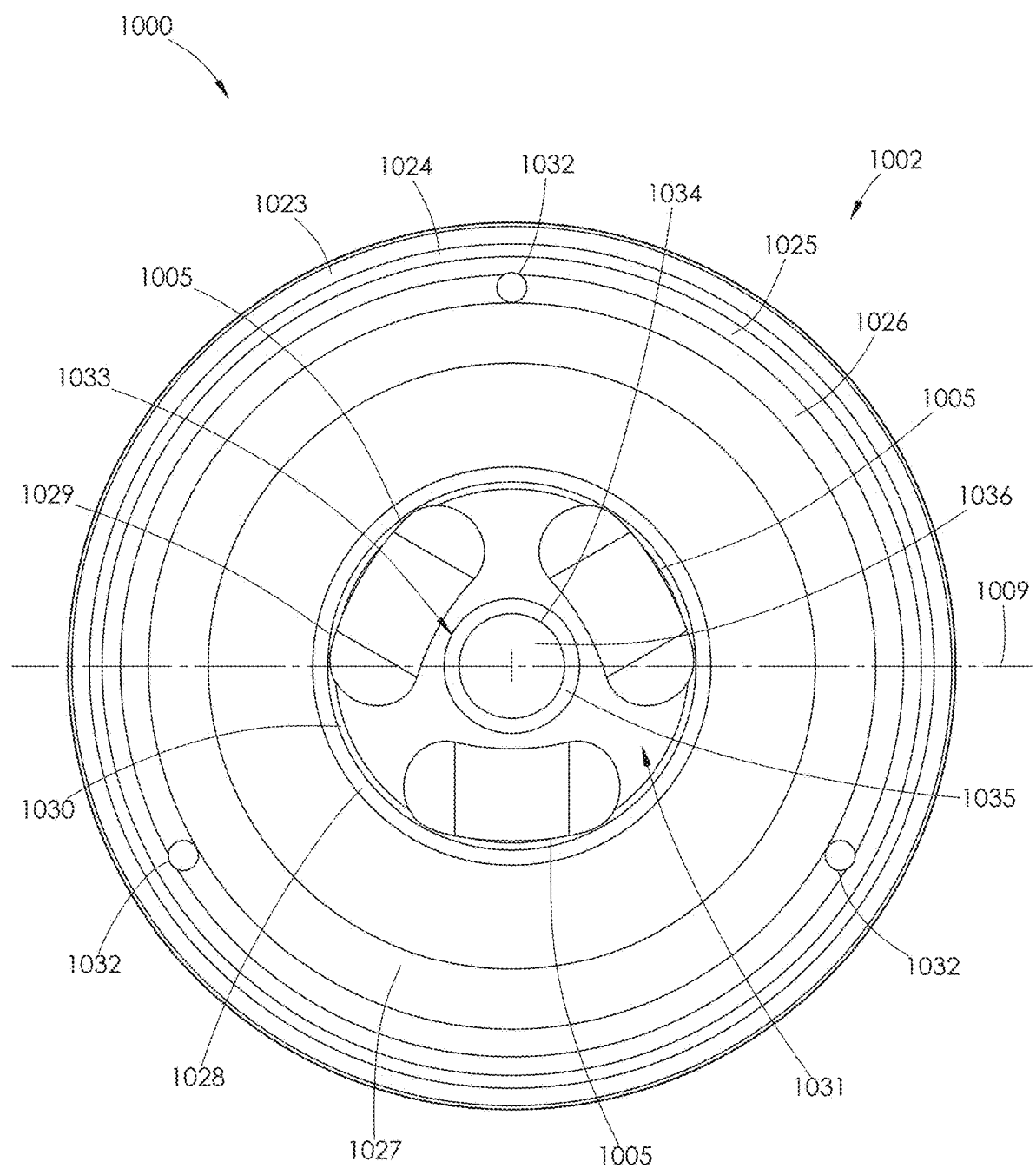

FIG. 123 is a front elevation view of the fluid routing plug shown in FIG. 122.

Figure 124:
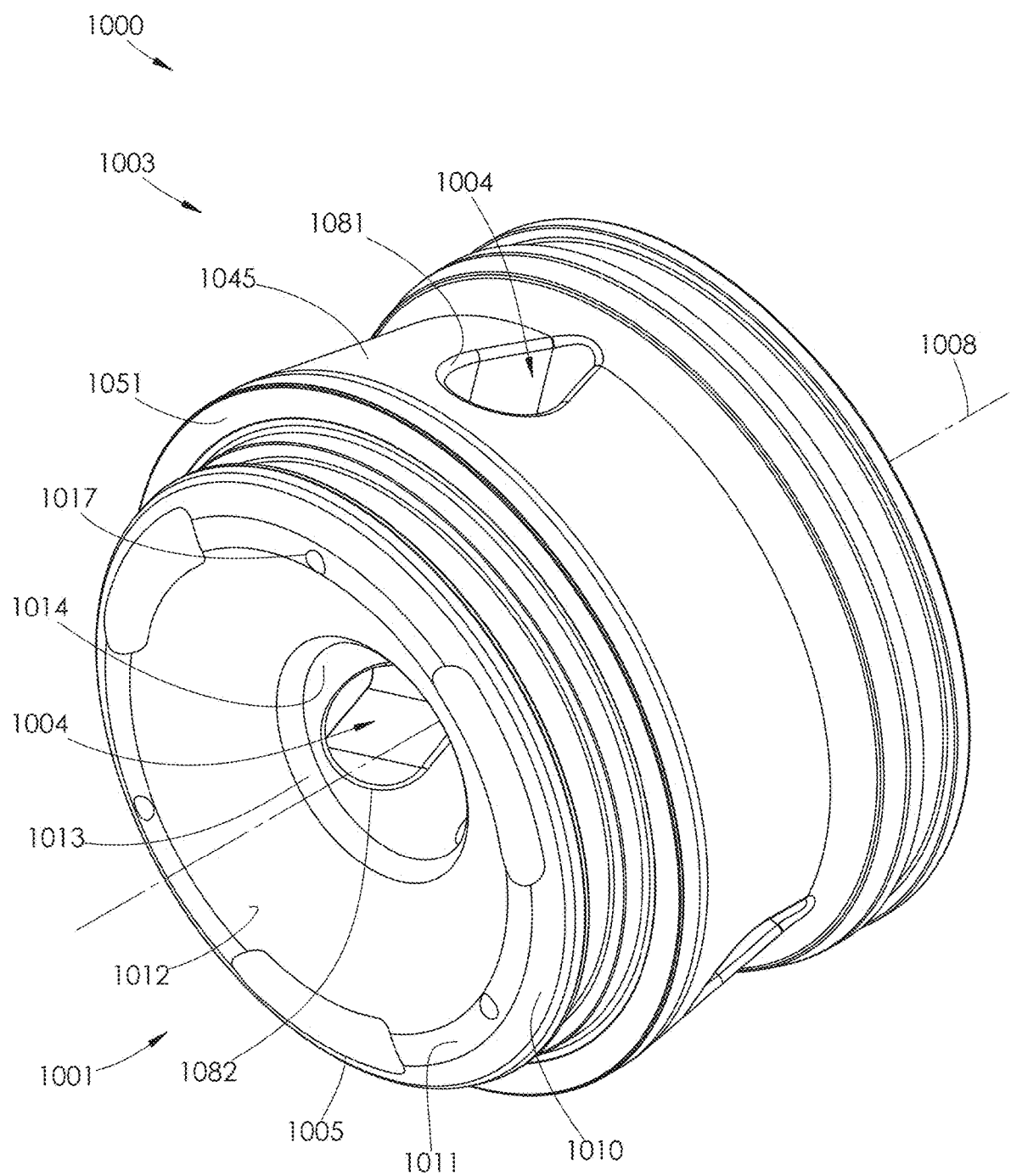

FIG. 124 a rear perspective view of the fluid routing plug shown in FIG. 122.

Figure 125:
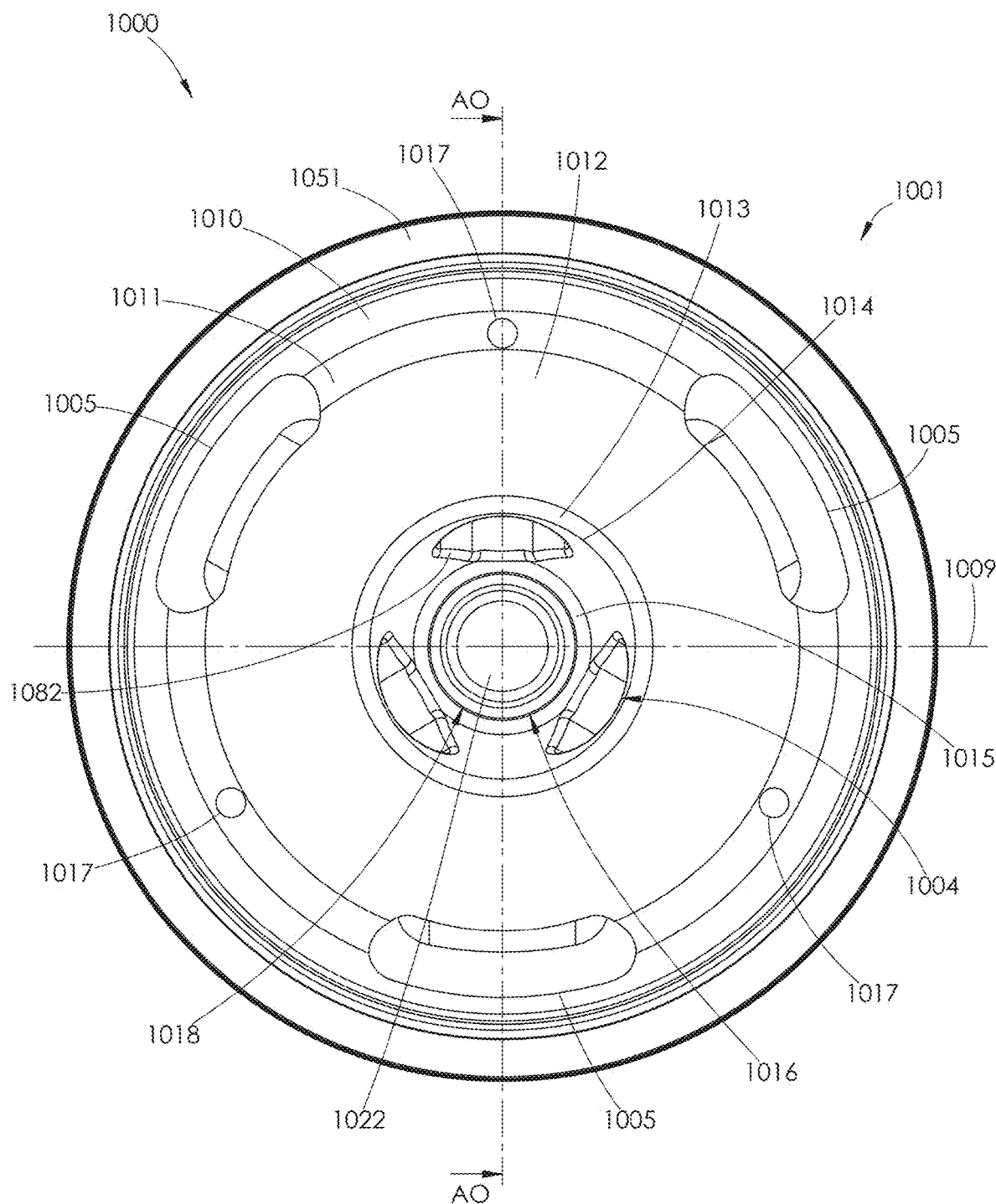

FIG. 125 is rear elevation view of the fluid routing plug shown in FIG. 122.

Figure 126:
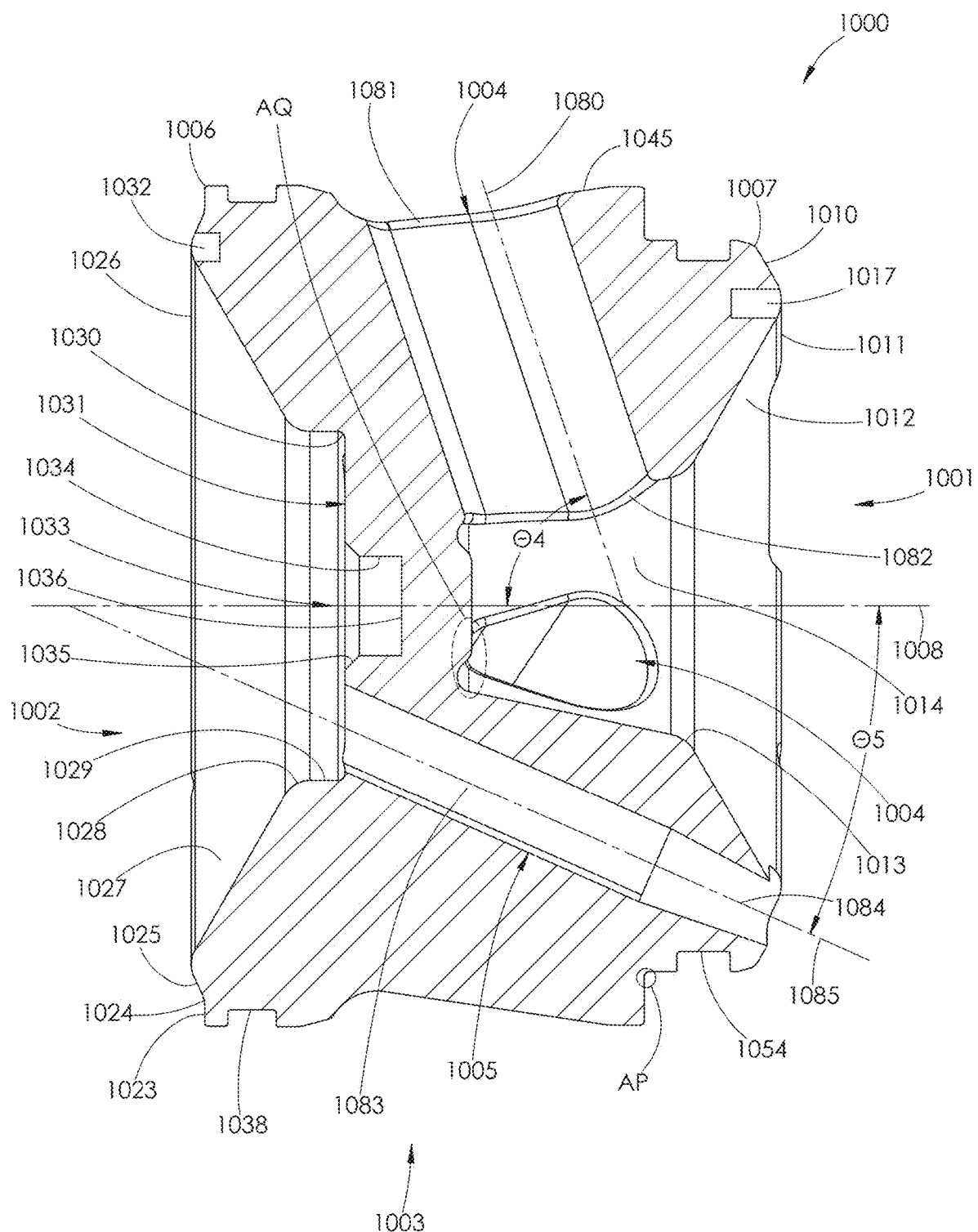

FIG. 126 is a cross-sectional view of the fluid routing plug shown in FIG. 125 taken along line AO-AO.

Figure 127:
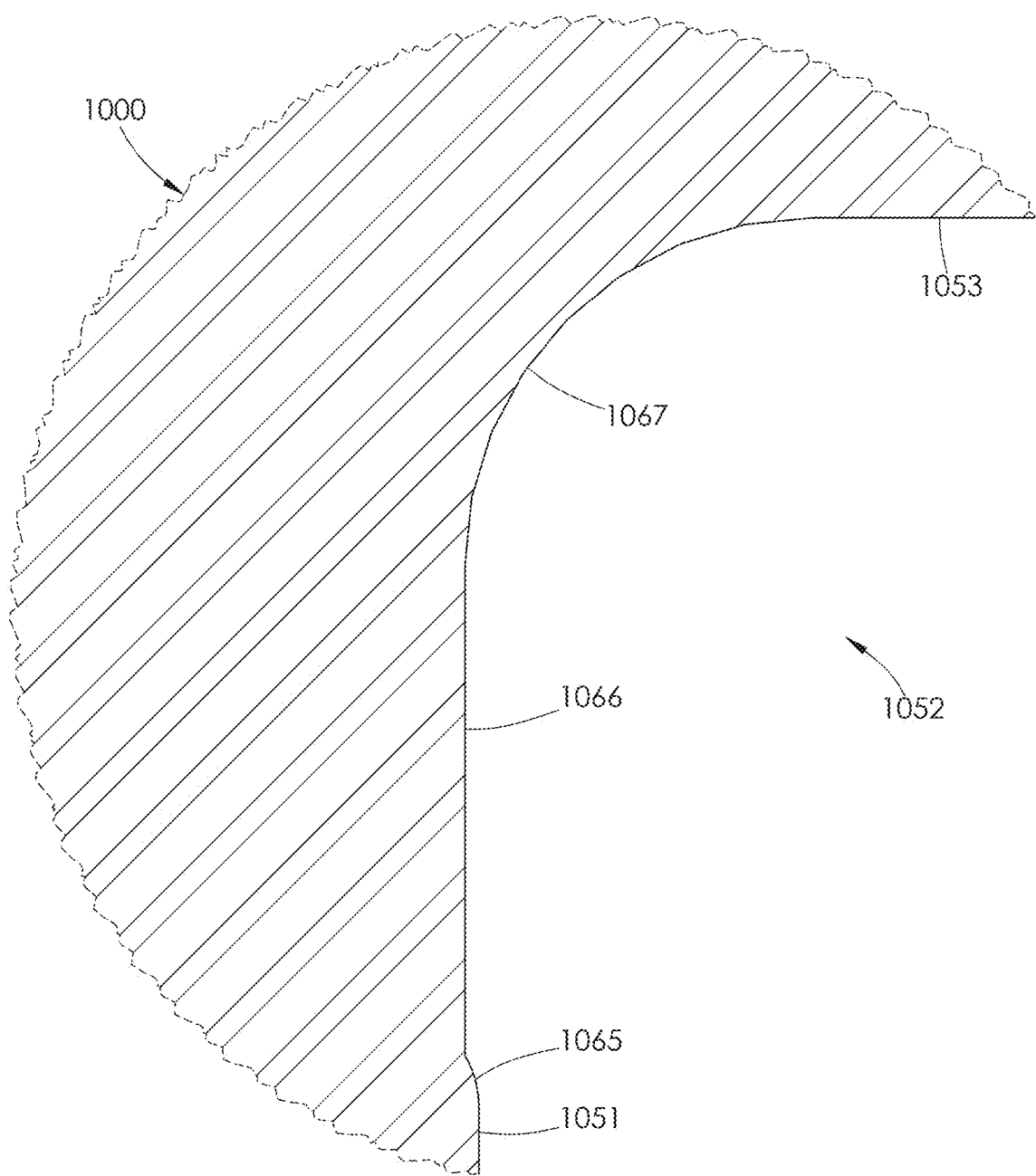

FIG. 127 is an enlarged view of area AP shown in FIG. 126.

Figure 128:
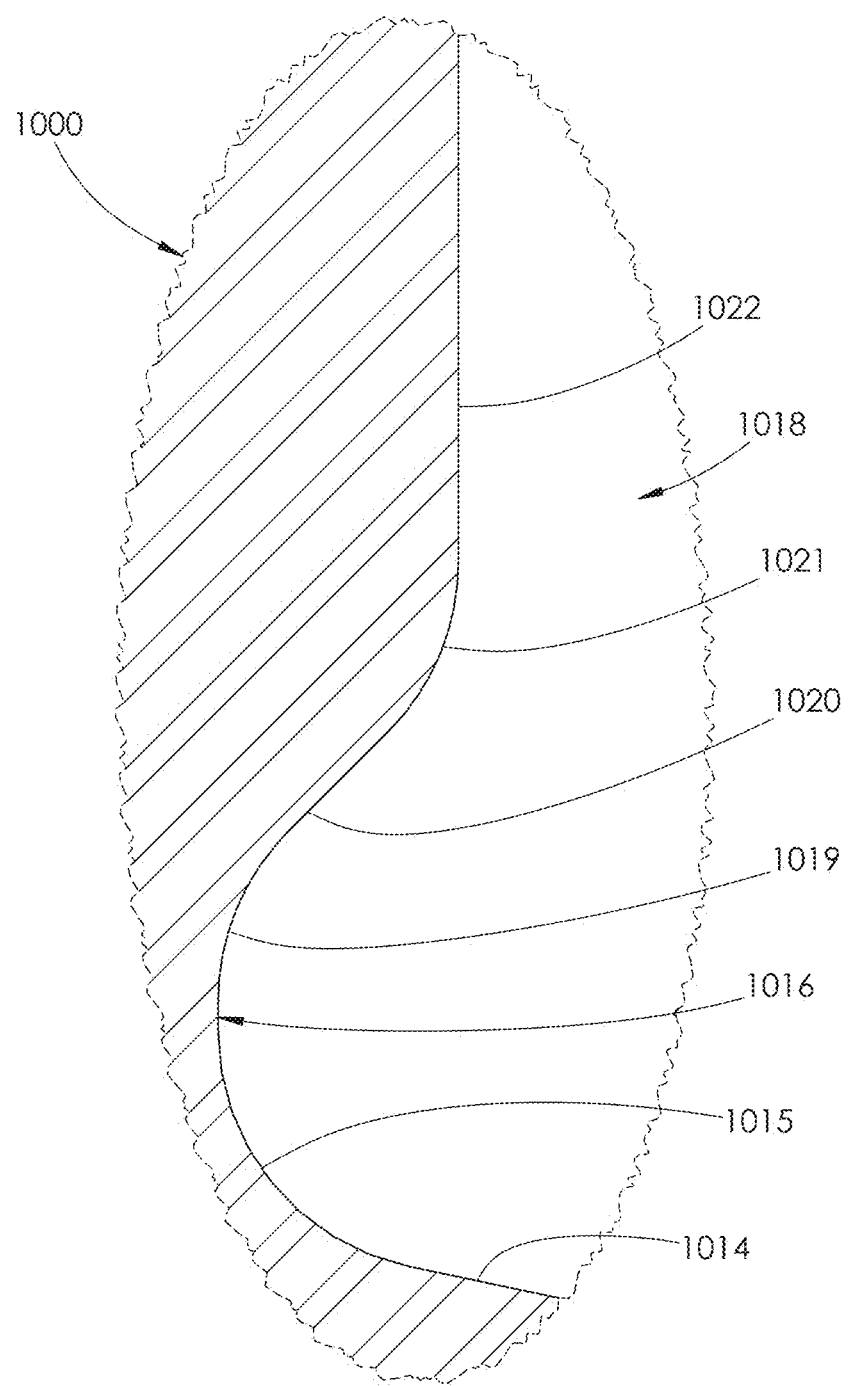

FIG. 128 is an enlarged view of area AQ shown in FIG. 126.

Figure 129:
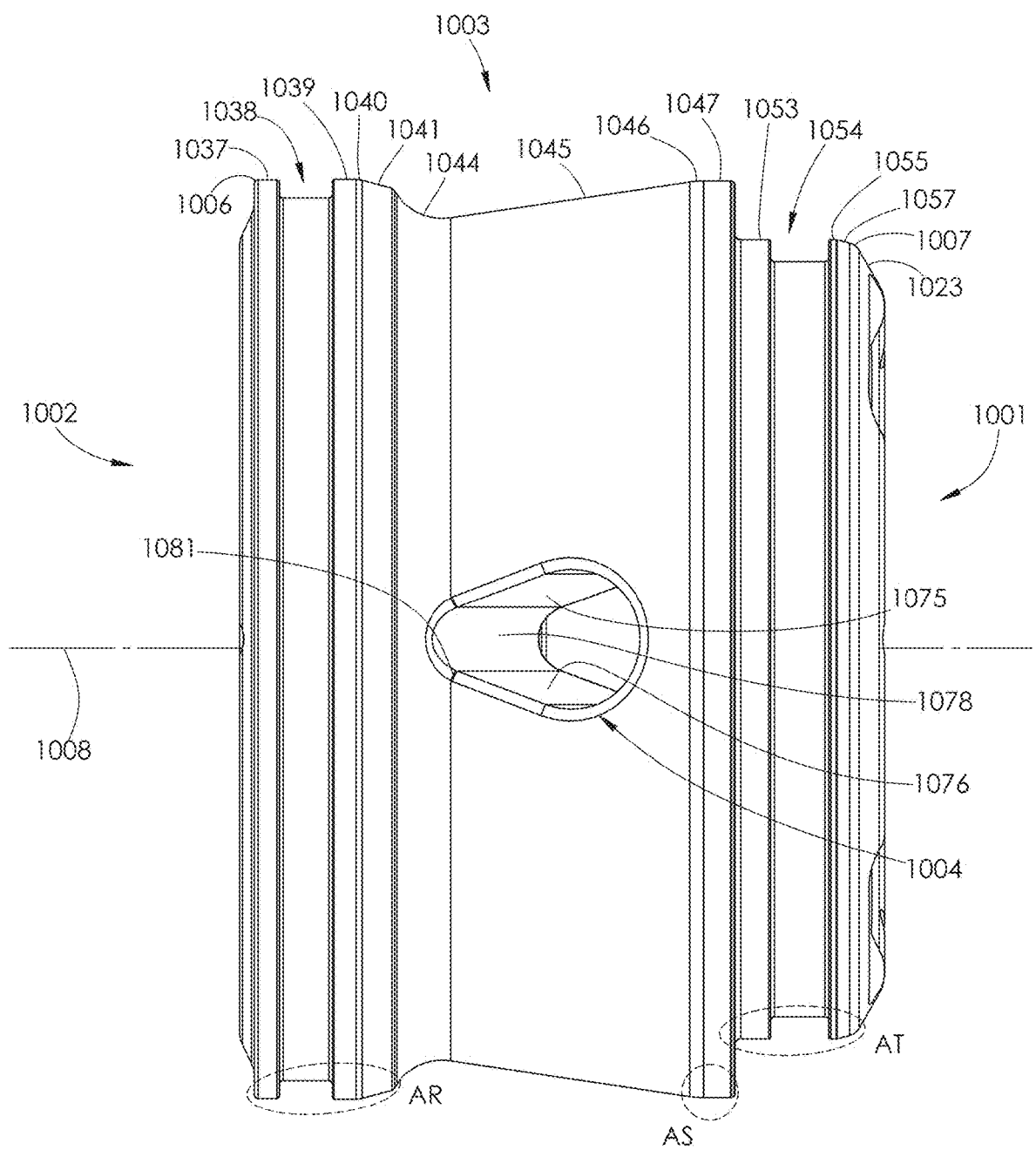

FIG. 129 is a top plan view of the fluid routing plug shown in FIG. 122.

Figure 130:
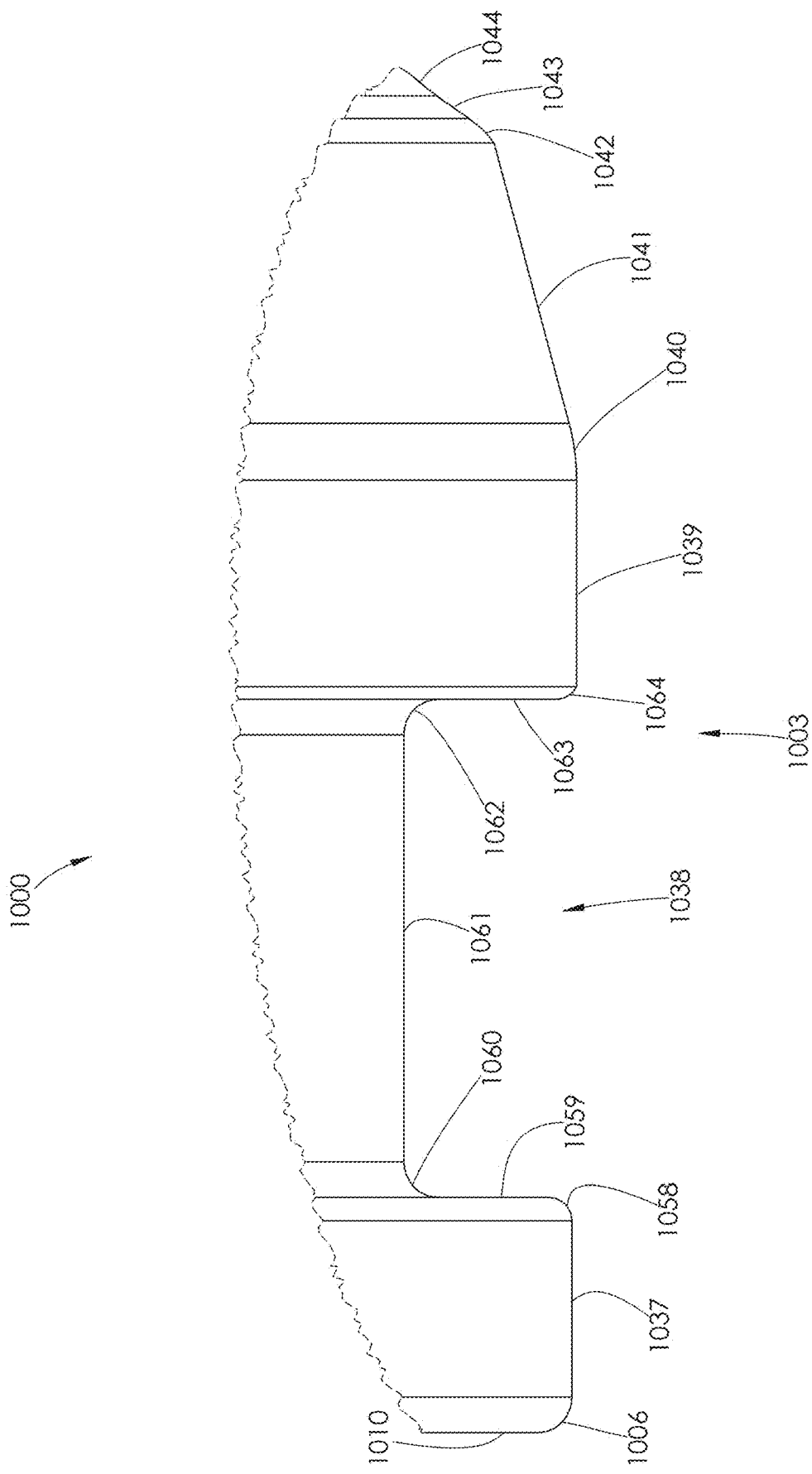

FIG. 130 is an enlarged view of area AR shown in FIG. 129.

Figure 131:
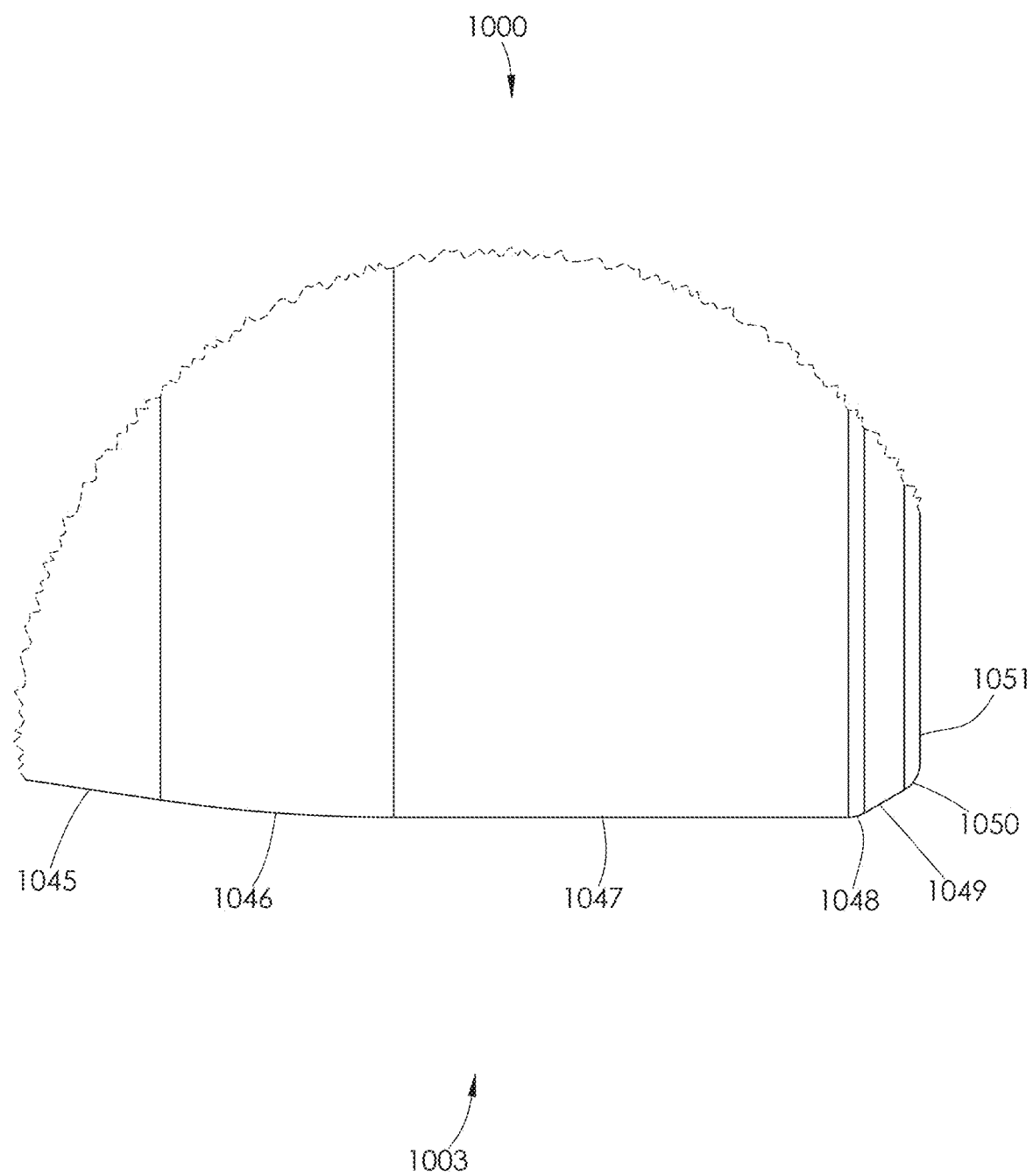

FIG. 131 is an enlarged view of area AS shown in FIG. 129

Figure 132:
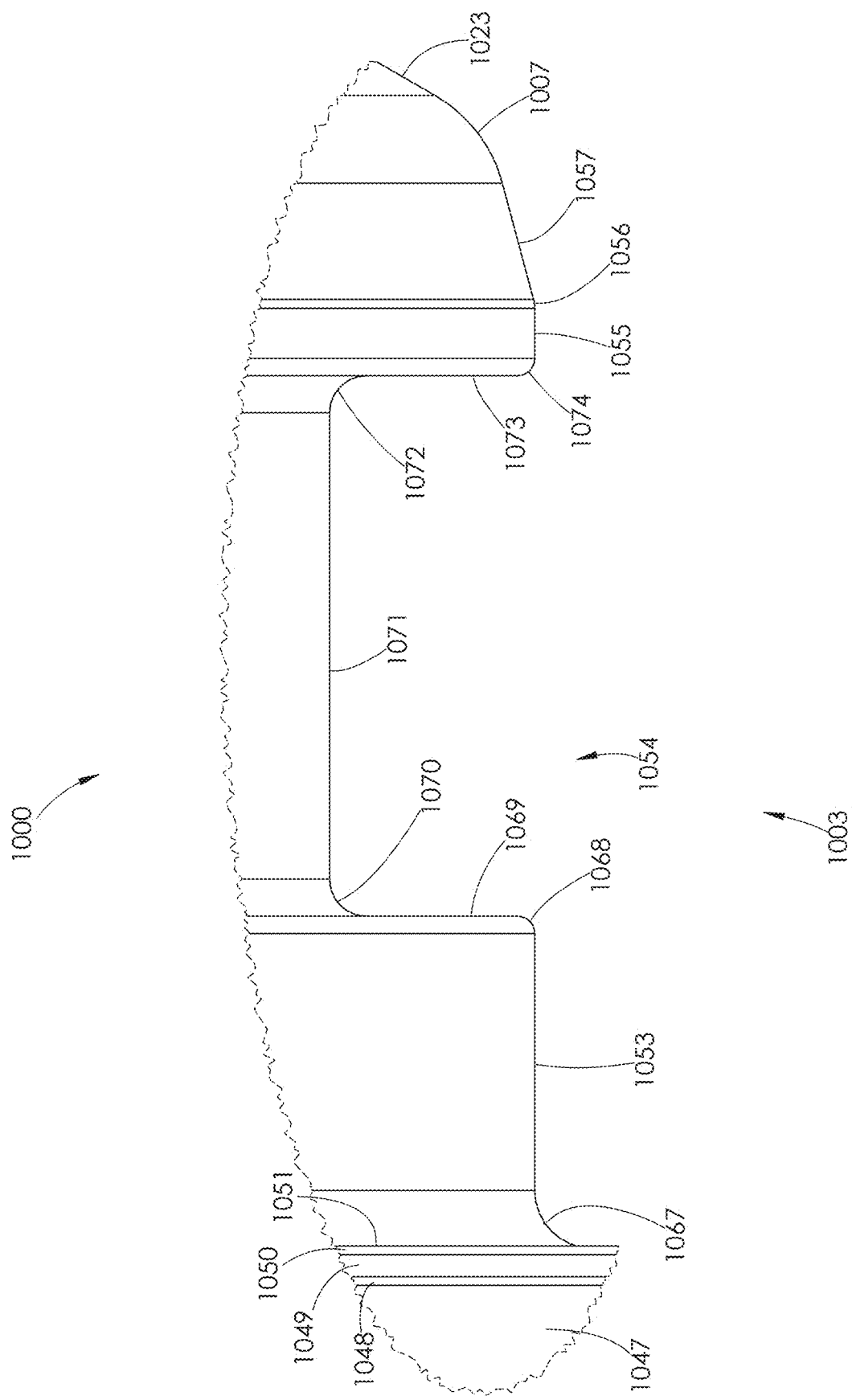

FIG. 132 is an enlarged view of area AT shown in FIG. 129.

Figure 133:
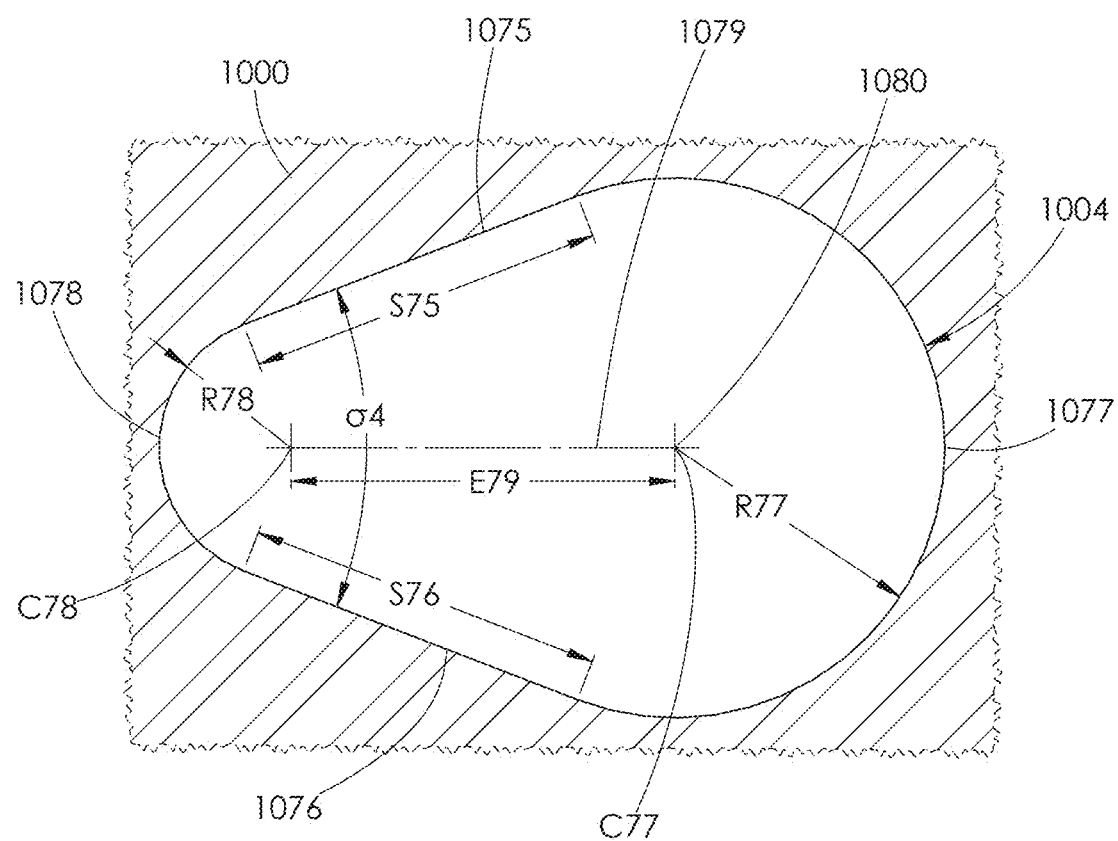

FIG. 133 is a cross-sectional view of a suction fluid passage taken perpendicular to the longitudinal axis of the suction fluid passage.

Figure 134:
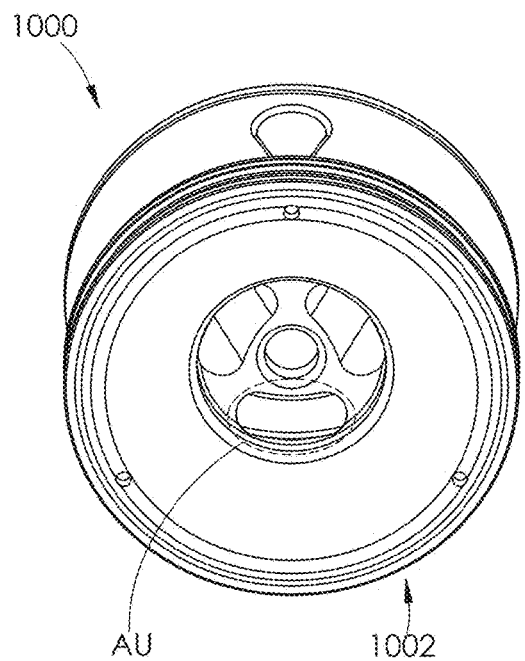

FIG. 134 is a top, front perspective view of the fluid routing plug shown in FIG. 122.

Figure 135:
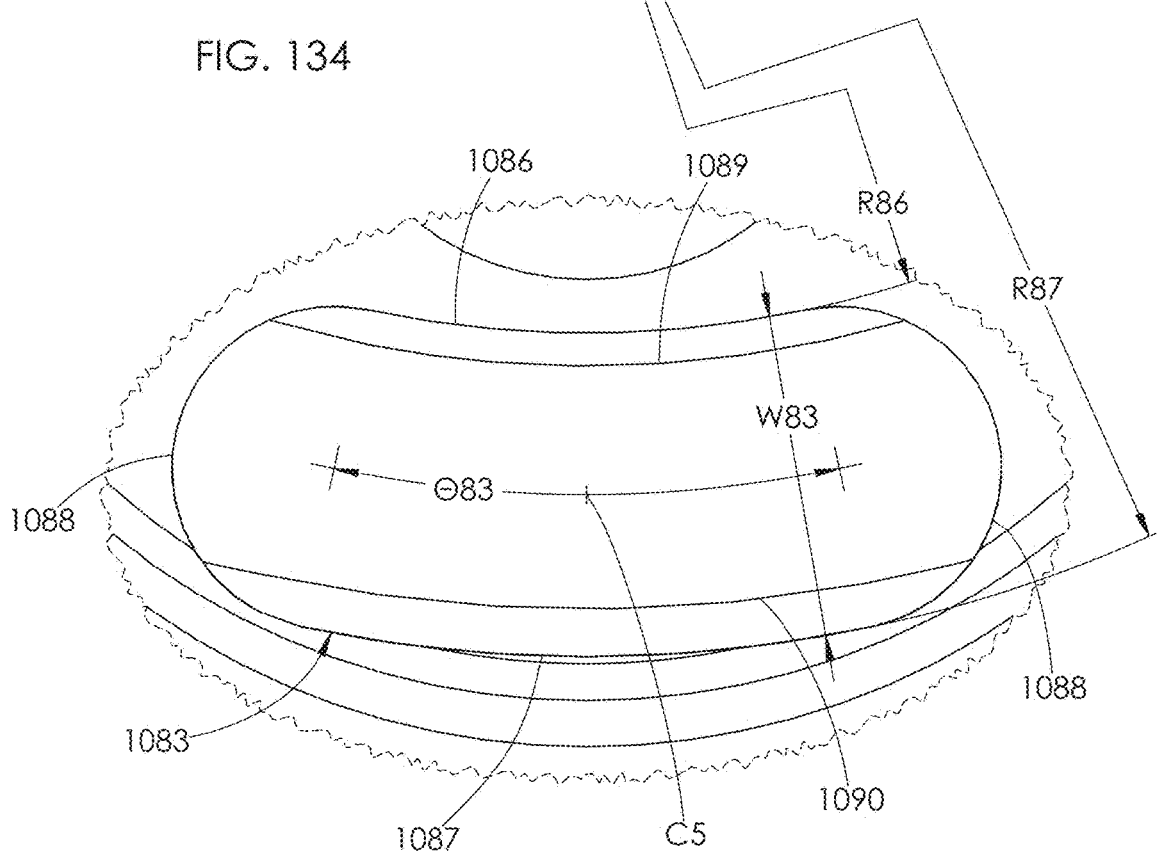

FIG. 135 is an enlarged view of area AU shown in FIG. 134.

Figure 136:
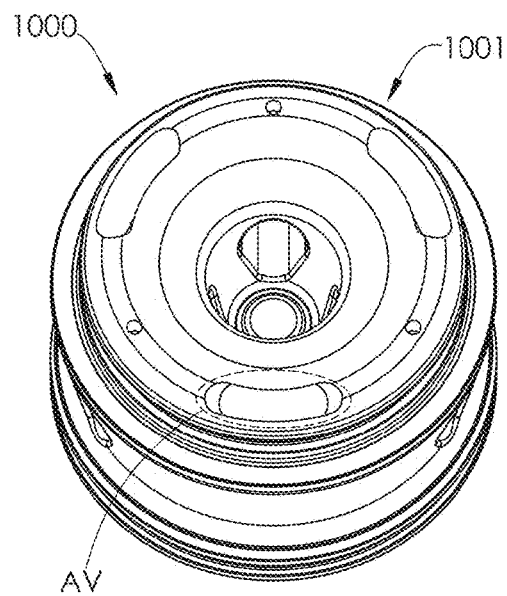

FIG. 136 is a bottom, rear perspective view of the fluid routing plug shown in FIG. 122.

Figure 137:
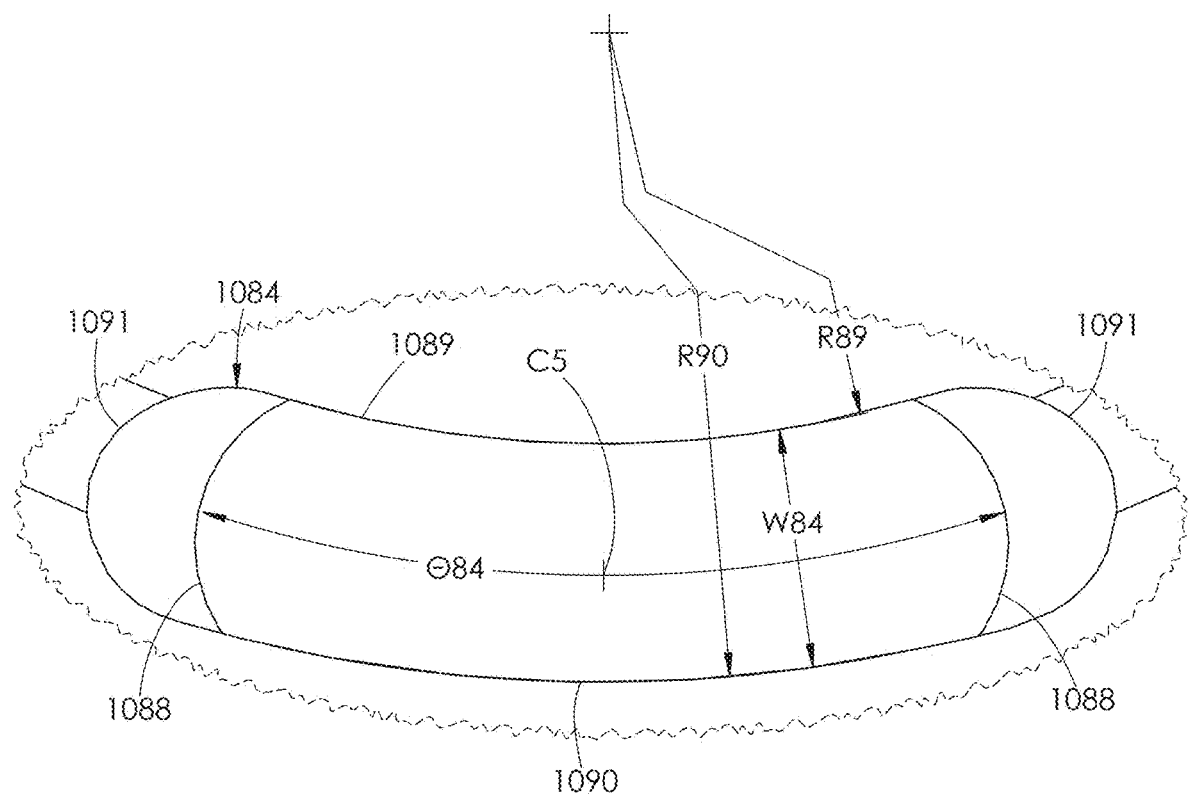

FIG. 137 is an enlarged view of area AV shown in FIG. 136.

Figure 138:
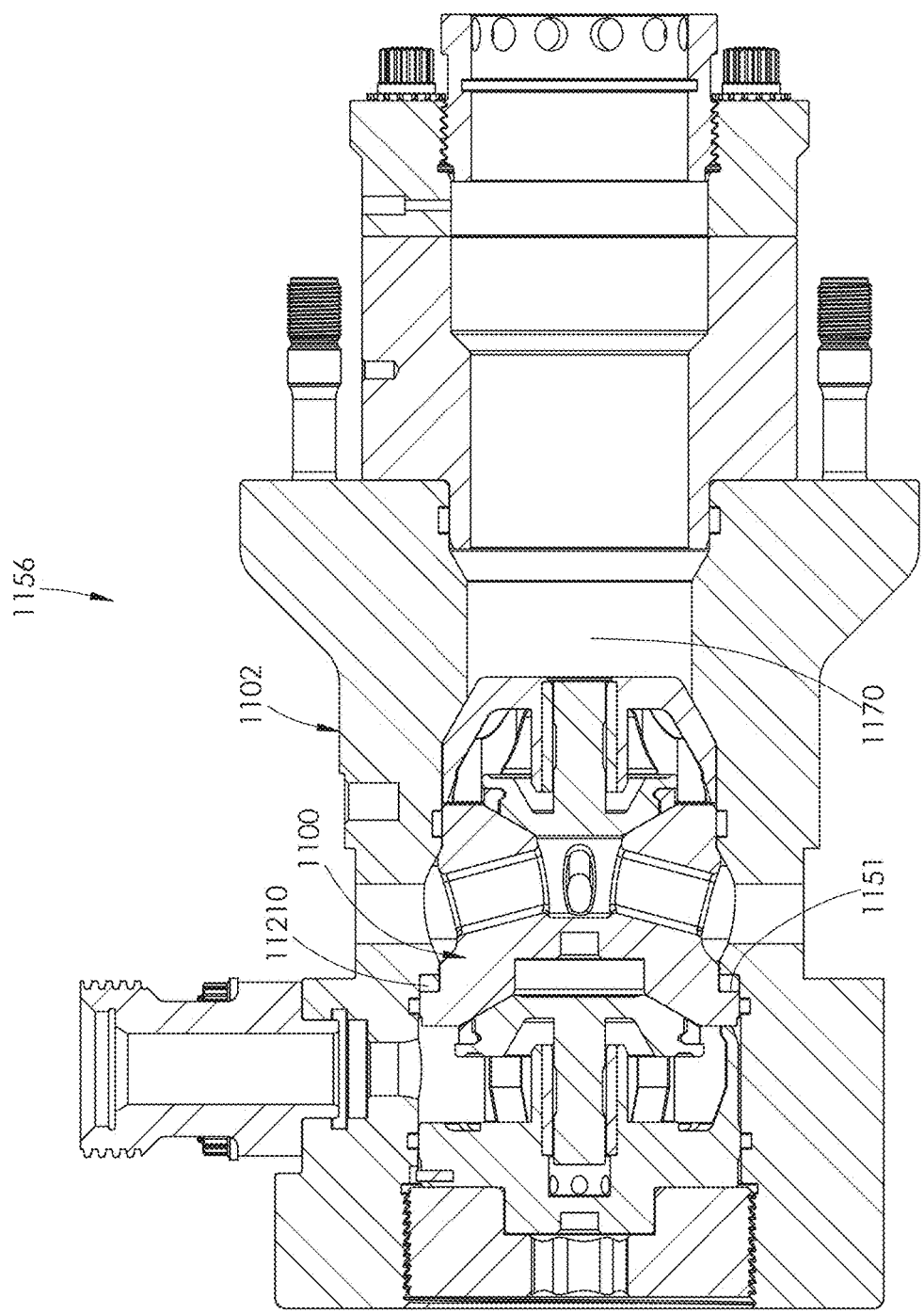

FIG. 138 is a cross-sectional view of another embodiment of a fluid end section having another embodiment of a fluid routing plug installed therein.

Figure 139:
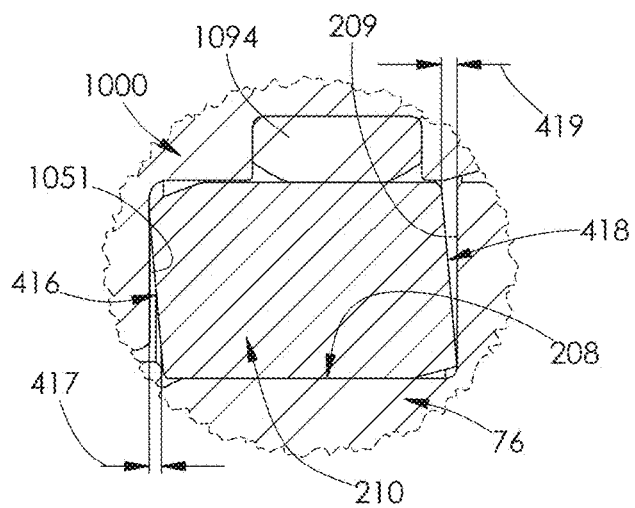

FIG. 139 is an enlarged view of area AW shown in FIG. 121, illustrating a cross-sectional view of an insert installed in a dynamic body with deformed front and rear surfaces.

Figure 63:
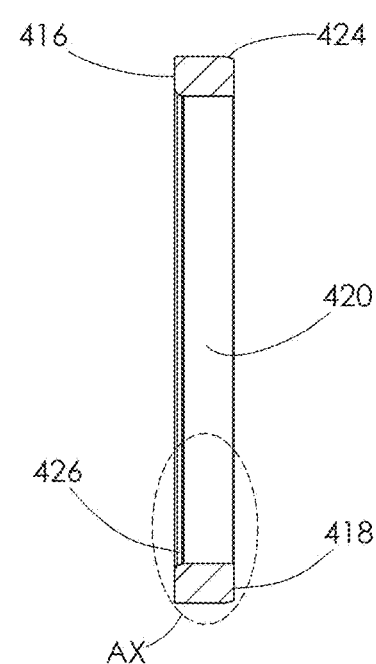
FIG. 63 is a cross-sectional view of the hardened insert shown in FIG. 62, taken along line Q-Q.
Figure 64:
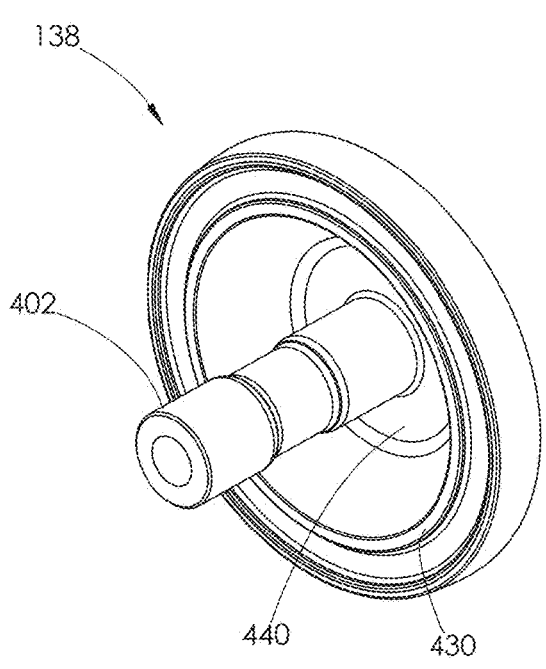
FIG. 64 is a front perspective view of the discharge valve shown in FIGS. 40 and 41.
Figure 65:
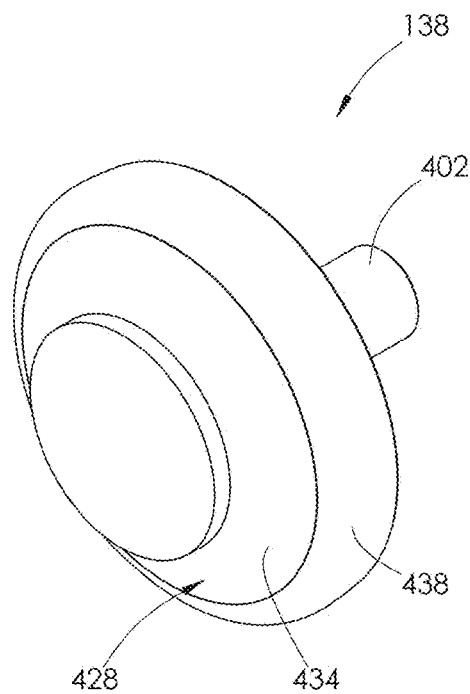
FIG. 65 is a rear perspective view of the discharge valve shown in FIG. 64.
Figure 140:
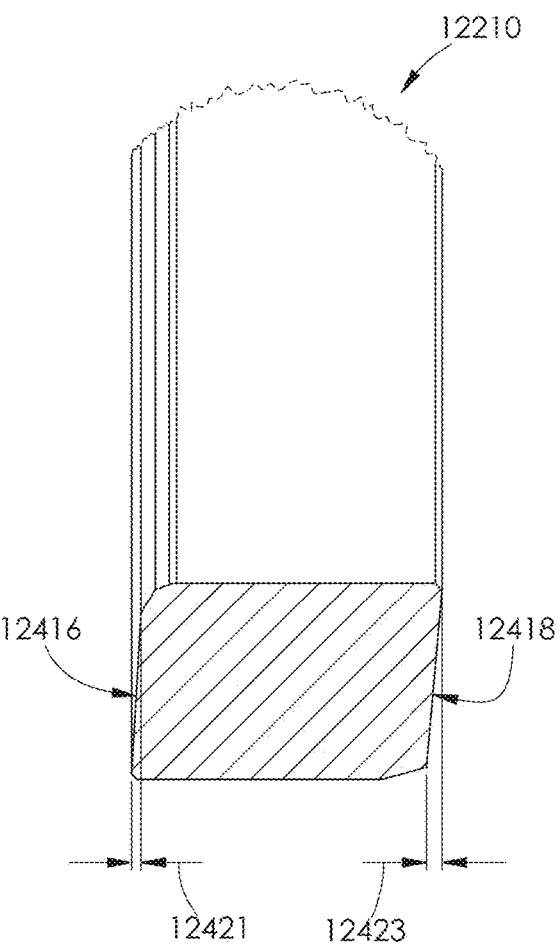

FIG. 140 is an enlarged view of area AX shown in FIG. 63, in which insert 210 has been replaced with insert 12210 to show the pre-formed front and rear surfaces.

Figure 141:
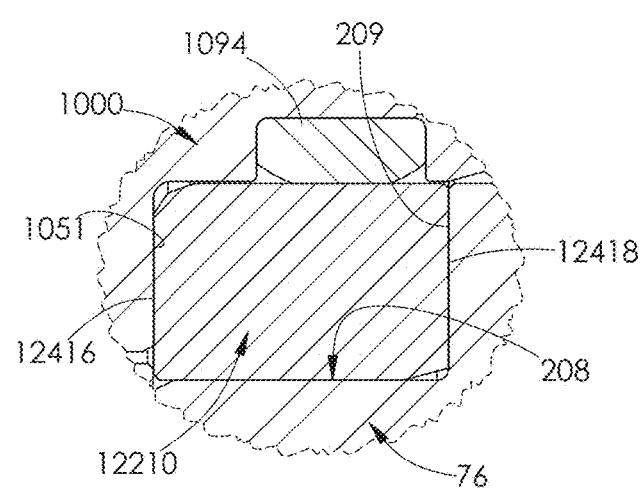

FIG. 141 is an enlarged view of area AW shown in FIG. 121, in which insert 210 has been replaced by insert 12210, showing the perpendicular surfaces of insert 12210 after installation.

Figure 142:
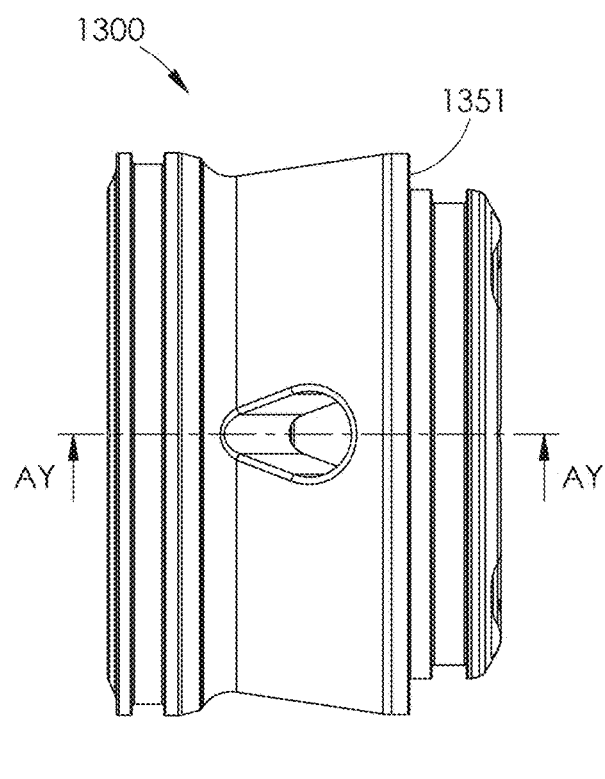

FIG. 142 is a top plan view of another embodiment of a fluid routing plug.

Figure 143:
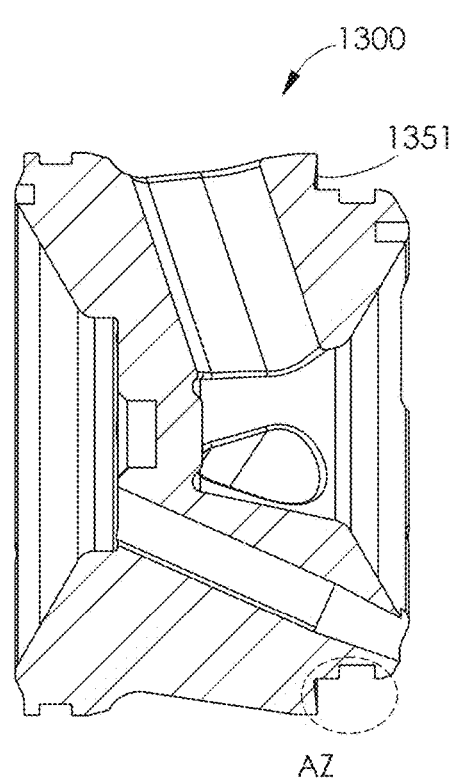

FIG. 143 is a cross-sectional view of the fluid routing plug shown in FIG. 142, taken along line AY-AY.

Figure 144:
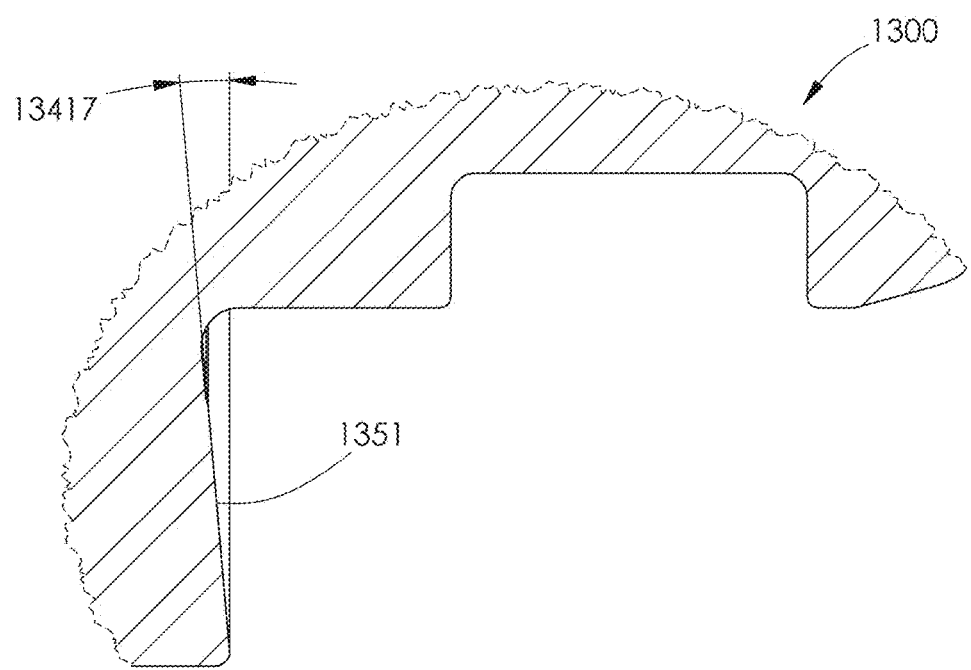

FIG. 144 is an enlarged view of area AZ shown in FIG. 143.

FIG. 145 is a top plan view of another embodiment of a dynamic body.

FIG. 146 is a cross-sectional view of the dynamic body shown in FIG. 145, taken along line BA-BA.

FIG. 147 is an enlarged view of area BB shown in FIG. 146.

Figure 148:
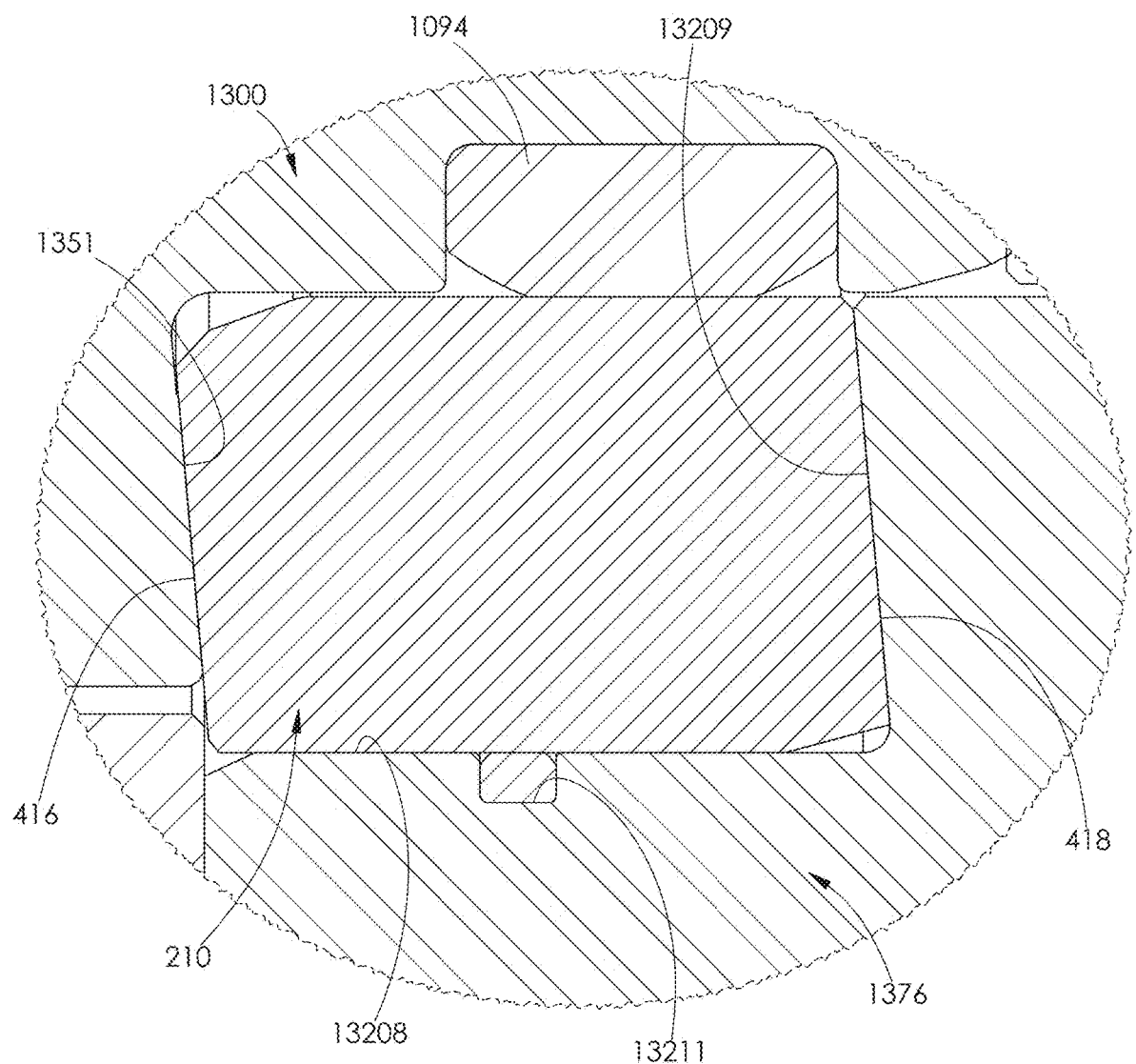

FIG. 148 is an enlarged view of area AW shown in FIG. 121, in which fluid routing plug 1100 has been replaced by fluid routing plug 1300 and dynamic body 76 has been replaced by dynamic body 1376.

Figure 149:
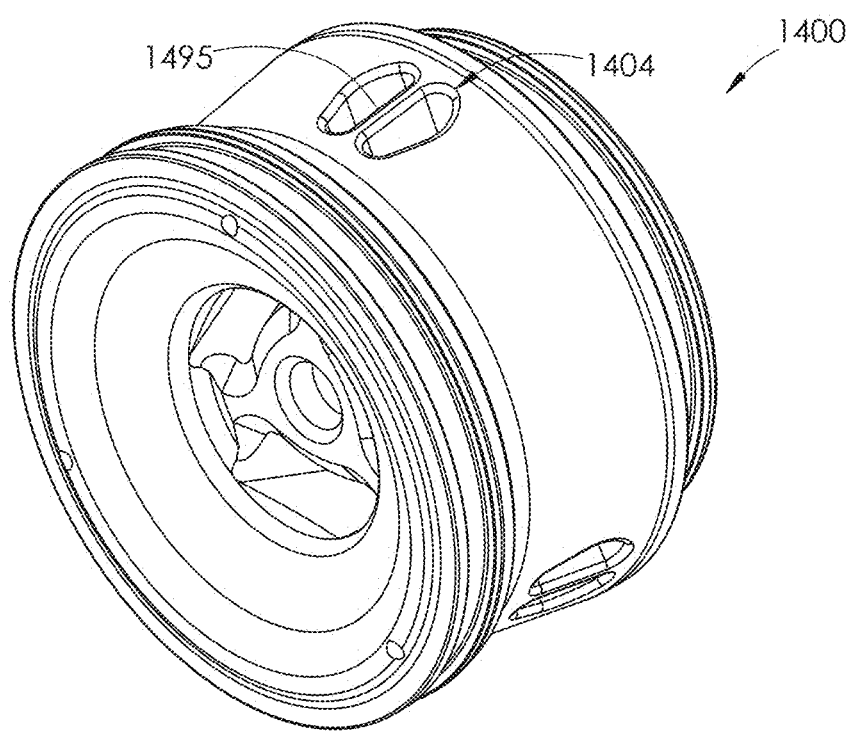

FIG. 149 is a perspective view of another embodiment of a fluid routing plug.

Figure 150:
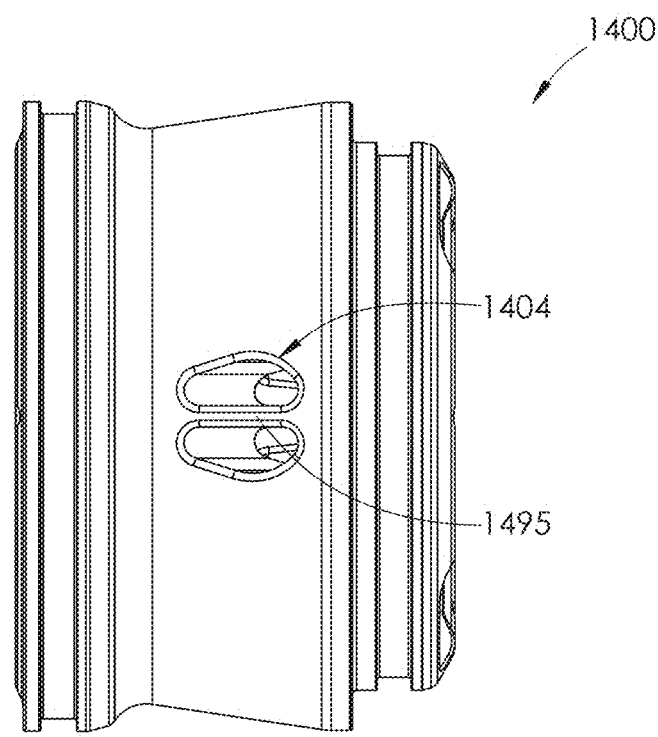

FIG. 150 is a top plan view of the fluid routing plug shown in FIG. 149.

Figure 151:
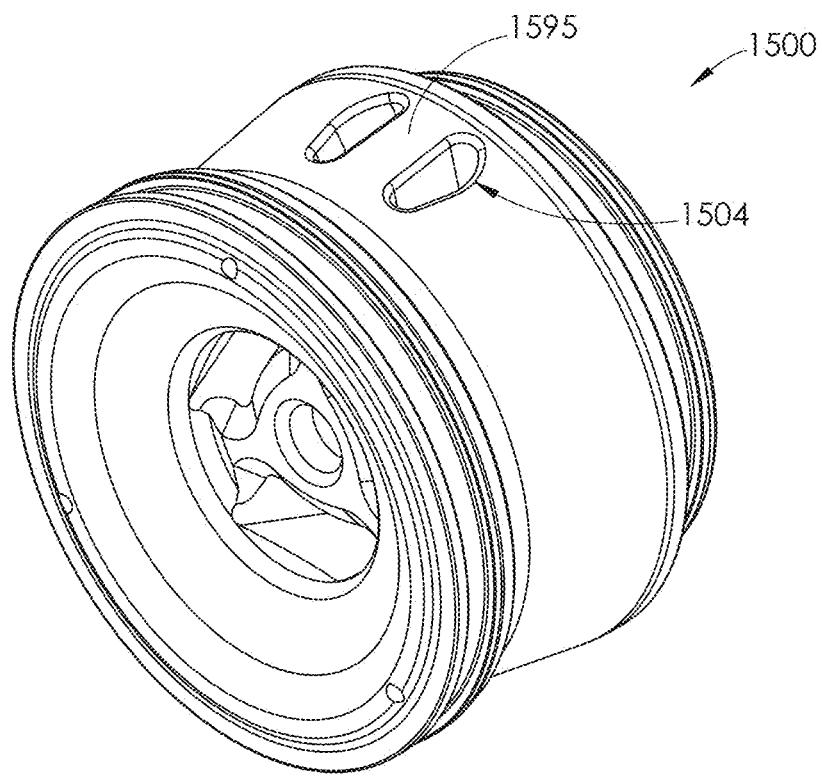

FIG. 151 is a perspective view of another embodiment of a fluid routing plug.

Figure 152:
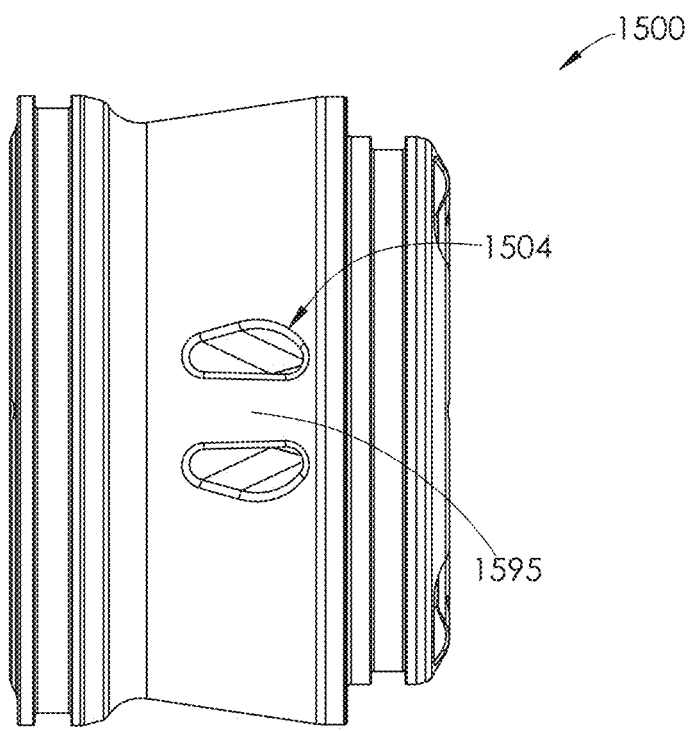

FIG. 152 is a top plan view of the fluid routing plug shown in FIG. 151.

Figure 153:
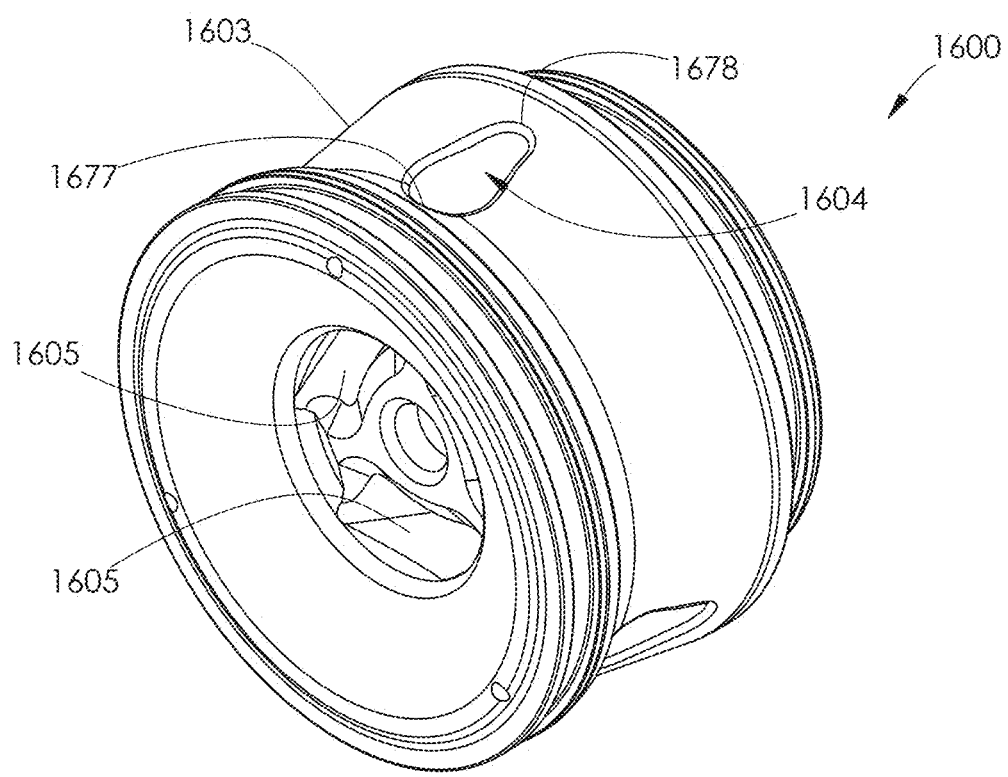

FIG. 153 is a perspective view of another embodiment of a fluid routing plug.

Figure 154:
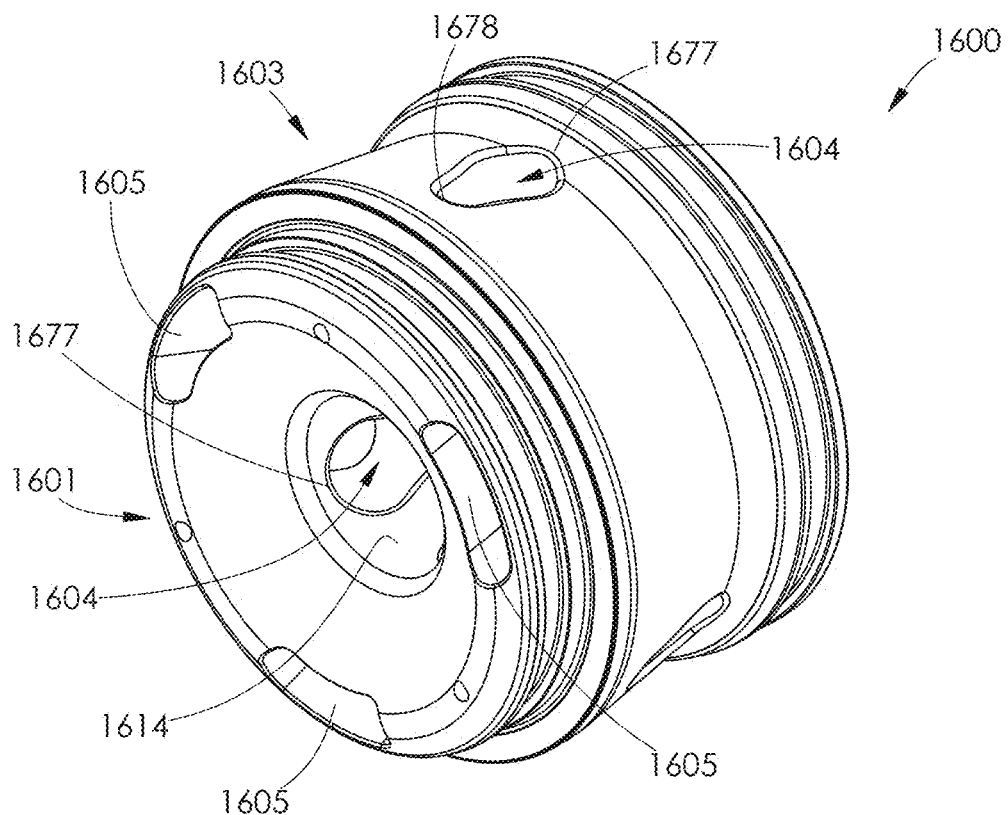

FIG. 154 is a rear perspective view of the fluid routing plug shown in FIG. 153.

Figure 155:
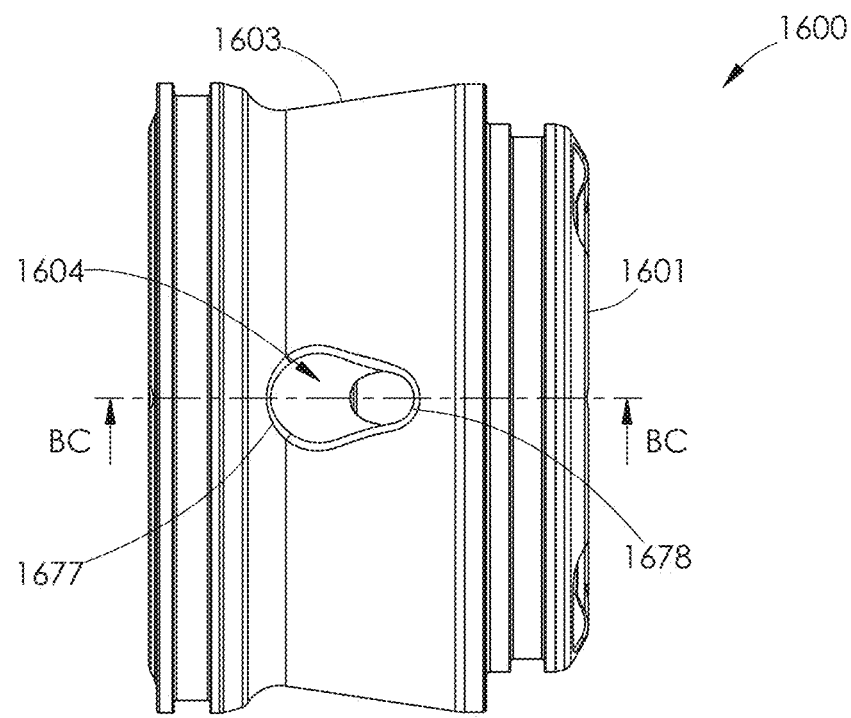

FIG. 155 is a top plan view of the fluid routing plug shown in FIG. 153.

Figure 156:
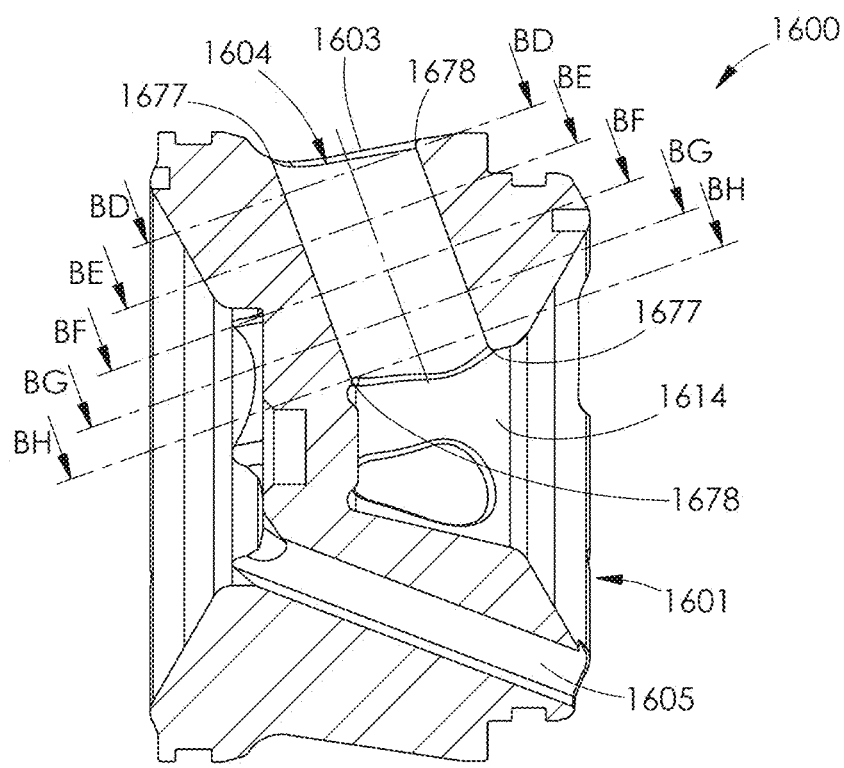

FIG. 156 is a cross-sectional view of the fluid routing plug shown in FIG. 155, taken along line BC-BC.

Figure 157:
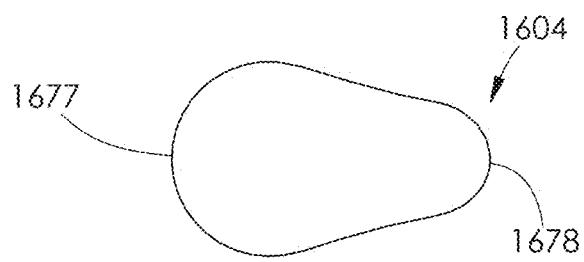

FIG. 157 is a cross-sectional view of the fluid routing plug shown in FIG. 156, taken along line BD-BD. FIG. 156 is used to illustrate the location of the section line but the figure shows the entire cross-section. Only the cross-section of the suction fluid passage is shown for clarity.

Figure 158:
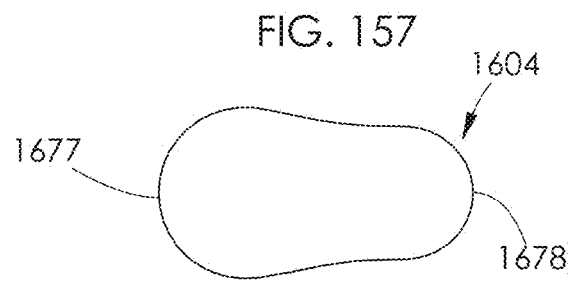

FIG. 158 is a cross-sectional view of the fluid routing plug shown in FIG. 156, taken along line BE-BE. FIG. 156 is used to illustrate the location of the section line but the figure shows the entire cross-section. Only the cross-section of the suction fluid passage is shown for clarity.

Figure 159:
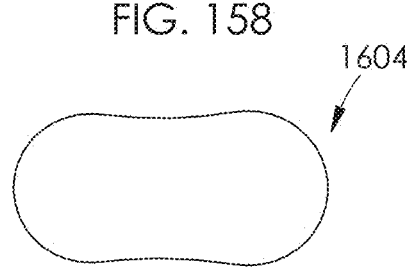

FIG. 159 is a cross-sectional view of the fluid routing plug shown in FIG. 156, taken along line BF-BF. FIG. 156 is used to illustrate the location of the section line but the figure shows the entire cross-section. Only the cross-section of the suction fluid passage is shown for clarity.

Figure 160:
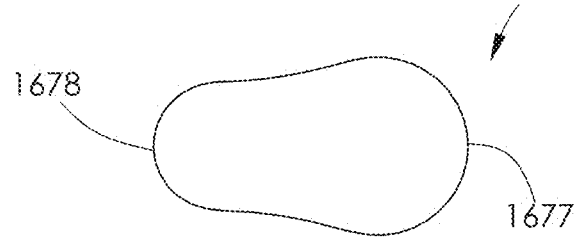

FIG. 160 is a cross-sectional view of the fluid routing plug shown in FIG. 156, taken along line BG-BG. FIG. 156 is used to illustrate the location of the section line but the figure shows the entire cross-section. Only the cross-section of the suction fluid passage is shown for clarity.

Figure 161:
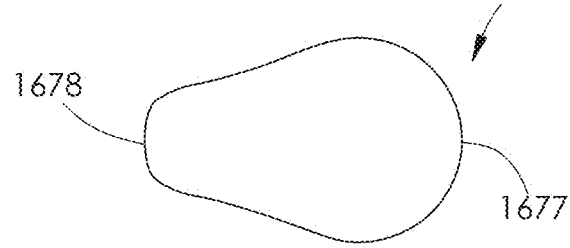

FIG. 161 is a cross-sectional view of the fluid routing plug shown in FIG. 156, taken along line BH-BH. FIG. 156 is used to illustrate the location of the section line but the figure shows the entire cross-section. Only the cross-section of the suction fluid passage is shown for clarity.

Figure 162:
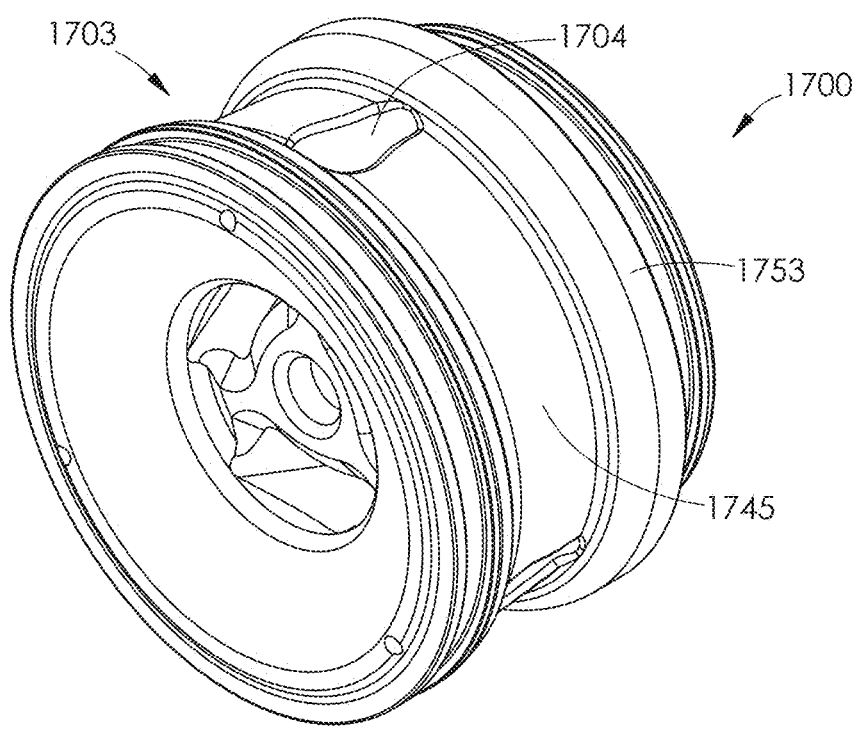

FIG. 162 is a perspective view of another embodiment of a fluid routing plug.

Figure 163:
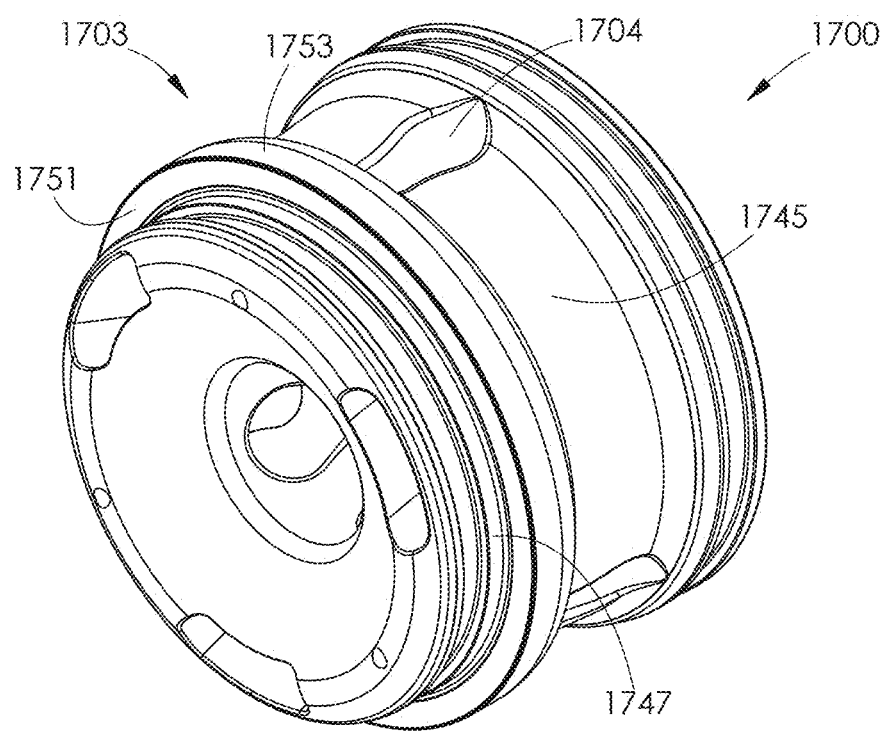

FIG. 163 is a rear perspective view of the fluid routing plug shown in FIG. 162.

Figure 164:
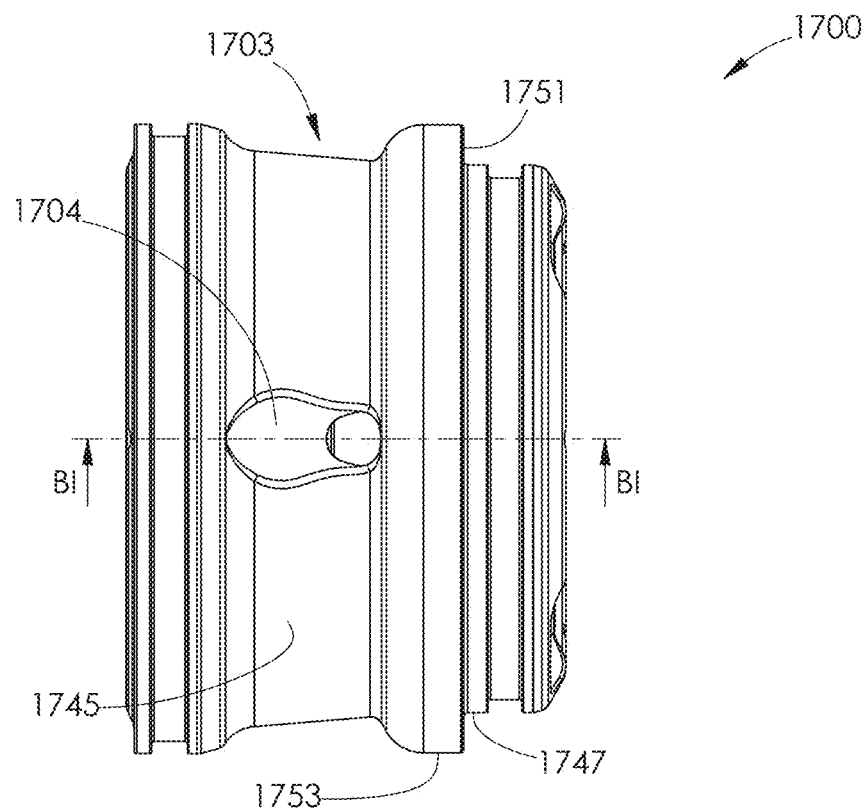

FIG. 164 is a top plan view of the fluid routing plug shown in FIG. 162.

Figure 165:
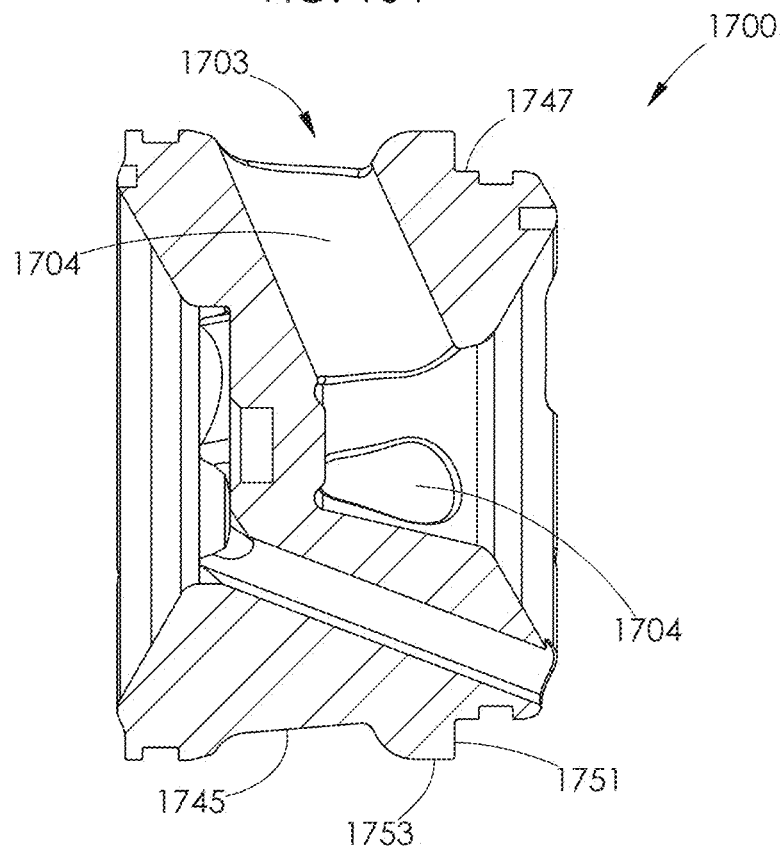

FIG. 165 is a cross-sectional view of the fluid routing plug shown in FIG. 164, taken along line BI-BI.

Figure 166:
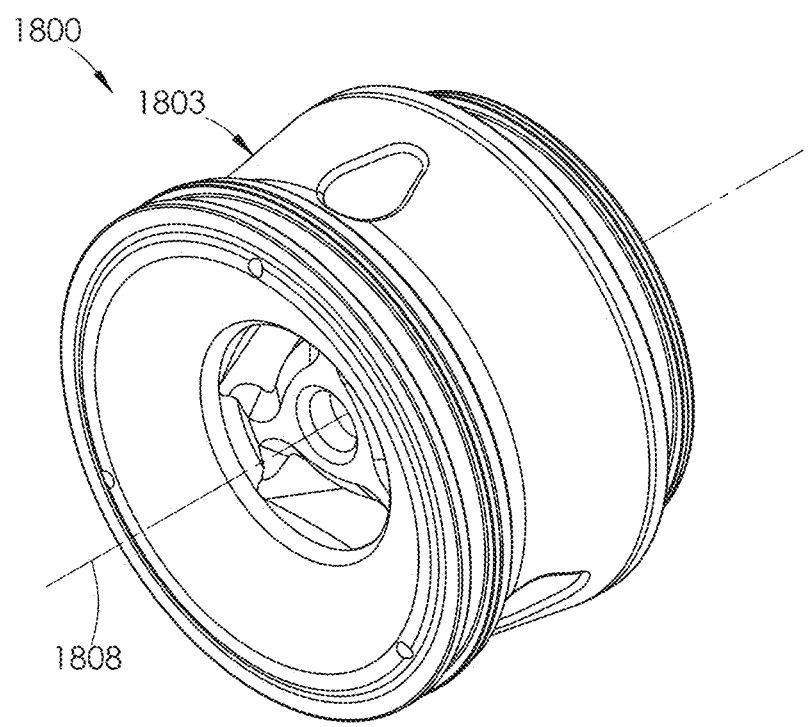

FIG. 166 is perspective view of another embodiment of a fluid routing plug.

Figure 167:
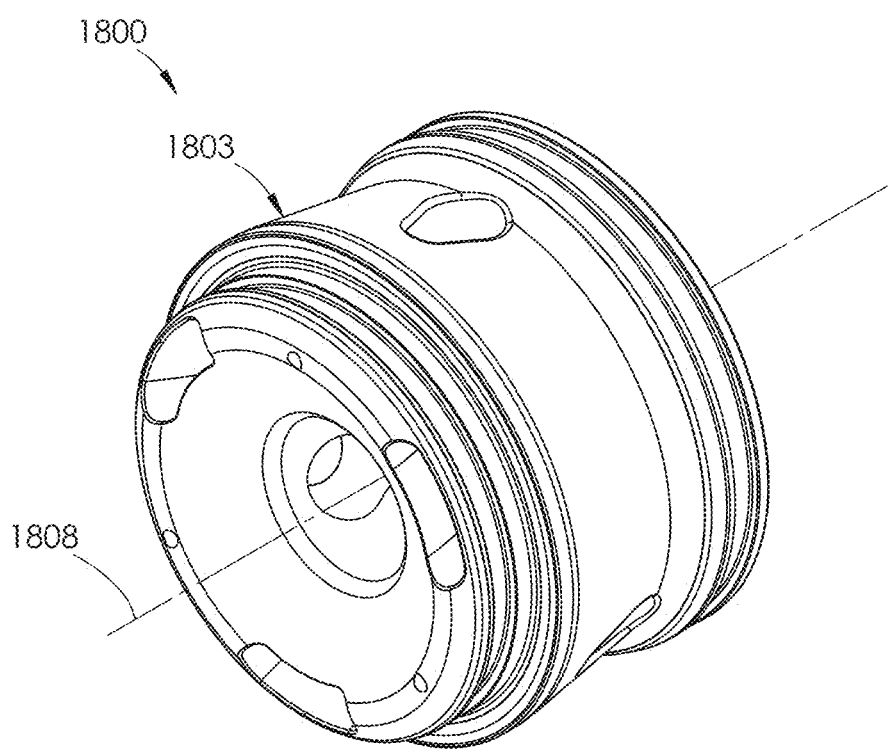

FIG. 167 is a rear perspective view of the fluid routing plug shown in FIG. 166.

Figure 168:
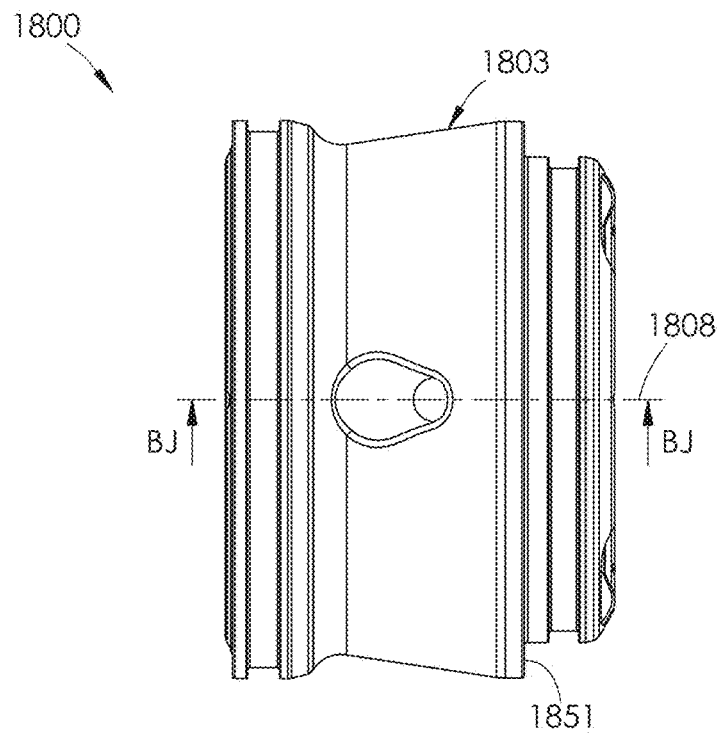

FIG. 168 is a top plan view of the fluid routing plug shown in FIG. 166.

Figure 169:
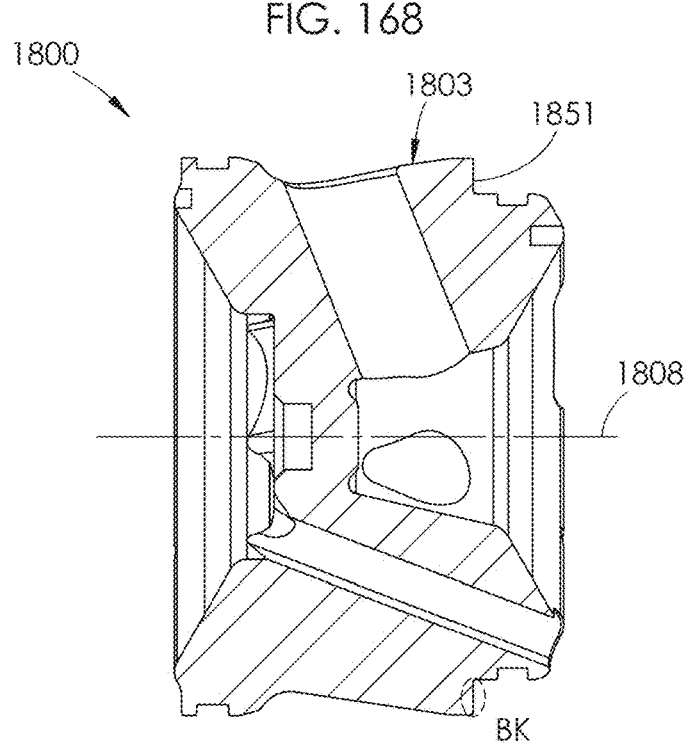

FIG. 169 is a cross-sectional view of the fluid routing plug shown in FIG. 168, taken along line BJ-BJ.

Figure 170:
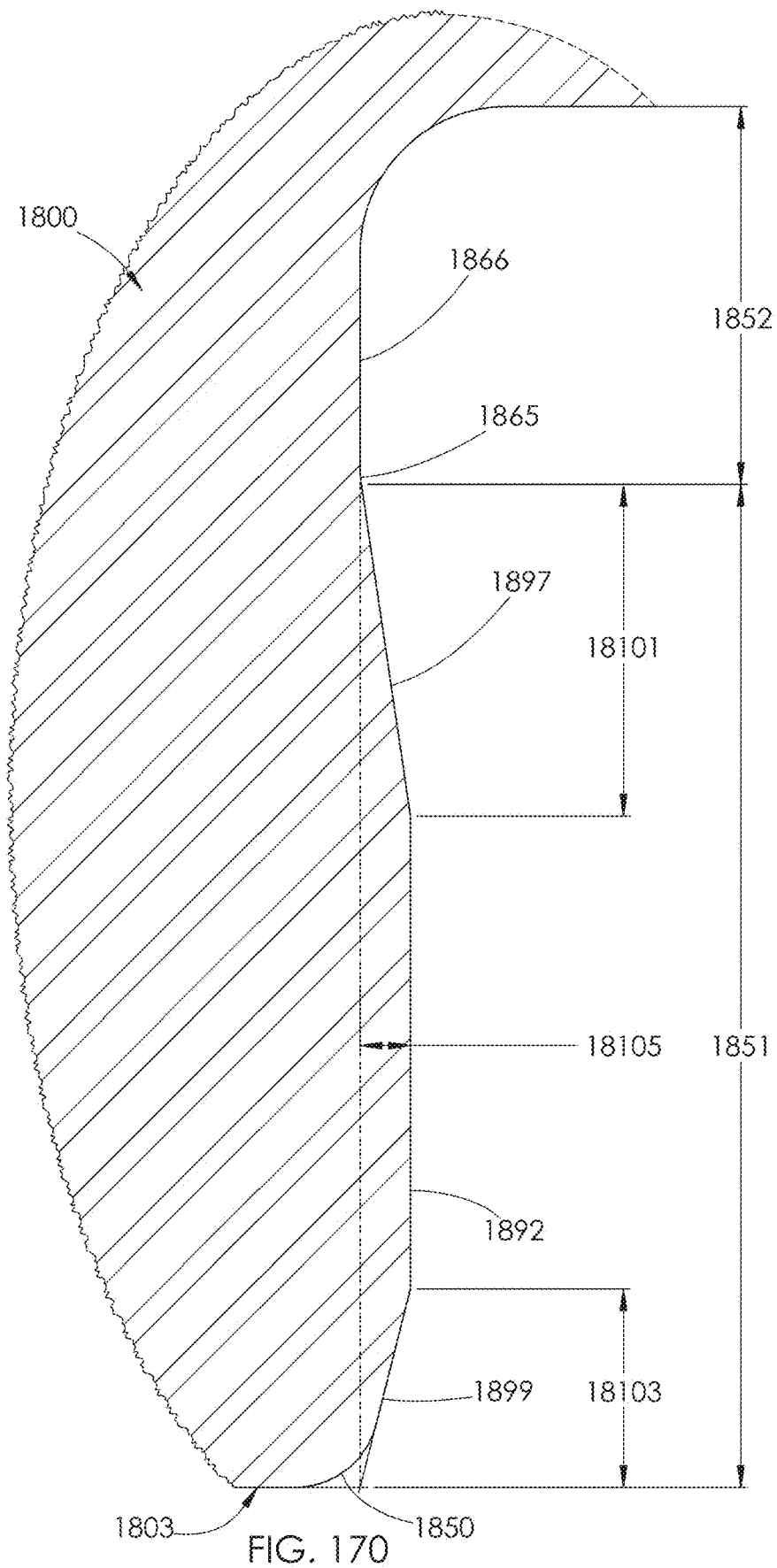

FIG. 170 is an enlarged view of area BK shown in FIG. 169. The height is magnified to illustrate the described features.

Figure 171:
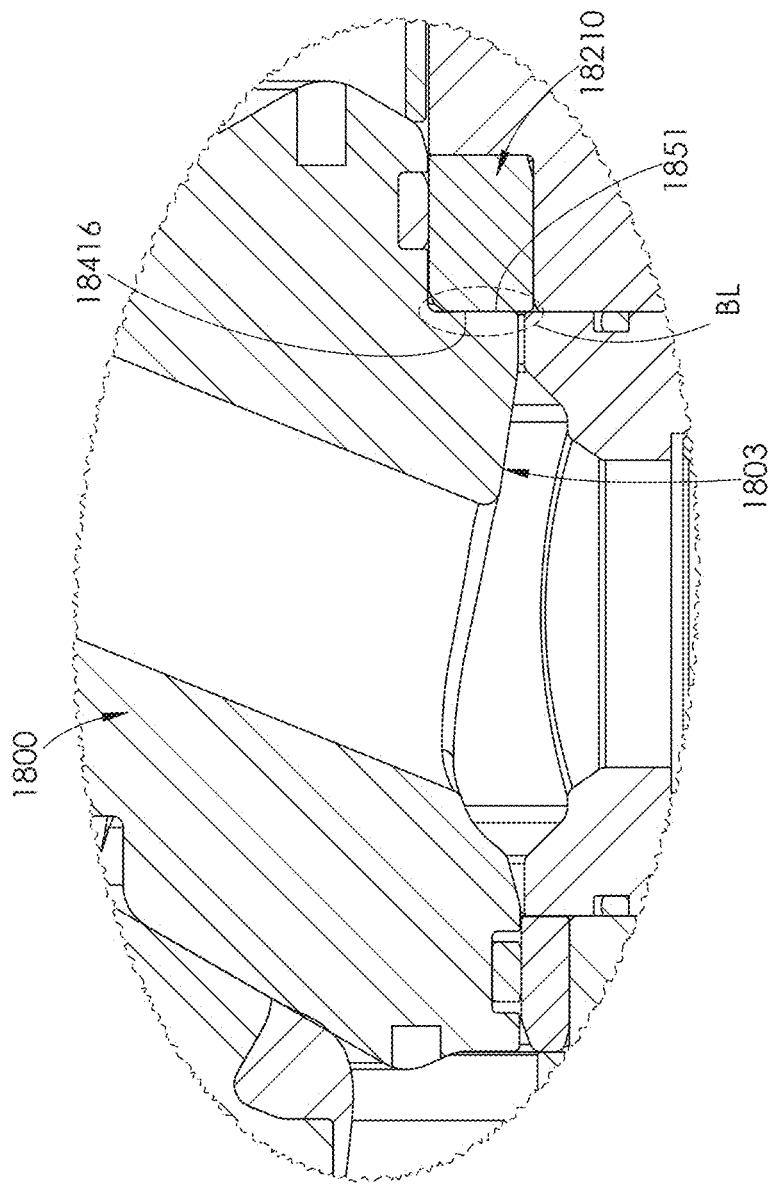

FIG. 171 is an enlarged view of area AN shown in FIG. 120, in which fluid routing plug 1000 has been replaced by fluid routing plug 1800 and insert 210 has been replaced by insert 18210.

Figure 172:
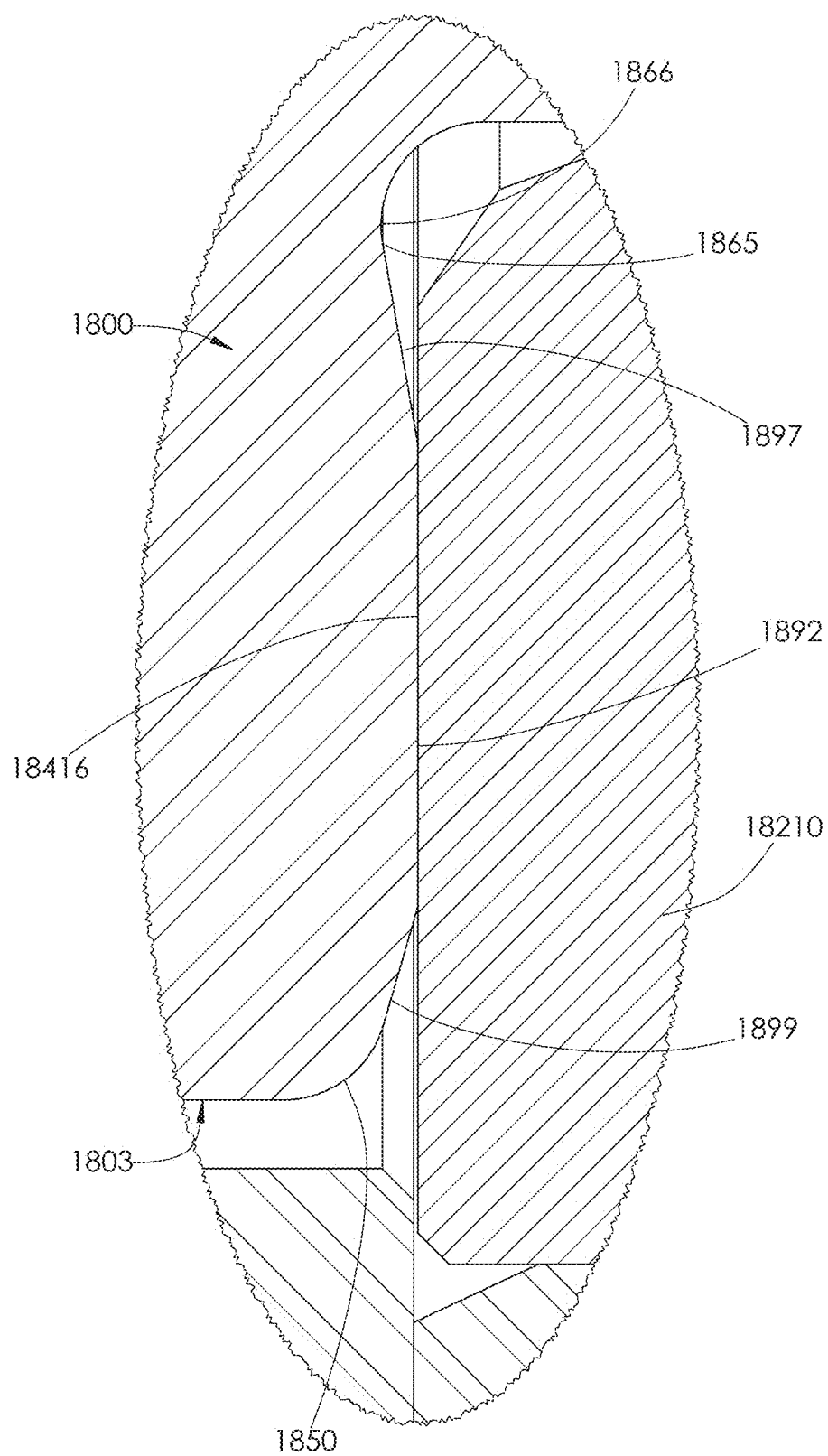

FIG. 172 is an enlarged view of area BL shown in FIG. 171. Some features have been magnified to illustrate the described features.

Figure 173:
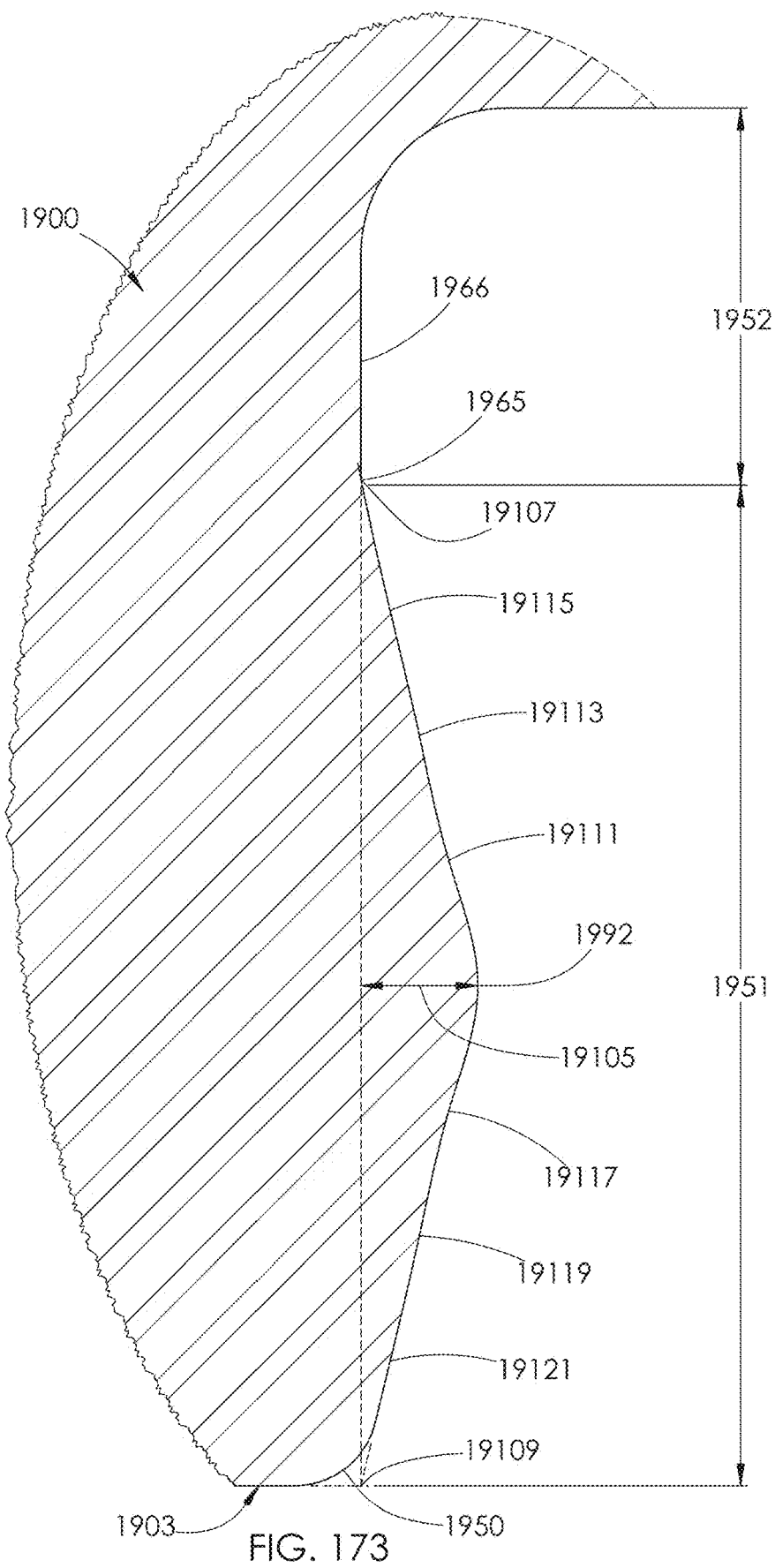

FIG. 173 is an enlarged view of area BK shown in FIG. 169. Fluid routing plug 1800 has been replace by fluid routing plug 1900. The height is magnified to illustrate the described features.

Figure 174:
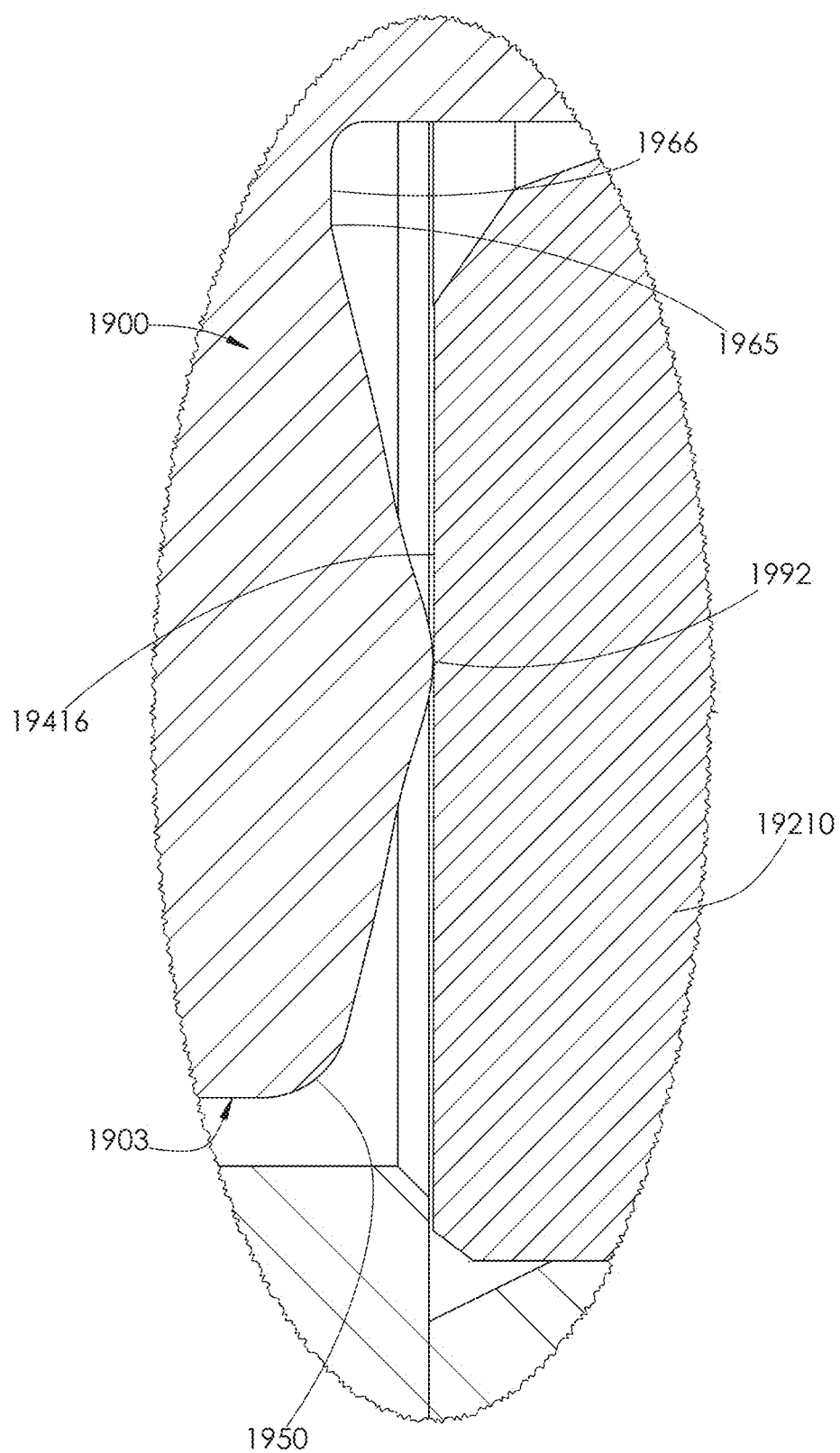

FIG. 174 is an enlarged view of area BL shown in FIG. 171. Fluid routing plug 1800 has been replaced by fluid routing plug 1900. Insert 18210 has been replaced by insert 1910. Some features have been magnified to illustrate the described features.

Figure 175:
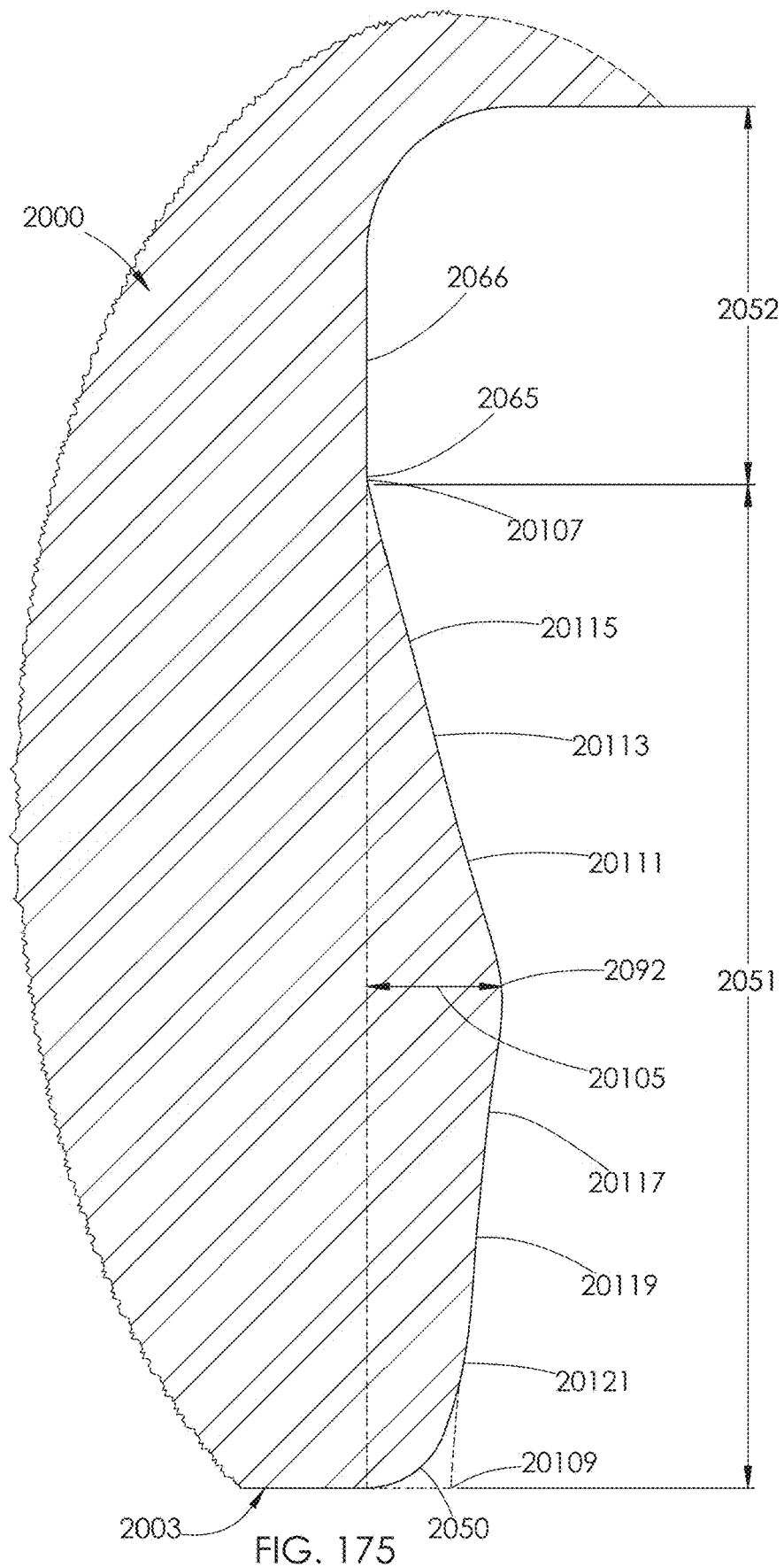

FIG. 175 is an enlarged view of area BK shown in FIG. 169. Fluid routing plug 1800 has been replaced by fluid routing plug 2000. The height is magnified to illustrate the described features.

Figure 176:
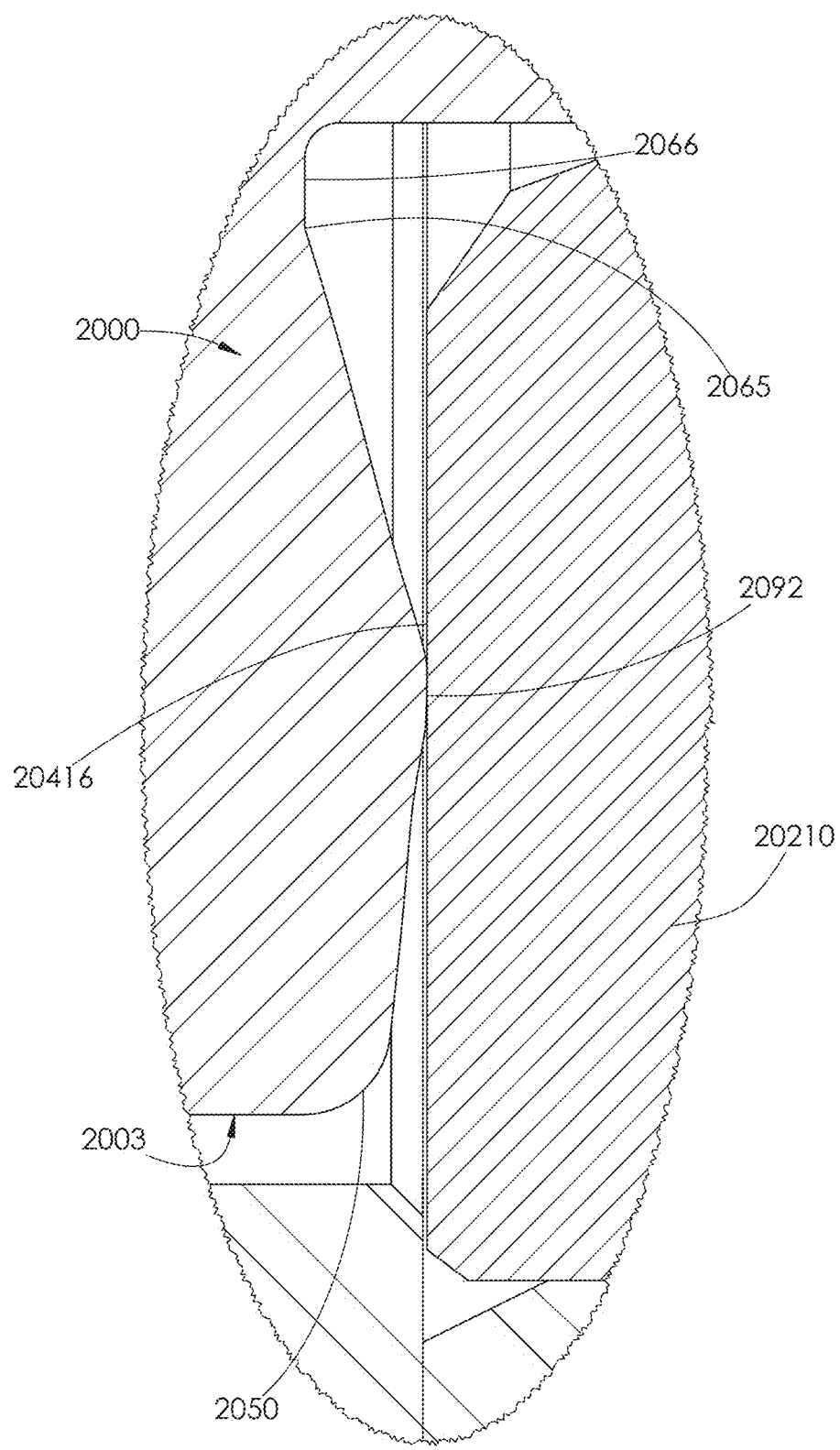

FIG. 176 is an enlarged view of area BL shown in FIG. 171. Fluid routing plug 1800 has been replaced by fluid routing plug 2000. Insert 18210 has been replaced by insert 20210. Some features have been greatly magnified to illustrate the described features.

DETAILED DESCRIPTION

Fluid End Assembly

Figure 3:
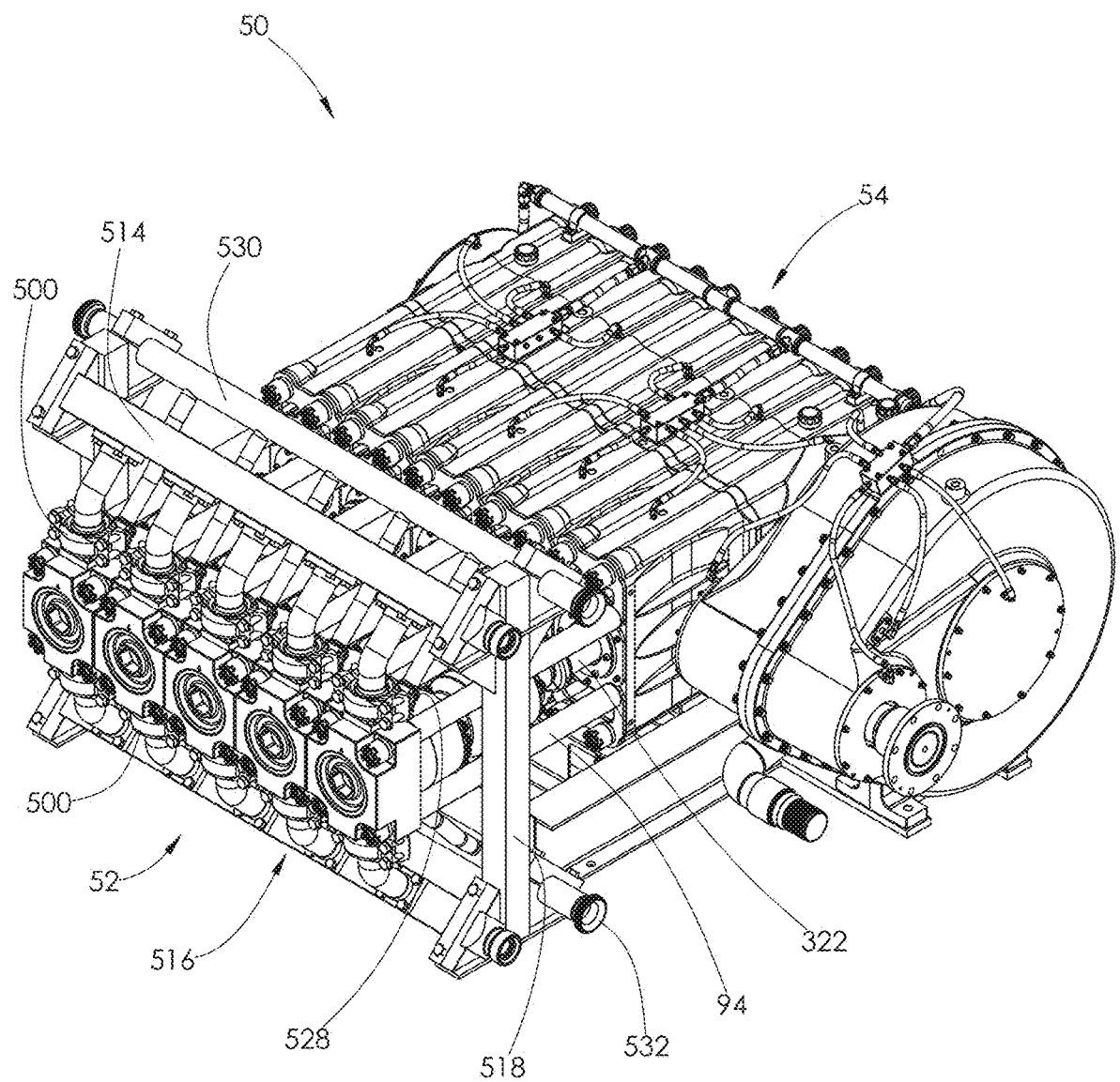
FIG. 3 is a front perspective view of one embodiment of a high pressure pump disclosed herein.
Figure 80:
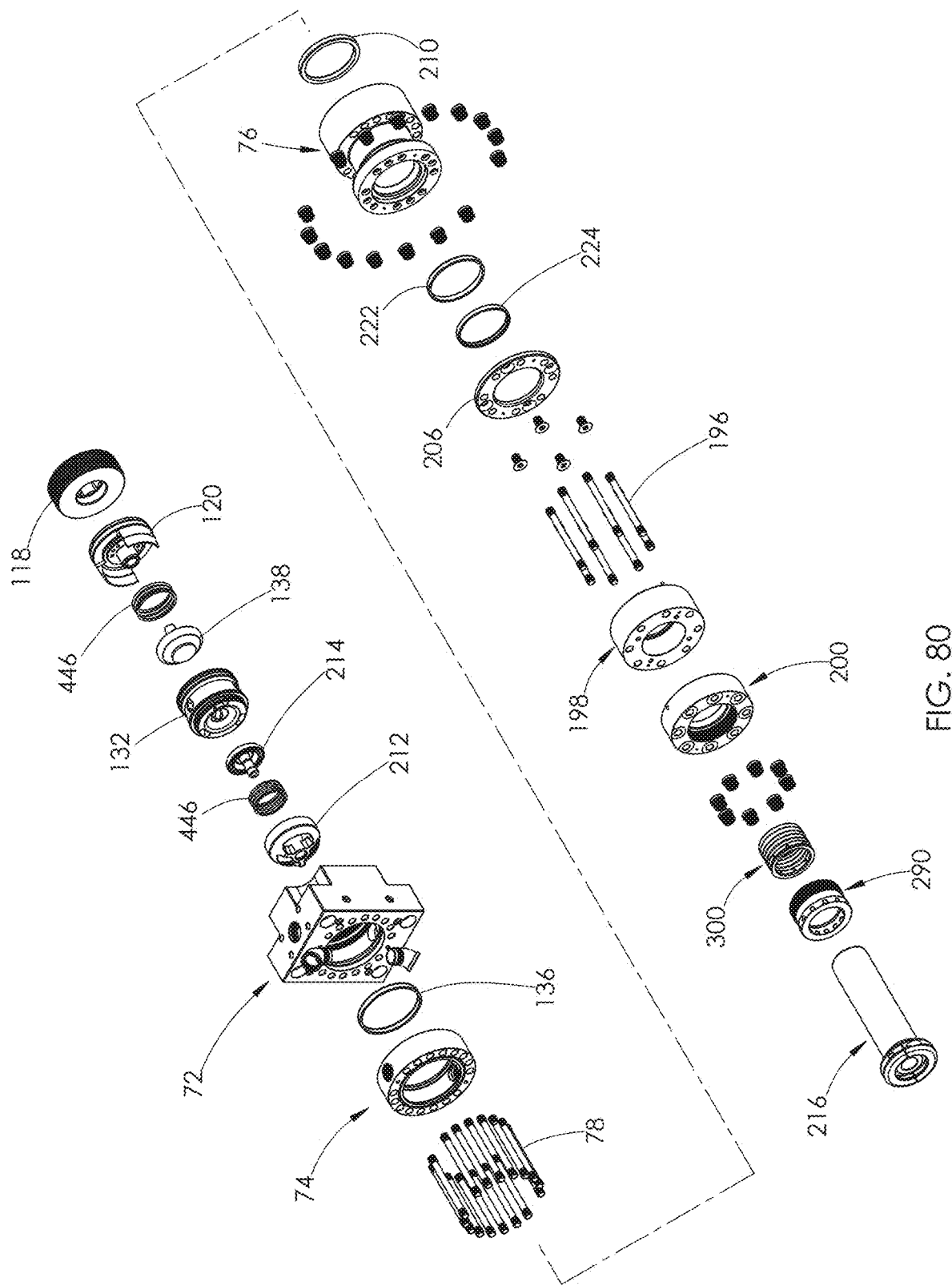
FIG. 80 is a rear perspective and exploded view of the fluid end section shown in FIGS. 9, 29, 40, and 41.

Turning now to FIGS. 3-80, a high pressure pump 50 is shown in FIG. 3. The pump 50 comprises a fluid end assembly 52 joined to a power end assembly 54. The power end assembly 54 is described in more detail in U.S. patent application Ser. No. 17/884,691, authored by Keith et al., and filed on Aug. 10, 2022, the entire contents of which are incorporated herein by reference (hereinafter "the '691 application"). In alternative embodiments, the fluid end assembly 52 may be attached to other power end designs known in the art. The fluid end assembly 52 is described herein. Fluid is routed throughout the fluid end assembly using a fluid routing plug 132. The fluid routing plug 132 and various embodiments thereof are described herein.

Fluid End Section

Figure 4:
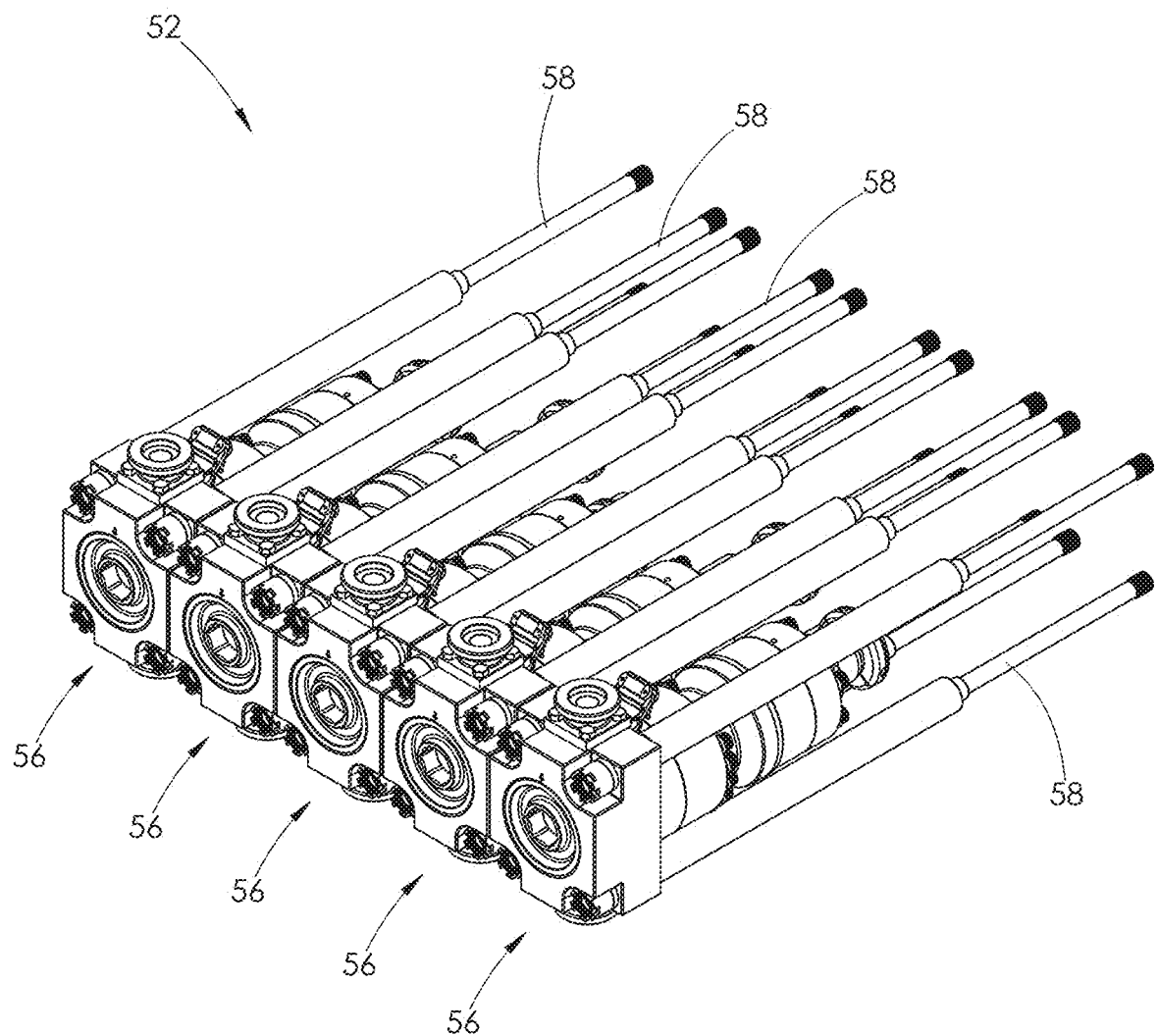
FIG. 4 is a front perspective view of the fluid end assembly shown in FIG. 3 attached to a plurality of stay rods.
Figure 5:
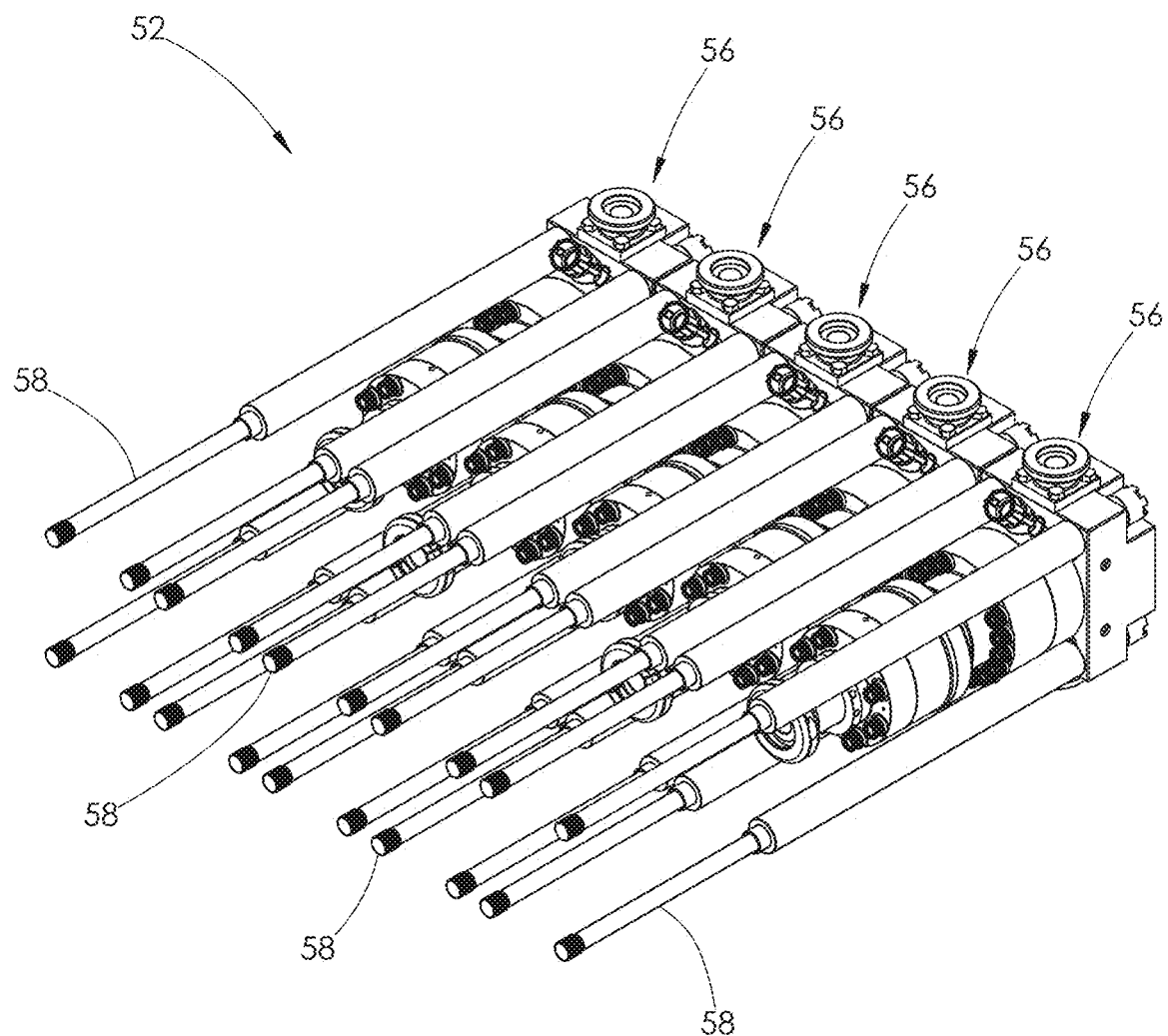
FIG. 5 is a rear perspective view of the fluid end assembly and stay rods shown in FIG. 4.
Figure 7:
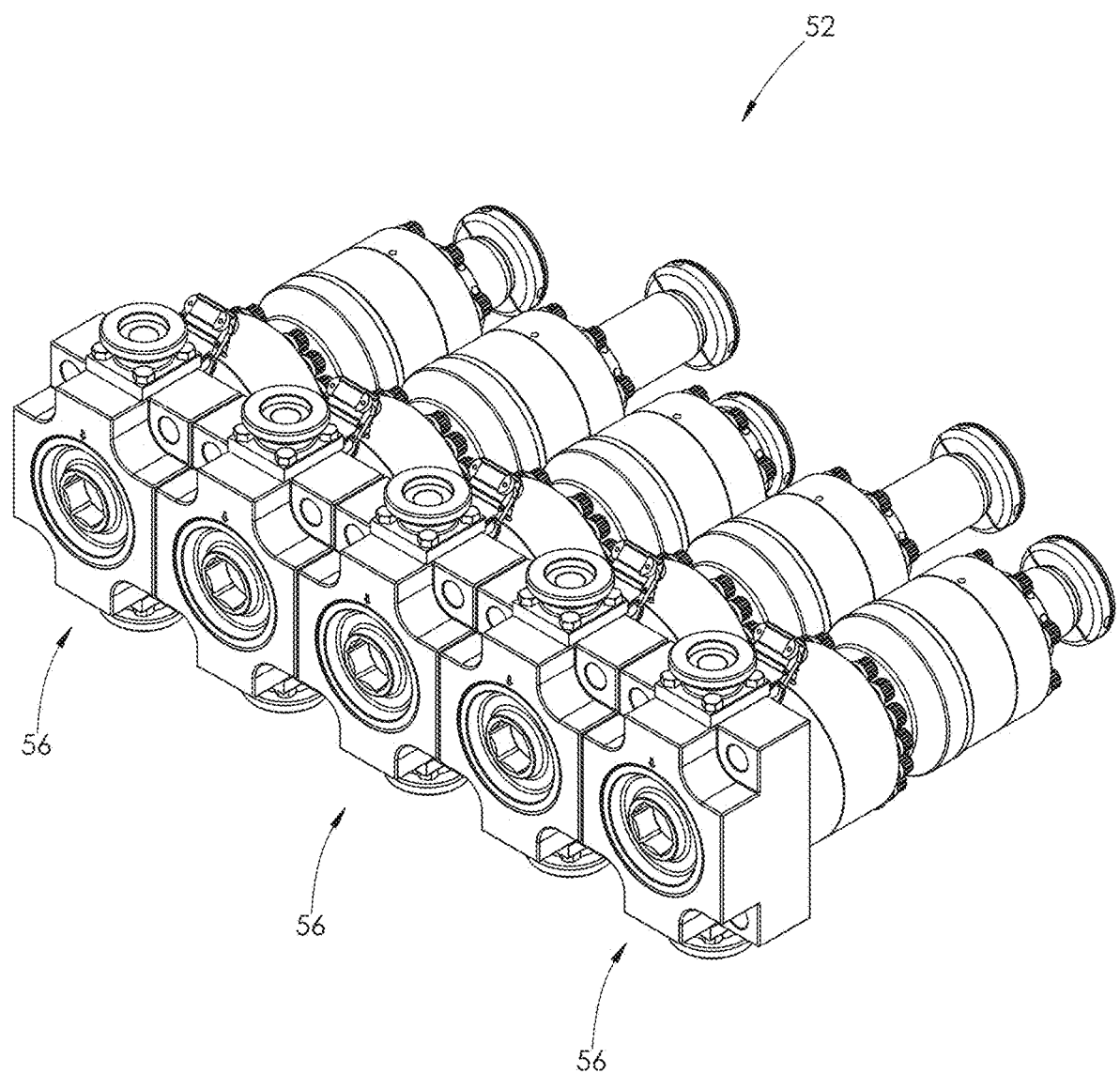
FIG. 7 is a front perspective view of the fluid end assembly shown in FIGS. 3 and 4.
Figure 8:
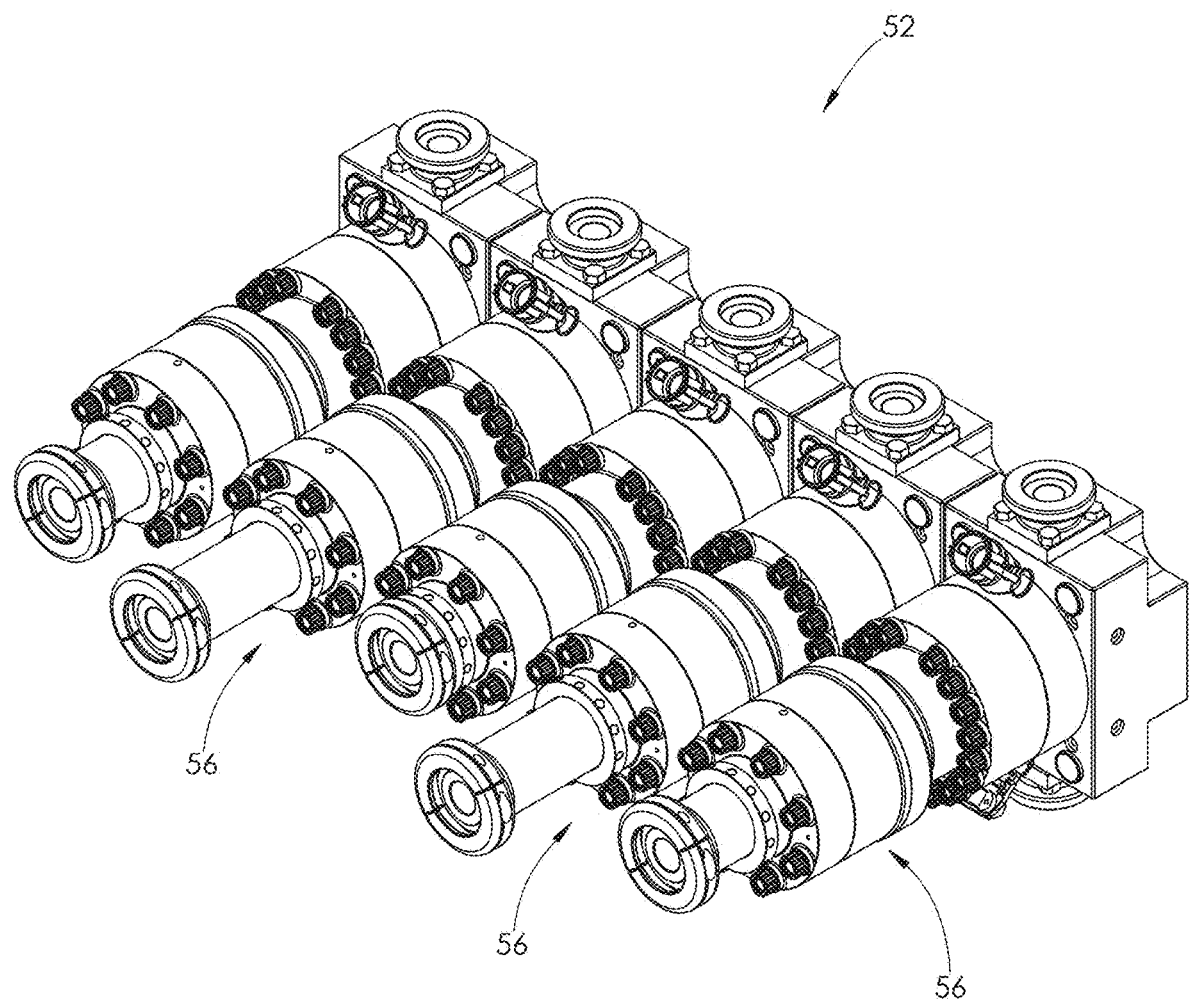
FIG. 8 is a rear perspective view of the fluid end assembly shown in FIG. 7.

Turning to FIGS. 4-8, the fluid end assembly 52 comprises a plurality of fluid end sections 56 positioned in a side-by-side relationship, as shown in FIGS. 6-8. Each fluid end section 56 is attached to the power end assembly 54 using a plurality of stay rods 58, as shown in FIGS. 4 and 5. Preferably, the fluid end assembly 52 comprises five fluid end sections 56 positioned adjacent one another. In alternative embodiments, the fluid end assembly 52 may comprise more or less than five fluid end sections 56. In operation, a single fluid end section 56 may be removed and replaced without removing the other fluid end sections 56 from the fluid end assembly 52.

Housing of Fluid End Section

Figure 9:
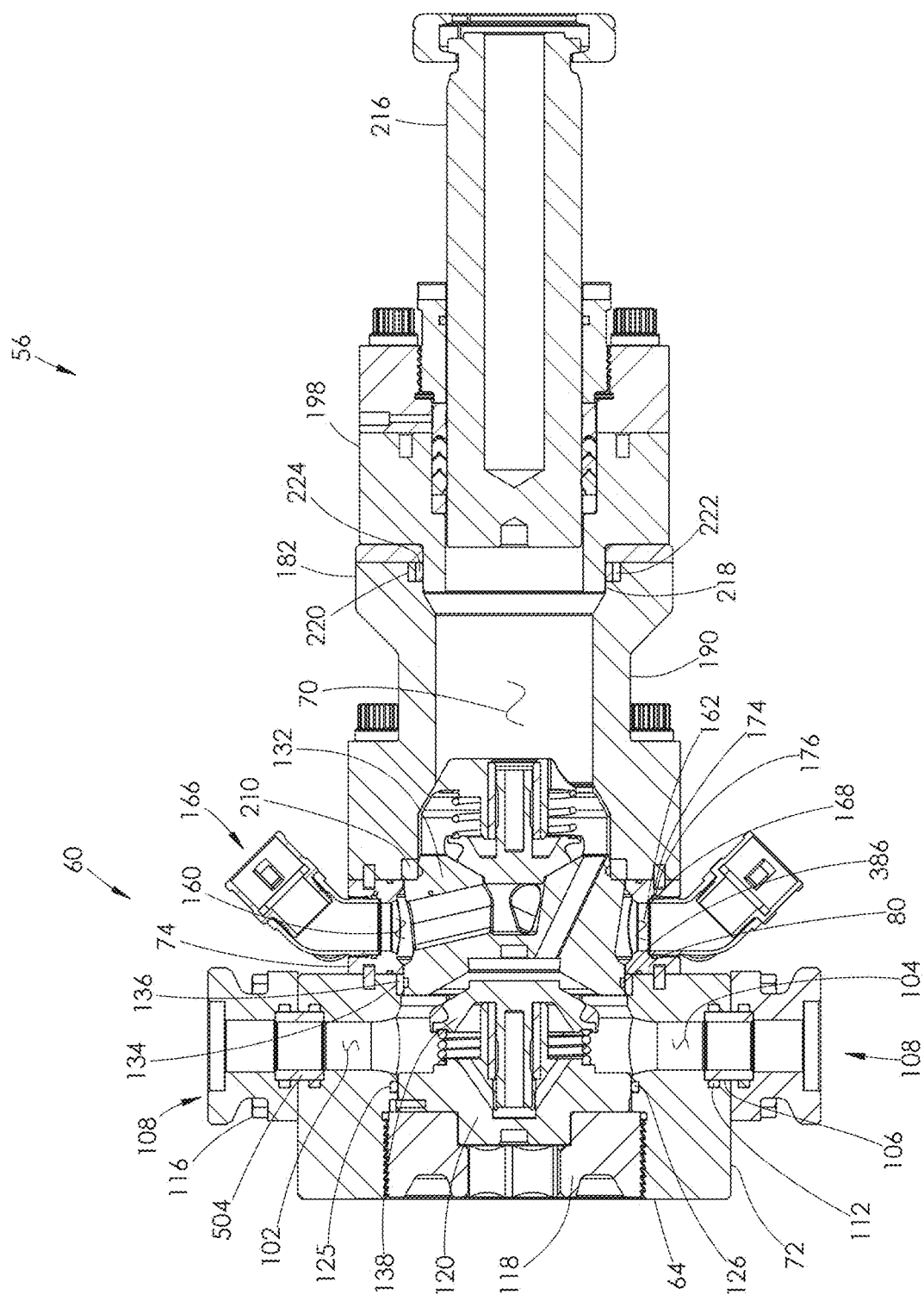
FIG. 9 is a cross-sectional view of one of the fluid end sections making up the fluid end assembly shown in FIG. 6, taken along line A-A.
Figure 10:
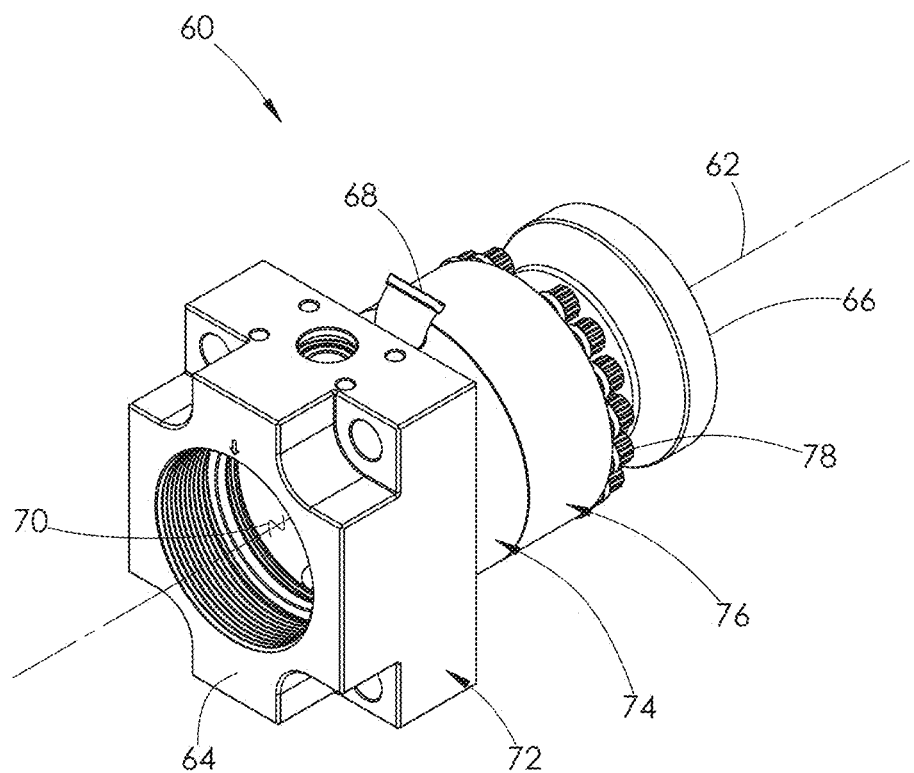
FIG. 10 is a front perspective view of one of the housings used with one of the fluid end sections shown in FIG. 7.
Figure 11:
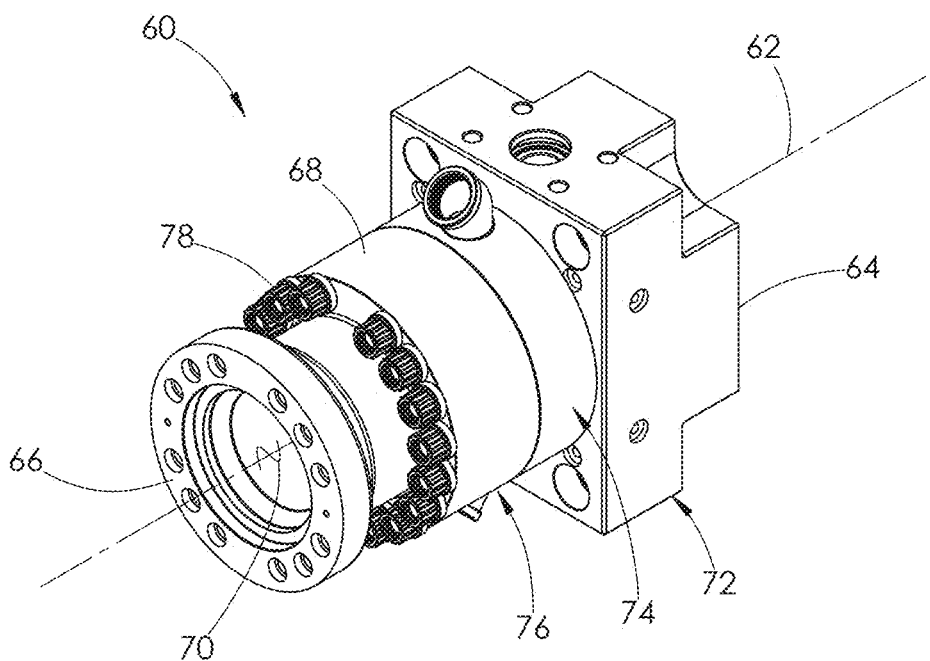
FIG. 11 is a rear perspective view of the housing shown in FIG. 10.
Figure 12:
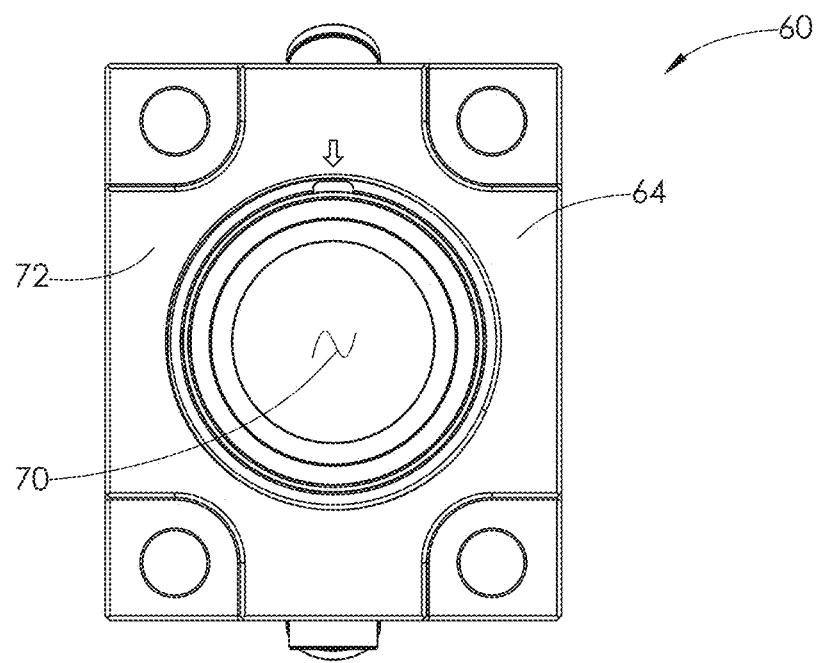
FIG. 12 is a front elevational view of the housing shown in FIG. 10.
Figure 13:
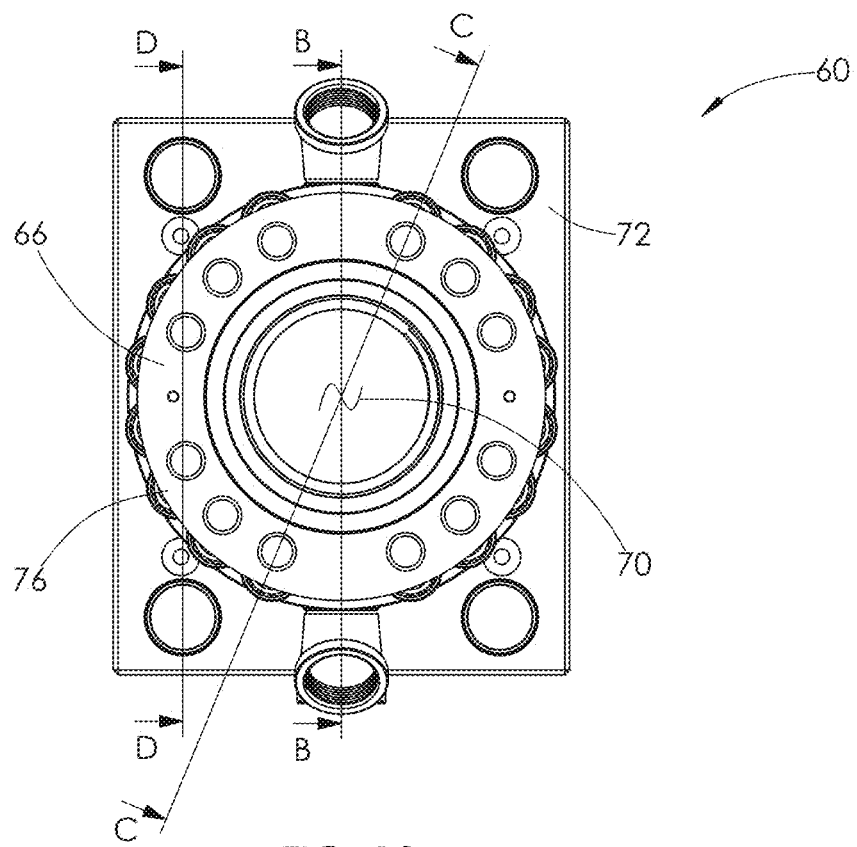
FIG. 13 is a rear elevational view of the housing shown in FIG. 10.
Figure 14:
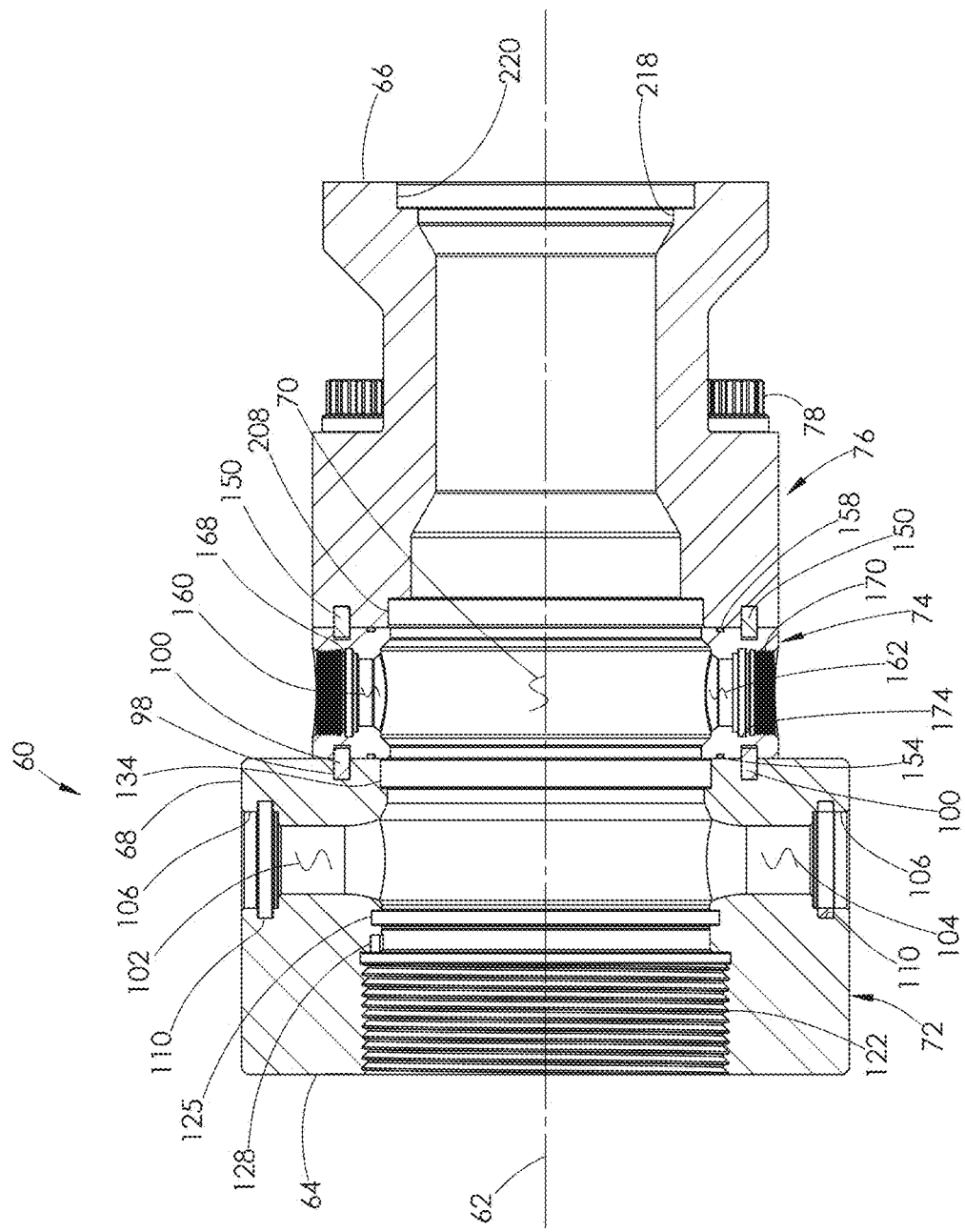
FIG. 14 is a cross-sectional view of the housing shown in FIG. 13, taken along line B-B.
Figure 15:
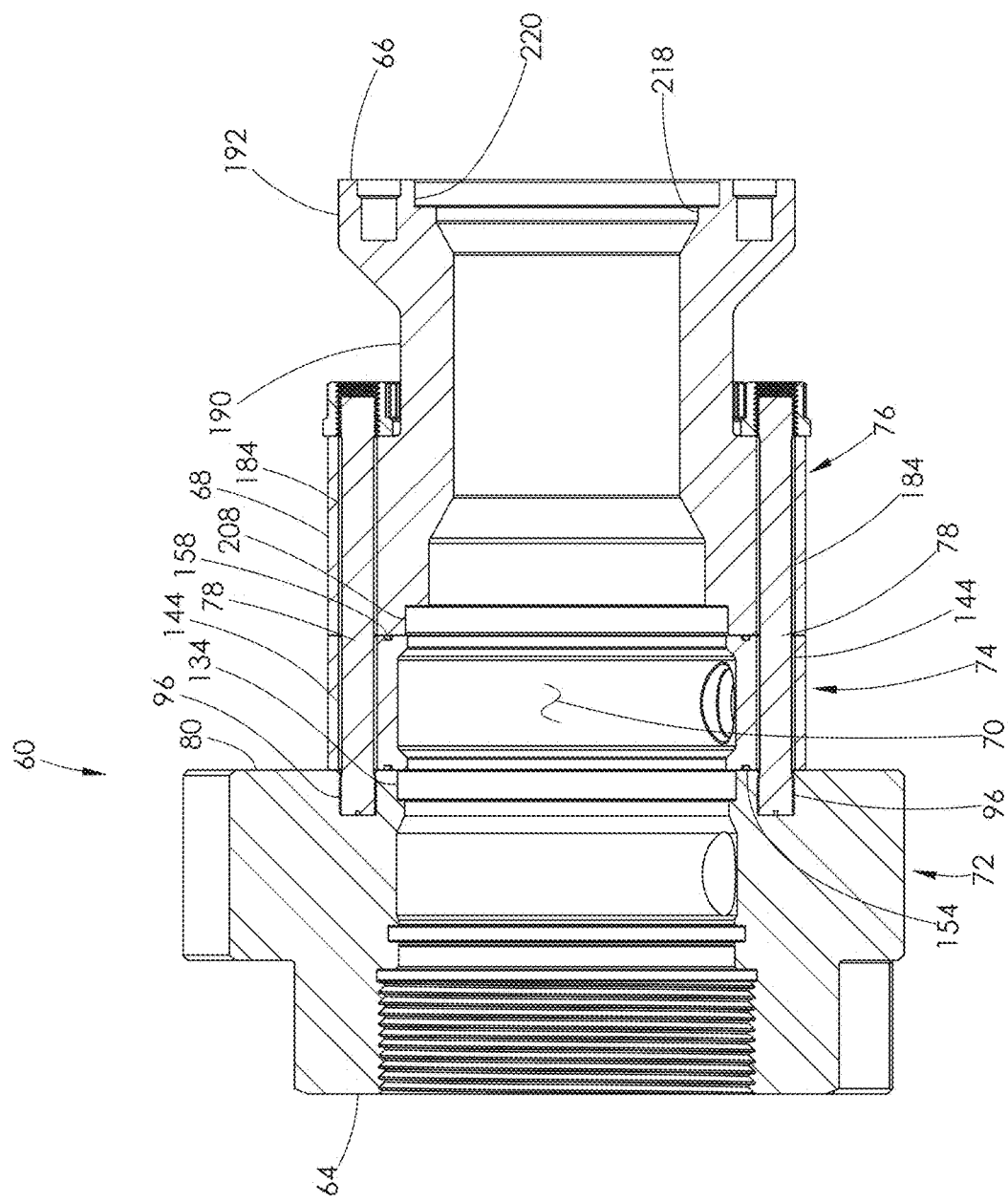
FIG. 15 is a cross-sectional view of the housing shown in FIG. 13, taken along line C-C.

Turning to FIGS. 10-16, each fluid end section 56 comprises a horizontally positioned housing 60 having a longitudinal axis 62 extending therethrough, as shown in FIGS. 10 and 11. The housing 60 has opposed front and rear surfaces 64 and 66 joined by an outer intermediate surface 68. A horizontal bore 70 is formed within the housing 60 and interconnects the front and rear surfaces 64 and 66, as shown in FIGS. 14 and 15. The horizontal bore 70 is sized to receive various components configured to route fluid throughout the housing 60, as shown in FIG. 9. The various components will be described in more detail later herein.

Figure 16:
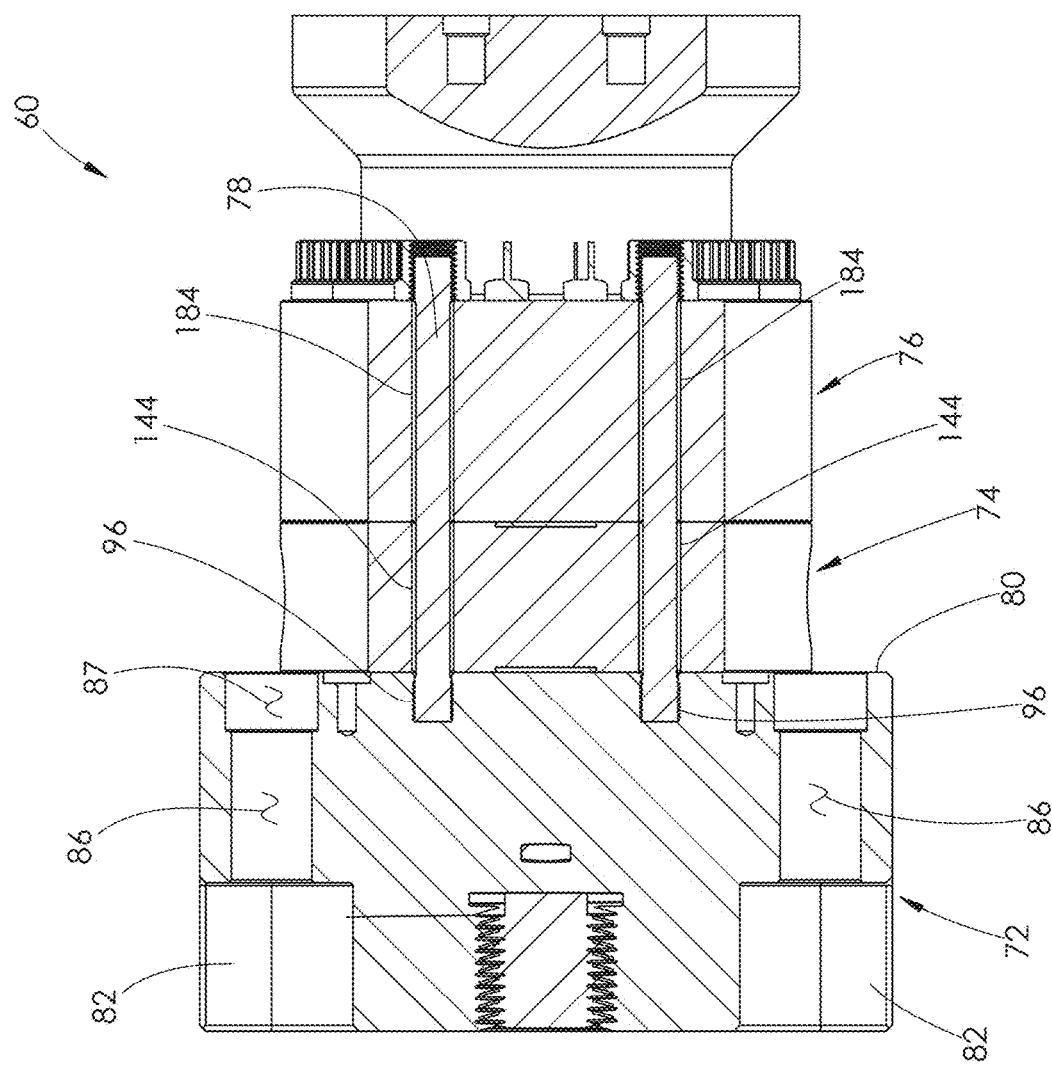
FIG. 16 is a cross-sectional view of the housing shown in FIG. 13, taken along line D-D.

Continuing with FIGS. 10-16, the housing 60 is of multi-piece construction. The housing 60 comprises a first section 72 joined to a second section 74 and a third section 76 by a plurality of first fasteners 78, as shown in FIGS. 15 and 16. By making the housing 60 out of multiple pieces rather than a single, integral piece, any one of the sections 72, 74, and 76 may be removed and replaced with a new section 72, 74, and 76, without replacing the other sections. For example, if a portion of the second section 74 begins to erode or crack, the second section 74 can be replaced without having to replace the first or third sections 72 and 76. In contrast, if the housing 60 were one single piece, the entire housing would need to be replaced, resulting in much more costly repair to the fluid end assembly 52.

First Section of Housing

Figure 17:
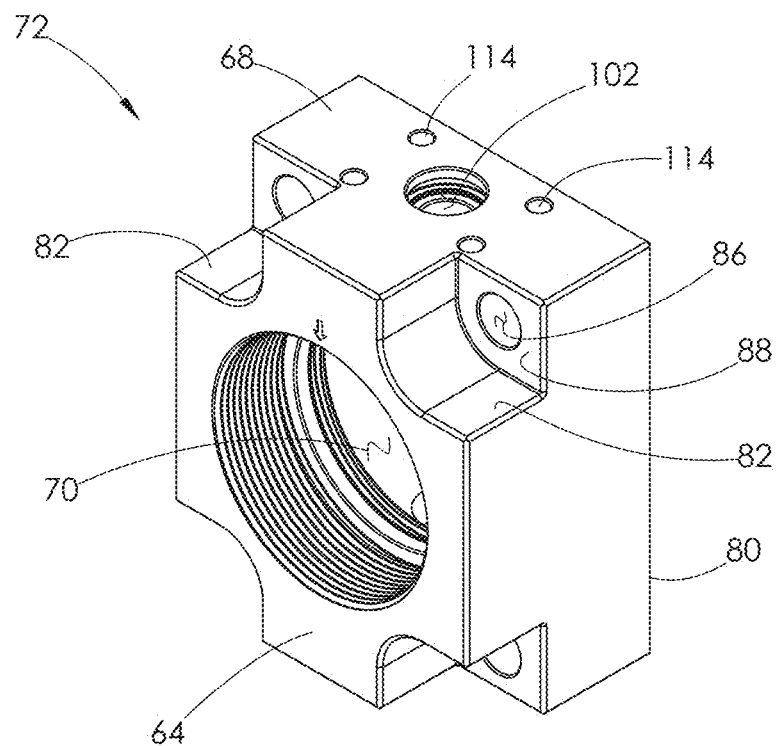
FIG. 17 is a front perspective view of the first section of the housing shown in FIG. 10.
Figure 18:
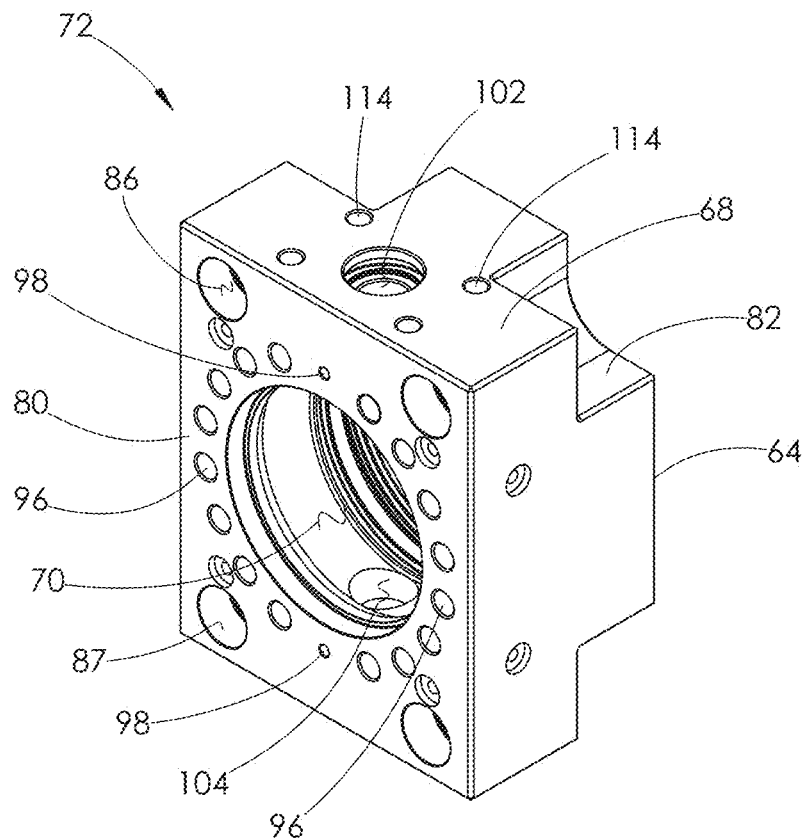
FIG. 18 is a rear perspective view of the first section shown in FIG. 17.
Figure 19:
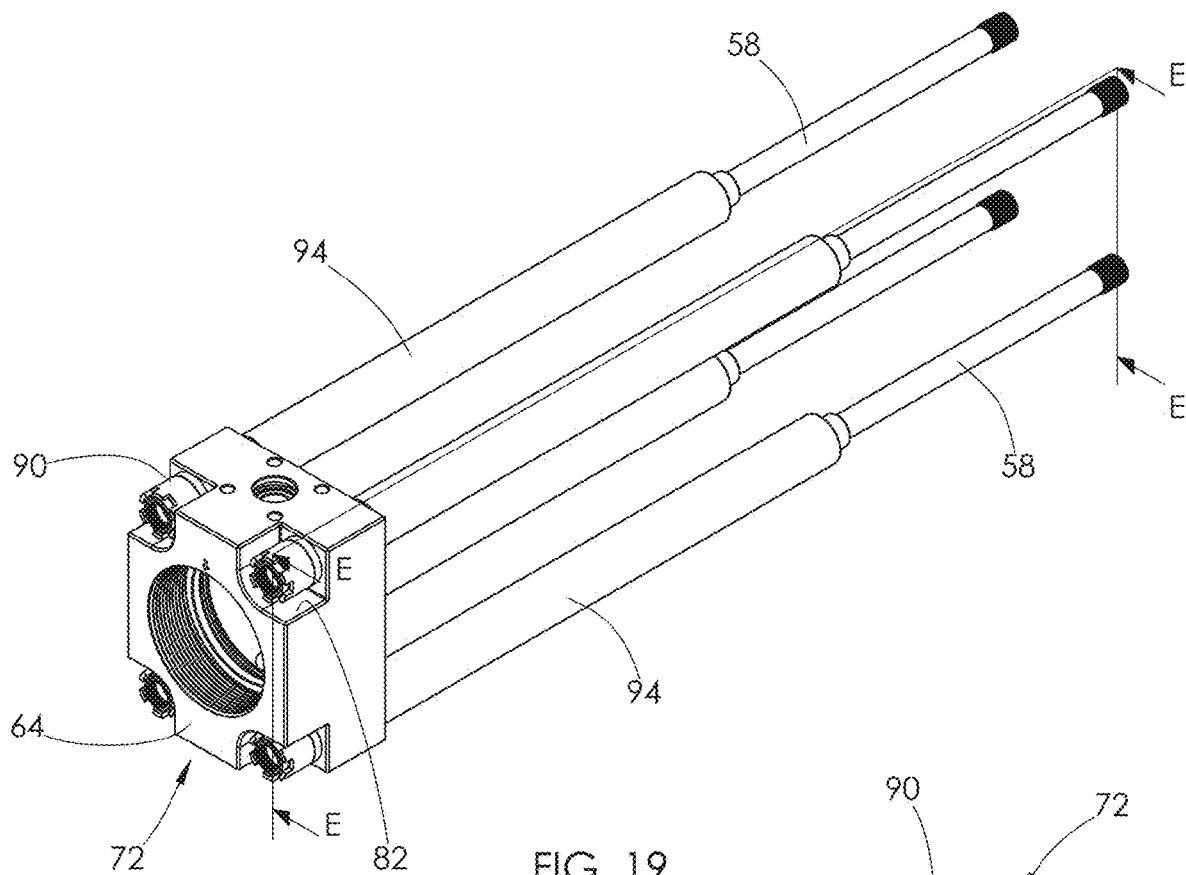
FIG. 19 is a front perspective view of the first section shown in FIG. 17, but the first section has a plurality of stay rods attached thereto.
Figure 20:
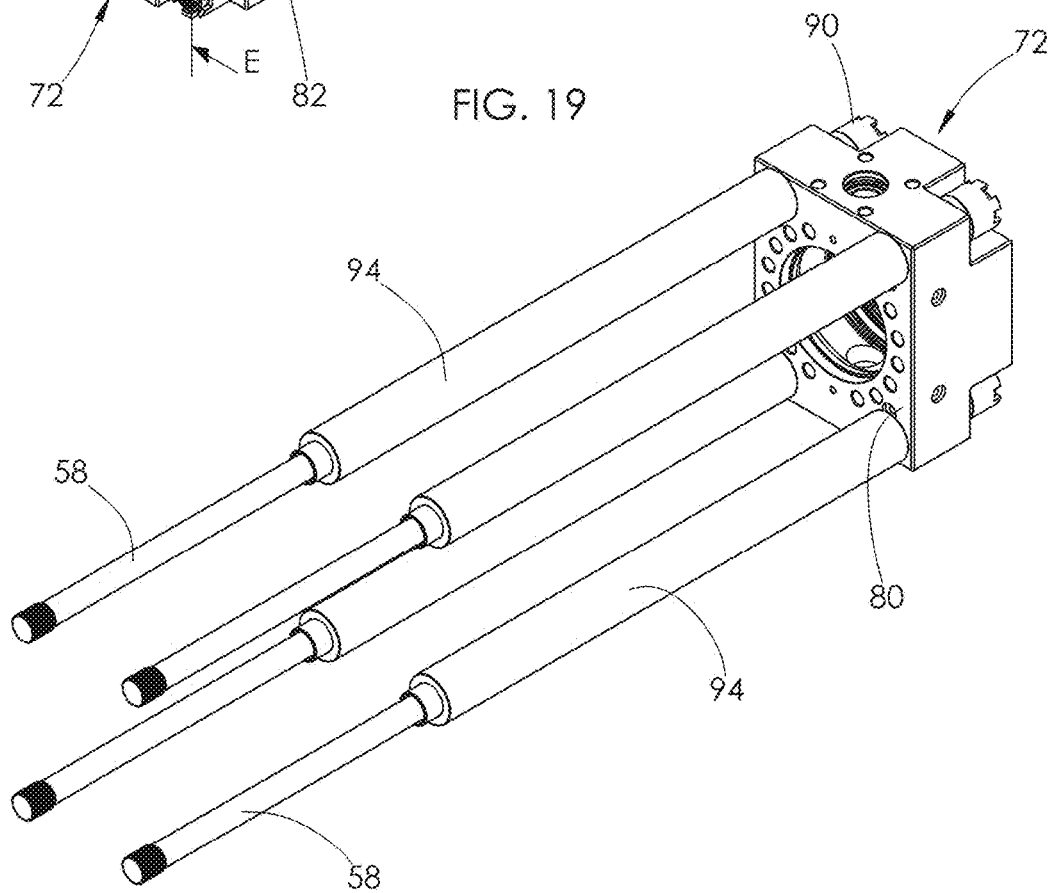
FIG. 20 is a rear perspective view of the first section and stay rods shown in FIG. 19.
Figure 21:
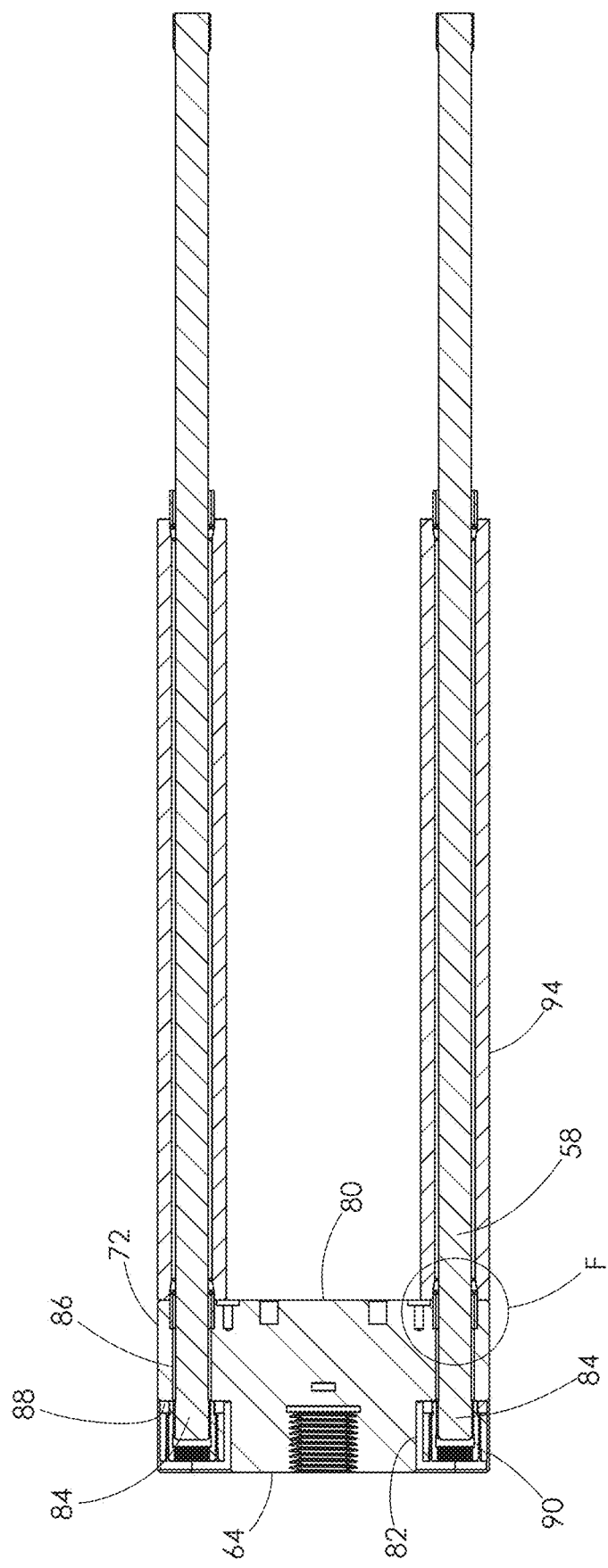
FIG. 21 is a cross-sectional view of the first section and stay rods shown in FIG. 19, taken along line E-E.

Turning to FIGS. 17-21, the first section 72 is positioned at the front end of the housing 60 and includes the front surface 64. During operation, fluid within the first section 72 remains at relatively the same high pressure. Thus, the first section 72 is considered the static or constant high pressure section of the housing 60. The first section 72 is configured to be attached to a plurality of the stay rods 58, as shown in FIGS. 19-21. Thus, each fluid end section 56 is attached to the power end assembly 54 via the first section 72 of the housing 60.

Continuing with FIGS. 17 and 18, each first section 72 comprises the front surface 64 joined to a rear surface 80. The surfaces 64 and 80 are interconnected by a portion of the outer intermediate surface 68 and a portion of the horizontal bore 70. The outer intermediate surface 68 of the first section has the shape of a rectangular prism with a plurality of notches 82 formed within the front surface 64. A notch 82 is formed within each corner of the first section 72 such that the front surface 64 has a cross-sectional shape of a cross sign having radiused corners. The notches 82 are configured to receive a first end 84 of each stay rod 58, as shown in FIG. 21.

With reference to FIGS. 17-21, a plurality of passages 86 are formed in the first section 72. Each passage 86 interconnects the rear surface 80 and a medial surface 88 of the first section 72. The medial surface 88 is defined by the plurality of notches 82. Each passage 86 comprises a counterbore 87 that opens on the rear surface 80, as shown in FIG. 16, and is configured to receive a corresponding one of the stay rods 58. When installed within the first section 72, the first end 84 of each stay rod 58 projects from the medial surface 88 and into the corresponding notch 82, as shown in FIG. 21.

Continuing with FIGS. 19-21, a threaded nut 90 is installed on the first end 84 of each stay rod 58 within each notch 82. The nut 90 is a three-piece nut, also known as a torque nut, that facilitates the application of high torque required to properly fasten the fluid end section 56 to the power end assembly 54. The nut 90 is described in more detail in the '691 application. In alternative embodiments, a traditional 12-point flange nut similar to the flange nut 230, shown in FIGS. 27 and 28, may be installed on the first end 84 of each stay rod 58 instead of the nut 90.

Figure 22:
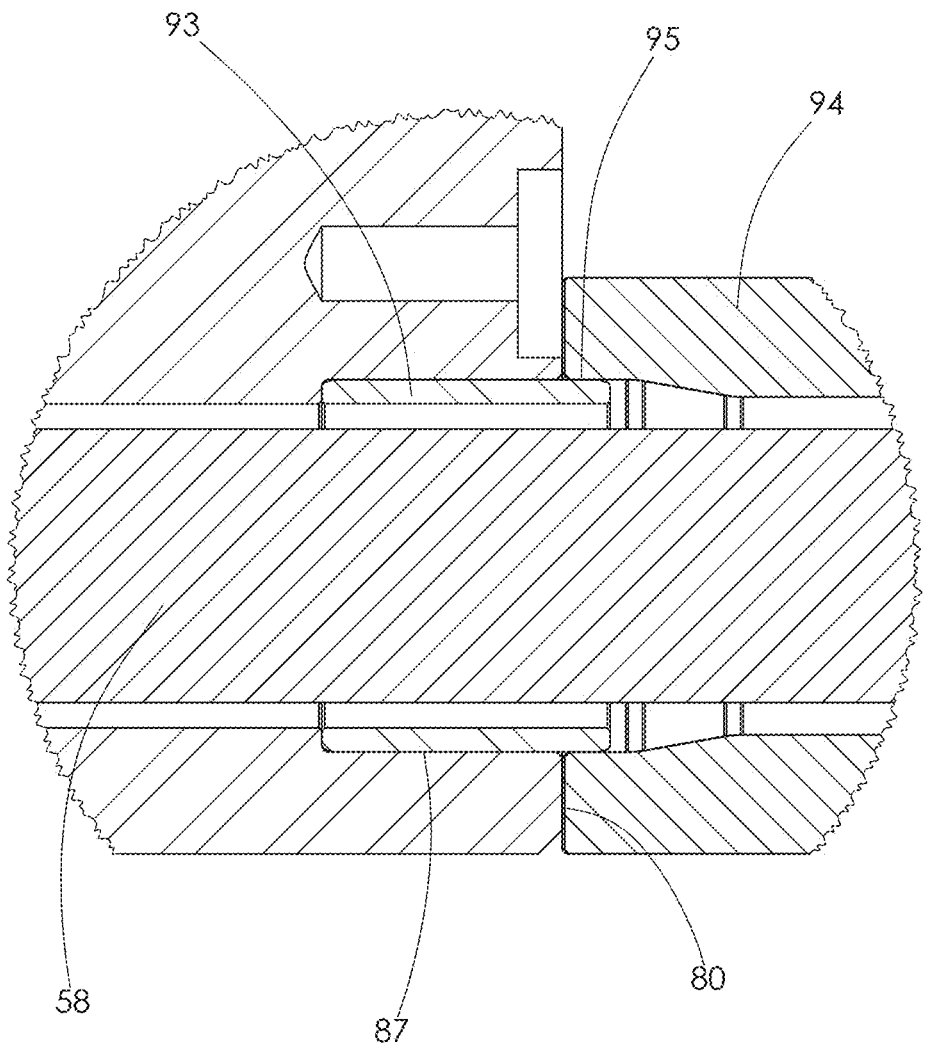
FIG. 22 is an enlarged view of area F shown in FIG. 21.

Continuing with FIGS. 19-22, a sleeve 94 is disposed around a portion of each stay rod 58 and extends between the rear surface 80 of the first section 72 and the power end assembly 54, as shown in FIG. 3. A dowel sleeve 93 is inserted into each counterbore 87 formed in each passage 86, as shown in FIG. 22. When installed therein, a portion of the dowel sleeve 93 projects from the rear surface 80 of the first section 72. A counterbore 95 is formed within the hollow interior of the sleeve 94 for receiving the projecting end of the dowel sleeve 93, as shown in FIG. 22. The dowel sleeve 93 aligns the sleeve 94 and the passage 86 concentrically. Such alignment maintains a planar engagement between the rear surface 80 of the first section 72 and the sleeve 94. When the nut 90 is torqued against the medial surface 88 of the first section 72, the sleeve 94 abuts the rear surface 80 of the first section 72, rigidly securing the first section 72 to the stay rod 58.

Turning back to FIGS. 14-16, and 18, a plurality of threaded openings 96 are formed in the rear surface 80 of the first section 72. The openings 96 surround an opening of the horizontal bore 70, as shown in FIG. 18. Each opening 96 is configured to receive a corresponding one of the first fasteners 78 used to secure the sections 72, 74, and 76 together, as shown in FIGS. 15 and 16. A plurality of dowel openings 98 are also formed in the rear surface 80 adjacent the openings 96, as shown in FIGS. 14 and 18. The dowel openings 98 are configured to receive first alignment dowels 100, as shown in FIG. 14. The first alignment dowels 100 assist in properly aligning the first section 72 and the second section 74 during assembly of the housing 60.

Continuing with FIG. 14, a pair of upper and lower discharge bores 102 and 104 are formed within the first section 72 and interconnect the intermediate surface 68 and the horizontal bore 70. The upper and lower discharge bores 102 and 104 shown in FIG. 14 are collinear. In alternative embodiments, the bores 102 and 104 may be offset from one another and not collinear. Each bore 102 and 104 may include a counterbore 106 that opens on the intermediate surface 68. Each counterbore 106 is sized to receive a portion of a discharge fitting adapter 504, as shown in FIG. 9. The fitting adapter 504 spans between the discharge bore 102 or 104 and a discharge fitting 108 attached to the outer intermediate surface 68 of the first section 72.

Continuing with FIG. 14, a groove 110 may be formed in the side walls of the counterbore 106 for receiving a seal 112. The seal 112 engages an outer surface of the fitting adapter 504 to prevent fluid from leaking between the first section 72 and the discharge fitting 108, as shown in FIG. 9.

With reference to FIGS. 17 and 18, a plurality of threaded openings 114 are formed in the intermediate surface 68 and surrounding the opening of the upper and lower discharge bores 102 and 104. The threaded openings 114 are configured to receive a plurality of threaded fasteners 116 configured to secure a discharge fitting 108 to the first section 72, as shown in FIG. 9.

Continuing with FIGS. 14 and 15, the walls surrounding the horizontal bore 70 within the first section 72 and positioned between the front surface 64 and the upper and lower discharge bores 102 and 104 are sized to receive a front retainer 118 and a discharge plug 120, as shown in FIG. 9. The discharge plug 120 seals fluid from leaking from the front surface 64 of the housing 60, and the front retainer 118 secures the discharge plug 120 within the first section 72 of the housing 60.

Figure 76:
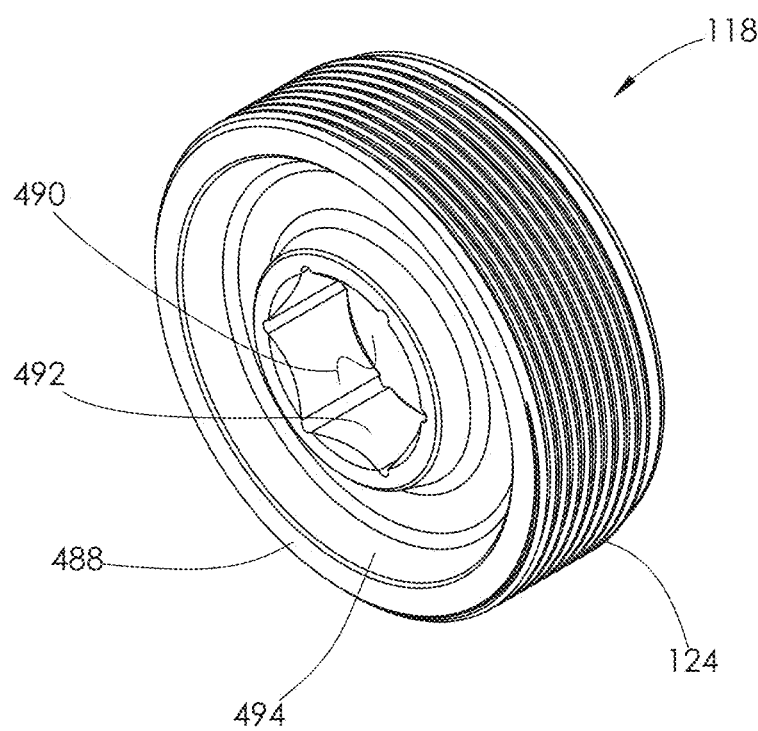
FIG. 76 is a front perspective view of the front retainer shown in FIGS. 40 and 41.
Figure 77:
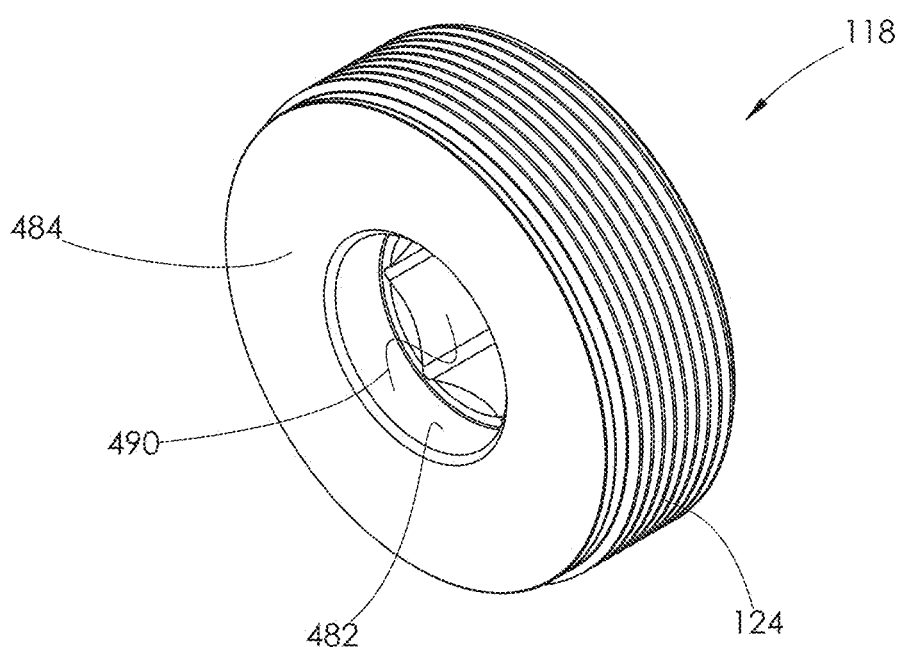
FIG. 77 is a rear perspective view of the front retainer shown in FIG. 76.

Continuing with FIGS. 14 and 15, internal threads 122 are formed in the walls of the first section 72 for mating with external threads 124, shown in FIGS. 76 and 77, formed on an outer surface of the front retainer 118. In contrast, an outer surface of the discharge plug 120 faces flat walls of the first section 72. A small amount of clearance may exist between the plug 120 and the walls of the first section 72.

Continuing with FIGS. 14 and 15, a groove 125 may be formed in such walls for receiving a seal 126 configured to engage an outer surface of the discharge plug 120, as shown in FIG. 9. The seal 126 prevents fluid from leaking around the discharge plug 120 during operation. A locating cutout 128 may further be formed in the walls that is configured to receive a locating dowel pin 130. As will be described later herein, the locating dowel pin 130 is used to properly align the discharge plug 120 within the housing 60.

Continuing with FIGS. 14 and 15, the walls surrounding the horizontal bore 70 and positioned between the upper and lower discharge bores 102 and 104 and the rear surface 80 of the first section 72 are sized to receive a portion of a fluid routing plug 132, as shown in FIG. 9. This area of the walls surrounding the horizontal bore 70 includes a counterbore 134 that opens on the rear surface 80. The counterbore 134 is sized to receive a wear ring 136, as shown in FIG. 9. The wear ring 136 has an annular shape and is configured to engage a first seal 386 installed within an outer surface of the fluid routing plug 132, as shown in FIG. 9. In alternative embodiments, the first section 72 may not include the counterbore 134 or the wear ring 136 and instead may be sized to directly engage the first seal 386 installed within the fluid routing plug 132.

Continuing with FIG. 9, in addition to the above mentioned components, the first section 72 is also configured to house a discharge valve 138. The components discussed above and installed within the first section 72 will be described in more detail later herein.

Second Section of Housing

Figure 23:
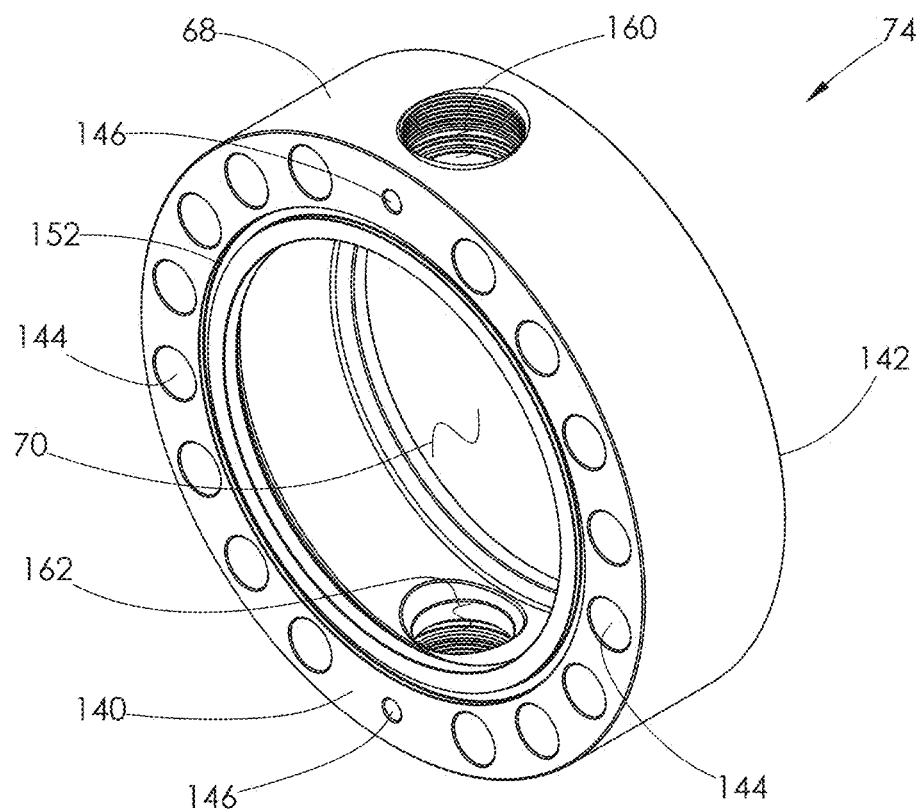
FIG. 23 is a front perspective view of a second section of the housing shown in FIG. 10.
Figure 24:
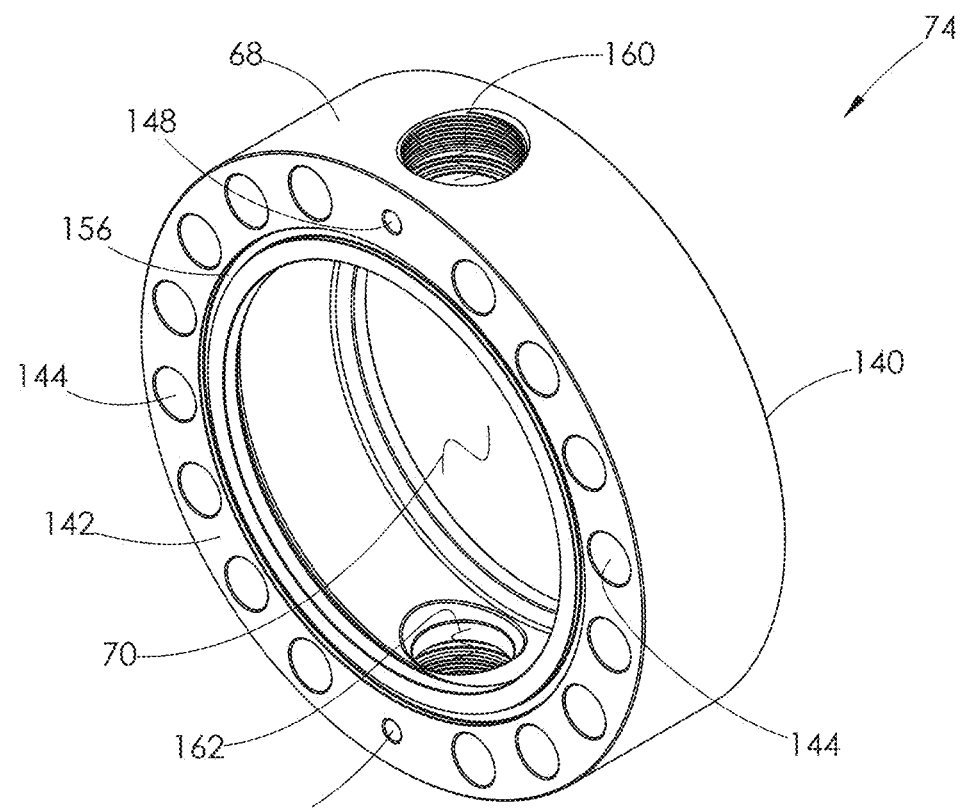
FIG. 24 is a rear perspective view of the second section shown in FIG. 23.

Turning to FIGS. 23 and 24, the second section 74 of the housing 60 is configured to be positioned between the first and third sections 72 and 76 and has a cylindrical cross-sectional shape. During operation, fluid pressure within the second section 74 remains at relatively the same pressure. The pressure is lower than that within the first section 72. Thus, the second section 74 may be referred to as the static or constant low pressure section of the housing 60. The second section 74 comprises opposed front and rear surfaces 140 and 142 joined by a portion of the outer intermediate surface 68 and a portion of the horizontal bore 70.

Continuing with FIGS. 15, 16, 23, and 24, a plurality of passages 144 are formed in the second section 74. The passages 144 surround the horizontal bore 70 and interconnect the front and rear surfaces 140 and 142, as shown in FIGS. 15 and 16. Each passage 144 is configured to receive a corresponding one of the first fasteners 78 used to secure the sections 72, 74, and 76 of the housing 60 together.

Continuing with FIGS. 14, 23, and 24, a plurality of dowel openings 146 are formed in the front surface 140 of the second section 74, as shown in FIG. 23. The dowel openings 146 align with the dowel openings 98 formed in the rear surface 80 of the first section 72 and are configured to receive a portion of the first alignment dowels 100, as shown in FIG. 14. Likewise, a plurality of dowel openings 148 are formed in the rear surface 142 of the second section 74, as shown in FIG. 24. The dowel openings 148 are configured to receive a portion of second alignment dowels 150, as shown in FIG. 14. The second alignment dowels 150 are configured to align the second section 74 and the third section 76 during assembly.

Continuing with FIGS. 14, 15, 23 and 24, a first annular groove 152 is formed in the front surface 140 of the second section 74 such that it surrounds an opening of the horizontal bore 70, as shown in FIG. 23. The first groove 152 is positioned between the horizontal bore 70 and the plurality of passages 144 and is configured to receive a first seal 154, as shown in FIGS. 14 and 15. Likewise, a second annular groove 156 is formed in the rear surface 142 of the second section 74 and positioned between the horizontal bore 70 and the plurality of passages 144, as shown in FIG. 24. The second groove 156 is configured to receive a second seal 158, as shown in FIGS. 14 and 15. The seals 154 and 158 shown in FIGS. 14 and 15 are O-rings. The seals 154 and 158 prevent fluid from leaking between the first and second sections 72 and 74 and between the second and third sections 74 and 76 during operation.

Continuing with FIGS. 14, 23, and 24, a pair of upper and lower suction bores 160 and 162 are formed within the second section 74 and interconnect the intermediate surface 68 and the horizontal bore 70. The upper and lower suction bores 160 and 162 shown in FIG. 14 are collinear. In alternative embodiments, the bores 160 and 162 may be offset from one another and not collinear.

Continuing with FIGS. 9 and 14, the suction bores 160 and 162 are each configured to receive a suction conduit 166, as shown in FIG. 9. The suction conduit 166 comprises a first connection member 164 configured to mate with the housing 60. Each suction bore 160 and 162 opens into a counterbore 168 sized to receive a portion of the first connection member 164. Internal threads 170 are formed in a portion of the walls surrounding the counterbore 168 for mating with external threads 172, shown in FIG. 78, formed on the first connection member 164.

Continuing with FIGS. 9 and 14, a groove 174 is formed in the walls surrounding the counterbore 168 and configured to receive a seal 176, as shown in FIG. 9. The seal 176 engages an outer surface of the first connection member 164 to prevent fluid from leaking from the housing 60 during operation. The suction conduits 166 will be described in more detail later herein.

Continuing with FIGS. 9, 14, and 15, the walls surrounding the horizontal bore 70 within the second section 74 are configured to receive a majority of the fluid routing plug 132, as shown in FIG. 9. A small amount of clearance may exist between the walls of the second section 74 and an outer surface of the fluid routing plug 132.

Third Section of Housing

Turning to FIGS. 14-16, 25 and 26, the third section 76 of the housing 60 is positioned at the rear end of the housing 60 and includes the rear surface 66. The third section 76 has a generally cylindrical cross-sectional shape. Fluid pressure within the third section 76 varies during operation. Thus, the third section 76 may be referred to as the dynamic or variable pressure section of the housing 60.

Figure 25:
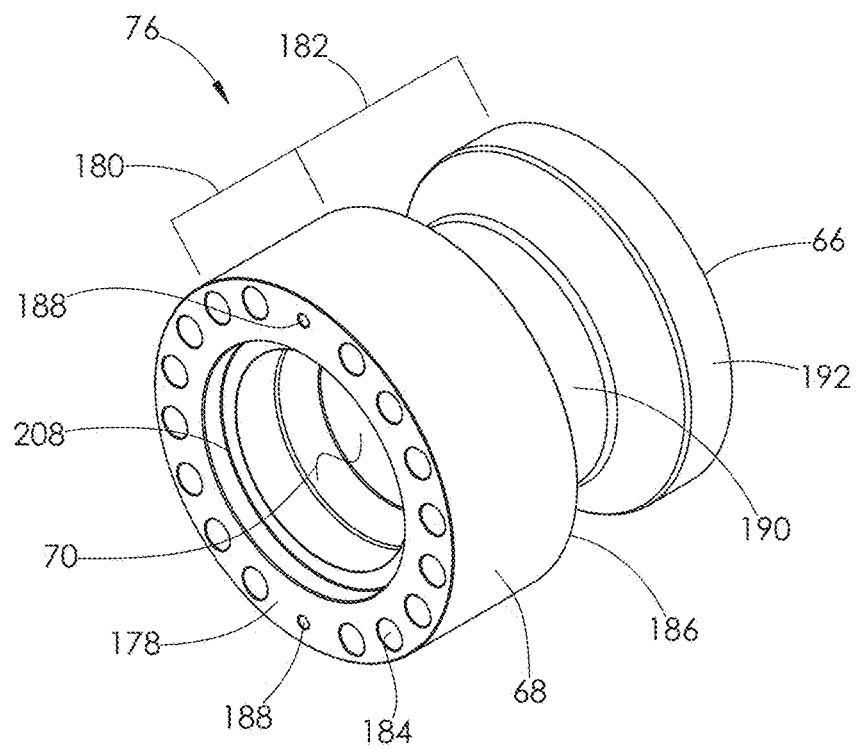
FIG. 25 is a front perspective view of the third section of the housing shown in FIG. 10.
Figure 26:
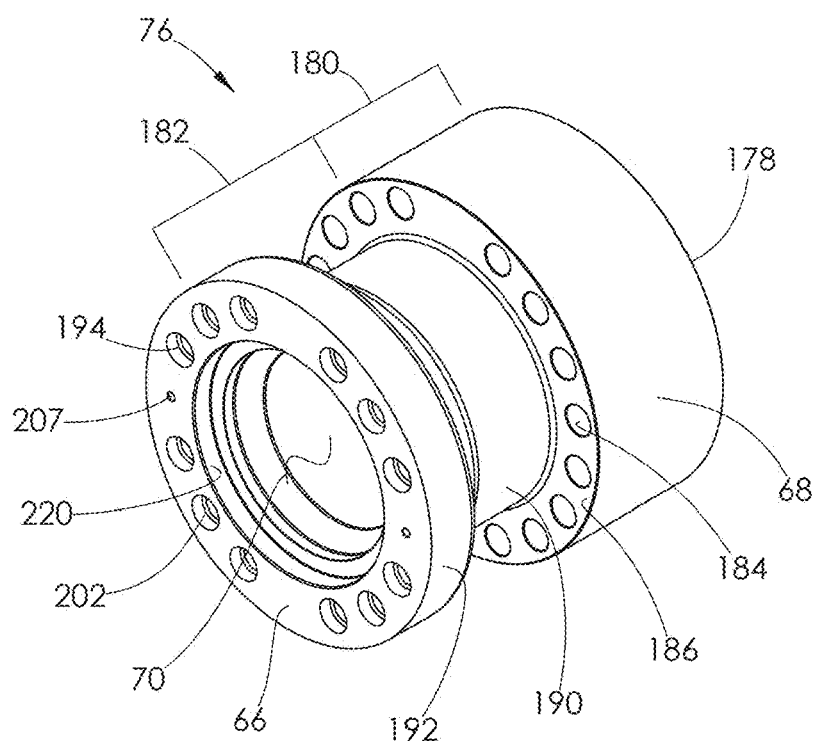
FIG. 26 is a rear perspective view of the third section shown in FIG. 25.

Continuing with FIGS. 25 and 26, the third section 76 comprises a front surface 178 joined to the rear surface 66 of the housing 60 by a portion of the outer intermediate surface 68 and a portion of the horizontal bore 70. The outer intermediate surface 68 of the third section 76 varies in diameter such that the third section 76 comprises a front portion 180 joined to a rear portion 182.

Continuing with FIGS. 15, 16, 25, and 26, the front portion 180 has a constant outer diameter and has a plurality of passages 184 formed therein. The passages 184 interconnect the front surface 178 and a medial surface 186 of the third section 76. The passages 184 align with the plurality of passages 144 formed in the second section 74 and the threaded openings 96 formed in the first section 72 of the housing 60, as shown in FIGS. 14 and 15. The passages 184 are configured to receive the first fasteners 78 used to secure the sections 72, 74, and 76 together.

Continuing with FIGS. 14 and 25, a plurality of dowel openings 188 are formed in the front surface 178 of the third section 76, as shown in FIG. 25. The dowel openings 188 are configured to receive a portion of second alignment dowels 150, as shown in FIG. 14. The second alignment dowels 150 are configured to properly align the third section 76 with the second section 74 during assembly.

Continuing with FIGS. 25 and 26, the rear portion 182 of the third section 76 comprises a neck 190 joined to a shoulder 192. The neck 190 interconnects the front portion 180 and the shoulder 192. The shoulder 192 includes the rear surface 66 of the housing 60. The neck 190 has a smaller outer diameter than that of the front portion 180 and the shoulder 192 to provide clearance for the plurality of passages 184 formed in the front portion 180.

Figure 29:
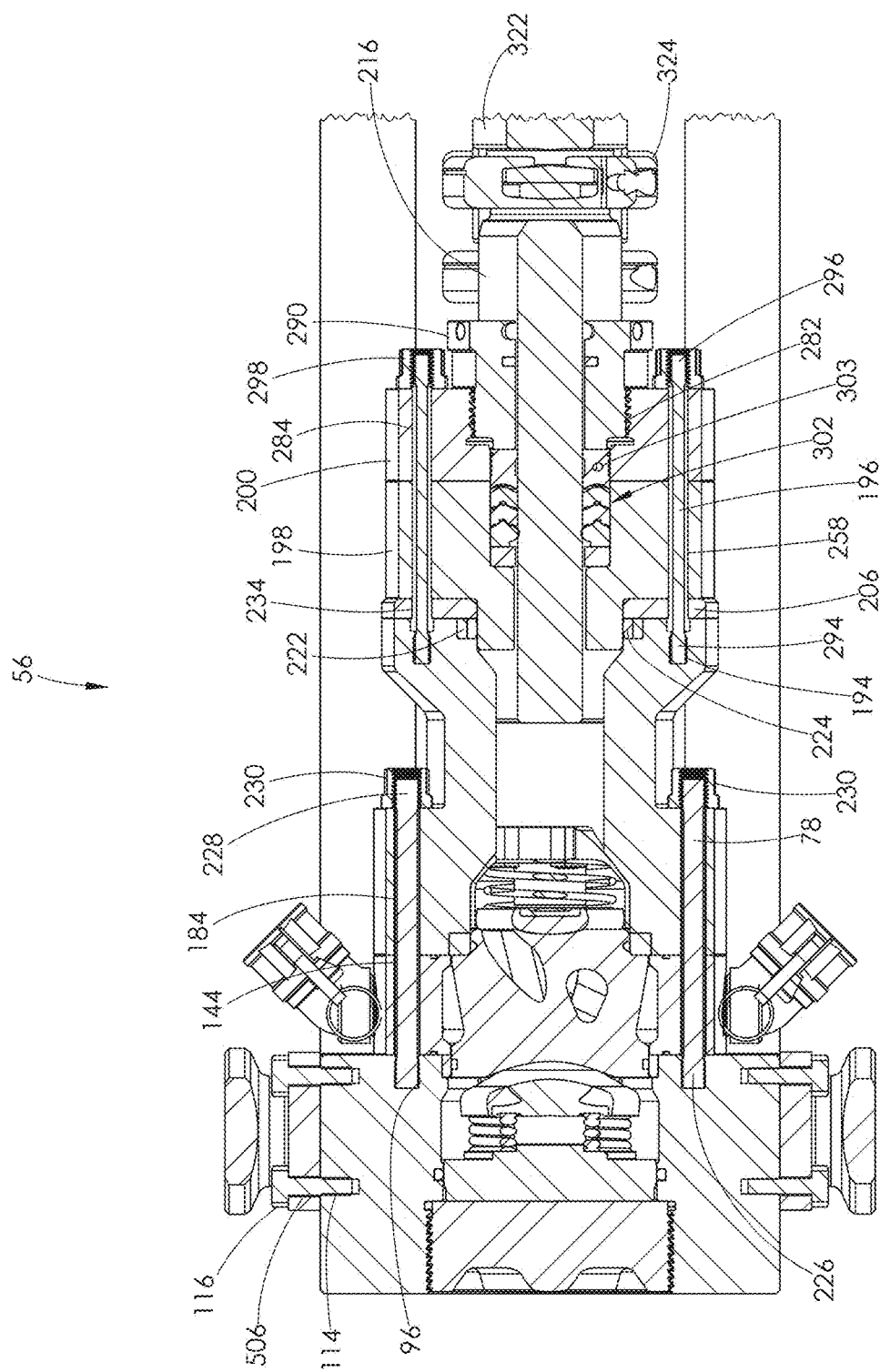
FIG. 29 is a cross-sectional view of the fluid end assembly shown in FIG. 6, taken along line G-G.

With reference to FIGS. 25 and 26, a plurality of first threaded openings 194 are formed in the rear surface 66 of the third section 76. The first threaded openings 194 are configured to receive a plurality of second fasteners 196, as shown in FIG. 29. The second fasteners 196 are configured to secure a stuffing box 198 and a rear retainer 200 to the third section 76 of the housing 60, as shown in FIG. 29. The stuffing box 198 and the rear retainer 200 will be described in more detail later herein.

Figure 32:
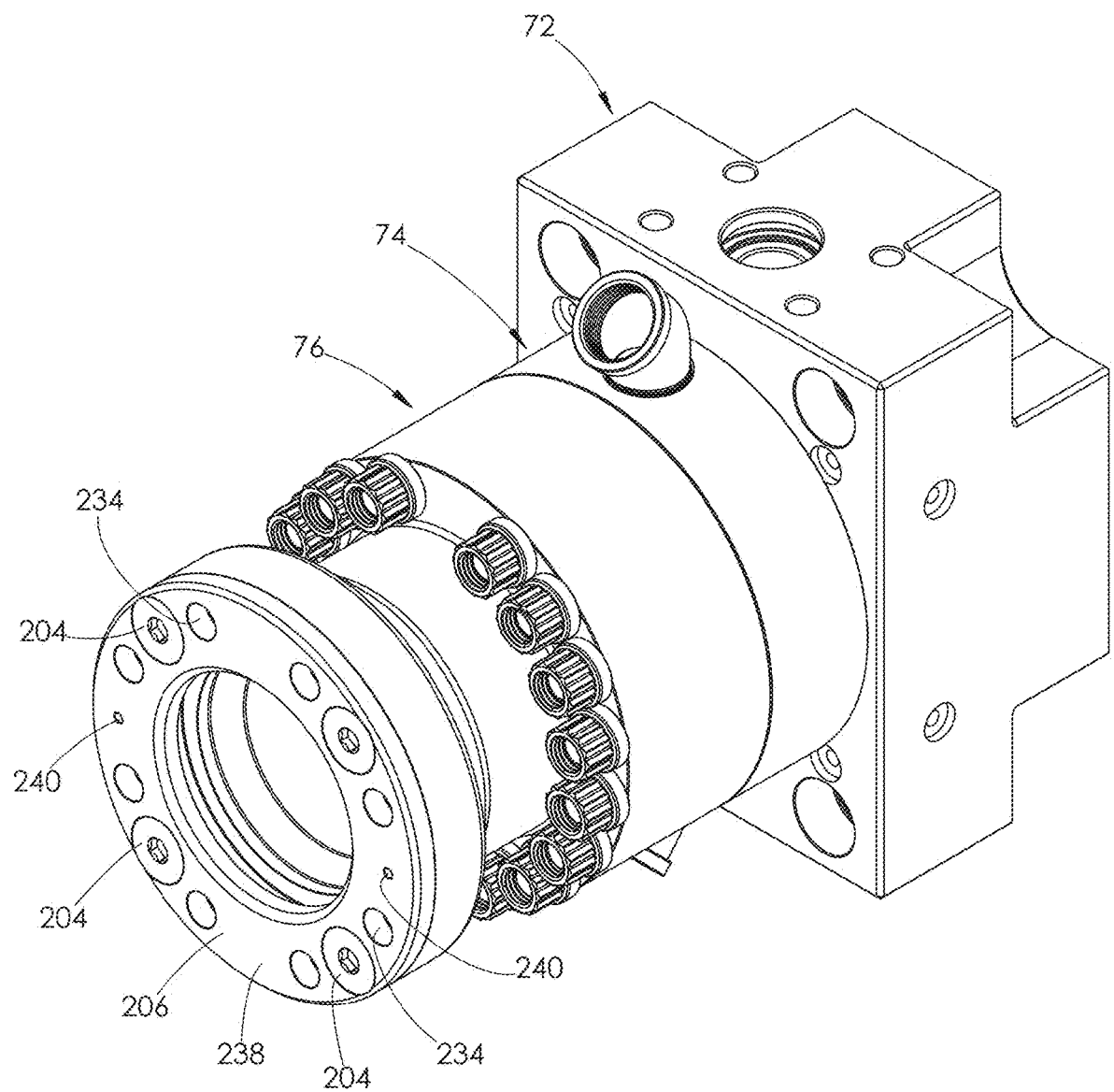
FIG. 32 is a rear perspective view of the retention plate shown in FIG. 30 attached to the housing shown in FIG. 10.
Figure 39:
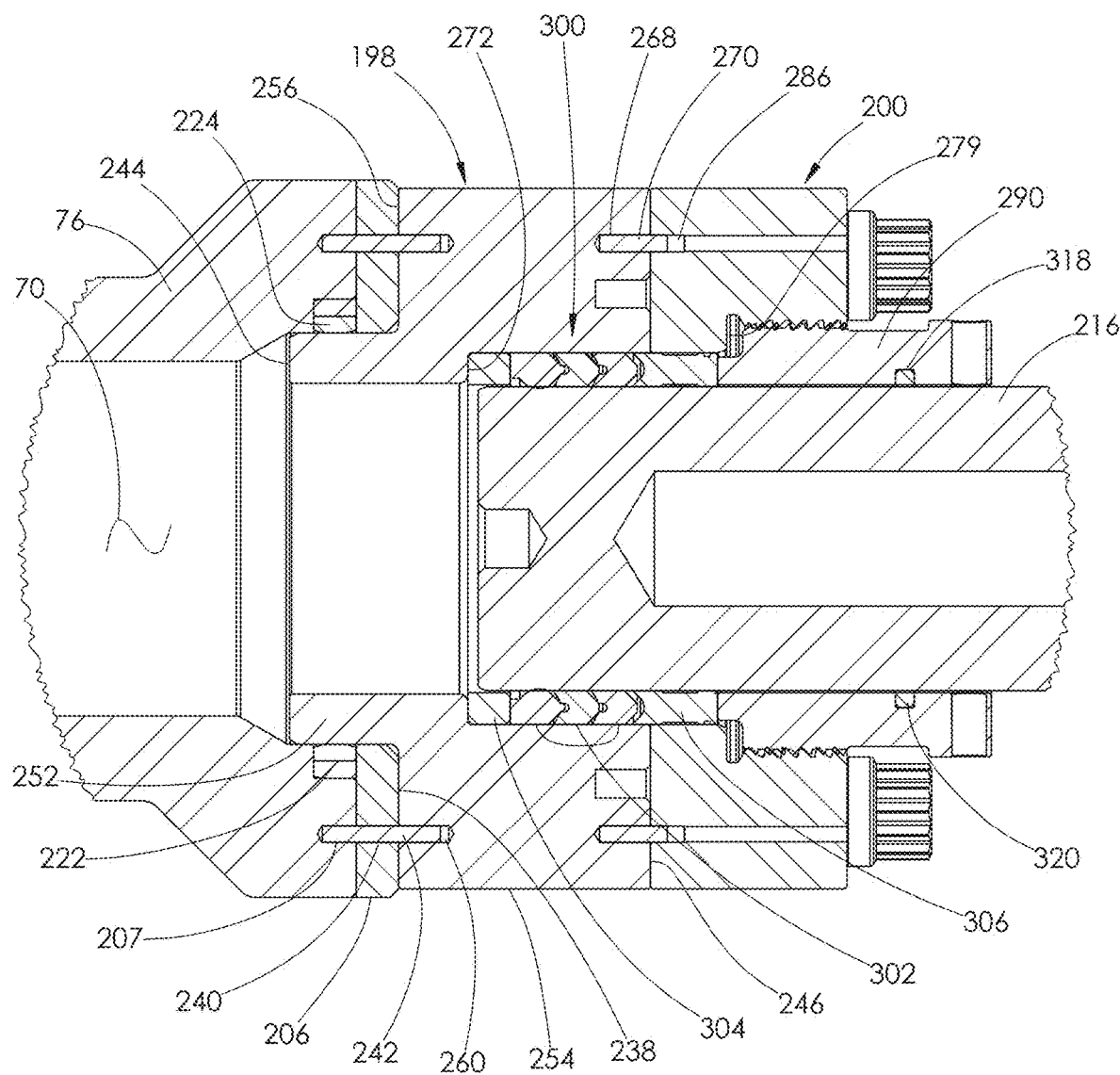
FIG. 39 is an enlarged cross-sectional view of the rear of a fluid end section shown in FIG. 6, taken along line H-H.

With reference to FIGS. 26 and 32, a plurality of second threaded openings 202 are also formed in the rear surface 66 of the third section 76, as shown in FIG. 26. The second threaded openings 202 are configured to receive a plurality of third fasteners 204. The third fasteners 204 are configured to secure a retention plate 206 to the rear surface of the housing 60, as shown in FIG. 32. The retention plate 206 will be described in more detail later herein. A plurality of dowel openings 207 are also formed in the rear surface 66 of the third section 76. The dowel openings 207 are configured to receive third alignment dowels 242, as shown in FIG. 39.

Turning back to FIGS. 9, 14, 15, and 25, a counterbore 208 is formed in the walls surrounding the horizontal bore 70 within the third section 76 and opens on the front surface 178. The counterbore 208 is configured to receive a hardened insert 210, as shown in FIG. 9. The insert 210 will be described in more detail later herein. The insert 210 engages portions of the fluid routing plug 132 when the fluid routing plug 132 is installed within the housing 60, as shown in FIG. 9. The walls surrounding the horizontal bore 70 between the counterbore 208 and the medial surface 186 of the third section 76 are further configured to receive a suction valve guide 212. A suction valve 214 is also installed within the third section 76 of the housing 60. The suction valve 214 and suction valve guide 212 will be described in more detail later herein.

Continuing with FIGS. 9, 14, 15, 25, and 26, the walls surrounding the horizontal bore 70 within the neck 190 of the rear portion 182 are sized to receive at least a portion of a reciprocating plunger 216, as shown in FIG. 9. The portion of the horizontal bore 70 extending through the neck 190 has a uniform diameter and opens into a first counterbore 218 formed in the shoulder 192, as shown in FIGS. 14 and 15. The first counterbore 218 is sized to receive a portion of the stuffing box 198, as shown in FIG. 9. The first counterbore 218 opens into a second counterbore 220, of which opens on the rear surface 66 of the housing 60, as shown in FIGS. 14, 15, and 26. The second counterbore 220 is sized to receive a wear ring 222 and a seal 224, as shown in FIG. 9. The wear ring 222 and the seal 224 each have an annular shape. When such components are installed within the housing 60, the wear ring 222 surrounds the seal 224, and the seal 224 engages an outer surface of the stuffing box 198.

Assembly of Housing

Figure 27:
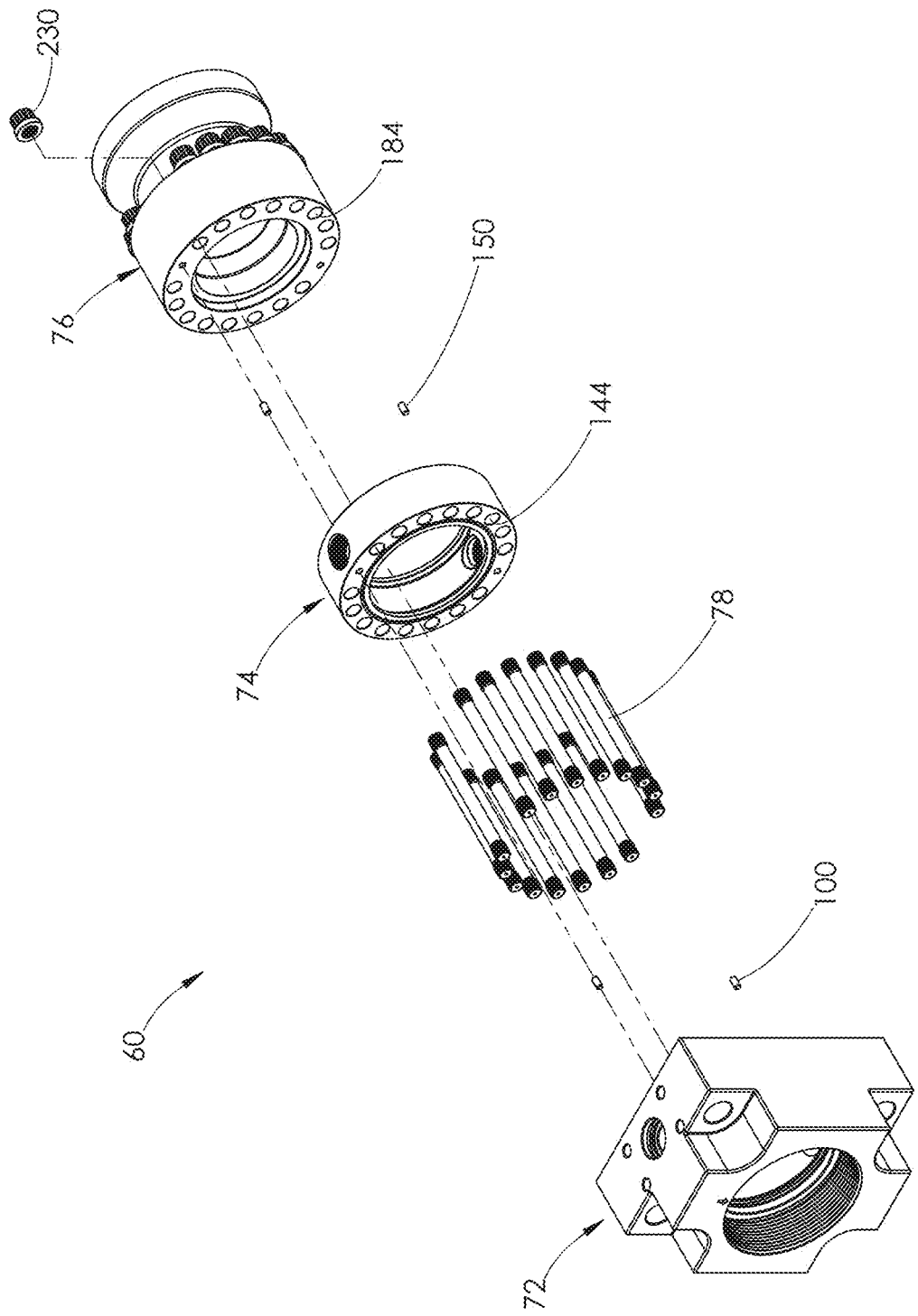
FIG. 27 is a front perspective and exploded view of the housing shown in FIG. 10.
Figure 28:
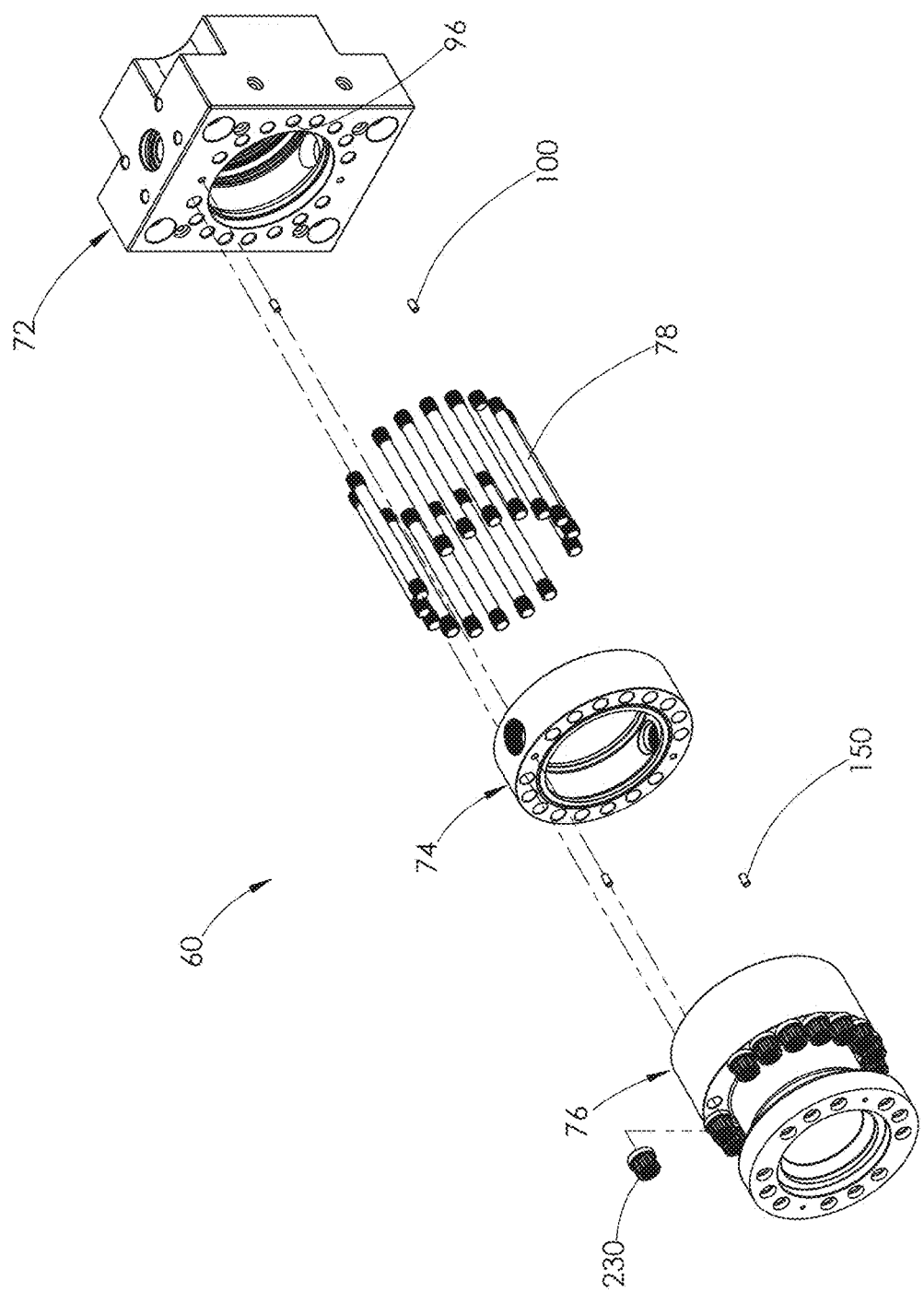
FIG. 28 is a rear perspective and exploded view of the housing shown in FIG. 10.

Turning to FIGS. 27-29, the housing 60 is assembled by threading a first end 226 of each of the first fasteners 78 into a corresponding one of the threaded openings 96 formed in the first section 72. Once installed therein, the first fasteners 78 project from the rear surface 80 of the first section 72. The second and third sections 74 and 76 may then be slid onto the fasteners 78 projecting from the first section 72 using the corresponding passages 144 and 184. The first and second alignment dowels 100 and 150 help to further align the sections 72, 74, and 76 together during assembly.

Continuing with FIGS. 27-29, when the second and third sections 74 and 76 are installed on the fasteners 78, a second end 228 projects from the medial surface 186 of the third section 76, as shown in FIG. 29. A flange nut 230 is installed on the second end 228 and torqued against the medial surface 186, tightly securing the sections 72, 74, and 76 together. When the housing 60 is assembled, a footprint of the rear surface 142 of the second section 74 is entirely within a footprint of the rear surface 80 of the first section 72, as shown in FIG. 29.

Continuing with FIGS. 27-29, the first fastener 78 shown in the figures is a threaded stud. In alternative embodiments, other types of fasteners known in the art may be used instead of a threaded stud. For example, screws or bolts may be used to secure the sections together. In further alternative embodiments, the nut may comprise the three-piece nut 90, shown in FIGS. 19-21.

Continuing with FIGS. 27-29, to remove a section 72, 74, or 76, the nut 230 is unthreaded from the second end 228 of each first fastener 78. The sections 72, 74, and 76 may then be pulled apart, as needed. If the first section 72 is being replaced, the first fasteners 78 are also unthreaded from the threaded openings 96. The components installed within the housing 60 may also be removed, as needed, prior to disassembling the housing 60.

Components Attached to Rear Surface of Housing

Turning to FIGS. 29-32, in addition to the housing 60, the fluid end section 56 comprises a plurality of components attached to the rear surface 66 of the housing 60. Such components are configured to receive the plunger 216. The various components include the retention plate 206, the stuffing box 198, and the rear retainer 200, previously mentioned. The components further comprise a plunger packing 300, and a packing nut 290.

Retention Plate

Continuing with FIGS. 29-32, the retention plate 206 has a cylindrical cross-sectional shape and is sized to cover the rear surface 66 of the housing 60 and the wear ring 222 and the seal 224, as shown in FIG. 29. The retention plate 206 holds the wear ring 222 and the seal 224 within the housing 60 in the event the stuffing box 198 needs to be removed.

Continuing with FIGS. 29-32, the retention plate 206 comprises opposed front and rear surface 237 and 238 joined by a central opening 239 formed therein. A plurality of first passages 234 are formed in the retention plate 206 and surround the central opening 239 of the plate 206. The first passages 234 align with the first threaded openings 194 formed in the rear surface 66 of the housing 60 and are configured to receive the plurality of second fasteners 196.

Figure 30:
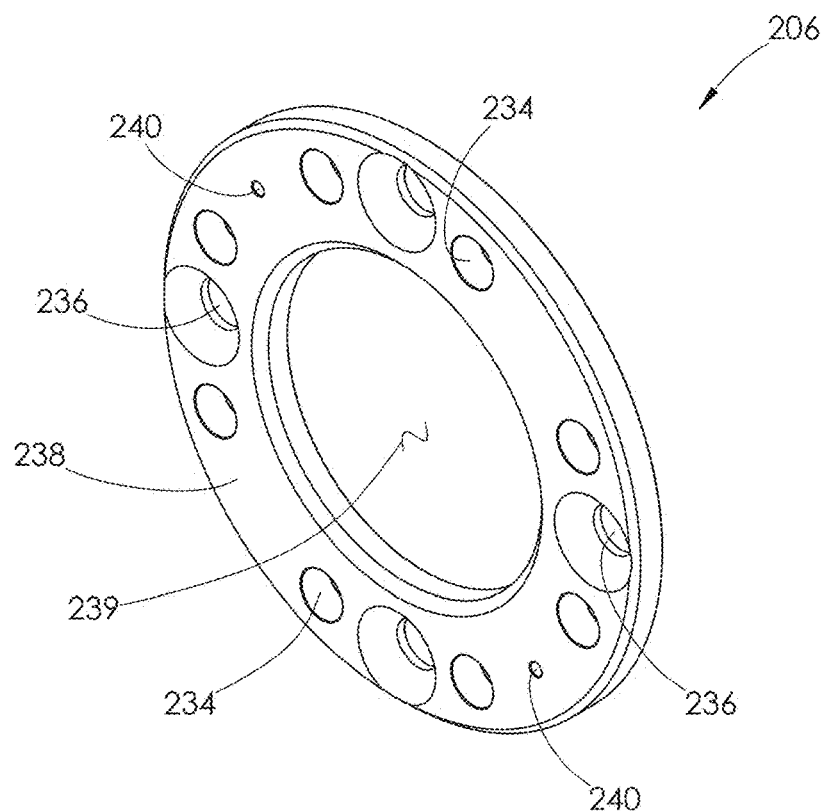
FIG. 30 is a rear perspective view of the retention plate shown in FIGS. 9 and 29.
Figure 31:
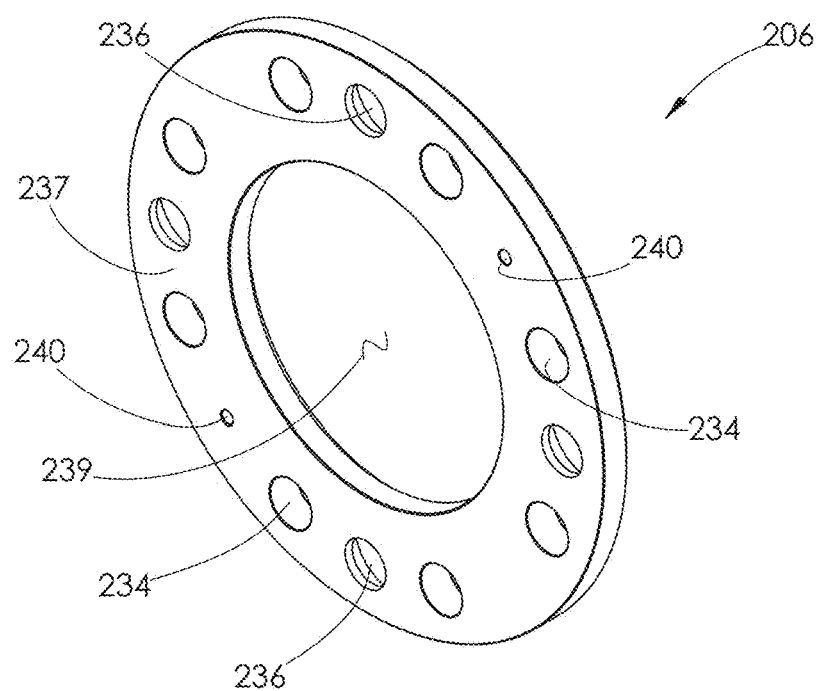
FIG. 31 is a front perspective view of the retention plate shown in FIG. 30.

Continuing with FIGS. 30-32, a plurality of second passages 236 are also formed in the retention plate 206. The second passages 236 align with the second threaded openings 202 formed in the rear surface 66 of the housing 60 and are configured to receive the third fasteners 204, as shown in FIG. 32. A third fastener 204 is threaded into one of the second threaded openings 202 and turned until it sits flush with the rear surface 238 of the retention plate 206, as shown in FIG. 32.

Continuing with FIGS. 30-32, a plurality of dowel openings 240 are formed in the retention plate 206 for receiving third alignment dowels 242, as shown in FIG. 39. The third alignment dowels 242 assist in properly aligning the retention plate 206 and the stuffing box 198 on the housing 60 during assembly.

Turning back to FIG. 29, since fluid does not contact the retention plate 206 during operation, the retention plate 206 may be made of a different and less costly material than that of the housing 60 or the stuffing box 198. For example, the retention plate 206 may be made of alloy steel, while the housing 60 and stuffing box 198 are made of stainless steel.

Stuffing Box

Turning to FIGS. 29, 33, 34, and 39, the stuffing box 198 comprises opposed front and rear surfaces 244 and 246 joined by an outer intermediate surface 248 and a central passage 250 formed therein. The stuffing box 198 further comprises a front portion 252 joined to a rear portion 254. The front portion 252 has a smaller outer diameter than the rear portion 254 such that a medial surface 256 is formed between the front and rear surfaces 244 and 246. The front portion 252 includes the front surface 244 of stuffing box 198, and the rear portion 254 includes the rear surface 246 of the stuffing box 198. An internal shoulder 272 is formed within the walls surrounding the central passage 250 within the rear portion 254 of the stuffing box 198.

Figure 33:
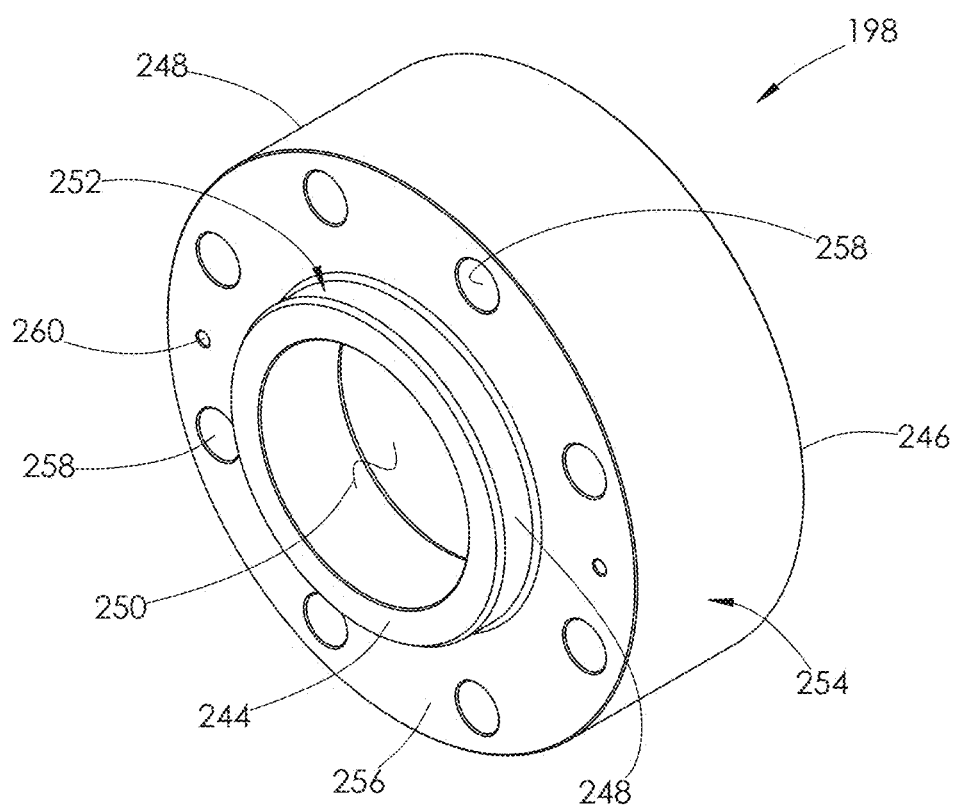
FIG. 33 is a front perspective view of the stuffing box shown in FIGS. 9 and 29.
Figure 34:
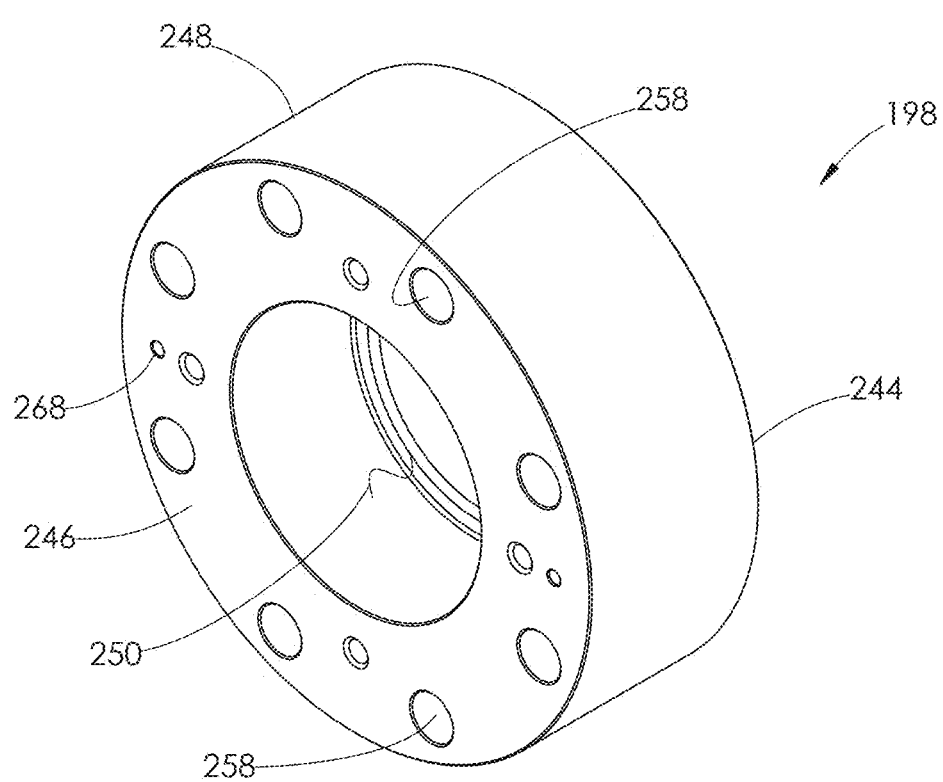
FIG. 34 is a rear perspective view of the stuffing box shown in FIG. 33.
Figure 35:
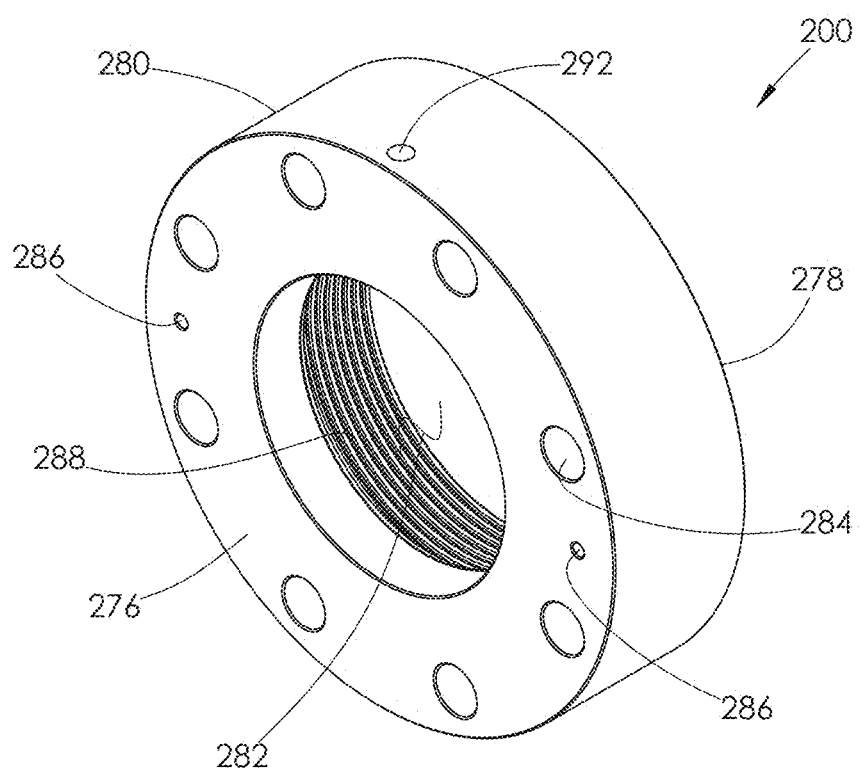
FIG. 35 is a front perspective view of the rear retainer shown in FIGS. 9 and 29.
Figure 36:
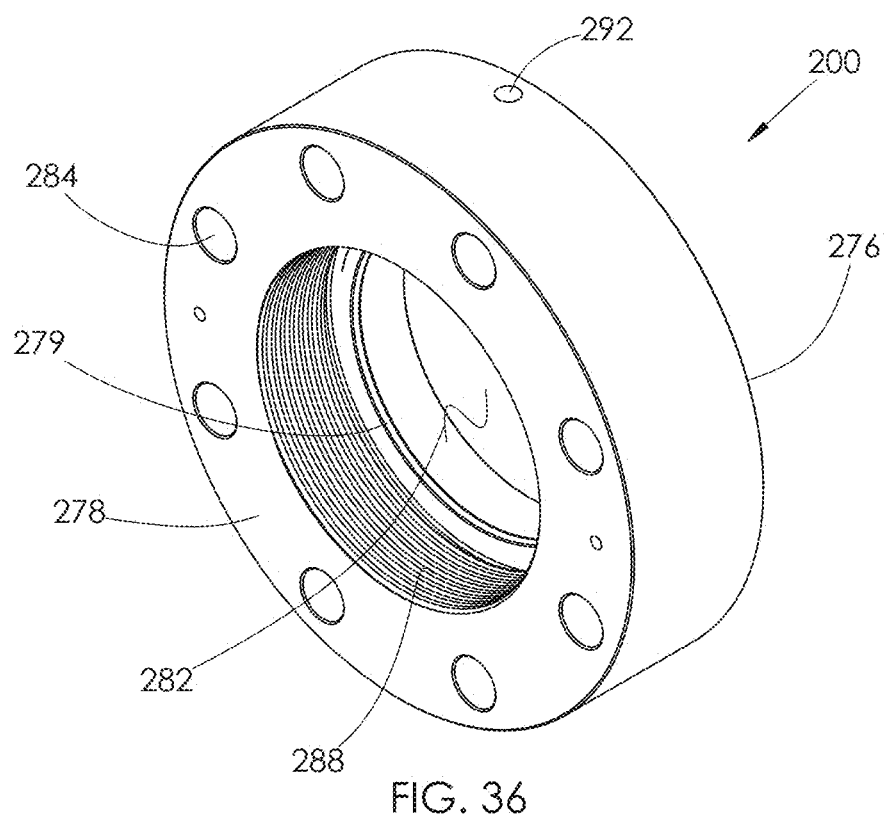
FIG. 36 is a rear perspective view of the rear retainer shown in FIG. 35.

Continuing with FIGS. 33, 34, and 39, a plurality of passages 258 are formed within the rear portion 254 of the stuffing box 198 and interconnect the medial surface 256 and the rear surface 246. The passages 258 are configured to align with the plurality of first passages 234 formed in the retention plate 206 and the plurality of first threaded openings 194 formed in the rear surface 66 of the housing 60, as shown in FIG. 29.

Continuing with FIGS. 33, 34, and 39, a plurality of dowel openings 260 may be formed in the medial surface 256 of the stuffing box 198. The dowel openings 260 are configured to receive at least a portion of the third alignment dowels 242 to properly align the stuffing box 198 on the retention plate 206 and the housing 60 during assembly, as shown in FIG. 39. Likewise, a plurality of dowel openings 268 may be formed in the rear surface 246 of the stuffing box 198 for receiving fourth alignment dowels 270, as shown in FIG. 39. The fourth alignment dowels 270 assist in properly aligning the rear retainer 200 on the stuffing box 198 during assembly.

Continuing with FIG. 39, the stuffing box 198 is installed within the third section 76 of the housing 60 such that the front portion 252 is disposed within the horizontal bore 70 and the medial surface 256 abuts the rear surface 238 of the retention plate 206. The outer intermediate surface 248 of the front portion 252 of the stuffing box 198 engages the seal 224. The seal 224 prevents fluid from leaking between the housing 60 and the stuffing box 198.

Continuing with FIG. 39, during operation, the seal 224 wears against the outer intermediate surface 248 of the front portion 252. Should the front portion 252 begin to erode, the stuffing box 198 may be removed and replaced with a new stuffing box 198. Likewise, the seal 224 wears against the wear ring 222 during operation. The wear ring 222 is preferably made of a harder and more wear resistant material than the housing 60, such as tungsten carbide. Should the wear ring 222 begin to erode, the wear ring 222 can be removed and replaced with a new wear ring 222. Trapping the seal 224 between replaceable parts protects the housing 60 over time.

Rear Retainer

Turning to FIGS. 29, 35, 36, and 39, the rear retainer 200 comprises opposed front and rear surfaces 276 and 278 joined by an outer intermediate surface 280 and a central passage 282 formed therein. A plurality of passages 284 are formed in the rear retainer 200 and surround the central passage 282. The passages 284 interconnect the front and rear surfaces 276 and 278 of the rear retainer 200 and are configured to align with the passages 258 formed in the rear portion 254 of the stuffing box 198, as shown in FIG. 29. A plurality of dowel openings 286 are formed in the front surface 276 of the rear retainer 200 for receiving a portion of the fourth alignment dowels 270, as shown in FIG. 39.

Figure 40:
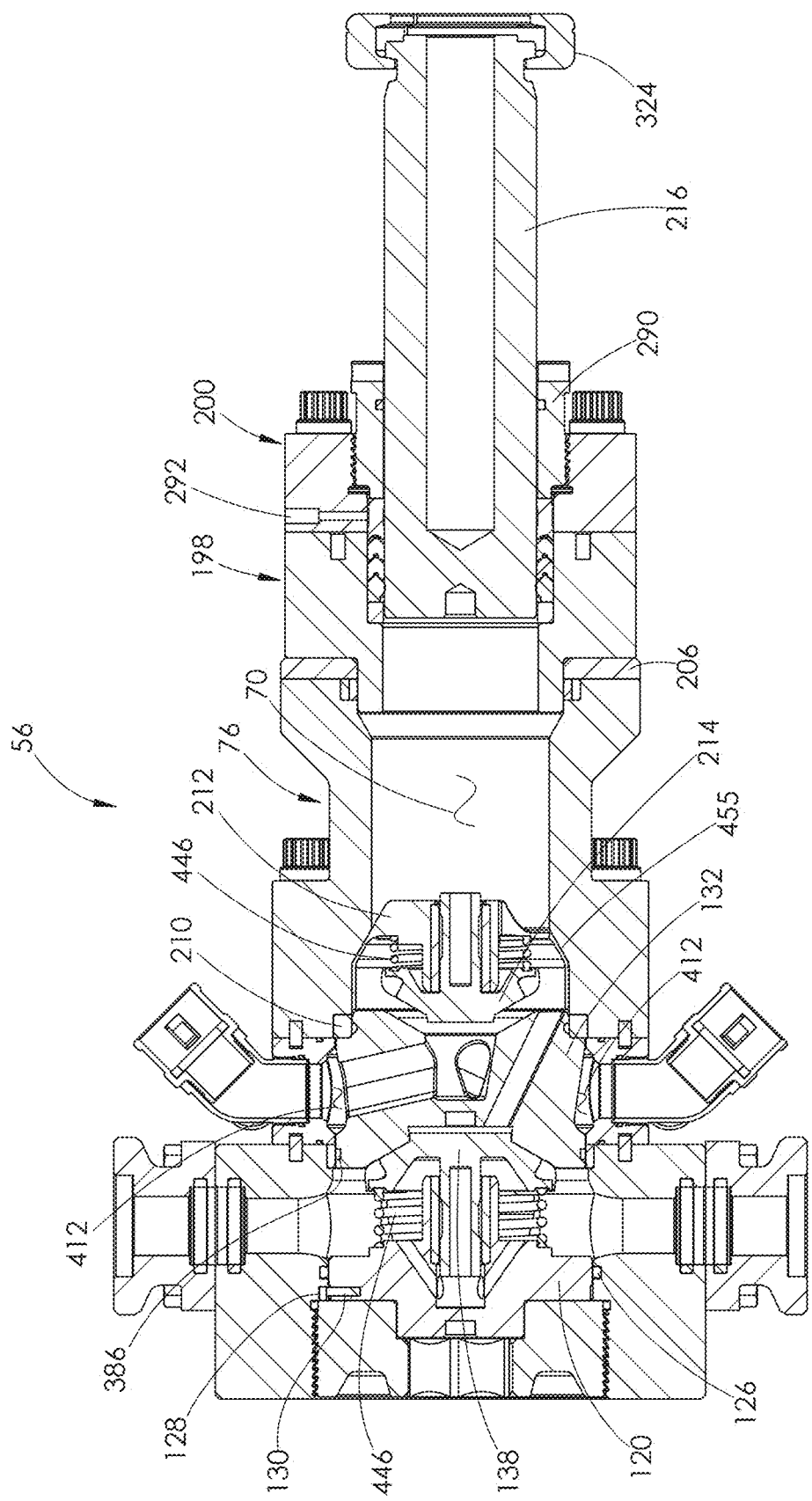
FIG. 40 is the cross-sectional view of the fluid end section shown in FIG. 9. The plunger is retracted, and the discharge valve is shown in a closed position.

Continuing with FIGS. 35, 36, 39, and 40, an internal shoulder 279 is formed within the walls surrounding the central passage 282 of the rear retainer 200. Internal threads 288 are formed in the walls surrounding the central passage 282 and positioned between the internal shoulder 279 and the rear surface 278. The internal threads 288 are configured to receive a packing nut 290, as shown in FIG. 39. The walls positioned between the internal shoulder 279 and the front surface 276 are flat and include one or more lube ports 292. The lube port 292 interconnects the central passage 282 and the outer intermediate surface 280 of the rear retainer 200, as shown in FIG. 40.

Plunger Packing and Packing Nut

Continuing with FIG. 39, fluid is prevented from leaking around the plunger 216 during operation by a plunger packing 300. The plunger packing 300 is installed within the stuffing box 198 and comprises a plurality of packing seals 302 sandwiched between first and second metal rings 304 and 306. The first metal ring 304 abuts the internal shoulder 272 formed within the stuffing box 198 and the second metal ring 306 extends into the central passage 282 formed in the rear retainer 200. The second metal ring 306 is known in the art as a "lantern ring". One or more passages 303, shown in FIG. 29, may be formed in the second metal ring 306 and fluidly connect with the one or more lube ports 292 formed in the rear retainer 200. During operation, oil used to lubricate the plunger 216 and plunger packing 300 is supplied through the lube port 292 and second metal ring 306.

Figure 37:
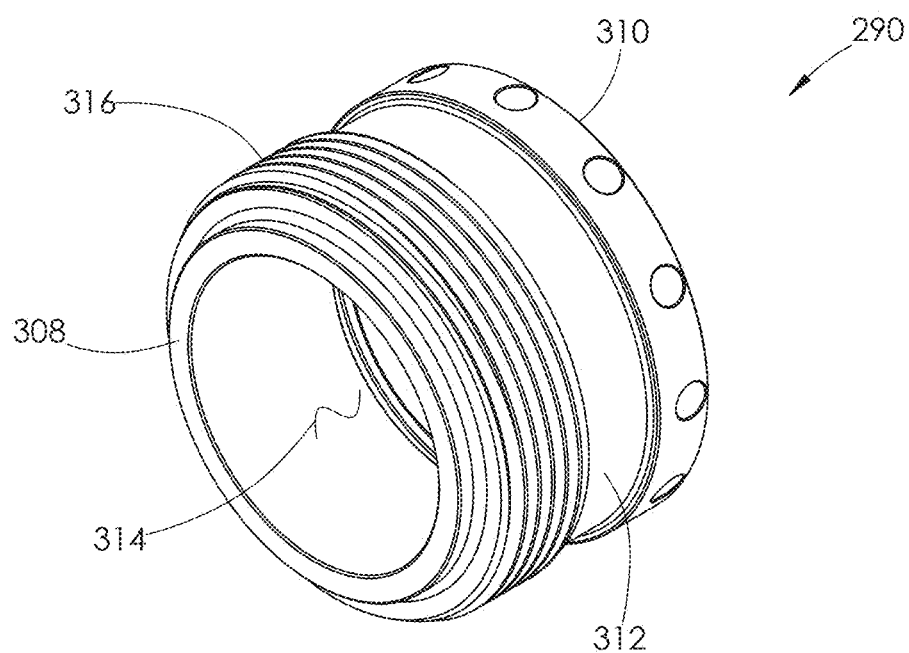
FIG. 37 is a front perspective view of the packing nut shown in FIGS. 9 and 29.
Figure 38:
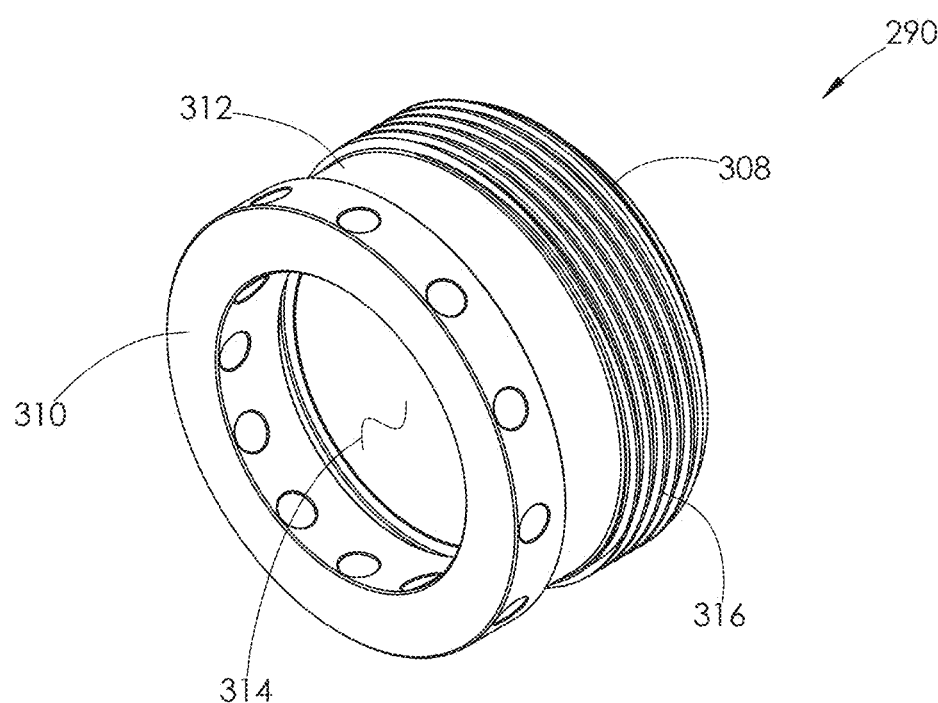
FIG. 38 is a rear perspective view of the packing nut shown in FIG. 37.

With reference to FIGS. 37-39, the plunger packing 300 is retained within the stuffing box 198 and the rear retainer 200 using the packing nut 290. The packing nut 290 comprises opposed front and rear surfaces 308 and 310 joined by an outer intermediate surface 312 and a central passage 314 formed therein. External threads 316 are formed in a portion of the outer intermediate surface 312 for engaging the internal threads 288 formed in the rear retainer 200, as shown in FIG. 39. When the packing nut 290 is installed within the rear retainer 200, the front surface 308 of the packing nut 290 engages and compresses the plunger packing 300, as shown in FIG. 39. When compressed, the packing seals 302 of the plunger packing 300 tightly seal against an outer surface of the plunger 216.

Continuing with FIG. 39, during operation, the packing nut 290 may be tightened, as needed, to ensure adequate compression of the packing seals 302 against the plunger 216. At least a portion of the packing nut 290 projects from the rear surface 278 of the rear retainer 200 to provide clearance to turn the packing nut 290, as needed. The central passage 314 formed in the packing nut 290 is sized to closely receive the plunger 216. A groove 318 may be formed in the walls surrounding the central passage 314 for receiving a seal 320. The seal 320 shown in FIG. 39 is an O-ring. The seal 320 prevents fluid from leaking around the plunger 216 during operation.

Assembly of Components on Rear Surface of Housing

Turning back to FIG. 29, the front surface 276 of the rear retainer 200 abuts the rear surface 246 of the stuffing box 198 such that the plurality of passages 284 align with the plurality of passages 258 formed in the stuffing box 198. A second fastener 196 is installed within a corresponding one of the aligned first threaded openings 194 and passages 234, 258, and 284. A first end 294 of the second fastener 196 threads into the first threaded opening 194 and a second end 296 projects from the rear surface 278 of the rear retainer 200. A nut 298 is threaded onto the second end 296 and torqued against the rear surface 278, tightly securing the stuffing box 198 and the rear retainer 200 to the third section 76 of the housing 60.

Continuing with FIG. 29, the nut 298 shown in the figures is 12-point flange nut. In alternative embodiments, the nut may comprise the three-piece nut 90, shown in FIGS. 19-21. The second fastener 196 shown in the figures is a threaded stud. In alternative embodiments, the second fastener 196 may comprise other fasteners known in the art, such as a bolt or screw.

Continuing with FIG. 29, the stuffing box 198 and rear retainer 200 are attached to the housing 60 after the retention plate 206 has first been attached to the rear surface 66 of the housing 60. The plunger packing 300 may be installed within stuffing box 198 either before or after the stuffing box 198 is attached to the housing 60. After all the components are assembled, the packing nut 290 is threaded into the rear retainer 200 until it engages the plunger packing 300.

With reference to FIGS. 29 and 39, when the retention plate 206, the stuffing box 198, and rear retainer 200 are attached to the housing 60, the central opening 239 of the retention plate 206 and the central passages 250 and 282 of the stuffing box 198 and the rear retainer 200 form an extension of the horizontal bore 70. Likewise, the interior of the plunger packing 300 and the central passage 314 of the packing nut 290 also form extensions of the horizontal bore 70. The plunger 216 is installed within the fluid end section 56 through the rear surface 310 of the packing nut 290. During operation, the plunger 216 reciprocates within the horizontal bore 70, creating the variance in fluid pressure within the fluid end section 56 during operation.

With reference to FIGS. 3, 39, and 40, during operation, reciprocal movement of the plunger 216 is driven by a pony rod 322 installed within the power end assembly 54. A clamp 324 secures the plunger 216 to the pony rod 322 such that the plunger 216 and pony rod 322 move in unison.

Components Installed within the Housing

Turning to FIGS. 40-80, the various internal components of the housing 60 will now be described in more detail. Fluid is routed throughout the housing 60 by the fluid routing plug 132. The timing of movement throughout the fluid routing plug 132 is controlled by the suction valve 214 and the discharge valve 138. Movement of the valves 214 and 138 is guided by the suction valve guide 212 and the discharge plug 120.

Fluid Routing Plug

Figure 41:
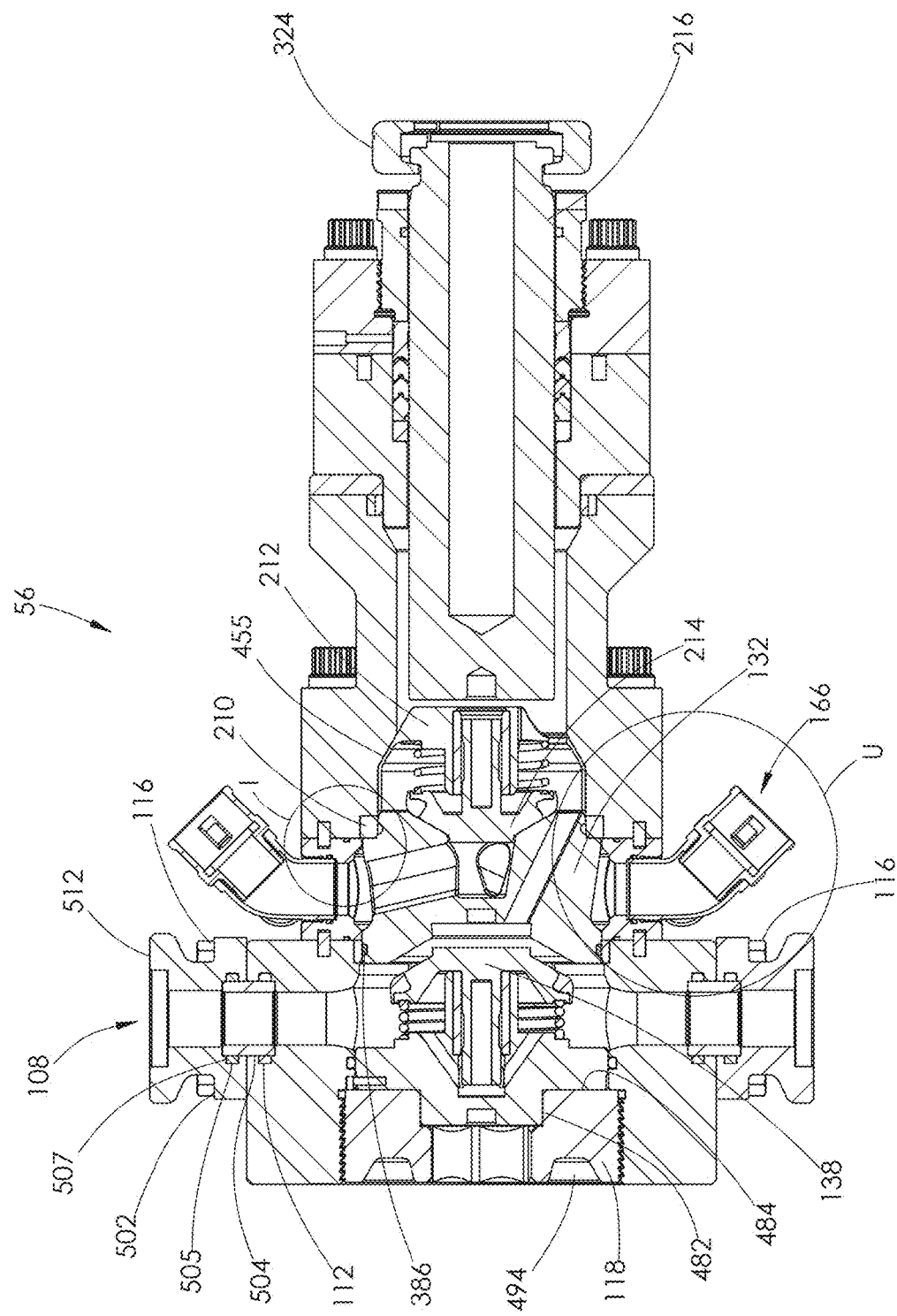
FIG. 41 is the cross-sectional view of the fluid end section shown in FIG. 40, but the plunger is extended within the fluid end section and the suction valve is in a closed position.

Turning to FIGS. 40-59, the fluid routing plug 132 comprises a body 330 having a suction surface 332 and an opposed discharge surface 334 joined by an outer intermediate surface 336. A central longitudinal axis 338 extends through the body 330 and the suction and discharge surfaces 332 and 334. When the fluid routing plug 132 is installed within the housing 60, at least a portion of the discharge surface 334 is positioned within the first section 72 of the housing 60, and at least a portion of the suction surface 332 is positioned within the third section 76 of the housing 60, as shown in FIGS. 40 and 41.

Continuing with FIGS. 43-59, the body 330 further comprises a plurality of suction fluid passages 340. The suction passages 340 interconnect the intermediate surface 336 and the suction surface 332 of the body 330, as shown in FIG. 48. The connection is formed within a blind bore 342 formed within the suction surface 332 of the body 330. During operation, fluid entering the housing 60 through the suction bores 160 and 162 flows into the suction passages 340 of the fluid routing plug 132 and into the blind bore 342. From there, fluid flows towards the suction surface 332 of the body 330 and out of the fluid routing plug 132. Three suction fluid passages 340 are shown in FIGS. 43-59. In alternative embodiments, more or less than three suction fluid passages 340 may be formed within the body 330.

Figure 49:
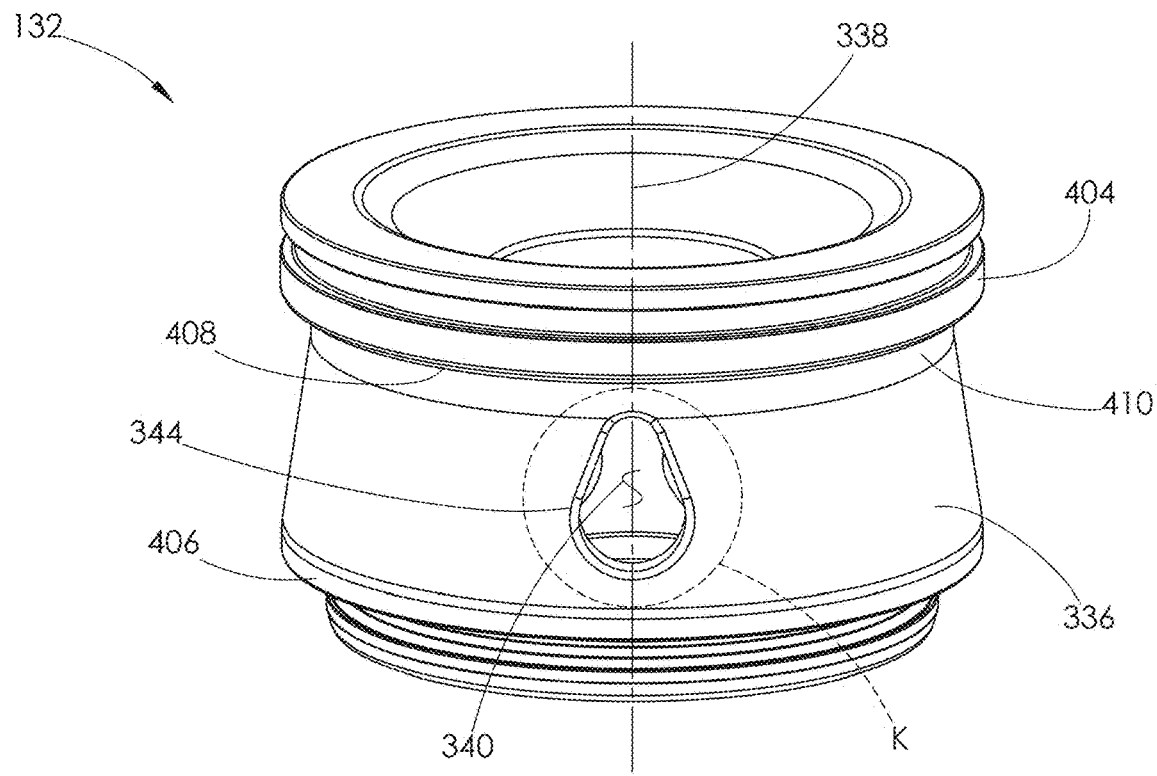
FIG. 49 is a top perspective view of the fluid routing plug shown in FIG. 43.
Figure 50:
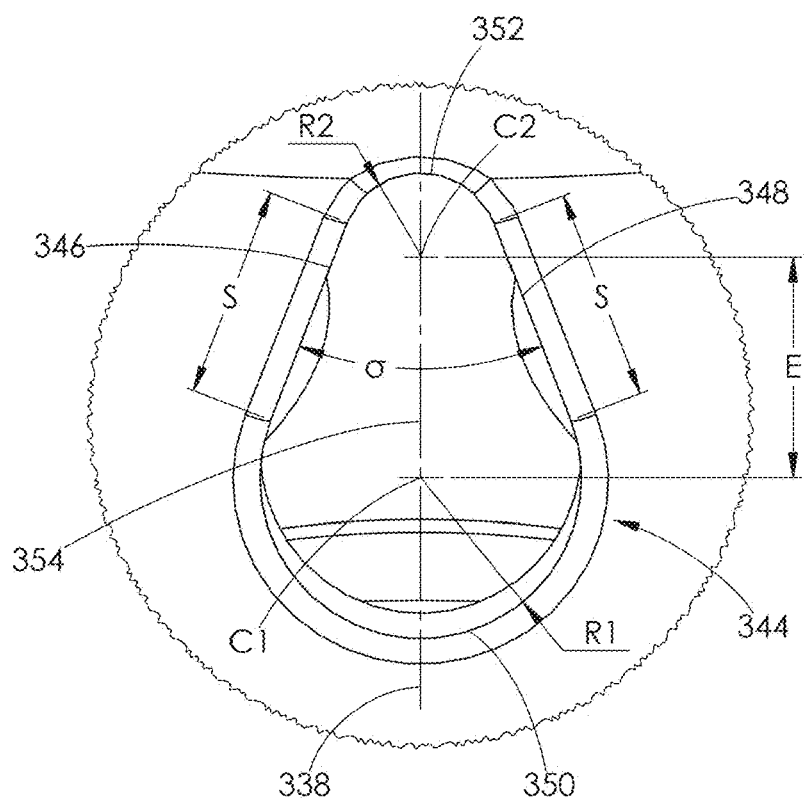
FIG. 50 is an enlarged view of area K shown in FIG. 49.

Continuing with FIGS. 49 and 50, each suction fluid passage 340 has a generally oval or tear drop cross-sectional shape. An opening 344 of each suction fluid passage 340 on the intermediate surface 336 comprises a first side wall 346 joined to a second side wall 348 by first and second ends 350 and 352. The first and second side walls 346 and 348 are straight lines of equal length S1, and the first and second ends 350 and 352 are circular arcs, as shown in FIG. 50.

Continuing with FIG. 50, the first end 350 of the opening 344 has a radius of R1 with a center at C1, and the second end 352 has a radius of R2 with a center at C2. The first end 350 is larger than the second end 352 such that R1>R2. The first and second side walls 346 and 348 are tangent to the first and second ends 350 and 352 and have an included angle, σ1.

Figure 55:
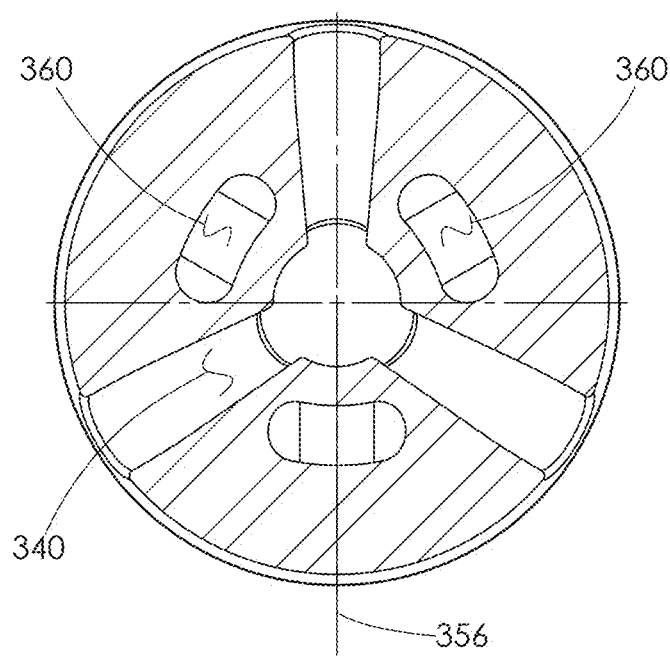
FIG. 55 is a cross-sectional view of the fluid routing plug shown in FIG. 44, taken along line M-M.

Continuing with FIG. 50, the opening 344 has a centerline 354 that connects the centers C1 and C2 of the first and second ends 350 and 352. The centerline 354 has a length E1 and is parallel with the central longitudinal axis 338. A cross-sectional shape of each suction passage 340 throughout the length of the body 330 corresponds with the shape of each opening 344, as shown in FIG. 55. Each suction passage 340 is sized and shaped to maximize fluid flow through the passage 340 and minimize fluid turbulence and stress to the body 330 of the fluid routing plug 132.

Figure 56:
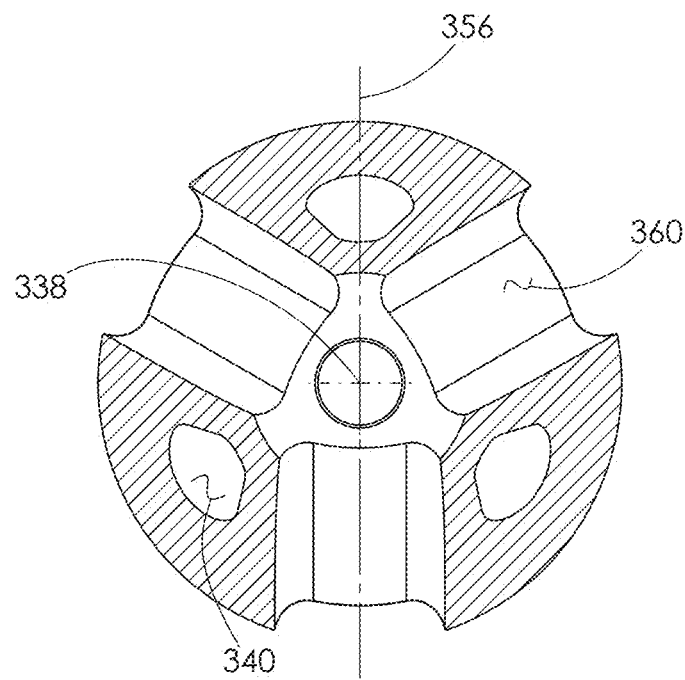
FIG. 56 is a front elevational and conical-sectional view of the fluid routing plug shown in FIG. 43. The conical-section is taken from line O in FIGS. 43 and 45 to line P in FIGS. 46 and 47.
Figure 57:
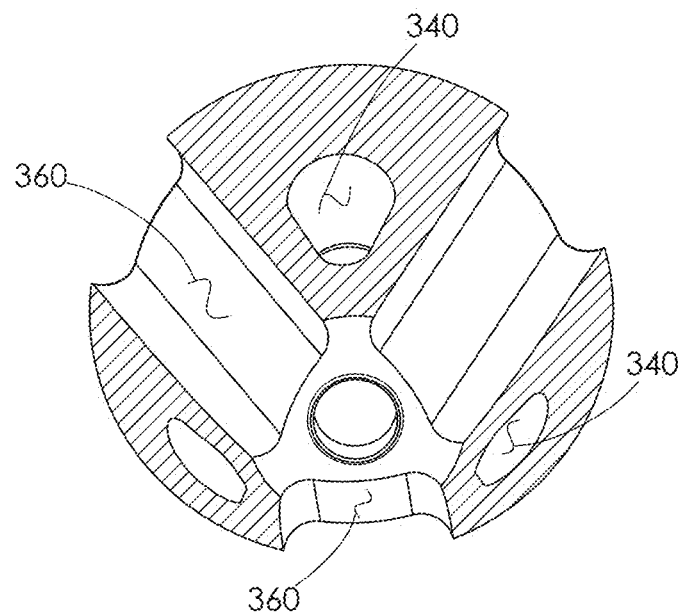
FIG. 57 is a front perspective and conical-sectional view of the fluid routing plug shown in FIG. 56.
Figure 58:
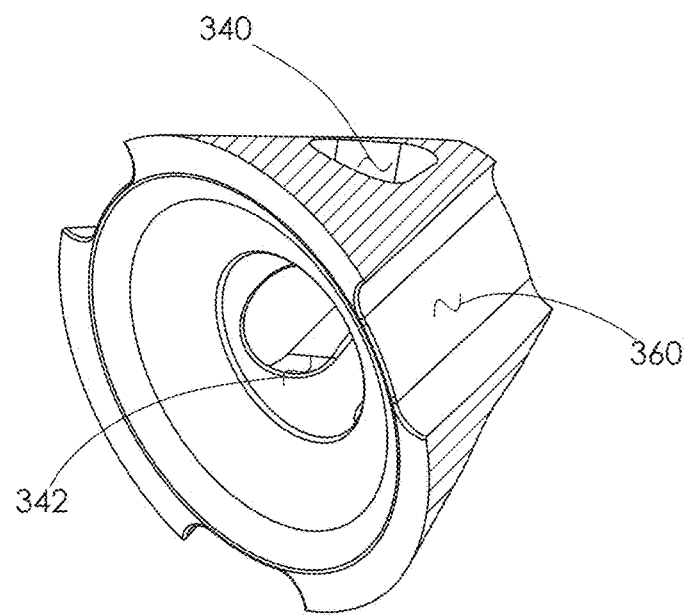
FIG. 58 is a rear perspective and conical-sectional view of the fluid routing plug shown in FIG. 56.
Figure 59:
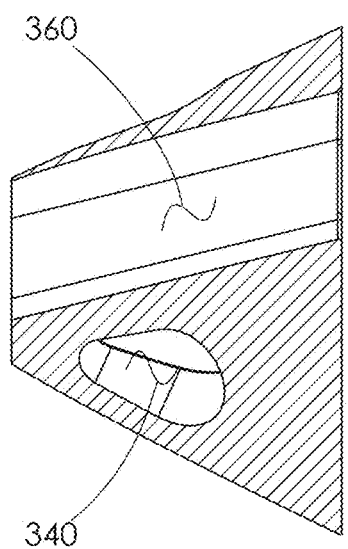
FIG. 59 is a side elevational and conical-sectional view of the fluid routing plug shown in FIG. 56.
Figure 60:
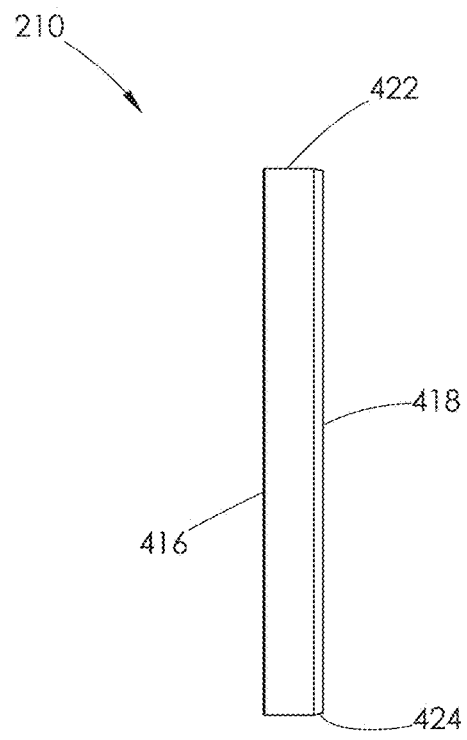
FIG. 60 is a side elevational view of the hardened insert shown in FIGS. 40 and 41.
Figure 61:
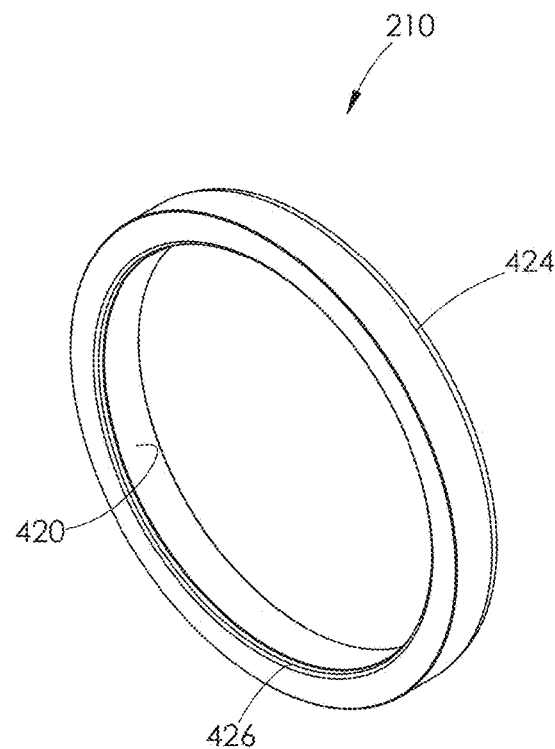
FIG. 61 is a front perspective view of the hardened insert shown in FIG. 60.
Figure 62:
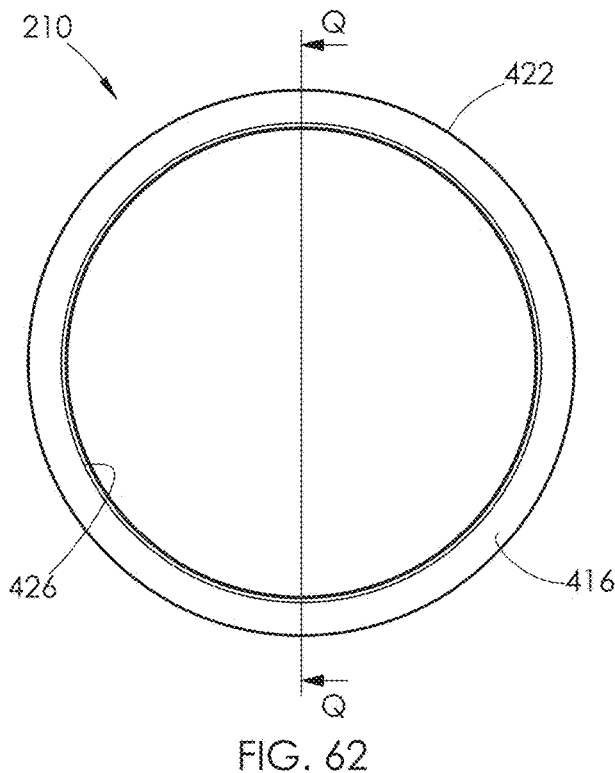
FIG. 62 is a front elevational view of the hardened insert shown in FIG. 60.

With reference to FIGS. 55 and 56, each suction fluid passage 340 extends between the blind bore 342 and the intermediate surface 336 such that each suction passage 340 comprises a longitudinal axis 356. The longitudinal axis 356 extends through the center C1 of the first end 350 of the opening 344 and intersects the central longitudinal axis 338, as shown in FIG. 56.

Continuing with FIGS. 43-59, the body 330 further comprises a plurality of discharge fluid passages 360. The discharge fluid passages 360 interconnect the suction surface 332 and the discharge surface 334 of the body 330 and do not intersect any of the suction fluid passages 340. Rather, the discharge and suction fluid passages 360 and 340 are in a spaced-relationship. In operation, fluid exiting the body 330 at the suction surface 332 is subsequently forced into the discharge fluid passages 360, towards the discharge surface 334 of the body 330, and out of the fluid routing plug 132. Three discharge fluid passages 360 are shown in FIGS. 43-59. In alternative embodiments, more or less than three discharge fluid passages 360 may be formed within the body 330.

Figure 43:
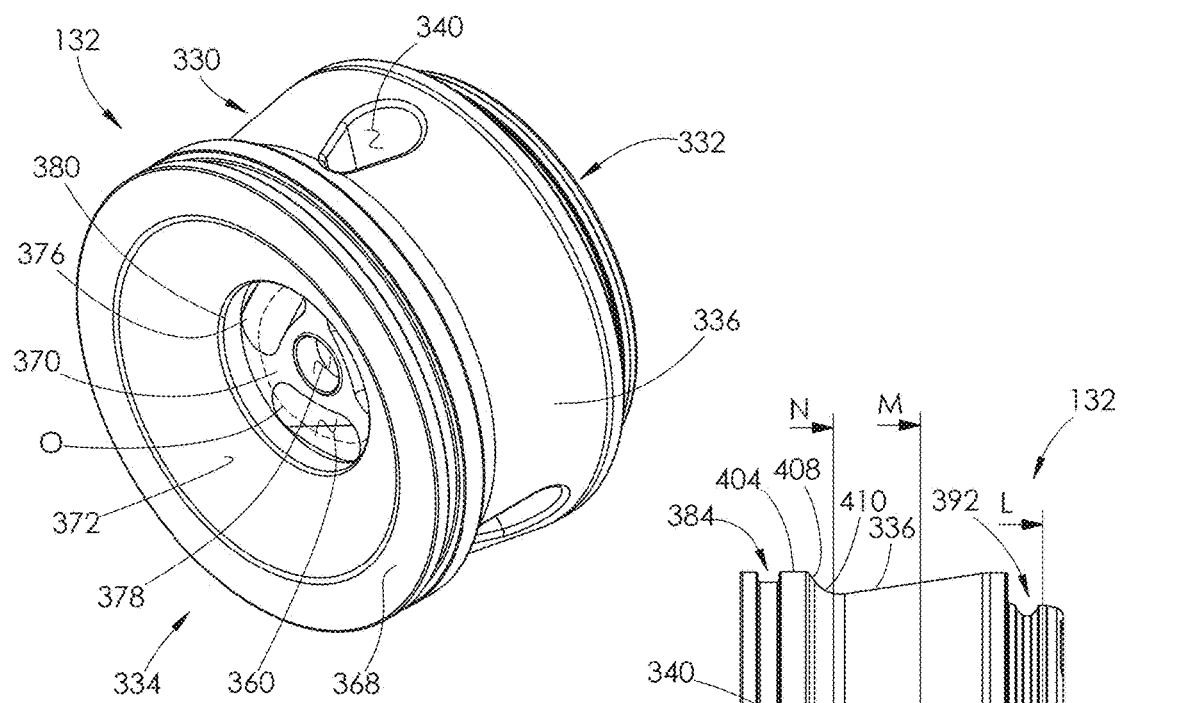
FIG. 43 is a front perspective view of the fluid routing plug shown in FIGS. 40 and 41.

Continuing with FIGS. 43, 46, and 48, the suction surface 332 of the body 330 comprises an outer rim 362 joined to the blind bore 342 by a tapered seating surface 366, as shown in FIGS. 46 and 48. Likewise, the discharge surface 334 comprises an outer rim 368 joined to a central base 370 by a tapered seating surface 372, as shown in FIGS. 43 and 48.

Continuing with FIGS. 43, 46, and 48, each discharge passage 360 opens at a first opening 374 on the outer rim 362 of the suction surface 332 and opens at a second opening 376 on the central base 370 of the discharge surface 334. The second openings 376 surround a blind bore 378 formed in the central base 370 of the discharge surface 334. The blind bore 378 is configured to engage a tool used to grip the fluid routing plug 132, as needed. For example, the walls of the blind bore 378 may be threaded. The central base 370 may also be slightly recessed from the tapered seating surface 372 such that a small counterbore 380 is created. The counterbore 380 helps further reduce any turbulence of fluid exiting the second openings 376.

Figure 54:
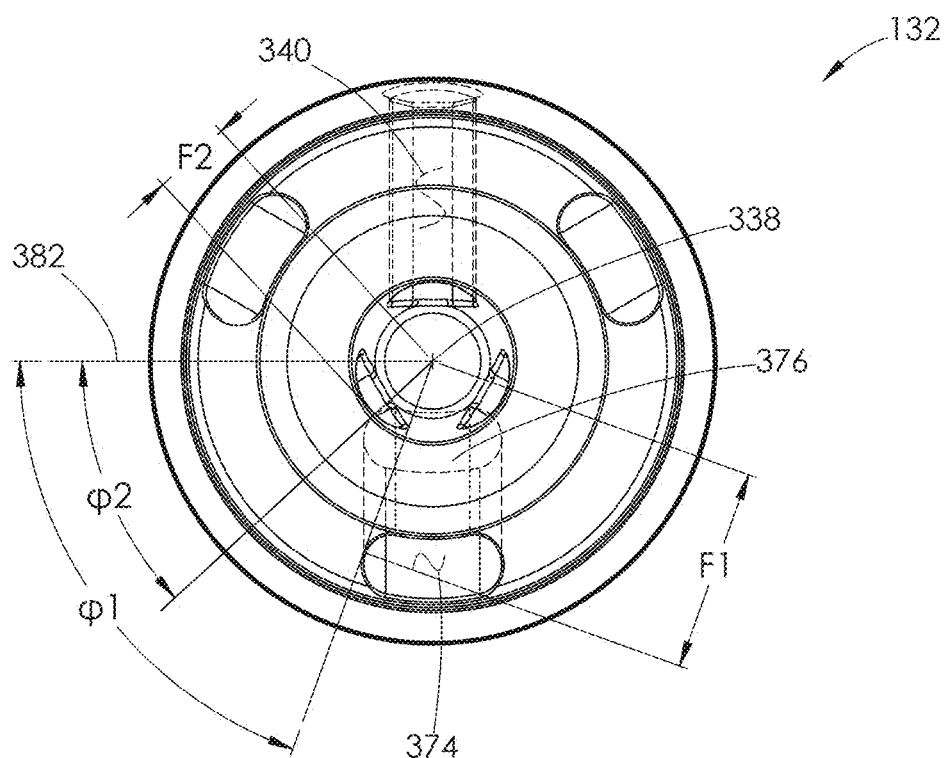
FIG. 54 is a rear elevational view of the fluid routing plug shown in FIG. 43, but one of the suction passages and one of the discharge passages are shown in phantom.

Continuing with FIG. 54, a position of the first and second openings 374 and 376 of each discharge passage 360 may be determined relative to a plane containing a line 382 that is perpendicular to the central longitudinal axis 338. The first opening 374, when projected onto the plane, is positioned at a first distance F1 from the central longitudinal axis 338 and at a first angle φ1 relative to the line 382. The second opening 376, when projected onto the plane, is positioned at a second distance F2 from the central longitudinal axis 338 and at a second angle φ2 relative to the line 382.

The first and second distances F1 and F2 shown in FIG. 54 are different. Likewise, the first and second angles φ1 and φ2 shown in FIG. 54 are different. In alternative embodiments, the first and second angles φ1 and φ2 may be different, but the first and second distances F1 and F2 may be the same. In further alternative embodiments, the first and second angles φ1 and φ2 may be the same, but the first and second distances F1 and F2 may be different. In even further alternative embodiments, the first and second distances F1 and F2 may be the same, and the first and second angles φ1 and φ2 may be the same.

Figure 51:
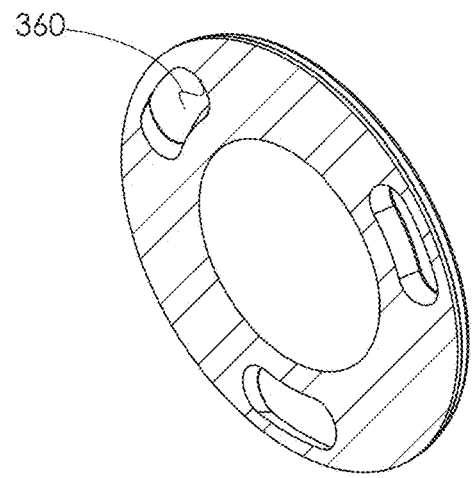
FIG. 51 is a perspective cross-sectional view of the fluid routing plug shown in FIG. 44, taken along line L-L.
Figure 52:
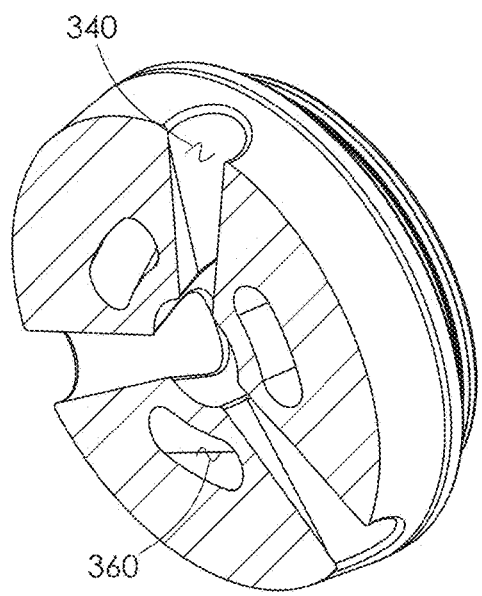
FIG. 52 is a perspective cross-sectional view of the fluid routing plug shown in FIG. 44, taken along line M-M.
Figure 53:
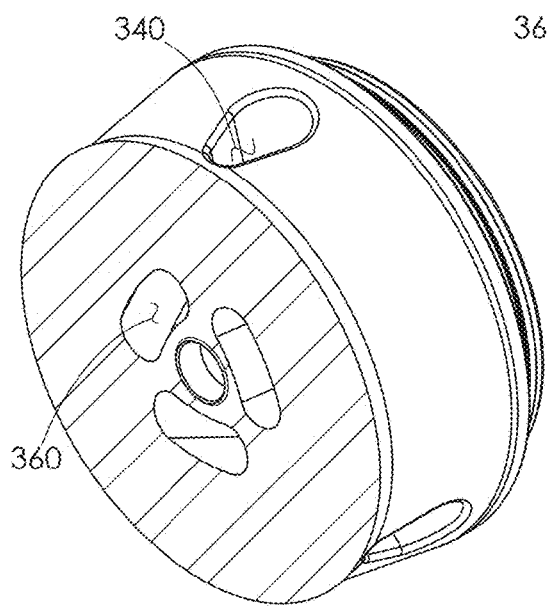
FIG. 53 is a perspective cross-sectional view of the fluid routing plug shown in FIG. 44, taken along line N-N.

With reference to FIGS. 51-53 and 56-59, each discharge fluid passage 360 has an arced cross-sectional shape. The length of the arc may gradually increase between the suction and discharge surfaces 332 and 334, as shown in FIGS. 51-53. In alternative embodiments, the discharge fluid passages 360 may have different shapes and sizes. Turning back to FIGS. 44 and 48, a first annular groove 384 is formed in the outer intermediate surface 336 of the body 330 for housing the first seal 386. The first groove 384 is positioned adjacent the discharge surface 334 and is characterized by two sides walls 388 joined by a base 390. When the fluid routing plug 132 is installed within the housing 60, the first seal 386 engages an inner surface of the wear ring 136 installed within the first section 72 of the housing 60, as shown in FIGS. 40 and 41. During operation, the first seal 386 wears against the wear ring 136. If the wear ring 136 begins to erode, the wear ring 136 may be removed and replaced with a new wear ring 136. The wear ring 136 has an annular shape and may be made of a harder and more wear resistant material than the housing 60. For example, the housing 60 may be made of stainless steel and the wear ring 136 is made of tungsten carbide.

Figure 42:
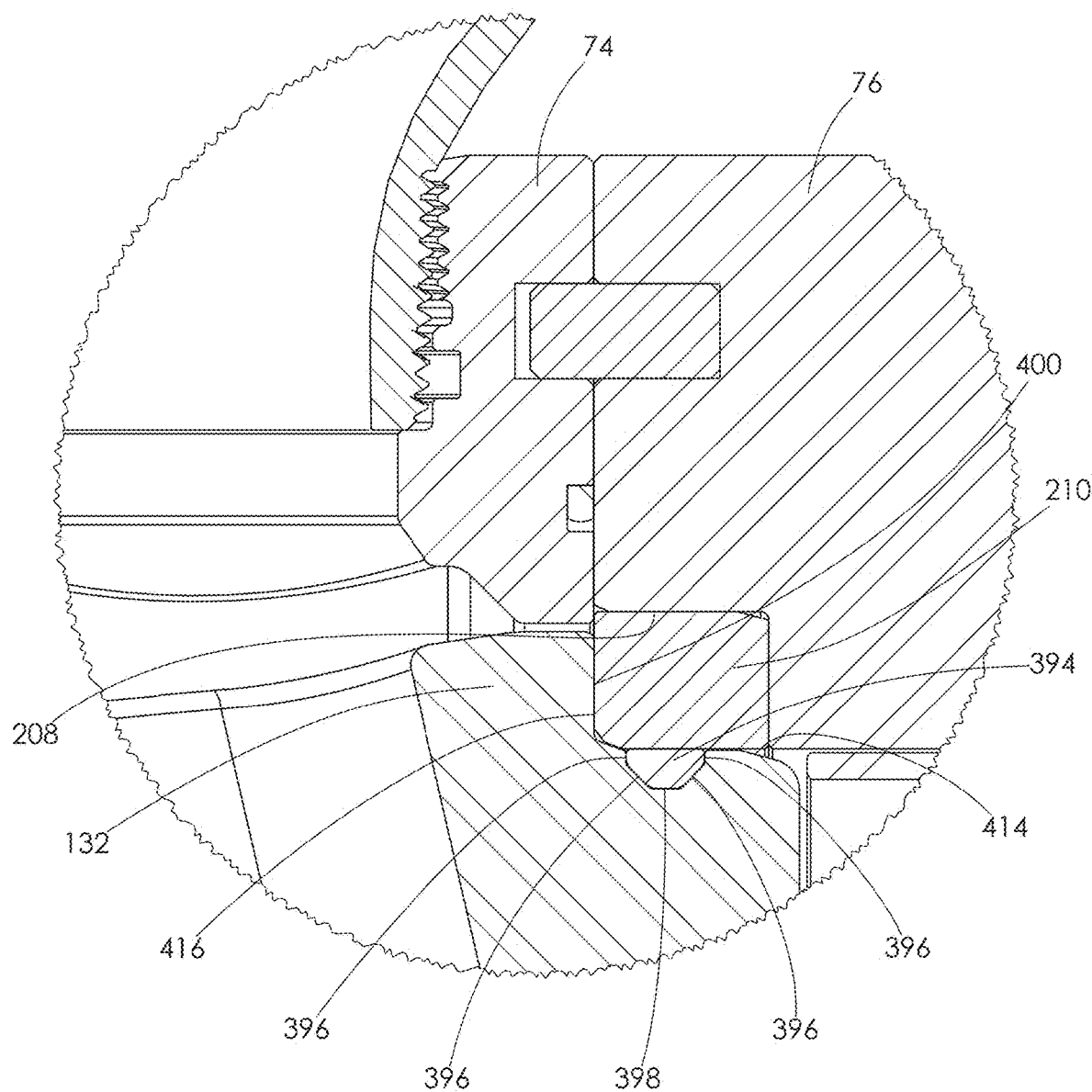
FIG. 42 is an enlarged view of area I shown in FIG. 41.
Figure 44:
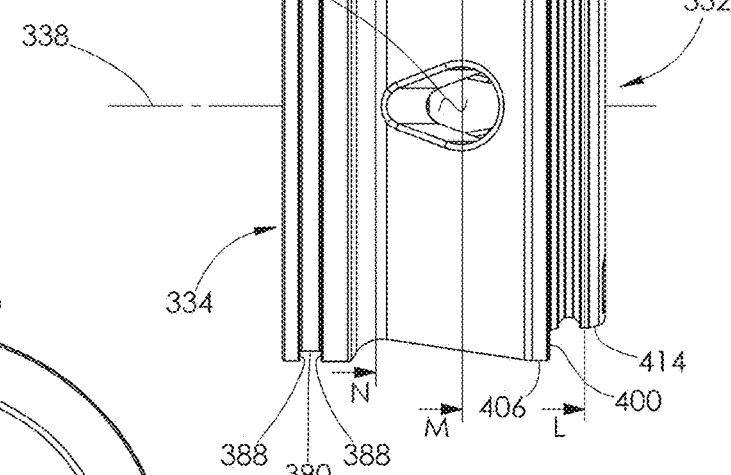
FIG. 44 is a top plan view of the fluid routing plug shown in FIG. 43.
Figure 45:
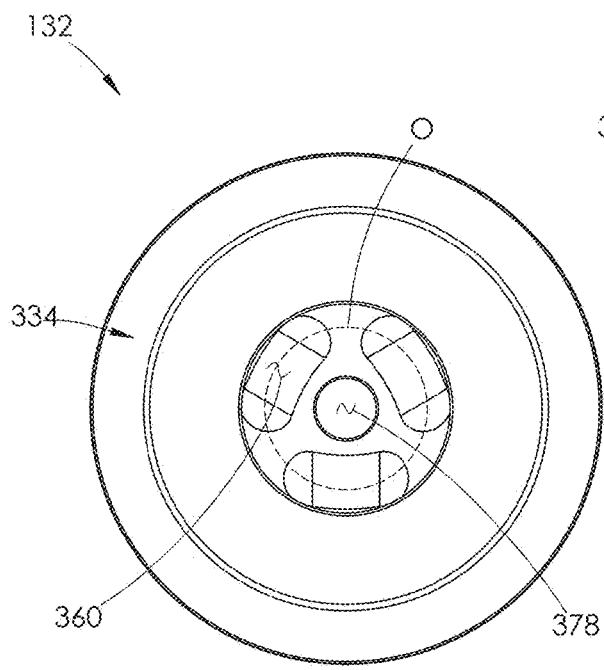
FIG. 45 is a front elevational view of the fluid routing plug shown in FIG. 43.

With reference to FIGS. 42, 44, and 48, a second annular groove 392 is formed in the outer intermediate surface 336 of the body 330 for housing a second seal 394. The second groove 392 is positioned adjacent the suction surface 332 and is characterized by a plurality of side walls 396 joined by a base 398, as shown in FIG. 42. Four side walls 396 are shown in FIG. 42 such that the groove 392 has a rounded shape. When the fluid routing plug 132 is installed within the housing 60, the second seal 394 engages an inner intermediate surface 420 of the hardened insert 210, as shown in FIG. 42. During operation, the second seal 394 wears against the insert 210. If the insert 210 begins to erode, the insert 210 may be removed and replaced with a new insert 210.

Continuing with FIGS. 42, 44, and 48, the outer intermediate surface 336 of the body 330 further comprises an annular shoulder 400 formed in the body 330. The shoulder 400 is positioned between the opening 344 of the suction passages 340 and the second groove 392. When the fluid routing plug 132 is installed within the housing 60, the shoulder 400 abuts a front surface 416 of the insert 210, as shown in FIG. 42. Axial movement of the fluid routing plug 132 towards the rear surface 66 of the housing 60 is prevented by the engagement between the shoulder 400 and the insert 210. During operation, the shoulder 400 may wear against the insert 210. If either feature begins to wear, the fluid routing plug 132 and/or the insert 210 may be removed and replaced with a new fluid routing plug 132 and/or insert 210.

Continuing with FIGS. 40, 41, 44, and 48, the outer intermediate surface 336 of the body 330 adjacent the first groove 384 is characterized as a first cylindrical surface 404. Likewise, the outer intermediate surface 336 adjacent the annular shoulder 400 is characterized as a second cylindrical surface 406. The first cylindrical surface 404 has a maximum outer diameter that is equal or almost equal to a maximum outer diameter of the second cylindrical surface 406. The surfaces 404 and 406 are configured to closely face the walls surrounding the horizontal bore 70 within the second section 74 of the housing 60, as shown in FIGS. 40 and 41.

Continuing with FIGS. 40, 41, 44, 48, and 49, the outer intermediate surface 336 of the body 330 further comprises a first bevel 408 joined to a transition surface 410 formed in the body 330. The first bevel 408 and the transition surface 410 are positioned between the first cylindrical surface 404 and the openings 344 of the suction passages 340. The outer intermediate surface 336 of the body 330 slowly tapers outward from the transition surface 410 to the second cylindrical surface 406.

Continuing with FIGS. 40 and 41, when the fluid routing plug 132 is installed within the housing 60, the first bevel 408 provides clearance between the outer intermediate surface 336 of the fluid routing plug 132 and an opening of the suction bores 160 and 162. Such clearance gives way to an annular fluid channel 412 formed between the housing 60 and the fluid routing plug 132. The shape of the outer intermediate surface 336 of the fluid routing plug 132 between the first and second cylindrical surfaces 404 and 406 helps direct fluid flowing from the suction bores 160 and 162 into the openings 344 of the suction passages 340 while minimizing fluid turbulence.

Turning back to FIG. 42, the outer intermediate surface 336 of the body 330 further comprises a second bevel 414 formed in the body 330. The second bevel 414 is positioned between the suction surface 332 and the second groove 392. The second bevel 414 provides clearance to help install the fluid routing plug 132 within the housing 60 and the insert 210.

Hardened Insert

With reference to FIGS. 42 and 60-63, the insert 210 has an annular shape and comprises opposed front and rear surfaces 416 and 418 joined by inner and outer intermediate surfaces 420 and 422. The insert 210 further comprises a first bevel 426 formed in the inner intermediate surface 420 adjacent the front surface 416, as shown in FIG. 63. The first bevel 426 provides clearance to assist in installing the fluid routing plug 132 within the insert 210 within the housing 60, as shown in FIG. 42. The insert 210 also comprises a second bevel 424 formed in the outer intermediate surface 422 adjacent the rear surface 418. The second bevel 424 provides clearance to assist in installing the insert 210 within the counterbore 208 formed in the third section 76 of the housing 60, as shown in FIG. 42. The insert 210 is made of a harder and more wear resistant material than the housing 60. For example, if the housing 60 is made of stainless steel, the insert 210 may be made of tungsten carbide.

Suction and Discharge Valves

With reference to FIGS. 40, 41, and 64-67, the flow of fluid throughout the housing 60 and the fluid routing plug 132 is regulated by the suction and discharge valves 214 and 138. The suction valve 214 is configured to engage the suction surface 332, and the discharge valve 138 is configured to engage the discharge surface 334 of the fluid routing plug 132 such that the surfaces 332 and 334 function as valve seats. The valves 214 and 138 are similar in shape but may vary in size. As shown in FIGS. 40 and 41, the discharge valve 138 is slightly larger than suction valve 214.

Figure 66:
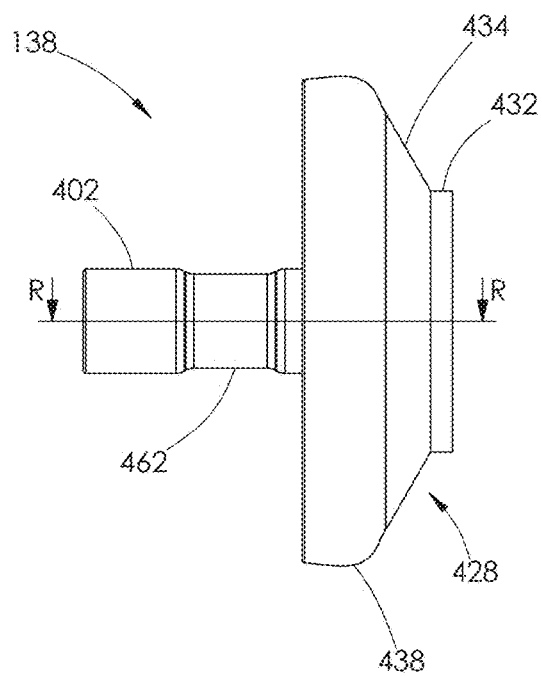
FIG. 66 is a side elevational view of the discharge valve shown in FIG. 64.
Figure 67:
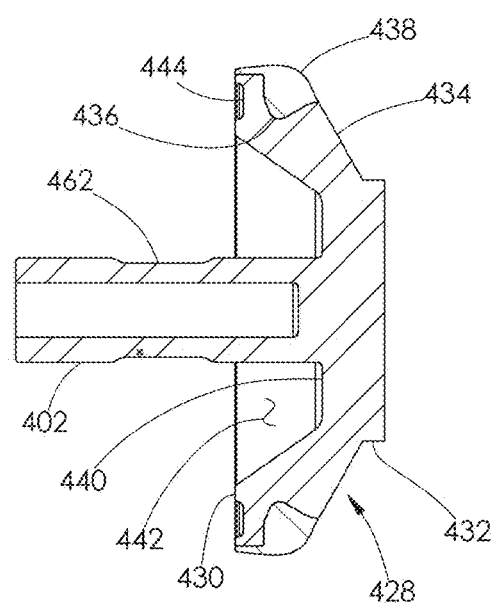
FIG. 67 is a cross-sectional view of the discharge valve shown in FIG. 66, taken along line R-R.
Figure 68:
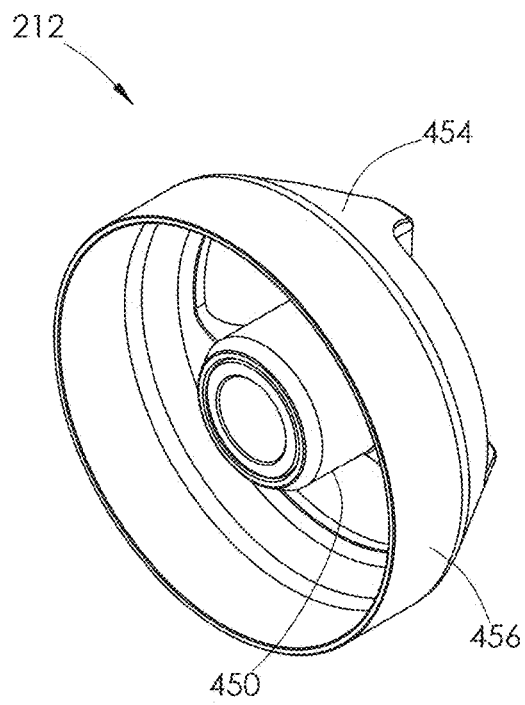
FIG. 68 is a front perspective view of the suction valve guide shown in FIGS. 40 and 41.
Figure 69:
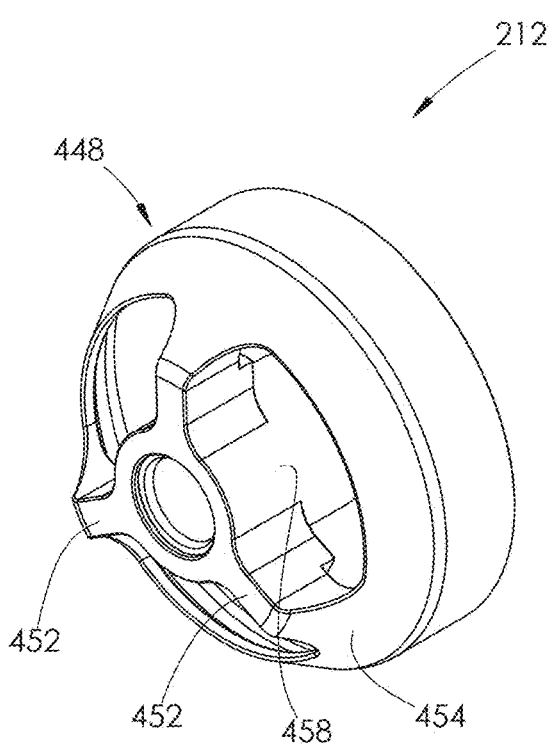
FIG. 69 is a rear perspective view of the suction valve guide shown in FIG. 68.
Figure 70:
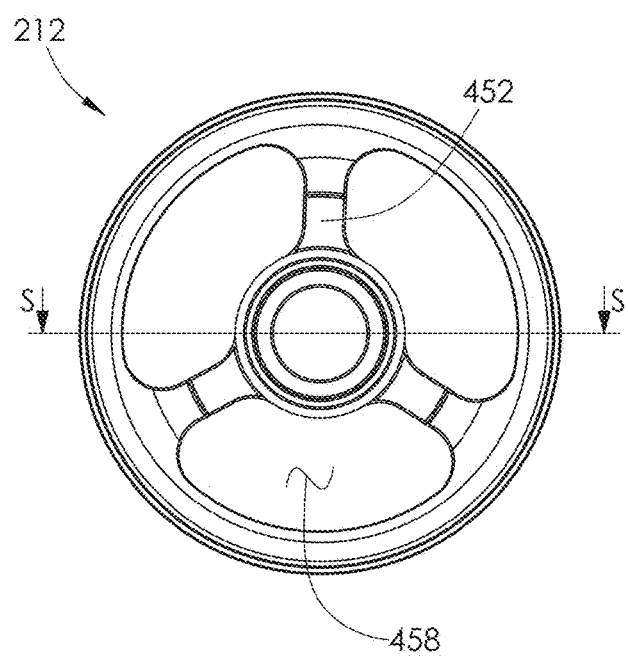
FIG. 70 is a front elevational view of the suction valve guide shown in FIG. 68.

Continuing with FIGS. 64-67, the discharge valve 138 is shown in more detail. The suction valve 214 has the same features as the discharge valve 138 so only the discharge valve 138 is shown in more detail in the figures. The discharge valve 138 comprises a stem 402 joined to a body 428. The body 428 comprises an outer rim 430 joined to a valve insert 432 by a tapered seating surface 434. An annular cutout 436 formed within the seating surface 434 is configured to house a seal 438, as shown in FIG. 67.

Continuing with FIGS. 40 and 41, during operation, the seating surface 434 and the seal 438 engage the seating surface 372 of the discharge surface 334 and block fluid from entering or exiting the discharge passages 360, as shown in FIG. 40. Likewise, the seating surface 434 and the seal 438 on the suction valve 214 engage the seating surface 366 of the suction surface 332 and block fluid from entering or exiting the suction passages 340, as shown in FIG. 41.

Continuing with FIGS. 40 and 41, when the seating surfaces 434 and 372 are engaged, the valve insert 432 extends partially into the counterbore 380 formed in the discharge surface 334. Fluid exiting the second openings 376 of the discharge passages 360 contacts the insert 432, pushing the discharge valve 138 away from the discharge surface 334 before flowing around the seating surface 434 of the discharge valve 138. Such motion enlarges the area for fluid to flow between the seating surfaces 372 and 434 before fluid reaches the surfaces 372 and 434, thereby reducing the velocity of fluid flow within such area. The lowered fluid velocity between the surfaces 372 and 434 causes any wear to the valve 138 or 214 to be concentrated at the insert 432 instead of the crucial sealing elements, thereby extending the life of the valve 138 or 214.

Likewise, the insert 432 on the suction valve 214 extends partially into the opening of the blind bore 342. Fluid within the blind bore 342 contacts the insert 432 before flowing around the seating surface 434 and seal 438 of the suction valve 214. Such motion enlarges the area for fluid to flow between the seating surfaces 366 and 434 before fluid reaches the surfaces 366 and 434, thereby reducing the velocity of fluid flow within such area.

Continuing with FIGS. 64-67, the stem 402 projects from a top surface 440 of the body 428 of the valve 138 or 214. The outer rim 430 surrounds the stem 402 and is spaced from the stem 402 by an annular void 442. A groove 444 is formed in the outer rim 430 for receiving a portion of a spring 446, as shown in FIGS. 40 and 41.

Continuing with FIGS. 40 and 41, during operation, the valves 138 and 214 move axially along the longitudinal axis 62 of the housing 60 between open and closed positions. In the closed position, the seating surface 434 and the seal 438 of each of the valves 138 and 214 tightly engage the corresponding seating surface 372 or 366 of the fluid routing plug 132 and the valve insert 432 is disposed within the corresponding bore 380 or 342. In the open position, the seating surface 434 and the seal 438 are spaced from the corresponding seating surface 372 or 366 of the fluid routing plug 132 and the valve insert 432 is spaced from the corresponding bore 380 or 342.

Suction Valve Guide

With reference to FIGS. 40, 41, and 68-71, axial movement of the suction valve 214 is guided by the suction valve guide 212. The suction valve guide 212 comprises a thin-walled skirt 448 joined to a body 450 by a plurality of support arms 452. The skirt 448 comprises a tapered upper section 454 joined to a cylindrical lower section 456. The plurality of arms 452 join the tapered upper section 454 to the body 450. A plurality of flow ports 458 are formed between adjacent arms 452 such that fluid may pass through the suction valve guide 212 during operation.

Continuing with FIGS. 40 and 41, the suction valve guide 212 is installed within the housing 60 such that the tapered upper section 454 engages a tapered surface 455 of the walls surrounding the horizontal bore 70. Such engagement prevents further axial movement of the suction valve guide 212 within the housing 60. When the suction valve guide 212 is installed within the housing 60, the skirt 448 covers the walls of the housing 60 positioned between the flow ports 458 and the fluid routing plug 132. During operation, fluid wears against the skirt 448, thereby protecting the housing 60 from wear and erosion. If the skirt 448 begins to erode, the suction valve guide 212 can be removed and replaced with a new guide 212.

Figure 71:
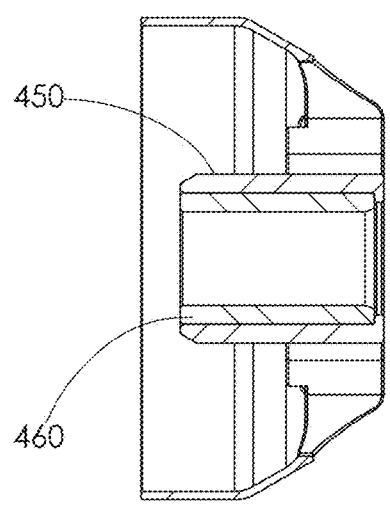
FIG. 71 is a cross-sectional view of the suction valve guide shown in FIG. 70, taken along line S-S.
Figure 72:
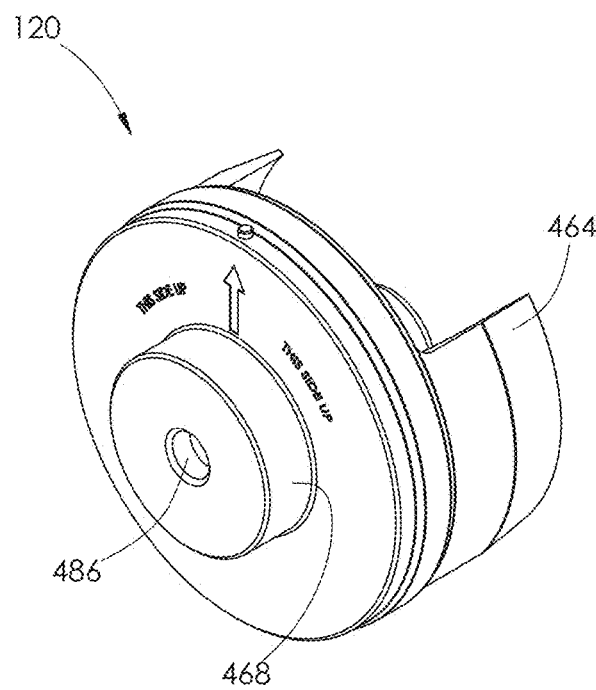
FIG. 72 is a front perspective view of the discharge plug shown in FIGS. 40 and 41.
Figure 73:
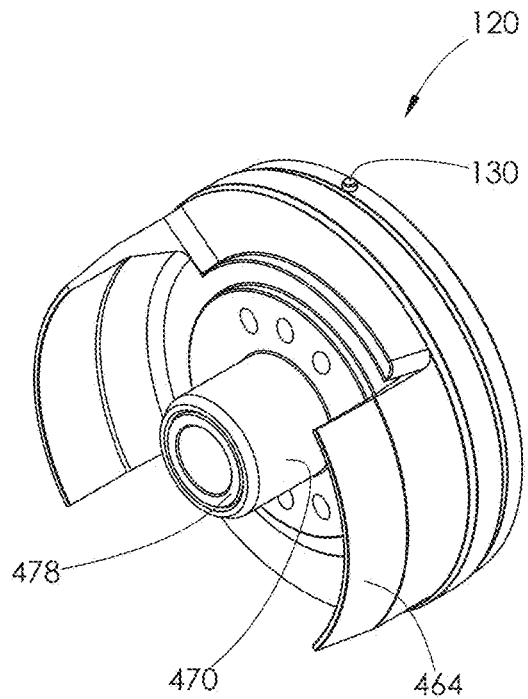
FIG. 73 is a rear perspective view of the discharge plug shown in FIG. 72.
Figure 74:
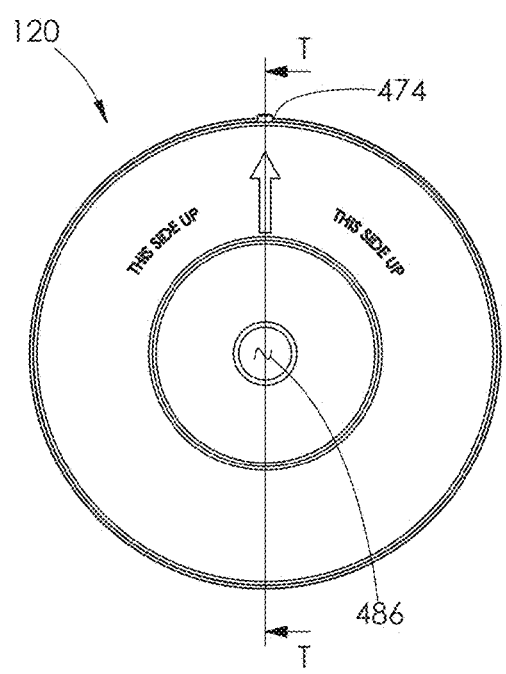
FIG. 74 is a front elevational view of the discharge plug shown in FIG. 72.

Continuing with FIGS. 40, 41, and 68-71, the body 450 of the suction valve guide 212 is tubular and is centered within the skirt 448. A tubular insert 460 is installed within the body 450, as shown in FIG. 71. The insert 460 is configured to receive the stem 402 of the suction valve 214, as shown in FIGS. 40 and 41. During operation, the stem 402 moves axially within the insert 460 and wears against the insert 460. An annular cutout 462 formed in the stem 402, shown in FIGS. 66 and 67, provides space for any fluid or other material trapped between the stem 402 and the insert 460. The insert 460 is made of a harder and more wear resistant material than the body 450 thereby extending the life of the suction valve guide 212. For example, if the body 450 is made of stainless steel, the insert 460 may be made of tungsten carbide.

Continuing with FIGS. 40 and 41, a spring 446 is positioned between the outer rim 430 of the suction valve 214 and the plurality of arms 452 such that the spring 446 surrounds at least a portion of the body 450 of the suction valve guide 212. During operation, the spring 446 biases the suction valve 212 in a closed position, as shown in FIG. 41. Fluid pushing against the valve insert 432 moves the suction valve 214 axially to compress the spring 446 and move the suction valve 214 to an open position, as shown in FIG. 40.

Discharge Plug

With reference to FIGS. 40, 41, and 72-75, axial movement of the discharge valve 138 is guided by the discharge plug 120. The discharge plug 120 comprises a pair of legs 464 joined to a body 466. The body 466 comprises a front portion 468 joined to a rear portion 470 by a medial portion 472. The medial portion 472 has a larger outer diameter than both the front and rear portions 468 and 470. An outer surface of the medial portion 472 engages the seal 126 installed within the first section 72 of the housing 60, as shown in FIGS. 40 and 41. The pair of legs 464 are joined to the medial portion 472 and extend between the medial portion 472 and the discharge surface 334 of the fluid routing plug 132.

Continuing with FIGS. 40, 41, and 72-75, a dowel opening 474 is formed in the outer surface of the medial portion 472 for receiving the locating dowel pin 130. The discharge plug 120 is installed within the first section 72 of the housing 60 such that the locating dowel pin 130 is installed within the dowel opening 474 formed in the medial portion 472 and the locating cutout 128 formed in the first section 72 of the housing 60. Such installation aligns the discharge plug 120 within the housing 60 so that the pair of legs 464 do not block the openings of the upper and lower discharge bores 102 and 104.

Continuing with FIGS. 40 and 41, the locating cutout 128 may be large enough to provide sufficient clearance for installation of the locating dowel pin 130 within the locating cutout 128. The locating cutout 128 is sized to allow maximum clearance for assembly, but still maintain an acceptable rotational position of the discharge plug 120. For example, the cutout 128 may be a maximum of 15 degrees wide along the circumference of the horizontal bore 70.

Figure 75:
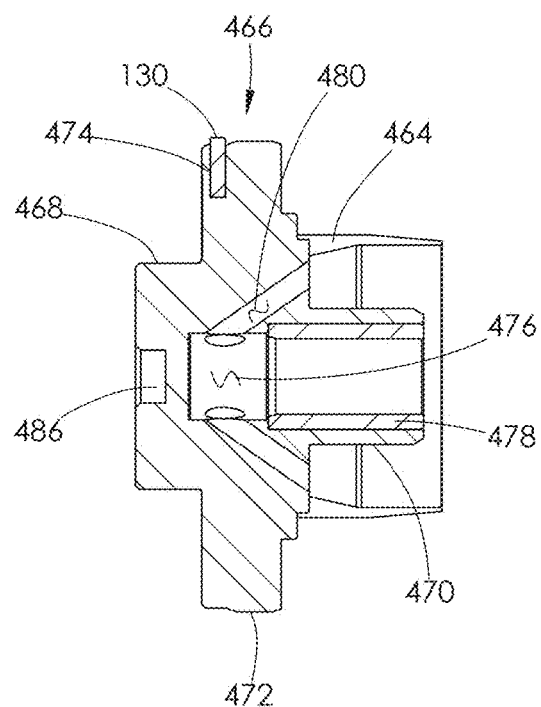
FIG. 75 is a cross-sectional view of the discharge plug shown in FIG. 74, taken along line T-T.

Continuing with FIG. 75, a blind bore 476 extends within the body 466 and opens on the rear portion 470 of the body 466. The bore 476 is sized to receive a tubular insert 478. The tubular insert 478 is similar to the tubular insert 460 installed within the suction valve guide 212. The tubular insert 478 is configured to receive the stem 402 of the discharge valve 138, as shown in FIGS. 40 and 41.

Continuing with FIGS. 40, 41, and 75, during operation, the stem 402 moves axially within the tubular insert 478. A plurality of passages 480 are formed in the body 466 and interconnect the bore 476 and an outer surface of the medial portion 472. During operation, any fluid or other material trapped within the bore 476 exits the discharge plug 120 through the passages 480. A spring 446 is positioned between the medial portion 472 of the plug 120 and the outer rim 430 of the discharge valve 138, as shown in FIGS. 40 and 41. The spring 446 biases the discharge valve 138 in the closed position, as shown in FIG. 40. Fluid pushing against the valve insert 432 moves the discharge valve 138 axially to compress the spring 446 and move the discharge valve 138 to an open position, as shown in FIG. 41.

Continuing with FIGS. 40, 41, 72, and 75, the front portion 468 of the body 466 is sized to be disposed within a counterbore 482 formed within the front retainer 118. When disposed therein, a rear surface 484 of the front retainer 118 abuts an outer surface of the medial portion 472 of the discharge plug 120, as shown in FIGS. 40 and 42. Such engagement holds the discharge plug 120 in place between the front retainer 118 and the fluid routing plug 132.

A blind bore 486 is formed in an outer surface of the front portion 468 of the plug 120. The blind bore 486 is configured to engage a tool used to help install or remove the plug 120 from the housing 60. For example, the bore 486 may have threaded walls.

Front Retainer

With reference to FIGS. 40, 41, 76, and 77, the front retainer 118 comprises opposed front and rear surfaces 488 and 484 joined by an outer surface having external threads 124 and a horizontal bore 490 formed therein. The horizontal bore 490 comprises a hex portion 492 that opens in the counterbore 482, as shown in FIGS. 40 and 41. The hex portion 492 is configured to mate with a tool used to thread the front retainer 118 into the housing 60 until it abuts the discharge plug 120, as shown in FIGS. 40 and 41. An annular void 494 is formed within the front surface 488 of the front retainer 118. The annular void 494 decreases the weight of the front retainer 118, making it easier to thread into the housing 60.

Discharge Conduits and Manifold

With reference to FIG. 41, each discharge fitting 108 comprises a support base 502 and a connection end 512. A discharge fitting adapter 504 is installed within the counterbore 106 formed in the upper and lower discharge bores 102 and 104. When installed, the seal 112 engages an outer surface of the fitting adapter 504. A groove 505 is formed with the discharge fitting 108 for receiving a second seal 507. The second seal 507 likewise engages an outer surface of the fitting adapter 504.

Continuing with FIG. 41, the support base 502 is sized to abut the outer intermediate surface 68 of the first section 72 of the housing 60. The support base 502 comprises a plurality of passages 506, shown in FIG. 29, configured to align with the threaded openings 114 formed in the intermediate surface 68 and surrounding the discharge bores 102 and 104. The threaded fasteners 116 are installed within the aligned passages 506 and openings 114 and tightened to secure the discharge fitting 108 to the first section 72.

With reference to FIGS. 3 and 41, the connection end 512 of the discharge fitting 108 is configured to mate within one or more discharge conduits 500 included in an upper or lower discharge manifold 514 or 516, as shown in FIG. 3. The upper and lower discharge manifolds 514 and 516 are supported on rack 518, as shown in FIG. 3. The fluid end assembly 52 is disposed within the interior open area of the rack 518. The rack 518 supports the upper and lower discharge manifolds 514 and 516 in a spaced position from the discharge bores 102 and 104. As a result, each discharge conduit 500 has an angled or bent shape. In operation, fluid discharges from the housing 60 through upper and lower discharge bores 102 and 104 and is carried to the corresponding upper or lower discharge manifolds 514 or 516 by the discharge fittings and conduits 108 and 500.

Suction Conduits and Manifold

Figure 78:
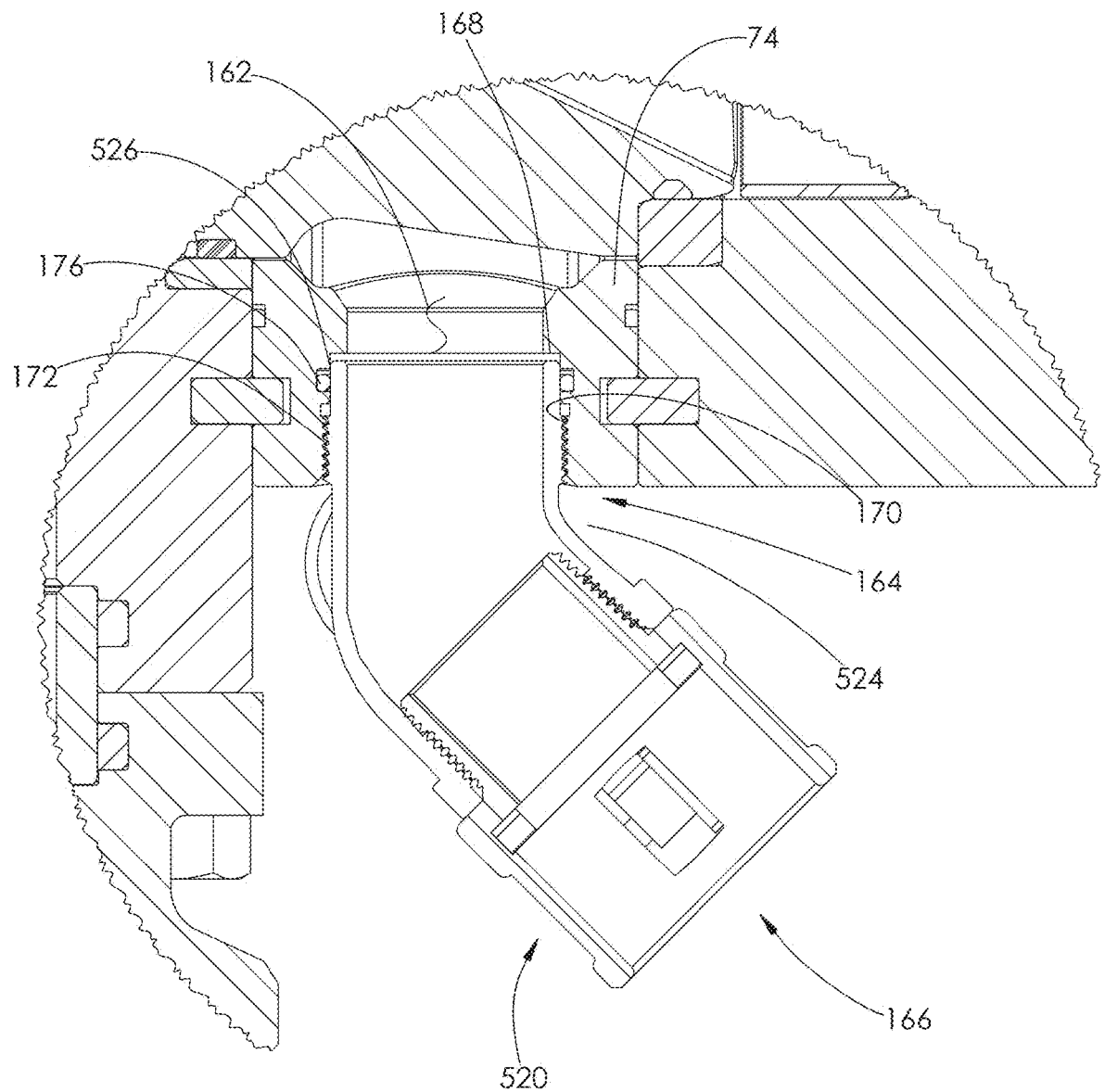
FIG. 78 is an enlarged view of area U shown in FIG. 41.
Figure 79:
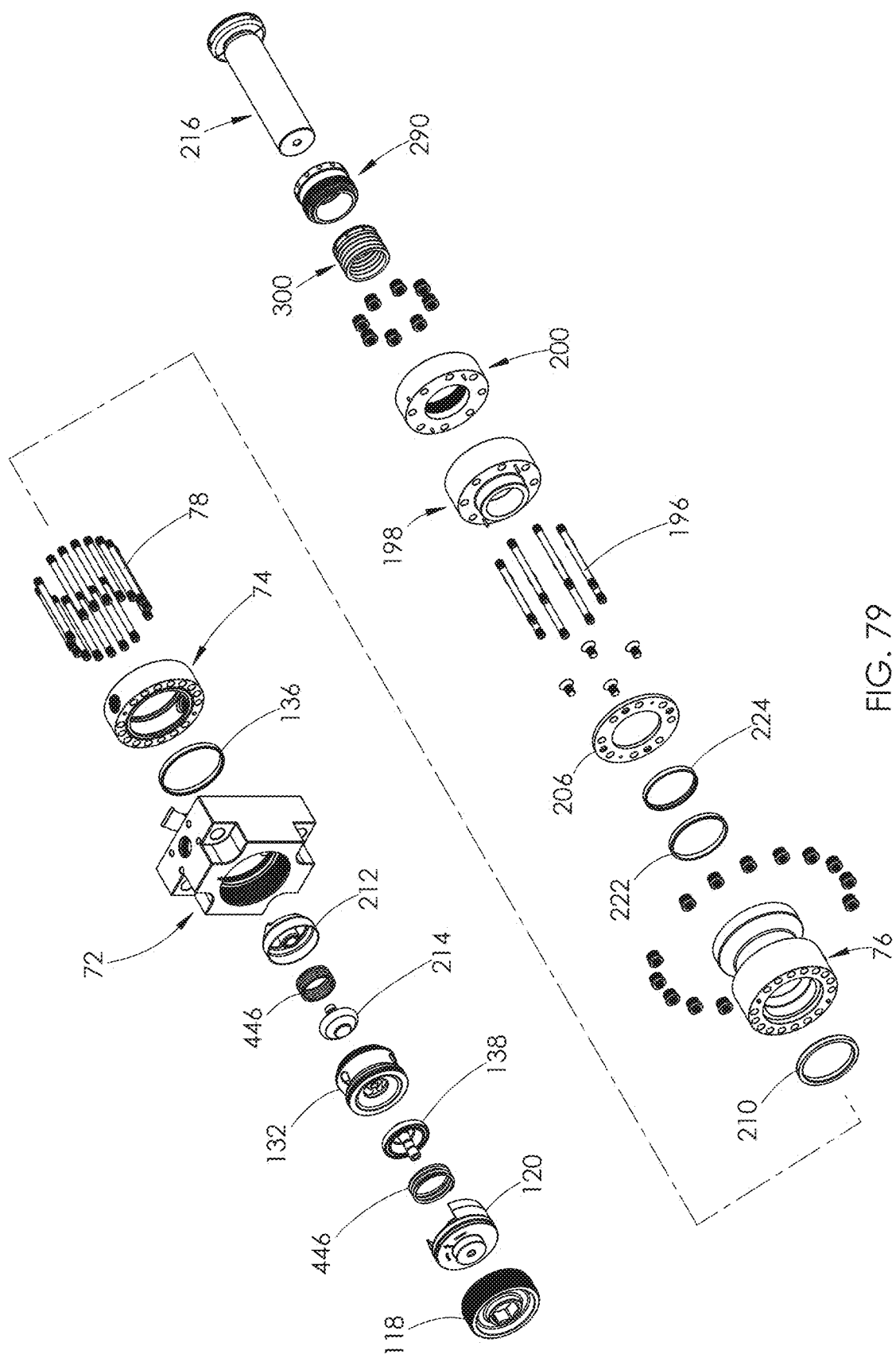
FIG. 79 is a front perspective and exploded view of the fluid end section shown in FIGS. 9, 29, 40, and 41.

With reference to FIGS. 41 and 78, each suction conduit 166 comprises the first connection member 164 joined to a second connection member 520 by threads, as shown in FIG. 78. The first and second connection members 164 and 520 may be made of a metal or hardened material.

Continuing with FIG. 78, the first connection member 164 comprises upper portion 524 joined to a lower portion 526. External threads 172 are formed on a portion of the lower portion 526 for mating with the internal threads 170 formed in the suction bores 160 or 162. The seal 176 installed within the housing 60 engages a cylindrical outer surface of the lower portion 526 below the external threads 172. The upper portion 524 has a larger outer diameter than the lower portion 526 and is positioned outside of the housing 60. The lower portion 526 abuts the counterbore 168 of the suction bores 160 and 162 of the second section 74 of the housing 60.

With reference to FIGS. 3 and 78, the second connection member 520 is configured to mate with one or more connection members or hoses 528 formed on an upper or lower suction manifold 530 or 532. The upper and lower suction manifolds 530 and 532 are supported on the rack 518 adjacent the discharge manifolds 514 and 516. The connection members or hoses 528 may be flexible so that they may bend, as needed, to properly interconnect the suction conduits 166 and the suction manifolds 530 and 532. In operation, fluid is drawn into the housing 60 from the suction manifolds 530 and 532 via the connection members 528, the suction conduits 166, and the upper and lower suction bores 160 and 162.

Assembly of Fluid End Section and Assembly

Turning to FIGS. 9, 29, 79, and 80, prior to assembling the housing 60, the wear ring 136 is preferably first pressed into the counterbore 134 formed in the first section 72 of the housing 60. Likewise, the hardened insert 210 is pressed into the counterbore 208 formed in the third section 76 of the housing 60. The seals 126, 112, and 176 may also be installed within the first and second sections 72 and 74 of the housing 60. The wear ring 222 and seal 224 may also be installed within the third section 76 of the housing 60 prior to assembling the housing 60.

Following installation of the above described components, the housing 60 may be assembled as described above. Thereafter, the retention plates 206, stuffing box 198, rear retainer 200, plunger packing 300, and packing nut 290 may be attached to the rear surface 66 of the housing 60. The inner components of the housing 60 are inserted within the housing 60 through the front surface 64 of the first section 72. The inner components may be installed prior to attaching the components to the rear surface 66 of the housing 60, if desired. Following assembly of each fluid end section 56, each section 56 is attached to the power end assembly 54 using the stay rods 58.

Each fluid end section 56 and its various components are heavy and cumbersome. Various tools or lifting mechanisms may be used to assemble the fluid end assembly 52 and attach it to the power end assembly 54, creating the high pressure pump 50.

Operation of Fluid End Assembly

Turning back to FIGS. 40 and 41, in operation, retraction of the plunger 216 out of the housing 60 pulls fluid from the upper and lower suction bores 160 and 162 into the suction passages 340 within the fluid routing plug 132. Fluid flowing through the suction passages 340 and into the blind bore 342 pushes on the valve insert 432 of the suction valve 214, causing the valve 214 to compress the spring 446 and move to an open position, as shown in FIG. 40. When in the open position, fluid flows around the suction valve 214 and the suction valve guide 212 and into the open horizontal bore 70 within the third section 76 of the housing 60.

Continuing with FIG. 41, extension of the plunger 216 further into the housing 60 pushes against fluid within the open horizontal bore 70 and forces the fluid towards the suction surface 332 of the fluid routing plug 132. Such motion also causes the suction valve 214 to move to a closed position, sealing the opening of the blind bore 342. Because the bore 342 is sealed, fluid is forced into the discharge passages 360.

Fluid flowing through the discharge passages 360 contacts the valve insert 432 on the discharge valve 138, causing the discharge valve 138 to compress the spring 446 and move into an open position, as shown in FIG. 41. When in the open position, fluid flows around the discharge valve 138 and into the upper and lower discharge bores 102 and 104. Because fluid exiting the discharge passages 360 has been compressed by extension of the plunger 216 into the housing 60, such fluid has a higher fluid pressure than that entering the housing 60 through the suction bores 160 and 162.

Figure 1:
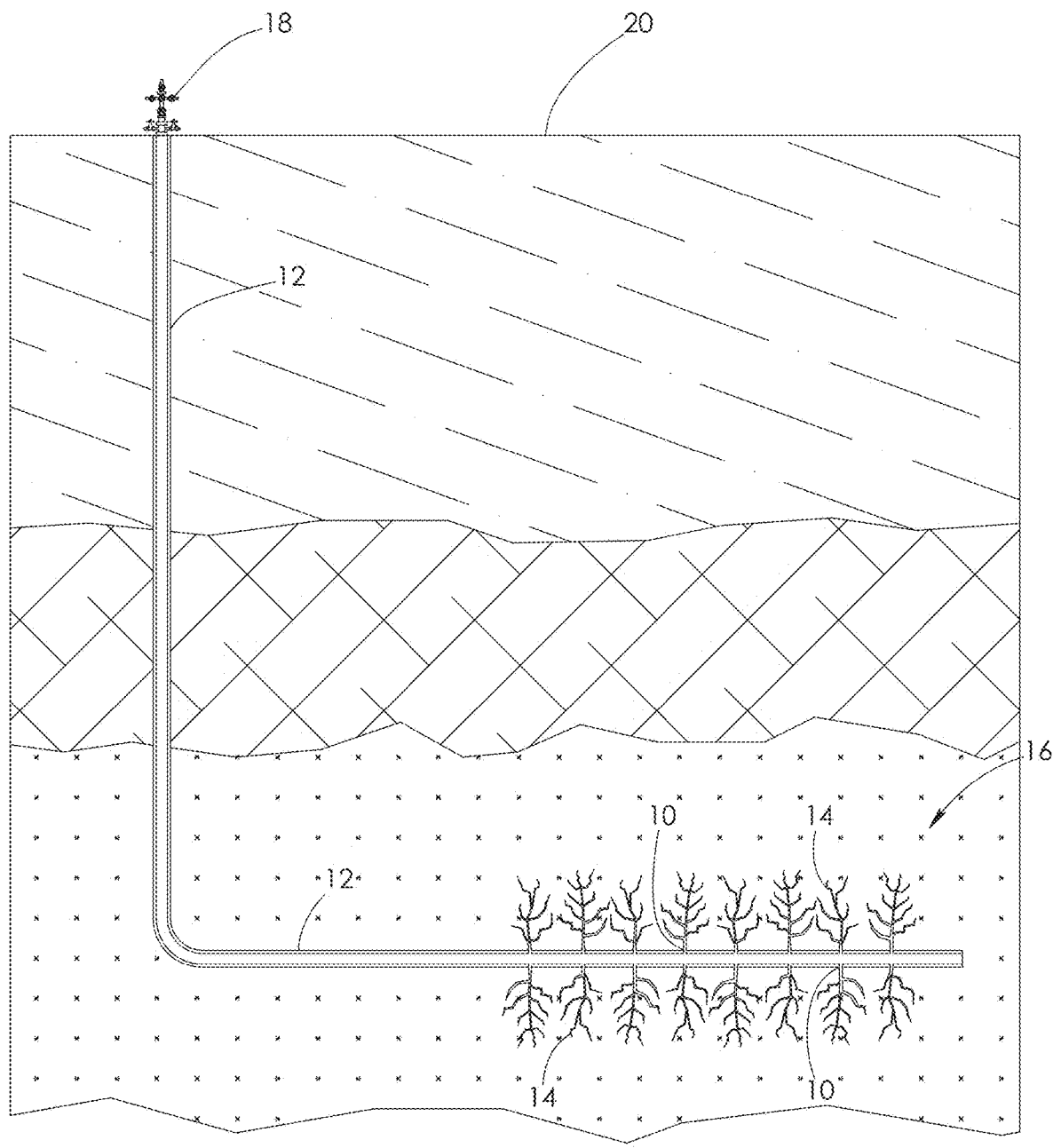
FIG. 1 is an illustration of the underground environment of a hydraulic fracturing operation.
Figure 2:
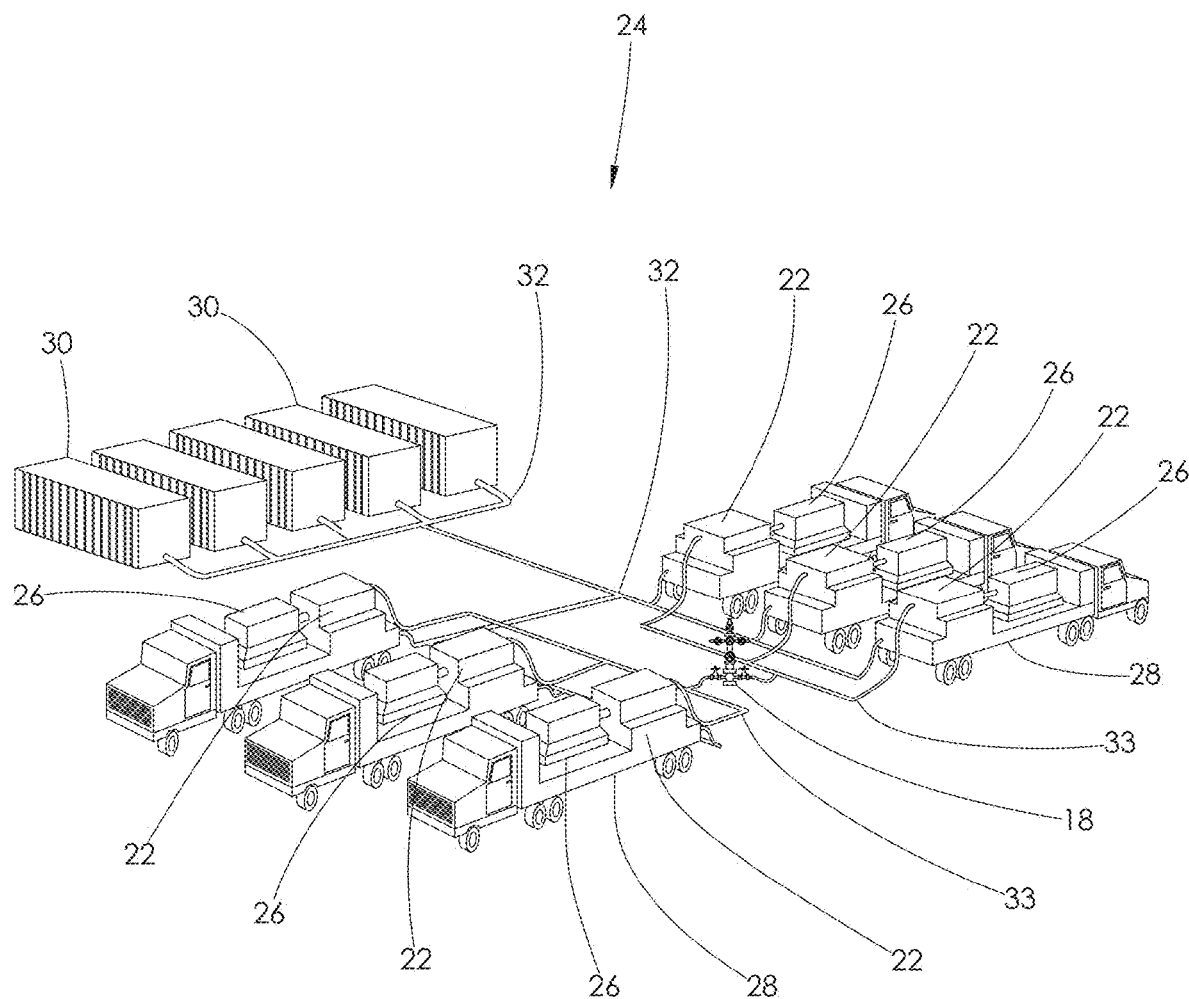
FIG. 2 illustrates above-ground equipment used in a hydraulic fracturing operation.

During operation, the plunger 216 continually reciprocates within the housing 60, pressurizing all fluid drawn into the housing 60 through the suction bores 160 and 162. Pressurized fluid exiting the housing 60 through the upper and lower discharge bores 102 and 104 is delivered to the upper and lower discharge manifolds 514 and 516 in communication with each of the fluid end sections 56. Pressurized fluid within the discharge manifolds 514 and 516 is eventually delivered to the wellhead 18, as shown in FIG. 2.

ALTERNATIVE EMBODIMENTS

Turning to FIGS. 81-119, alternative embodiments of fluid routing plugs that may be used with the fluid end assembly 52 are described in more detail. The alternative embodiments of fluid routing plugs are shown installed within alternative embodiments of fluid end sections in FIGS. 81-119. Such fluid end section embodiments are described in more detail in U.S. Pat. No. 11,808,254 authored by Thomas, et al., and filed on Aug. 10, 2022, the entire contents of which are incorporated herein by reference. To the extent any features of the alternative fluid end section embodiments are the same or nearly the same as features of the fluid end section 56, for ease of reference, such features will be given the same reference numbers as those described above. Likewise, to the extent any features of the fluid routing plug 132 and the various fluid routing plug embodiments are the same or nearly the same, such features will be given the same reference numbers herein, for ease of reference.

With reference to FIGS. 81-100, another embodiment of a fluid routing plug 600 is shown. The fluid routing plug 600 is installed within another embodiment of a housing 602. The housing 602 comprises an integral first and second section 604 joined to the third section 76, as shown in FIG. 81. The fluid routing plug 600 comprises a body 606 having a suction surface 608 and an opposed discharge surface 610 joined by an outer intermediate surface 612, as shown in FIGS. 84-87. The suction and discharge surfaces 608 and 610 are generally identical to the suction and discharge surfaces 332 and 334 of the fluid routing plug 132.

Continuing with FIGS. 81-100, a central longitudinal axis 613 extends through the body 606 and the suction and discharge surfaces 608 and 610, as shown in FIG. 87. When the fluid routing plug 600 is installed within the housing 602, most of the plug 600 is installed within the integral section 604, but at least a portion of the suction surface 608 is positioned within the third section 76 of the housing 602, as shown in FIG. 81.

Continuing with FIGS. 84-100, the body 606 further comprises a plurality of suction fluid passages 614. The suction passages 614 interconnect the intermediate surface 612 and the suction surface 608 of the body 606, as shown in FIG. 87. The connection is formed within an axially-blind bore 616 formed within the suction surface 608 of the body 606. The suction passages 614 are generally identical to the suction passages 340 formed in the fluid routing plug 132, but the passages 614 are oriented differently within the body 606.

Continuing with FIGS. 88 and 89, an opening 618 of each suction passage 614 on the intermediate surface 612 comprises a first side wall 620 joined to a second side wall 622 by first and second ends 624 and 626. The first and second side walls 620 and 622 are straight lines of equal length S1, and the first and second ends 624 and 626 are circular arcs, as shown in FIG. 89.

Continuing with FIG. 89, the first end 624 of the opening 618 has a radius of R1 with a center at C1, and the second end 626 has a radius of R2 with a center at C2. The first end 624 is larger than the second end 626 such that R1>R2. The first and second side walls 620 and 622 are tangent to the first and second ends 624 and 626 and have an included angle, σ1. The opening 618 is oriented such that the center C1 of the first end 624 is a perpendicular distance D from the central longitudinal axis 613.

Continuing with FIG. 89, the opening 618 has a centerline 628 that connects the centers C1 and C2 of the first and second ends 624 and 626. The centerline 628 has a length E1 and forms an angle χ with the central longitudinal axis 613, further orienting the opening 618. A cross-sectional shape of each suction passage 614 throughout the length of the body 606 corresponds with the shape of each opening 618, as shown in FIGS. 84 and 87. Each suction passage 614 is sized and shaped to maximize fluid flow through the passage 614 and minimize fluid turbulence and stress to the body 606 of the fluid routing plug 600.

With reference to FIGS. 91 and 97, each suction fluid passage 614 extends between the axially-blind bore 616 and the intermediate surface 612 such that each suction passage 614 comprises a first longitudinal axis 630 and a second longitudinal axis 632. The first longitudinal axis 630 extends through the center C1 of the first end 624 of the opening 618, as shown in FIG. 91. Like the center C1, the first longitudinal axis 630 is offset a perpendicular distance D from the central longitudinal axis 613. The first longitudinal axis 630 does not intersect, is not parallel to, and is not co-planar with the central longitudinal axis 613.

The second longitudinal axis 632 extends through point P, shown on FIG. 91. The second longitudinal axis 632 may intersect and be co-planar with the central longitudinal axis 613, as shown in FIGS. 91 and 97. The configuration of the suction passages 614 encourages a vortex type fluid flow about the central longitudinal axis 613 of the body 606, thereby reducing fluid turbulence and erosion during operation.

Continuing with FIGS. 85-87, the body 606 further comprises a plurality of discharge fluid passages 634. The discharge passages 634 interconnect the suction surface 608 and the discharge surface 610 of the body 606 and do not intersect any of the suction passages 614. The discharge passages 634 are generally identical to the discharge passages 360 formed in the fluid routing plug 132, but the passages 634 are oriented differently within the body 606.

With reference to FIGS. 85, 86, 90, 92, and 93, each discharge passage 634 opens at a first opening 636 on an outer rim 638 of the suction surface 608, as shown in FIGS. 92 and 93, and opens at a second opening 640 on a central base 642 of the discharge surface 610, as shown in FIGS. 85 and 86. A position of the first and second openings 636 and 640 of each discharge passage 634 may be determined relative to a plane containing a line 644 that is perpendicular to the central longitudinal axis 613, as shown in FIG. 90. The first opening 636, when projected onto the plane, is positioned at a first distance F1 from the central longitudinal axis 613 and at a first angle φ1 relative to the line 644. The second opening 640, when projected onto the plane, is positioned at a second distance F2 from the central longitudinal axis 613 and at a second angle φ2 relative to the line 644.

The first and second distances F1 and F2 shown in FIG. 90 are different. Likewise, the first and second angles φ1 and φ2 shown in FIG. 90 are different. In alternative embodiments, the first and second angles φ1 and φ2 may be different. In further alternative embodiments, the first and second angles φ1 and φ2 may be the same, but the first and second distances F1 and F2 may be different. In even further alternative embodiments, the first and second distances F1 and F2 may be the same, and the first and second angles φ1 and φ2 may be the same.

With reference to FIGS. 94-100, each discharge passage 634 has an arced cross-sectional shape. The length of the arc may gradually increase between the suction and discharge surfaces 608 and 610, as shown in FIGS. 94-96. At least a portion of each discharge passage 634 intersects a plane containing the central longitudinal axis 613 of the body 606, as shown in FIG. 97.

Continuing with FIGS. 97-100, the configuration of the discharge passages 634 encourages a vortex type flow of fluid about the central longitudinal axis 613 of the body 606, thereby reducing fluid turbulence during operation. The shape of each discharge passage 634 thus maximizes fluid flow and minimizes stress to the body 606 of the fluid routing plug 600 during operation.

Turning back to FIG. 87, the intermediate surface 612 comprises a first sealing surface 650 positioned adjacent the discharge surface 610 and a second sealing surface 652 positioned adjacent the suction surface 608. The first and second sealing surfaces 650 and 652 each extend around the entire intermediate surface 612 in an endless manner and surround the longitudinal axis 613 of the body 606.

Turning back to FIG. 81, the first sealing surface 650 engages a first seal 654 installed within a groove 656 formed in the integral section 604 of the housing 602. The second sealing surface 652 engages a second seal 660 installed within the counterbore 208 formed in the third section 76 of the housing 602. The second seal 660 is surrounded by a wear ring 662. Engagement of the first and second sealing surfaces 650 and 652 with the first and second seals 654 and 660 prevents fluid from leaking around the fluid routing plug 600 during operation. Because the first and second seals 654 and 660 are installed within the housing 602, no grooves are formed in the fluid routing plug 600 for housing a seal.

Continuing with FIG. 87, the intermediate surface 612 of the fluid routing plug 600 further comprises a first bevel 664 and a second bevel 666. The first bevel 664 is positioned between the first sealing surface 650 and the suction passages 614, and the second bevel 666 is positioned between the suction passages 614 and the second sealing surface 652. The bevels 664 and 666 are configured to engage the first and second beveled surfaces 668 and 670 formed in the walls of the integral section 604 of the housing 602, as shown in FIGS. 82 and 83. Axial movement of the fluid routing plug 600 towards the stuffing box 198 is prevented by engagement of the first and second bevels 664 and 666 with the first and second beveled surfaces 668 and 670, as shown in FIG. 81.

Continuing with FIG. 82, when the fluid routing plug 600 is installed within the housing 602, the first bevel 664 seats against the first beveled surface 668. The bevel 664 and the beveled surface 668 meet at a non-right angle. Such angle reduces stress in the fluid routing plug 600 and the housing 602 during operation. The bevel 664 and the beveled surface 668 remain engaged during the forward and backwards stroke of the plunger 216.

Turning to FIG. 83, in contrast to the first bevel 664, the second bevel 666 is sized to be spaced from the second beveled surface 670 when the fluid routing plug 600 is initially installed within the housing 602, as shown by a gap 672. The gap 672 provides space for the fluid routing plug 600 to expand during operation.

As the plunger 216 retracts backwards away from the housing 602, a significant amount of load is applied to the first bevel 664. The applied load causes the fluid routing plug 600 and the integral section 604 to deform, allowing the second bevel 666 to eventually engage the second beveled surface 670. Upon engaging the second beveled surface 670, the load being applied to the first bevel 664 is shared with the second bevel 666, thereby decreasing the load applied to the first bevel 664. Without the gap 672, the fluid routing plug 600 may not have enough room to deform, potentially causing damage to the fluid routing plug 600 and the housing 602 over time.

As the plunger 216 extends forward into the housing 602, the second bevel 666 will return to its non-deformed state, re-creating the gap 672. The gap 672 will repeatedly be created and closed during operation as the plunger 216 reciprocates. In addition to providing space for the fluid routing plug 600 to deform, the gap 672 also provides a gas and fluid relief area during the forward stroke of the plunger 216.

Continuing with FIG. 82, the intermediate surface 612 of the fluid routing plug 600 further comprises a transition bevel 674. The transition bevel 674 extends between the first sealing surface 650 and the first bevel 664, as shown in FIG. 87. The transition bevel 674 does not engage the first beveled surface 668. The transition bevel 674 helps reduce friction between the fluid routing plug 600 and the housing 602 during installation.

Turning to FIG. 101, another embodiment of a housing 682 having the fluid routing plug 600 installed therein is shown. The housing 682 is identical to the housing 602, but the integral section 604 has been split into a first section 684 joined to a second section 686 by a plurality of fasteners (not shown). Splitting the integral section 604 into two sections allows a wear ring 688 to be installed within a counterbore 690 formed in the first section 684. The first seal 654 is also installed within the counterbore 690. The wear ring 668 surrounds the first seal 654 and provides a barrier between the walls of the housing 682 and the first seal 654, during operation. The wear ring 688 and the first seal 654 are held within the counterbore 690 by joining the second section 686 to the first section 684 of the housing 682. During operation, if either the first seal 654 or the wear ring 688 begins to wear and erode, the first seal 654 and/or the wear ring 688 can be removed and replaced with a new first seal 654 and/or wear ring 688. Using the wear ring 688 helps prevent wear or damage to the housing 682 during operation.

Turning to FIGS. 102 and 103, another embodiment of a fluid routing plug 700 is shown. The fluid routing plug 700 is shown installed within the housing 682. The fluid routing plug 700 is identical to the fluid routing plug 600, but it comprises another embodiment of an intermediate surface 702. Instead of a first sealing surface 650, the intermediate surface 702 comprises a first groove 704 for housing the first seal 654. Thus, the first seal 654 is installed within the fluid routing plug 700 instead of the counterbore 690. The counterbore 690 only houses the wear ring 688. Thus, the counterbore 690 may vary in size depending on components to be installed therein. The first seal 654 engages the wear ring 688 installed within the counterbore 690. During operation, if either the first seal 654 or the wear ring 688 begins to wear and erode, the first seal 654 and/or the wear ring 688 can be removed and replaced with a new first seal 654 and/or wear ring 688.

Turning to FIGS. 104 and 105, another embodiment of a fluid routing plug 750 is shown installed within the housing 602. The fluid routing plug 750 is identical to the fluid routing plug 600, but it comprises another embodiment of an intermediate surface 752. Instead of a second sealing surface 652, the intermediate surface 752 comprises a second groove 754 for housing the second seal 660. Thus, the second seal 660 is installed within the fluid routing plug 750 instead of the counterbore 208 of the third section 76. Only the wear ring 662 is installed within the counterbore 208. The second seal 660 engages the wear ring 662. During operation, if either the second seal 660 or the wear ring 662 begins to wear and erode, the second seal 660 and/or the wear ring 662 can be removed and replaced with a new second seal 660 and/or wear ring 662. In alternative embodiments, a fluid routing plug may have both the first and second seals 654 and 660 installed within grooves formed in the fluid routing plug.

Turning to FIGS. 106-112, another embodiment of a fluid routing plug 800 is shown. The fluid routing plug 800 is identical to the fluid routing plug 600, but it comprises another embodiment of an intermediate surface 802. The fluid routing plug 800 is shown installed within another embodiment of a housing 804. The housing 804 is identical to the housing 60, but it includes another embodiment of a second section 806. An outer intermediate surface of the second section 806 is shaped like the second section 686, shown in FIG. 100, but the interior walls of the second section 806 are modified, as described below.

Continuing with FIGS. 107-112, instead of the first bevel 664, the intermediate surface 802 of the fluid routing plug 800 comprises a cylindrical section 808 joined to a transition section 810 by a landing bevel 812, as shown in FIG. 112. The cylindrical section 808 and the landing bevel 812 are configured to engage a landing bevel counterbore 814 formed in the second section 806 of the housing 804, as shown in FIG. 111.

Continuing with FIG. 111, the landing bevel 812 is configured to only contact the landing bevel counterbore 814 at a single point or very small engagement length. The cross-sectional profile of the landing bevel 812 is thus characterized as a splined curve. In operation, the varying fluid pressures in and around the fluid routing plug 800 cause the plug 800 to stretch or deform as the plunger 216 reciprocates. The landing bevel 812 and landing bevel counterbore 814 are sized so that the surfaces more fully engage as the fluid routing plug 800 stretches or deforms during operation. Such engagement supports the housing 804 and fluid routing plug 800 when in their highest state of loading, thereby reducing stress and increasing the life span of such components.

Continuing with FIGS. 106-110, the intermediate surface 802 further comprises the first groove 704 for housing the first seal 654, as shown in FIG. 111, and comprises the second sealing surface 652. However, the fluid routing plug 800 does not comprise the second bevel 666. The intermediate surface 802 merely tapers outwardly from the transition section 810 to the second sealing surface 652. The intermediate surface 802 between the suction passages 314 and the second sealing surface 652 is sized to closely face the walls of the second section 806 of the housing 804. Axial movement of the fluid routing plug 800 within the housing 804 is prevented by engagement of the landing bevel 812 and the landing bevel counterbore 814, as shown in FIG. 111.

Turning to FIGS. 113-119, another embodiment of a fluid routing plug 900 is shown. The fluid routing plug 900 is identical to the fluid routing plug 800, but it comprises another embodiment of an intermediate surface 902. The intermediate surface 902 is like the intermediate surface 802, with a few modifications. The fluid routing plug 900 is shown installed within another embodiment of a housing 904. The housing 904 is identical to the housing 60, but it comprises another embodiment of a second section 906.

Continuing with FIGS. 114-119, the intermediate surface 902 comprises a cylindrical section 908 joined to a transition section 910 by a landing bevel 912. In contrast to the landing bevel 812, the landing bevel 912 joins the cylindrical section 908 at a sharper angle. However, at least a portion of the landing bevel 912 is still a splined curve. A relief 914 is also formed in the walls of the housing 904 adjacent a landing bevel counterbore 916. The relief 914 allows the landing bevel counterbore 916 to be formed in the walls of the housing 904 at a sharper angle. The shape of the landing bevel counterbore 916 is a straight bevel. The modified configuration of the landing bevel 912 and the landing bevel counterbore 916 allows the surfaces to more fully engage during operation. Specifically, more surface area of the landing bevel 912 engages more surface area of the landing bevel counterbore 916 as the fluid routing plug 900 stretches and deforms during operation. Distributing the load during operation over a larger surface area reduces the stresses within the housing 904 and the fluid routing plug 900.

Continuing with FIGS. 114-119, a first groove 918 for housing a first seal 920 is formed within the cylindrical section 908. In contrast to the first groove 704, the first groove 918 extends a greater length of the cylindrical section 908 and houses a larger first seal 920. By increasing the size of the seal 920 installed within the fluid routing plug 900, the area of the intermediate surface 902 contacted by high pressure fluid is reduced, thereby reducing the total stress applied to the fluid routing plug 900 during operation.

Continuing with FIGS. 114-119, the transition section 910 of the intermediate surface 902 has a smaller outer diameter than that of the fluid routing plug 800. The smaller diameter increases the size of the annular fluid channel 412 formed between the fluid routing plug 900 and the walls of the housing 904 surrounding the suction bores 160 and 162, as shown in FIG. 113. The walls of the housing 904 surrounding the suction bores 160 and 162 may include one or more bevels 922 to further increase the size of the annular fluid channel 412. The increase in size of the annular fluid channel 412 helps optimize fluid flow within the housing 904.

Continuing with FIGS. 117 and 119, to account for the smaller diameter of the transition section 910, the intermediate surface 902 further comprises a step 924 positioned between the suction passages 614 and the second sealing surface 652, as shown in FIG. 117. The step 924 increases the outer diameter of the intermediate surface 902 so that the second sealing surface 652 engages the second seal 660, as shown in FIG. 113.

Turning now to FIGS. 120-137, another embodiment of a fluid routing plug 1000 is shown. Fluid routing plug 1000 extends the suction seat 1012 and discharge seat 1027 radially compared to those in embodiments 132, 600, 700, 750, 800, and 900 described herein, without requiring any changes to the relevant fluid end sections. Multi-sectioned discharge fluid passages 1005 are utilized to prevent partial blockage of these passages due to the radial extent of the suction seat 1012. This and other features are discussed in more detail hereinafter.

Fluid routing plug 1000 has a generally cylindrical shape and comprises suction surface 1001, discharge surface 1002, outer intermediate surface 1003, a plurality of suction fluid passages 1004, a plurality of discharge fluid passages 1005, a front transition radius 1006, a rear transition radius 1007, a central longitudinal axis 1008, and a transverse axis 1009. To align with the directional convention used throughout the disclosure of fluid routing plug 1000 the suction surface 1001 may be referred to as the rear surface 1001, and the discharge surface 1002 may be referred to as the front surface 1002.

The suction surface 1001, shown in FIGS. 124 and 125, has a circular projection with the central longitudinal axis 1008 as the center. Beginning at the outermost radius of the suction surface 1001 and moving toward the center, the suction surface 1001 comprises a plurality of concentric elements. These elements are the outer rim 1010, suction crown 1011, suction seat 1012, first radius 1013, suction bore 1014, second radius 1015, and suction base 1016. The suction base 1016 comprises a circular boss 1018 concentric with the suction surface 1001. The circular boss 1018 comprises third radius 1019, first bevel 1020, fourth radius 1021, and boss surface 1022 which are also concentric with the suction surface 1001.

The suction surface 1001 further comprises a plurality of locating bores 1017, which are blind bores spaced evenly around the circumference. These locating bores 1017 are positioned radially at the section of the suction surface 1001 that extends the furthest longitudinally. Specifically, their radial placement falls within the radial limits of the suction crown 1011.

During manufacturing, the suction surface 1001 may be placed on a planar surface to facilitate operations on other surfaces of the fluid routing plug 1000. The planar surface may include projecting elements that fit tightly within the locating bores 1017. The radial placement of the locating bores 1017 aligns with the contact area between the planar surface and the suction surface 1001, minimizing the bending moment on the projecting elements. This reduces the deflection in the projecting elements and limits movement of the fluid routing plug 1000 during these operations.

The discharge surface 1002, shown in FIGS. 122-123, also has a circular projection centered on the central longitudinal axis 1008. Beginning at the outermost radius of the discharge surface 1002 and moving toward the center, the discharge surface 1002 comprises a plurality of concentric elements. These elements are outer rim 1023, fifth radius 1024, outer crown 1025, discharge crown 1026, discharge seat 1027, sixth radius 1028, counterbore 1029, seventh radius 1030, and central base 1031. The central base 1031 comprises installation bore 1033 which comprises blind bore 1034, first chamfer 1035, and base 1036 all of which are also concentric with the discharge surface 1002. The blind bore 1034 may be threaded. In this embodiment the base 1036 is flat but may have other shapes. The transition from the bore 1034 to the base 1036 may be radiused to reduce stress concentration.

The discharge surface 1002 further comprises a plurality of locating bores 1032, which are blind bores spaced evenly around the circumference. These locating bores 1032 are positioned radially at the section of the discharge surface 1002 that extends the furthest longitudinally. Specifically, their radial placement falls within the radial limits of the outer crown 1025 and discharge crown 1026. Locating bores 1032 are used in the same manner as locating bores 1017 when manufacturing operations are performed on the surfaces other than the discharge surface 1002.

The outer intermediate surface 1003, shown in FIGS. 127 and 129-132, comprises a plurality of sections with linear, radial, and spline profiles. Beginning at the section closest to the discharge surface 1002 and continuing along the outer intermediate surface 1003 to the section closest to the suction surface 1001, the sections are: first cylindrical surface 1037, first annular groove 1038, second cylindrical surface 1039, eighth radius 1040, second bevel 1041, ninth radius 1042, third bevel 1043, transition surface 1044, suction passage surface 1045, tenth radius 1046, third cylindrical surface 1047, eleventh radius 1048, fourth bevel 1049, twelfth radius 1050, annular shoulder 1051, stress relief cutout 1052, fourth cylindrical surface 1053, second annular groove 1054, fifth cylindrical surface 1055, thirteenth radius 1056, and fifth bevel 1057.

The first annular groove 1038, as shown in FIG. 130, comprises fourteenth radius 1058, first sidewall 1059, fifteenth radius 1060, first base 1061, sixteenth radius 1062, second sidewall 1063, and seventeenth radius 1064. In this embodiment, the first annular groove 1038 is configured to receive a first seal 386 as shown in FIGS. 120 and 121.

The stress relief cutout 1052, shown in FIG. 127, comprises eighteenth radius 1065, linear section 1066, and nineteenth radius 1067. This and other embodiments of the stress relief cutout 1052 are disclosed in greater detail in U.S. patent application Ser. No. 18/933,692, which is co-pending herewith and incorporated by reference herein.

The second annular groove 1054, shown in FIG. 132, comprises twentieth radius 1068, third sidewall 1069, twenty-first radius 1070, second base 1071, twenty-second radius 1072, fourth sidewall 1073, and twenty-third radius 1074. In this embodiment the second annular groove 1054 is configured to receive a second seal 1094 as shown in FIGS. 120-121.

Each suction fluid passage 1004, shown in FIGS. 126, 129, and 133, fluidly connects the suction passage surface 1045 of the outer intermediate surface 1003 to the suction bore 1014 of the suction surface 1001. The plurality of suction fluid passages 1004 are spaced evenly around the circumference of the fluid routing plug 1000 and do not intersect any of the discharge fluid passages 1005. Each suction fluid passage 1004 comprises a longitudinal axis 1080, along which the cross-section remains constant as shown in FIG. 133. The cross-section of each suction fluid passage 1004 is generally oval or tear drop shaped. Specifically each suction fluid passage 1004 comprises a fifth sidewall 1075 and a sixth sidewall 1076, which are joined by first and second curved surfaces 1077 and 1078. The fifth and sixth sidewalls 1075 and 1076 are planar surfaces with widths S75 and S76. In this embodiment S75 equals S76 but may differ in other embodiments.

Continuing with FIG. 133, the first and second curved surfaces 1077 and 1078 are partial cylindrical surfaces. The first curved surface 1077 has a radius R77 with a center at C77, while the second curved surface 1078 has radius R78 with a center at C78. The fifth and sixth sidewalls 1075 and 1076 are tangent to the first and second curved surfaces 1077 and 1078, forming an included angle, σ4. In this embodiment R77 is greater than R78; however, in other embodiments, R77 may be equal to or smaller than R78. Centers C77 and C78 lie on a centerline 1079 having a length E79. In this embodiment, centerline 1079 is parallel to the central longitudinal axis 1008 but may not be in other embodiments.

The suction fluid passage 1004 further comprises a twenty-fourth radius 1081 and a twenty-fifth radius 1082, shown in FIG. 126. These radii eliminate the sharp transitions between the fifth sidewall 1075, sixth sidewall 1076, first curved surface 1077, and second curved surface 1078 to the suction passage surface 1045 at one end and the suction bore 1014 at the other end of the suction fluid passage 1004.

The longitudinal axis 1080 of each suction fluid passage 1004 is colinear with center C77 of the first curved surface 1077 and intersects the central longitudinal axis 1008 at angle Θ4 as shown in FIG. 126.

Each discharge fluid passage 1005 fluidly connects the suction surface 1001 to the discharge surface 1002. The plurality of discharge fluid passages 1005 are spaced evenly around the circumference of the fluid routing plug 1000 and do not intersect any of the suction fluid passages 1004. Each discharge fluid passage 1005 comprises a discharge surface section 1083, a suction surface section 1084, and a longitudinal axis 1085. While the cross-section of the discharge surface section 1083 remains constant, the cross-section of the suction surface section 1084 varies along its length. Although the cross-section of the discharge fluid passage 1005 may change, the cross-sectional area remains constant throughout the entire length of the discharge fluid passage 1005.

The discharge surface section 1083 begins at the discharge surface 1002 and terminates where it connects to the suction surface section 1084. The cross-section of the discharge surface section 1083 is a curved slot with rounded ends as shown in FIG. 135. The discharge surface section 1083 comprises plurality of partial cylindrical surfaces, including an inner wall 1086 and outer wall 1087, which are connected tangentially to two end sections 1088. The radius R86 of the inner wall 1086 is smaller than the radius R87 of the outer wall 1087. Subtracting R86 from R87 gives the width W83 of the discharge surface section 1083. The circumferential length of each wall 1086 and 1087 is determined from the radii R86 and R87 and the swept angle Θ83.

The suction surface section 1084 begins at the termination of the discharge surface section 1083 and terminates at the suction surface 1001. As stated earlier, the cross-section of the suction surface section 1084 varies along its length. At its beginning, the cross-section is the same as that of the discharge surface section 1083. At its termination, the cross section is narrower and longer but maintains the same cross-sectional area as at the beginning.

The cross-section of the suction surface section 1084 at its termination, that is, at the suction surface 1001, is shown in FIG. 137. This configuration results in the suction surface section 1084 comprising a plurality of partial frustoconical surfaces, including an inner wall 1089 and outer wall 1090, which are connected tangentially to two end sections 1091. The radius R89 of the inner wall 1089 is smaller than the radius R90 of the outer wall 1090. Subtracting R89 from R90 gives the width W84 of the suction surface section 1084 at the suction surface 1001. The circumferential length of each wall 1089 and 1090 at the suction surface 1001 is determined from the radii R89 and R90 and the swept angle Θ84. Note that W84 is always smaller than W83, and Θ84 is always larger than Θ83.

The suction surface section 1084 smoothly transitions from the from the cross-section at its beginning, which is the same cross section as the discharge surface section 1083, to the cross-section at its termination. This is commonly referred to as a lofted surface. At any point along the suction surface section 1084 the cross-sectional area remains constant.

The center C5 of the discharge fluid passage 1005 at any point can be obtained by subtracting the radius of the inner wall 1089 from the radius of the outer wall 1090, dividing the result by two to determine the radius, and then dividing the swept angle by two to find the point along the circumference. The longitudinal axis 1085 forms an angle Θ5 with the central longitudinal axis 1008, as shown in FIG. 126, and coincides with the center C5 of the discharge fluid passage 1005 along its entire length.

During assembly of the fluid end section 56, with the housing 60 already assembled and the insert 210 and wear ring 136 installed within the housing 60, an externally threaded tool (not shown) is screwed into the installation bore 1033 and used to insert the fluid routing plug 1000 in the horizontal bore 70. During the insertion process, the twelfth radius 1050, fourth bevel 1049, and eleventh radius 1048 assist with the initial alignment and insertion of the fluid routing plug 1000 through the wear ring 136. As the fluid routing plug 1000 is inserted further into the horizontal bore 70, the third bevel 1043, ninth radius 1042, second bevel 1041, and eighth radius 1040 facilitate the final alignment prior to full insertion. Simultaneously, twelfth radius 1050, fourth bevel 1049, and eleventh radius 1048 also assist with the alignment and insertion of the fluid routing plug 1000 in the insert 210. These combinations of radii and bevels not only assist in alignment but also prevent damage to the fluid routing plug 1000, wear ring 136, and insert 210 during the assembly process.

During operation, the seal 438 of the suction valve 214 never extends radially past the suction crown 1011 of the suction surface 1001 of the fluid routing plug 1000. Similarly, the seal 438 of the discharge valve 138 never extends radially beyond the discharge crown 1026 of the discharge surface 1002 of the fluid routing plug 1000. This positional limitation reduces the risk of overextension and tearing of the seals 438.

The discharge fluid passages 1005 are never obstructed, even partially, by the seal 438 of the suction valve 214. This is achieved by reducing the width W84 of the suction surface section 1084 at the suction surface 1001. Despite this reduction, fluid flow through the discharge fluid passage 1005 continues with minimal turbulence, as the cross-sectional area of the discharge fluid passage 1005 remains constant throughout its length.

The boss 1018 in the suction base 1016 of the suction surface 1001 increases the material thickness between the boss surface 1022 and the installation bore 1033 in the central base 1031 of the discharge surface 1002. The additional material thickness reduces stress and lowers the likelihood of failure of the fluid routing plug 1000 in this area. The second radius 1015 of the suction surface 1001 and the seventh radius 1030 of the discharge surface 1002 also reduce stress concentrations in the same area again increasing expected life of the fluid routing plug 1000.

To promote non-turbulent fluid flow, the design incorporates the twenty-fourth and twenty-fifth radii 1081 and 1082 of the suction fluid passage 1004. Additionally, the first radius 1013 of the suction surface 1001 and the sixth radius 1028 of the discharge surface 1002 further refine the flow paths, reducing the potential for turbulence.

Referring now to FIG. 138, another embodiment of a fluid routing plug 1100 is shown installed in another embodiment of a fluid end section 1156. The fluid end section 1156 comprises a housing 1102 with a horizontal bore 1170 configured to receive an insert 11210. The fluid routing plug 1100 comprises an annular shoulder 1151. This illustrates another method for longitudinally positioning the fluid routing plug 1100.

Referring now to FIGS. 120-121 and 139-141, another embodiment of an insert 12210 is shown. In previous embodiments, the insert 210 experienced deformation due to the heavy press fit required for operation. Specifically, the front surface 416 displaced outward, forming a convex cone, while the rear surface 418 underwent plastic compression, resulting in a concave deformation. These deformations resulted in a point contact between the front surface 416 of the insert 210 and the annular shoulder 1051 of the fluid routing plug 1000, as well as between the rear surface 418 of the insert 210 and the base 209 of the counterbore 208 of the dynamic body 76, as shown in FIG. 139. The resulting point contacts create stress concentrations within the insert 210 and fluid routing plug 1000 leading to premature failure of the insert 210 and or fluid routing plug 1000.

Measurements of the resulting deformations indicate that the front and rear surfaces 416 and 418 remain planar, allowing the displacement to be quantified as a linear measure. The front surface 416 undergoes outward extrusion, with the displacement shown in FIG. 139 as 417, while the rear surface 418 undergoes inward intrusion, with the displacement shown as 419. The amount of the displacements is between 0.0004 and 0.0008 inches and they are not necessarily equal. The displacements may also be measured as an angular displacements. Note that the displacements in FIG. 139 are greatly exaggerated for illustrative purposes.

The solution to the deformation issue is a new embodiment of insert 12210, shown in FIGS. 140 and 141, which comprises a concave front surface 12416 and a convex rear surface 12418. Insert 12210 is generally similar to insert 210, shown in FIGS. 60-63, except for the modified surfaces. FIGS. 140-141 illustrate these modifications by replacing insert 210 of FIG. 63 with insert 12210. The front surface 12416 is pre-formed to include a specific displacement 12421, and the rear surface 12418 is pre-formed with a corresponding displacement 12423. This geometry is designed so that, when the insert is pressed into place, the concave front surface 12416 and convex rear surface 12418 account for the distortions caused by the heavy press fit, resulting in a flat final shapes of both surfaces 12416 and 12418 that are perpendicular to the longitudinal axis.

Once installed, as shown in FIG. 141, the surfaces 12416 and 12418 are planar and perpendicular to the longitudinal axis of the insert 12210, allowing for full or nearly full contact between the front surface 12416 of the insert 12210 and the annular shoulder 1051 of the fluid routing plug 1000, as well as between the rear surface 12418 of the insert 12210 and the base 209 of the counterbore 208 of the dynamic body 76. However, the amounts of the pre-formed displacements 12421 and 12423 do not necessarily match the measured displacements 417 and 419 after assembly of the original embodiment of insert 210, as the modified surfaces of the new insert 12210 alter the amount of deformation due to the press fit. Additionally, this method of pre-forming the surfaces could also be applied in cases where the original displacements are not planar, adapting the insert geometry to achieve the desired final shape. Achieving the desired flatness may require a trial-and-error approach, with iterative adjustments to the geometry of insert 12210 to ensure optimal performance and minimize stress concentrations.

Referring now to FIGS. 142-148, another solution to the deformation issue is shown. Unlike the previous approach, which modifies the insert 12210 itself, this solution modifies the surfaces that contact the deformed front and rear surfaces 416 and 418 of the insert 210 so that the surfaces conform to the deformation.

The surfaces modified 1351 and 13209, are shown in a new embodiment of the fluid routing plug 1300 and a new embodiment of the dynamic body 1376. The new embodiment of the fluid routing plug 1300 is shown in FIGS. 142-144. The fluid routing plug 1300 comprises an annular shoulder 1351 having an offset of 13417. The offset 13417 is shaped to match the displacement 417 of the front surface 416 of the insert 210 after installation. FIG. 144 illustrates the offset 13417 as an angular displacement, demonstrating an alternative way to quantify it.

The new embodiment of the dynamic body 1376 is shown in FIGS. 145-147. The dynamic body 1376 comprises a counterbore 13208 with a seal groove 13211, and a base 13209, which has an offset 13419. The offset 13419 is shaped to match the displacement 419 of the rear surface 418 of the insert 210 after installation. FIG. 147 illustrates the offset 13419 as an angular displacement, demonstrating an alternative way to quantify it.

Once assembled, the modified annular shoulder 1351 of the fluid routing plug 1300 and the base 13209 of the counterbore 13208 of the dynamic body 1376 fully, or nearly fully, engage the deformed front and rear surfaces 416 and 417 of the insert 210, as shown in FIG. 148. This engagement reduces stress concentrations in the insert 210, which could otherwise lead to premature failure. As a result, this modification enhances the durability and service life of the assembly.

Unlike the previous solution, which may require a trial-and-error approach due to the modified shape of the insert 12210 affecting its deformation, this solution allows for post-insertion measurement of the insert 210. The same deformations can then be replicated on the engaging surfaces 1351 and 13209 without the need for trial and error. Measurements may be taken on a non-modified dynamic body 76, after which the insert 210 can be removed and the dynamic body 76 modified. Alternatively, a test configuration may be constructed to measure the displacement of both the front and rear surfaces 416 and 418 before modifying the surfaces 1351 and 13209.

It is also contemplated that one or both of the deformations may not be planar, requiring a non-planar profile to be formed on the engaged surfaces 1351 and 13209. Additionally, the deformations may vary for the front and rear surfaces 416 and 418, resulting in different profiles on the annular shoulder 1351 and the base 13209 of the counterbore 13208. In this embodiment, the deformations result in planar surfaces, which are addressed by modifications to the engaging surfaces 1351 and 13209.

In operation, even with the load faces 1351 and 13209 modified to enhance contact surface area, the insert 210 still experiences variable loads about its circumference on the front and rear surfaces 416 and 418 due to the suction fluid passages 1304 in the fluid routing plug 1300. The extremely high pressure applied to the fluid routing plug 1300 from the discharge surface 1302 is transferred to the insert 210 through the fluid routing plug 1300. The suction fluid passages 1304 reduce the wall thickness between the discharge surface 1302 and the insert 210. Specifically, the area of the fluid routing plug 1300 between the suction fluid passages 1304 and the insert 210 is less rigid than the sections between the suction fluid passages 1304, allowing localized flexing of the fluid routing plug 1300. This results in a lower force being applied to the insert 210 in those areas. The varying magnitude of force causes differing amounts of flexure in the insert 210, creating areas of stress concentration and, consequently, regions more prone to early failure. The flexure is more pronounced if the counterbore 13208 of the dynamic body 1376 includes a seal groove 13211 as shown in FIG. 148.

The solution to this problem of varying magnitudes of applied force and resulting flexure is to stiffen the fluid routing plug 1300, significantly reducing or eliminating flexure in the section of the fluid routing plug 1300 between the suction fluid passages 1304 and the insert 210. One such design is embodied in the fluid routing plug 1400 shown in FIGS. 149-150. The fluid routing plug 1400 comprises a plurality of suction fluid passages 1404, each incorporating a support column 1495. The support column 1495 reinforces the area of the fluid routing plug 1400 between the insert 210 and the suction fluid passages 1404, thereby reducing flexure as intended. To ensure that the inclusion of the support columns 1495 does not reduce flow capacity, the dimensions of the suction fluid passages 1404 are adjusted to maintain their original cross-sectional area.

Another embodiment of a fluid routing plug 1500 is shown in FIGS. 151-152. The fluid routing plug 1500 comprises a plurality of suction fluid passages 1504, each incorporating a support column 1595. The support columns 1595 are wider than the support columns 1495 of fluid routing plug 1400, providing increased stiffness to the area between the suction fluid passages 1504 and the insert 210. This enhanced stiffness further reduces flexure. As with the previous embodiment, the dimensions of the suction fluid passages 1504 are adjusted to maintain their original cross-sectional area, ensuring that the inclusion of the support columns 1595 does not restrict flow.

It is acknowledged that the support columns 1495 and 1595 may, at first glance, appear to be nothing more than the spaces between a greater number of smaller suction fluid passages 1404 and 1504, essentially halving the size of each passage 1404 and 1504 and doubling their number. However, the placement of these passages 1404 and 1504 cannot be arbitrarily placed due to the need to avoid interference with the discharge fluid passages 1405 and 1505. Unlike a simple geometric redistribution, the arrangement of the suction fluid passages 1404 and 1504 and support columns 1495 and 1595 is carefully designed to balance structural integrity with fluid routing constraints. The result is a functional optimization that ensures stiffness is maximized without disrupting the required flow paths.

Another embodiment of a fluid routing plug 1600 is shown in FIGS. 153-161. The fluid routing plug 1600 comprises a suction surface 1601 having a suction bore 1614, an outer intermediate surface 1603, a plurality of discharge passages 1605, and a plurality of suction fluid passages 1604. Each suction fluid passage 1604 has teardrop shape when viewed perpendicular to its longitudinal axis, with a larger end 1677 and a smaller end 1678, as shown in FIG. 155. In previous embodiments the larger end 1077 of the teardrop shape is oriented closer to the insert 210 upon assembly, as can be inferred from FIGS. 120, 129, and 133. However, in fluid routing plug 1600, this orientation is reversed at the outer intermediate surface 1603, positioning the smaller end 1678 of the teardrop shape closer to the insert 210 when assembled.

Due to the angles of the discharge fluid passages 1605, the orientation of the teardrop shape must transition back to having the larger end 1677 facing the insert 210 as the suction fluid passages 1604 approach the suction bore 1614. Without this transition, the suction fluid passages 1604 would intersect the discharge fluid passages 1605. This transition occurs gradually as the suction fluid passages 1604 progress from the outer intermediate surface 1603 to the suction bore 1614. At the longitudinal midpoint of each suction fluid passage 1604 the cross-section is oval. FIGS. 156-161 illustrate the progression of this transformation from the outer intermediate surface 1603 to the suction bore 1614. This configuration maximizes stiffness in areas where the thickness between the suction fluid passage 1604 and the insert 210 is smallest while maintaining the required clearances closer to the suction bore 1614.

Another embodiment of a fluid routing plug 1700 is shown in FIGS. 162-165. The fluid routing plug 1700 comprises an outer intermediate surface 1703 and plurality of suction fluid passages 1704. The outer intermediate 1703 surface comprises a suction passage surface 1745, a third cylindrical surface 1747, an annular shoulder 1751, and a fourth cylindrical surface 1753. In this embodiment, the outside diameter of the suction passage surface 1745 is reduced to be smaller than the inside diameter of the insert 210. Specifically, the diameter of the suction passage surface 1745 is smaller than the fourth cylindrical surface 1753, while the third cylindrical surface 1747 retains its original diameter.

Since there is no longer any portion of the suction fluid passages 1704 behind the annular shoulder 1751, the thickness of the third cylindrical surface 1747 is constant. As a result, while deflection may increase as compared to embodiments with material behind the annular shoulder 1751, it does not vary around its circumference, which is beneficial for the life of the insert 210. The suction fluid passages 1704 may or may not undergo transformation, as in embodiment 1600.

The fluid routing plugs and corresponding fluid end sections described herein have various embodiments of fluid passages, intermediate surfaces, and corresponding housing sections. While not specifically shown in a figure herein, various features from one fluid routing plug or fluid end section embodiment may be included in another fluid end section embodiment.

Even after extensive efforts to distribute load evenly across the engaging faces of the insert and the fluid routing plug, extreme operational forces continue to cause localized deformation at the contact surfaces. Repeated qualitative and quantitative analyses have revealed that the most durable interface is achieved by initiating contact at the approximate center of the front face of the insert. As the applied load increases, this contact zone should expand both radially inward and outward until full engagement is achieved. This contact progression has been shown to significantly extend insert life under cyclic high-pressure operation by reducing stress concentrations and delaying plastic deformation. To implement this contact progression, the annular shoulder of the fluid routing plug is configured such that the portion of the annular shoulder opposite the center of the insert's front face makes initial contact. This principle of initial central contact can be realized through numerous shoulder profiles. Three embodiments of shoulder geometries developed by the inventors are described in the following paragraphs.

The first of the three embodiments, shown in FIGS. 166-172, has a fluid routing plug 1800 with an annular shoulder 1851. The annular shoulder 1851 comprises a flat middle section 1892 flanked by an inner taper 1897 and an outer taper 1899. The flat middle section 1892 may be radially centered on the front face 18416 of the insert 18210, may extend generally perpendicular to the longitudinal axis 1808, and may extend from a first radius 18101 to a second radius 18103. The flat middle section 1892 is spaced longitudinally from the linear section 1866 of the stress relief cutout 1852 and that spacing defines the height 18105 of the flat middle section 1892. The inner taper 1897 extends from the first radius 18101, at the termination of the flat middle section 1892, to the linear section 1866, transitioning into the linear section 1866 with an eighteenth radius 1865. Radially outward from the second radius 18103, the flat middle section 1892 transitions into the outer taper 1899, which extends from the second radius 18103 to the outer intermediate surface 1803, terminating at the same longitudinal position as the linear section 1866. However, the outer taper 1899 is truncated by the twelfth radius 1850 at the outer intermediate surface 1803.

In one example embodiment, the height 18105 of the flat middle section 1892 is 0.0003 inches, the first radius 18101 located 0.100 inches radially outward from the termination of the linear section 1866, and the second radius 18103 located 0.060 inches radially inward from the outer intermediate surface 1803. These specific dimensional relationships are provided for illustrative purposes and may be varied based on application-specific requirements. One or both of the inner and outer tapers 1897 and 1899 may comprise multiple linear segments having differing taper angles, may be curved segments with a constant radius, or may be spline curves. Additionally, the inner and outer tapers 1897 and 1899 may have equal or unequal lengths, depending on the desired progression of contact during loading.

The second of the three embodiments, shown in FIGS. 173-174, has a fluid routing plug 1900 with an annular shoulder 1951. The annular shoulder 1951 comprises a single symmetric splined curve having a crown 1992 at the point the annular shoulder 1951 contacts the front surface 19416 of the insert 19210. The crown 1992 is centered on the annular shoulder 1951. The crown 1992 is spaced longitudinally from the linear section 1966 of the stress relief cutout 1952, and that spacing defines the height 19105 of the crown 1992. The annular shoulder 1951 transitions to the linear section 1966 with an eighteenth radius 1965 and is truncated by the twelfth radius 1950 at the outer intermediate surface 1903. The annular shoulder 1951 is symmetric; that is, the height, or longitudinal distance from the linear section 1966, is equal at equal inward or outward radial distances from the crown 1992. The symmetric splined curve profile of the annular shoulder 1951 defines the contact progression surface, and the linear section 1966 of the stress relief cutout 1952 serves as the reference surface for longitudinal height measurements.

The symmetric curve profile of the annular shoulder 1951 is defined by nine reference points: the innermost point 19107, the crown 1992, the outermost point 19109, first intermediate point 19111, second intermediate point 19113, third intermediate point 19115, fourth intermediate point 19117, fifth intermediate point 19119, and sixth intermediate point 19121. The intermediate points 19111, 19113, and 19115 are spaced at regular radial intervals between the crown 1992 and the innermost point 19107, and the intermediate points 19117, 19119, and 19121 are spaced at regular radial intervals between the crown 1992 and the outermost point 19109. The crown 1992 is radially centered on the annular shoulder 1951 and located at the maximum height 19105 from the linear section 1966. The innermost point 19107 has a height of 0.000000 inches relative to the linear section 1966 and is radially positioned where the annular shoulder 1951 would have intersected the linear section 1966 but for the presence of the eighteenth radius 1965. The outermost point 19109 also has a height of 0.000000 inches relative to the linear section 1966 and is radially positioned at the outer intermediate surface 1903, although it is a virtual point, as the curve is truncated at that location by the twelfth radius 1950. The longitudinal height of each of the nine reference points relative to the linear section 1966 may be used to define the curve profile of the annular shoulder 1951 and may be modified as needed to achieve a desired contact progression.

In one specific implementation of the embodiment shown in FIGS. 173 and 174, the annular shoulder 1951 has a total radial width of 0.302365 inches. The crown 1992 is radially centered and located at a radial position of 0.1511825 inches, with a height of 0.000700 inches relative to the linear section 1966. The innermost point 19107 is located 0.151182 inches radially inward from the crown 1992 and has a height of 0.000000 inches. The outermost point 19109 is located 0.151182 inches radially outward from the crown 1992 and likewise has a height of 0.000000 inches. The first intermediate point 19111 is positioned 0.037796 inches radially inward from the crown 1992 and has a height of 0.000525 inches. The second intermediate point 19113 is positioned 0.075591 inches radially inward from the crown 1992 and has a height of 0.000350 inches. The third intermediate point 19115 is positioned 0.113387 inches radially inward from the crown 1992 and has a height of 0.000175 inches. The fourth intermediate point 19117 is positioned 0.037796 inches radially outward from the crown 1992 and has a height of 0.000525 inches. The fifth intermediate point 19119 is positioned 0.075591 inches radially outward from the crown 1992 and has a height of 0.000350 inches. The sixth intermediate point 19121 is positioned 0.113387 inches radially outward from the crown 1992 and has a height of 0.000175 inches. The longitudinal height values at each of these nine reference points define the curve profile of the annular shoulder 1951 and may be used to precisely control the shape of the contact progression surface formed between the fluid routing plug 1900 and the insert 19210.

The third of the three embodiments, shown in FIGS. 175-176, has a fluid routing plug 2000 with an annular shoulder 2051. The annular shoulder 2051 comprises a single asymmetric splined curve having a crown 2092 at the point the annular shoulder 2051 contacts the front surface 20416 of the insert 20210. The crown 2092 is radially centered on the annular shoulder 2051. The crown 2092 is spaced longitudinally from the linear section 2066 of the stress relief cutout 2052, and that spacing defines the height 20105 of the crown 2092. The annular shoulder 2051 transitions to the linear section 2066 with an eighteenth radius 2065 and is truncated by the twelfth radius 2050 at the outer intermediate surface 2003. The asymmetric nature of the annular shoulder 2051 arises from the differing longitudinal heights of the innermost and outermost points relative to the linear section 2066. Specifically, the innermost point 20107 lies at a different longitudinal height than the outermost point 20109, and the intermediate points between the crown and these two locations reflect that asymmetry. The asymmetric splined curve profile of the annular shoulder 2051 defines the contact progression surface, and the linear section 2066 of the stress relief cutout 2052 serves as the reference surface for longitudinal height measurements.

The asymmetric curve profile of the annular shoulder 2051 is defined by nine reference points: the innermost point 20107, the crown 2092, the outermost point 20109, first intermediate point 20111, second intermediate point 20113, third intermediate point 20115, fourth intermediate point 20117, fifth intermediate point 20119, and sixth intermediate point 20121. The intermediate points 20111, 20113, and 20115 are spaced at regular radial intervals between the crown 2092 and the innermost point 20107, and the intermediate points 20117, 20119, and 20121 are spaced at regular radial intervals between the crown 2092 and the outermost point 20109. The crown 2092 is located at the maximum height 20105 from the linear section 2066. The innermost point 20107 is radially positioned where the annular shoulder 2051 would have intersected the linear section 2066 but for the presence of the eighteenth radius 2065 and has a height of 0.000000 inches relative to the linear section 2066. The outermost point 20109 is radially positioned at the outer intermediate surface 2003, although it is a virtual point due to truncation by the twelfth radius 2050, and it has a nonzero height relative to the linear section 2066. The differing heights of the innermost and outermost points 20107 and 20109 result in a curve that is asymmetrical in profile while remaining radially centered. The longitudinal height of each of the nine reference points relative to the linear section 2066 may be used to define the curve profile of the annular shoulder 2051 and may be modified as needed to achieve a desired contact progression.

In one specific implementation of the embodiment shown in FIGS. 175 and 176, the annular shoulder 2051 has a total radial width of 0.302365 inches. The crown 2092 is radially centered and located at a radial position of 0.151182 inches, with a height of 0.000800 inches relative to the linear section 2066. The innermost point 20107 is located 0.151182 inches radially inward from the crown 2092 and has a height of 0.000000 inches. The outermost point 20109 is located 0.151182 inches radially outward from the crown 2092 and has a height of 0.000500 inches. The first intermediate point 20111 is positioned 0.037796 inches radially inward from the crown 2092 and has a height of 0.000600 inches. The second intermediate point 20113 is positioned 0.075591 inches radially inward from the crown 2092 and has a height of 0.000400 inches. The third intermediate point 20115 is positioned 0.113387 inches radially inward from the crown 2092 and has a height of 0.000200 inches. The fourth intermediate point 20117 is positioned 0.037796 inches radially outward from the crown 2092 and has a height of 0.000725 inches. The fifth intermediate point 20119 is positioned 0.075591 inches radially outward from the crown 2092 and has a height of 0.000650 inches. The sixth intermediate point 20121 is positioned 0.113387 inches radially outward from the crown 2092 and has a height of 0.000575 inches. The longitudinal height values at each of these nine reference points define the curve profile of the annular shoulder 2051 and may be used to precisely control the shape of the contact progression surface formed between the fluid routing plug 2000 and the insert 20210.

The embodiments described above illustrate various implementations of an annular shoulder having a contoured contact progression surface formed between a fluid routing plug and an insert. However, numerous alternative embodiments may be employed within the scope of the invention. For example, the asymmetric height profile of the contact progression surface, such as that described in the third embodiment, may be reversed so that the high side is positioned radially inward rather than outward. Likewise, the annular shoulder may have a symmetric radial geometry while maintaining an asymmetric longitudinal height profile, or it may have an asymmetric radial profile with a symmetric height.

The embodiments described above illustrate various implementations of an annular shoulder having a contoured contact progression surface formed between a fluid routing plug and an insert. However, numerous alternative embodiments may be employed within the scope of the invention. For example, the asymmetric height profile of the contact progression surface, such as that described in the third embodiment, may be reversed so that the high side is positioned radially inward rather than outward. Likewise, the annular shoulder may have a symmetric radial geometry while maintaining an asymmetric longitudinal height profile, or it may have an asymmetric radial profile with a symmetric height.

While the crown is shown in the figures as radially centered on the annular shoulder, this is not a requirement. The crown may be located at any radial position along the annular shoulder. Likewise, although the desired initial contact location is between the crown of the annular shoulder and the radial center of the front surface of the insert, the illustrations depict the initial contact point on the insert front surface as offset from the radial center. In alternative embodiments, the initial contact point on the insert may also be located at any radial position. The annular shoulder and the front surface of the insert may each be shaped or contoured to achieve a desired progression of contact during assembly, regardless of radial symmetry.

In each of the described embodiments, the contoured surface is formed on the annular shoulder of the plug, with the insert having a corresponding planar surface. In an alternative embodiment, the contoured surface may instead be formed on the insert, while the plug has a generally planar or complementary surface. The described geometry, reference points, and curve profiles may be applied to the insert rather than the plug.

The embodiments described herein generally depict an interface that is perpendicular to the longitudinal axis of the plug. However, in alternative configurations where the contact interface is angled relative to the longitudinal axis, such as those previously described with deformed mating surfaces, the contour of the annular shoulder may be adjusted accordingly. The reference heights of the various points on the contact progression surface may be projected or defined relative to a plane corresponding to the deformed surface, or compensated for in the design of the contour.

Additional variations may include modifying the rate of change of the contour height between the crown and the inner or outer reference points to produce a more gradual or more abrupt contact progression. Different radii of curvature or spline tension values may be employed to alter the contact behavior. The annular shoulder may also include locally flat or relief regions for stress control or manufacturing ease. Further, the overall diameter of the annular shoulder or the radial width of the contoured region may be adjusted without departing from the invention.

In all embodiments, the number of reference points used to define the contour may be increased or decreased, and the spacing between those points need not be uniform. Curves may be defined with as few as three points or more than nine, depending on the desired resolution and complexity of the surface.

In alternative embodiments, features of one of the various fluid routing plugs and corresponding housings described in the '529 application, previously incorporated herein by reference, may be included in one or more of the various fluid routing plugs and/or housings described herein. One of skill in the art will appreciate that the various housing and components described herein may have different shapes and sizes, depending on the shape and size of the various components chosen to assemble each fluid end section.

One or more kits may be useful in assembling a fluid end assembly out of the various fluid end sections described herein. A single kit may comprise a plurality of one of the various embodiments of housings and fasteners described herein. The kit may further comprise a plurality of one or more of the various inner components described herein. The kit may even further comprise a plurality of one or more of the various components attached to the various housings described herein.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A fluid end, comprising:
   a housing having a bore formed therein, the bore comprising a counterbore with a base surface;
   a fluid routing plug at least partially disposed within the bore, the fluid routing plug comprising:
   a body extending along a longitudinal axis having:
   a first end;
   a second end; and
   an outer surface extending between the first end and the second end, the outer surface defining an annular shoulder disposed proximate the second end, wherein:
   a first plurality of fluid passages extending from the outer surface to the second end; and
   a second plurality of fluid passages extending from the second end to the first end; and
   a hardened insert positioned between the annular shoulder of the fluid routing plug and the base surface of the counterbore and comprising:
   a pre-formed first surface having a first profile abutting the shoulder;
   a pre-formed second surface having a second profile abutting the base surface;
   wherein the annular shoulder is characterized by a contoured contact progression profile having an initial central contact at which the pre-formed first surface contacts the annular shoulder, wherein, as a compressive load is applied to the hardened insert, the pre-formed first surface plastically deforms against the annular shoulder to increase a contact area radially outward and radially inward from the initial central contact.

2. The fluid end of claim 1 wherein the annular shoulder comprises a symmetric splined curve, wherein the initial central contact is a crown centered on the shoulder.

3. The fluid end of claim 1, wherein the annular shoulder comprises an asymmetric splined curve, wherein the initial central contact is a crown radially centered and a longitudinal height that varies unequally on opposite sides of the crown.

4. The fluid end of claim 1 wherein the annular shoulder comprises a flat central region flanked by tapered surfaces.

5. The fluid end of claim 1 wherein the fluid routing plug comprises a plurality of support columns positioned within the first plurality of fluid passages.

6. The fluid end of claim 1 wherein the base surface of the counterbore is shaped to match a post-deformation profile of the second surface of the insert.

7. The fluid end of claim 1, wherein the contoured contact progression profile of the annular shoulder comprises a symmetric splined curve, wherein the initial central contact is a crown located at a radial midpoint of the shoulder, the crown having a maximum height relative to a reference surface, and a plurality of radially spaced reference points positioned symmetrically on opposite sides of the crown, each reference point having a longitudinal height that decreases with increasing radial distance from the crown, terminating at an outermost point and an innermost point, each located on the reference surface.

8. The fluid end of claim 7 in which the crown has a distance from the reference surface of less than one one-thousandth of an inch.

9. The fluid end of claim 8 in which the crown is radially disposed less than one-quarter of an inch from the innermost point of the annular shoulder.

10. The fluid end of claim 1, wherein the contoured contact progression profile of the annular shoulder comprises an asymmetric splined curve, wherein the initial central contact is a crown located at a radial midpoint of the shoulder, the crown having a maximum height relative to a reference surface, and a plurality of radially spaced reference points on opposite sides of the crown, the reference points having longitudinal heights that decrease in magnitude with increasing radial distance from the crown, wherein the longitudinal height of the outermost point differs from the longitudinal height of the innermost point, the innermost point being located on the reference surface.

11. The fluid end of claim 10 wherein the crown has a distance from the reference surface of less than one-one thousandth of an inch, and a radial distance of less than one quarter of an inch from the innermost point of the annular shoulder.

12. The fluid end of claim 10 in which the reference points are spaced at regular radial intervals and wherein the angle of the annular shoulder relative to the reference plane changes at each reference point.

13. The fluid end of claim 1 wherein the outer surface of the fluid routing plug further comprises an annular groove configured to receive a seal.

14. The fluid end of claim 13 in which the seal, situated in the annular groove, abuts an inner surface of the hardened insert.

15. A contact progression surface formed on an annular shoulder of a fluid routing plug, the contact progression surface comprising:

a crown positioned at a radial midpoint of the shoulder and having a maximum height relative to a reference surface;

a first set of reference points located at regular radial intervals inward from the crown, each having a longitudinal height less than that of the crown; and a second set of reference points located at regular radial intervals outward from the crown, each having a longitudinal height less than that of the crown;

wherein the longitudinal height of the contact progression surface relative to the reference surface decreases with increasing radial distance from the crown, such that contact between the annular shoulder and a mating insert surface expands radially inward and outward from the crown as a compressive load is applied.

16. The contact progression surface of claim 15 wherein the longitudinal heights of the first and second set of reference points are symmetric about the crown, such that the contact progression surface forms a symmetric splined curve centered at the crown and the innermost and outermost reference points are located on the reference surface.

17. The contact progression surface of claim 15, wherein the longitudinal height of the outermost reference point relative to the reference surface differs from the longitudinal height of the innermost reference point, such that the contact progression surface forms an asymmetric splined curve.

18. The contact progression surface of claim 15, wherein the crown comprises a flat central region extending over a finite radial width, the flat central region flanked by a first tapered surface extending radially inward and a second tapered surface extending radially outward, each decreasing in longitudinal distance from the reference surface with increasing radial distance from the flat region.

19. A fluid end, comprising:
a housing having a counterbore with a base surface;
a fluid routing plug contained in the housing, the fluid routing plug having the contact progression surface of claim 15;
a hardened insert, positioned between the contact progression surface of the fluid routing plug and the base surface of the counterbore.

20. The fluid end of claim 19, wherein the hardened insert comprises a pre-formed surface abutting the contact progression surface, the pre-formed surface configured to plastically deform under compressive load to increase contact area with the contact progression surface.

21. The fluid end of claim 20, wherein the pre-formed surface of the hardened insert has a concave profile prior to deformation and is configured to deform into a planar surface upon installation.

\* \* \* \* \*